(12) United States Patent
Freichel et al.

(10) Patent No.: US 12,503,503 B2
(45) Date of Patent: Dec. 23, 2025

(54) BISPECIFIC ANTI-VEGF/ANG2 ANTIBODY FORMULATION

(71) Applicant: Hoffmann-La Roche Inc., Little Falls, NJ (US)

(72) Inventors: Christian Freichel, Basel (CH); Claudia Mueller, Basel (CH); Robert Mueller, Basel (CH); Piotr Jan Szczesny, Basel (CH); Martin Worgull, Basel (CH); Christine Wurth, Basel (CH)

(73) Assignee: Hoffmann-La Roche Inc., Little Falls, NJ (US)

( * ) Notice: Subject to any disclaimer, the term of this patent is extended or adjusted under 35 U.S.C. 154(b) by 1096 days.

(21) Appl. No.: 17/242,667

(22) Filed: Apr. 28, 2021

(65) Prior Publication Data

US 2021/0324062 A1 Oct. 21, 2021

Related U.S. Application Data

(63) Continuation of application No. PCT/EP2019/079137, filed on Oct. 25, 2019.

(30) Foreign Application Priority Data

Oct. 29, 2018 (EP) .................................. 18203104

(51) Int. Cl.
| | | |
|---|---|---|
| *A61K 39/395* | (2006.01) | |
| *C07K 16/22* | (2006.01) | |
| *A61M 5/178* | (2006.01) | |

(52) U.S. Cl.
CPC ............ *C07K 16/22* (2013.01); *A61M 5/178* (2013.01); *C07K 2317/31* (2013.01); *C07K 2317/526* (2013.01); *C07K 2317/565* (2013.01); *C07K 2317/94* (2013.01)

(58) Field of Classification Search
None
See application file for complete search history.

(56) References Cited

U.S. PATENT DOCUMENTS

| | | |
|---|---|---|
| 4,275,149 A | 6/1981 | Litman et al. |
| 4,318,980 A | 3/1982 | Boguslaski et al. |
| 4,490,473 A | 12/1984 | Brunhouse |
| 4,676,980 A | 6/1987 | Segal et al. |
| 4,737,456 A | 4/1988 | Weng et al. |
| 4,752,601 A | 6/1988 | Hahn |
| 4,816,567 A | 3/1989 | Cabilly et al. |
| 5,047,335 A | 9/1991 | Paulson et al. |
| 5,091,178 A | 2/1992 | Hellstrom et al. |
| 5,202,238 A | 4/1993 | Fell et al. |
| 5,204,244 A | 4/1993 | Fell et al. |
| 5,208,020 A | 5/1993 | Chari et al. |
| 5,225,539 A | 7/1993 | Winter |
| 5,278,299 A | 1/1994 | Wong et al. |
| 5,348,876 A | 9/1994 | Michaelsen et al. |
| 5,412,468 A | 5/1995 | Lundberg et al. |
| 5,416,064 A | 5/1995 | Chari et al. |
| 5,419,904 A | 5/1995 | Irie et al. |
| 5,510,261 A | 4/1996 | Goochee et al. |
| 5,571,894 A | 11/1996 | Wels et al. |
| 5,576,184 A | 11/1996 | Better et al. |
| 5,587,458 A | 12/1996 | King et al. |
| 5,624,821 A | 4/1997 | Winter et al. |
| 5,635,483 A | 6/1997 | Pettit et al. |
| 5,648,237 A | 7/1997 | Carter et al. |
| 5,648,260 A | 7/1997 | Winter et al. |
| 5,698,449 A | 12/1997 | Baumann et al. |
| 5,712,374 A | 1/1998 | Kunstmann et al. |
| 5,714,586 A | 2/1998 | Kunstmann et al. |
| 5,730,977 A | 3/1998 | Ooka et al. |
| 5,731,168 A | 3/1998 | Carter et al. |
| 5,736,137 A | 4/1998 | Anderson et al. |
| 5,739,116 A | 4/1998 | Hamann et al. |
| 5,747,035 A | 5/1998 | Presta et al. |
| 5,750,373 A | 5/1998 | Garrard et al. |
| 5,767,285 A | 6/1998 | Hamann et al. |
| 5,770,429 A | 6/1998 | Lonberg et al. |
| 5,770,701 A | 6/1998 | McGahren et al. |
| 5,770,710 A | 6/1998 | McGahren et al. |
| 5,773,001 A | 6/1998 | Hamann et al. |
| 5,780,588 A | 7/1998 | Pettit et al. |
| 5,789,199 A | 8/1998 | Joly et al. |
| 5,821,337 A | 10/1998 | Carter et al. |
| 5,834,597 A | 11/1998 | Tso et al. |
| 5,840,523 A | 11/1998 | Simmons et al. |
| 5,843,398 A | 12/1998 | Kaminski et al. |
| 5,859,205 A | 1/1999 | Adair et al. |
| 5,869,046 A | 2/1999 | Presta et al. |

(Continued)

FOREIGN PATENT DOCUMENTS

| | | |
|---|---|---|
| CA | 2369292 | 10/2000 |
| CA | 2645891 A1 | 9/2007 |

(Continued)

OTHER PUBLICATIONS

Wang et al. (J. Pharm. Sci. 96(1): 1-26, 2007).*

(Continued)

*Primary Examiner* — Christine J Saoud
(74) *Attorney, Agent, or Firm* — Jelena Libby

(57) ABSTRACT

This invention relates to a pharmaceutical formulation of a bispecific anti-VEGF/ANG2 antibody, and a process for the preparation and uses of the formulation.

13 Claims, 25 Drawing Sheets

Specification includes a Sequence Listing.

(56) References Cited

U.S. PATENT DOCUMENTS

| | | |
|---|---|---|
| 5,877,296 A | 3/1999 | Hamann et al. |
| 5,885,573 A | 3/1999 | Bluestone et al. |
| 5,959,177 A | 9/1999 | Hein et al. |
| 5,985,599 A | 11/1999 | McKenzie et al. |
| 6,030,613 A | 2/2000 | Blumberg et al. |
| 6,040,498 A | 3/2000 | Stomp et al. |
| 6,054,297 A | 4/2000 | Carter et al. |
| 6,075,181 A | 6/2000 | Kucherlapati et al. |
| 6,086,875 A | 7/2000 | Blumberg et al. |
| 6,136,310 A | 10/2000 | Hanna et al. |
| 6,150,584 A | 11/2000 | Kucherlapati et al. |
| 6,165,464 A | 12/2000 | Hudziak et al. |
| 6,165,745 A | 12/2000 | Ward et al. |
| 6,166,185 A | 12/2000 | Davis et al. |
| 6,171,586 B1 | 1/2001 | Lam et al. |
| 6,172,213 B1 | 1/2001 | Lowman et al. |
| 6,180,377 B1 | 1/2001 | Morgan et al. |
| 6,194,551 B1 | 2/2001 | Idusogie et al. |
| 6,242,195 B1 | 6/2001 | Idusogie et al. |
| 6,248,516 B1 | 6/2001 | Winter et al. |
| 6,267,958 B1 | 7/2001 | Andya et al. |
| 6,277,375 B1 | 8/2001 | Ward |
| 6,323,321 B1 | 11/2001 | Buhring et al. |
| 6,417,429 B1 | 7/2002 | Hein et al. |
| 6,420,548 B1 | 7/2002 | Vezina et al. |
| 6,485,726 B1 | 11/2002 | Blumberg et al. |
| 6,491,916 B1 | 12/2002 | Bluestone et al. |
| 6,528,624 B1 | 3/2003 | Idusogie et al. |
| 6,538,124 B1 | 3/2003 | Idusogie et al. |
| 6,582,959 B2 | 6/2003 | Kim |
| 6,586,207 B2 | 7/2003 | Tirrell et al. |
| 6,630,579 B2 | 10/2003 | Chari et al. |
| 6,676,927 B1 | 1/2004 | Ravetch |
| 6,703,020 B1 | 3/2004 | Thorpe et al. |
| 6,706,265 B1 | 3/2004 | Bolt et al. |
| 6,737,056 B1 | 5/2004 | Presta et al. |
| 6,815,540 B1 | 11/2004 | Pluckthun et al. |
| 6,821,505 B2 | 11/2004 | Ward |
| 6,897,044 B1 | 5/2005 | Braslawsky et al. |
| 6,946,292 B2 | 9/2005 | Kanda et al. |
| 6,982,321 B2 | 1/2006 | Winter et al. |
| 7,041,870 B2 | 5/2006 | Tomizuka et al. |
| 7,060,269 B1 | 6/2006 | Baca et al. |
| 7,083,784 B2 | 8/2006 | Dall'Acqua et al. |
| 7,087,409 B2 | 8/2006 | Barbas et al. |
| 7,122,637 B2 | 10/2006 | Presta |
| 7,125,978 B1 | 10/2006 | Vezina et al. |
| 7,129,330 B1 | 10/2006 | Little et al. |
| 7,183,387 B1 | 2/2007 | Presta |
| 7,189,826 B2 | 3/2007 | Rodman |
| 7,214,775 B2 | 5/2007 | Hanai et al. |
| 7,276,585 B2 | 10/2007 | Lazar et al. |
| 7,297,775 B2 | 11/2007 | Idusogie et al. |
| 7,317,091 B2 | 1/2008 | Lazar et al. |
| 7,332,581 B2 | 2/2008 | Presta et al. |
| 7,335,742 B2 | 2/2008 | Presta |
| 7,364,731 B2 | 4/2008 | Idusogie et al. |
| 7,371,826 B2 | 5/2008 | Presta et al. |
| 7,416,727 B2 | 8/2008 | Presta |
| 7,498,298 B2 | 3/2009 | Doronina et al. |
| 7,521,053 B2 | 4/2009 | Oliner |
| 7,521,541 B2 | 4/2009 | Eigenbrot et al. |
| 7,527,791 B2 | 5/2009 | Adams et al. |
| 7,563,441 B2 | 7/2009 | Graus et al. |
| 7,598,055 B2 | 10/2009 | Bobrowicz et al. |
| 7,632,497 B2 | 12/2009 | Stavenhagen et al. |
| 7,658,924 B2 | 2/2010 | Oliner et al. |
| 7,678,373 B2 | 3/2010 | Desnoyers et al. |
| 7,691,977 B2 | 4/2010 | Fuh et al. |
| 7,741,072 B2 | 6/2010 | Idusogie et al. |
| 7,785,791 B2 | 8/2010 | Presta |
| 7,790,858 B2 | 9/2010 | Presta |
| 7,919,257 B2 | 4/2011 | Hoogenboom et al. |
| 7,923,538 B2 | 4/2011 | Shitara et al. |
| 7,931,895 B2 | 4/2011 | Beliard et al. |
| 7,960,512 B2 | 6/2011 | Stavenhagen et al. |
| 7,994,290 B2 | 8/2011 | Shitara et al. |
| 8,088,376 B2 | 1/2012 | Chamberlain et al. |
| 8,133,979 B2 | 3/2012 | Brinkmann et al. |
| 8,163,882 B2 | 4/2012 | Presta |
| RE43,568 E | 8/2012 | Graus et al. |
| 8,268,314 B2 | 9/2012 | Baehner et al. |
| 8,361,747 B2 | 1/2013 | Brinkmann et al. |
| 8,399,626 B2 | 3/2013 | Brinkmann et al. |
| RE44,359 E | 7/2013 | Graus et al. |
| 8,674,083 B2 | 3/2014 | Presta |
| 8,703,130 B2 | 4/2014 | Bachner et al. |
| 8,945,552 B2 | 2/2015 | Baehner et al. |
| 8,969,526 B2 | 3/2015 | Baehner et al. |
| 9,017,671 B2 | 4/2015 | Andya et al. |
| 9,695,233 B2 | 7/2017 | Duerr et al. |
| 9,708,396 B2 | 7/2017 | Baehner et al. |
| 10,683,345 B2 | 6/2020 | Duerr et al. |
| 2001/0036459 A1 | 11/2001 | Ravetch et al. |
| 2002/0098193 A1 | 7/2002 | Ward et al. |
| 2002/0197256 A1 | 12/2002 | Grewal et al. |
| 2003/0064053 A1 | 4/2003 | Liu et al. |
| 2003/0108546 A1 | 6/2003 | Fukushima et al. |
| 2003/0115614 A1 | 6/2003 | Kanda et al. |
| 2003/0118592 A1 | 6/2003 | Ledbetter et al. |
| 2003/0124129 A1 | 7/2003 | Oliner et al. |
| 2003/0158389 A1 | 8/2003 | Idusogie et al. |
| 2003/0161826 A1 | 8/2003 | Arnason et al. |
| 2003/0166868 A1 | 9/2003 | Presta et al. |
| 2003/0190311 A1 | 10/2003 | Dall'Acqua et al. |
| 2003/0190317 A1 | 10/2003 | Baca et al. |
| 2003/0203409 A1 | 10/2003 | Kim |
| 2003/0206899 A1 | 11/2003 | Ferrara et al. |
| 2004/0002587 A1 | 1/2004 | Watkins et al. |
| 2004/0110226 A1 | 6/2004 | Lazar et al. |
| 2004/0132101 A1 | 7/2004 | Lazar et al. |
| 2004/0191244 A1 | 9/2004 | Presta |
| 2004/0191256 A1 | 9/2004 | Raju |
| 2004/0191265 A1 | 9/2004 | Schenerman et al. |
| 2004/0214988 A1 | 10/2004 | Tirrell et al. |
| 2004/0228856 A1 | 11/2004 | Presta |
| 2005/0014934 A1 | 1/2005 | Hinton et al. |
| 2005/0031613 A1 | 2/2005 | Nakamura et al. |
| 2005/0031626 A1 | 2/2005 | Stevenson |
| 2005/0032114 A1 | 2/2005 | Hinton et al. |
| 2005/0037000 A1 | 2/2005 | Stavenhagen et al. |
| 2005/0054832 A1 | 3/2005 | Lazar et al. |
| 2005/0079170 A1 | 4/2005 | LeGall et al. |
| 2005/0079574 A1 | 4/2005 | Bond et al. |
| 2005/0079605 A1 | 4/2005 | Umana et al. |
| 2005/0112126 A1 | 5/2005 | Baca et al. |
| 2005/0118174 A1 | 6/2005 | Presta |
| 2005/0119455 A1 | 6/2005 | Fuh et al. |
| 2005/0136051 A1 | 6/2005 | Scallon |
| 2005/0142133 A1 | 6/2005 | Lazar et al. |
| 2005/0152894 A1 | 7/2005 | Krummen et al. |
| 2005/0186208 A1 | 8/2005 | Fyfe et al. |
| 2005/0227324 A1 | 10/2005 | Huang et al. |
| 2005/0233382 A1 | 10/2005 | Presta |
| 2005/0249722 A1 | 11/2005 | Beliard et al. |
| 2005/0249723 A1 | 11/2005 | Lazar |
| 2005/0260186 A1 | 11/2005 | Bookbinder et al. |
| 2005/0266000 A1 | 12/2005 | Bond et al. |
| 2005/0272916 A1 | 12/2005 | Hanai et al. |
| 2005/0276799 A1 | 12/2005 | Hinton et al. |
| 2005/0276805 A1 | 12/2005 | Hanai et al. |
| 2006/0009360 A1 | 1/2006 | Pifer et al. |
| 2006/0018909 A1 | 1/2006 | Oliner et al. |
| 2006/0018911 A1 | 1/2006 | Ault-Riche et al. |
| 2006/0024292 A1 | 2/2006 | Gerngross et al. |
| 2006/0024298 A1 | 2/2006 | Lazar |
| 2006/0024300 A1 | 2/2006 | Adams et al. |
| 2006/0024304 A1 | 2/2006 | Gerngross et al. |
| 2006/0025576 A1 | 2/2006 | Miller et al. |
| 2006/0029604 A1 | 2/2006 | Gerngross et al. |
| 2006/0034828 A1 | 2/2006 | Gerngross et al. |
| 2006/0034829 A1 | 2/2006 | Gerngross et al. |
| 2006/0034830 A1 | 2/2006 | Gerngross et al. |
| 2006/0067930 A1 | 3/2006 | Adams et al. |

(56) References Cited

U.S. PATENT DOCUMENTS

| | | |
|---|---|---|
| 2006/0074225 A1 | 4/2006 | Chamberlain et al. |
| 2006/0088523 A1 | 4/2006 | Andya et al. |
| 2006/0104968 A1 | 5/2006 | Bookbinder et al. |
| 2006/0121032 A1 | 6/2006 | Dahiyat et al. |
| 2006/0122370 A1 | 6/2006 | Oliner et al. |
| 2006/0134709 A1 | 6/2006 | Stavenhagen et al. |
| 2006/0140934 A1 | 6/2006 | Gegg et al. |
| 2006/0153838 A1 | 7/2006 | Watkins et al. |
| 2006/0160996 A9 | 7/2006 | Lazar et al. |
| 2006/0173170 A1 | 8/2006 | Chamberlain et al. |
| 2006/0194290 A1 | 8/2006 | Presta |
| 2006/0194291 A1 | 8/2006 | Presta |
| 2006/0194954 A1 | 8/2006 | Idusogie et al. |
| 2006/0194957 A1 | 8/2006 | Presta |
| 2006/0198840 A1 | 9/2006 | Dall'Acqua et al. |
| 2006/0235208 A1 | 10/2006 | Lazar et al. |
| 2006/0246004 A1 | 11/2006 | Adams et al. |
| 2006/0246071 A1 | 11/2006 | Green et al. |
| 2006/0275282 A1 | 12/2006 | Moore et al. |
| 2006/0275283 A1 | 12/2006 | Van Vlijmen et al. |
| 2006/0280747 A1 | 12/2006 | Fuh et al. |
| 2007/0003546 A1 | 1/2007 | Lazar et al. |
| 2007/0009523 A1 | 1/2007 | Presta |
| 2007/0020260 A1 | 1/2007 | Presta |
| 2007/0020267 A1 | 1/2007 | Fuh et al. |
| 2007/0036806 A1 | 2/2007 | Glaesner et al. |
| 2007/0041966 A1 | 2/2007 | Armour et al. |
| 2007/0048300 A1 | 3/2007 | Taylor et al. |
| 2007/0053901 A1 | 3/2007 | Lazar et al. |
| 2007/0061900 A1 | 3/2007 | Murphy et al. |
| 2007/0117126 A1 | 5/2007 | Sidhu et al. |
| 2007/0122403 A1 | 5/2007 | Dall'Acqua et al. |
| 2007/0122406 A1 | 5/2007 | Chamberlain et al. |
| 2007/0135620 A1 | 6/2007 | Chamberlain et al. |
| 2007/0141065 A1 | 6/2007 | Fuh et al. |
| 2007/0148171 A1 | 6/2007 | Lazar et al. |
| 2007/0160597 A1 | 7/2007 | Lazar et al. |
| 2007/0160598 A1 | 7/2007 | Dennis et al. |
| 2007/0161783 A1 | 7/2007 | Barbosa et al. |
| 2007/0166309 A1 | 7/2007 | Lazar et al. |
| 2007/0202098 A1 | 8/2007 | Lazar et al. |
| 2007/0219133 A1 | 9/2007 | Lazar et al. |
| 2007/0224189 A1 | 9/2007 | Lazar et al. |
| 2007/0224192 A1 | 9/2007 | Lazar et al. |
| 2007/0231329 A1 | 10/2007 | Lazar et al. |
| 2007/0237764 A1 | 10/2007 | Birtalan et al. |
| 2007/0237765 A1 | 10/2007 | Lazar et al. |
| 2007/0237766 A1 | 10/2007 | Lazar et al. |
| 2007/0237767 A1 | 10/2007 | Lazar et al. |
| 2007/0238665 A1 | 10/2007 | Lazar et al. |
| 2007/0243188 A1 | 10/2007 | Lazar et al. |
| 2007/0248602 A1 | 10/2007 | Lazar et al. |
| 2007/0248603 A1 | 10/2007 | Lazar et al. |
| 2007/0286859 A1 | 12/2007 | Lazar et al. |
| 2007/0292936 A1 | 12/2007 | Barthelemy et al. |
| 2008/0051563 A1 | 2/2008 | Lazar et al. |
| 2008/0057056 A1 | 3/2008 | Lazar et al. |
| 2008/0069820 A1 | 3/2008 | Fuh et al. |
| 2008/0095762 A1 | 4/2008 | Presta |
| 2008/0138338 A1 | 6/2008 | Idusogie et al. |
| 2008/0152649 A1 | 6/2008 | Chamberlain et al. |
| 2008/0154025 A1 | 6/2008 | Lazar et al. |
| 2008/0161541 A1 | 7/2008 | Lazar et al. |
| 2008/0181890 A1 | 7/2008 | Lazar et al. |
| 2008/0206242 A1 | 8/2008 | Lawrence et al. |
| 2008/0213215 A1 | 9/2008 | Krishnan et al. |
| 2008/0274105 A1 | 11/2008 | Presta |
| 2008/0274108 A1 | 11/2008 | Presta |
| 2009/0041770 A1 | 2/2009 | Chamberlain et al. |
| 2009/0054323 A1 | 2/2009 | Oliner et al. |
| 2009/0060911 A1 | 3/2009 | Ravetch |
| 2009/0068182 A1 | 3/2009 | Young et al. |
| 2009/0148441 A1 | 6/2009 | Gillies |
| 2009/0162359 A1 | 6/2009 | Klein et al. |
| 2009/0162360 A1 | 6/2009 | Klein et al. |
| 2009/0163699 A1 | 6/2009 | Chamberlain et al. |
| 2009/0175851 A1 | 7/2009 | Klein |
| 2009/0215991 A1 | 8/2009 | Lazar et al. |
| 2009/0232811 A1 | 9/2009 | Klein et al. |
| 2010/0098730 A1 | 4/2010 | Lowman et al. |
| 2010/0111967 A1 | 5/2010 | Baehner et al. |
| 2010/0166740 A1 | 7/2010 | Endl et al. |
| 2010/0166749 A1 | 7/2010 | Presta |
| 2010/0255013 A1 | 10/2010 | Presta |
| 2011/0044998 A1 | 2/2011 | Bedian et al. |
| 2011/0052584 A1 | 3/2011 | Ravetch |
| 2011/0086050 A1 | 4/2011 | Presta et al. |
| 2011/0250130 A1 | 10/2011 | Benatuil et al. |
| 2011/0293632 A1 | 12/2011 | Presta |
| 2012/0201813 A1 | 8/2012 | Presta |
| 2012/0321627 A1 | 12/2012 | Baehner et al. |
| 2013/0156789 A1 | 6/2013 | Brinkmann et al. |
| 2014/0017244 A1 | 1/2014 | Duerr et al. |
| 2014/0065151 A1 | 3/2014 | Brinkmann et al. |
| 2014/0065707 A1 | 3/2014 | Brinkmann et al. |
| 2015/0004166 A1 | 1/2015 | Baehner et al. |
| 2015/0239981 A1 | 8/2015 | Baehner et al. |
| 2016/0068613 A1 | 3/2016 | Regula et al. |
| 2016/0215045 A1 | 7/2016 | Leung et al. |
| 2017/0044246 A1 | 2/2017 | Schlothauer et al. |

FOREIGN PATENT DOCUMENTS

| | | |
|---|---|---|
| CA | 2700986 | 4/2009 |
| CN | 1565622 A | 1/2005 |
| CN | 101098890 | 1/2008 |
| CN | 102191209 A | 9/2011 |
| CN | 102250247 A | 11/2011 |
| CN | 102250248 A | 11/2011 |
| CN | 102753577 A | 10/2012 |
| CN | 103533950 A | 1/2014 |
| CN | 104066448 A | 9/2014 |
| CN | 104582728 A | 4/2015 |
| CN | 106999511 A | 8/2017 |
| CN | 107080843 A | 8/2017 |
| CN | 107428826 A | 12/2017 |
| EC | SP992970 | 1/2000 |
| EP | 0404097 B1 | 9/1996 |
| EP | 0425235 B1 | 9/1996 |
| EP | 0359096 B1 | 11/1997 |
| EP | 1176195 A1 | 1/2002 |
| EP | 0666868 B2 | 6/2002 |
| EP | 1331266 A1 | 7/2003 |
| EP | 1331266 A4 | 7/2003 |
| EP | 0904107 B1 | 10/2004 |
| EP | 0811691 B1 | 12/2004 |
| EP | 1498491 A1 | 1/2005 |
| EP | 1498491 A4 | 1/2005 |
| EP | 1068241 B1 | 10/2007 |
| EP | 1870459 A1 | 12/2007 |
| EP | 1270595 B1 | 7/2008 |
| EP | 1692182 B1 | 4/2010 |
| EP | 2248829 A1 | 11/2010 |
| EP | 2252632 B1 | 1/2014 |
| EP | 2691417 B1 | 8/2018 |
| JP | 2008-520551 A | 6/2008 |
| JP | 2015-527064 A | 9/2015 |
| JP | 2017-538674 A | 12/2017 |
| JP | 2018-500380 A | 1/2018 |
| JP | 2018-517773 A | 7/2018 |
| WO | 1993/006217 A1 | 4/1993 |
| WO | 1994/10202 A1 | 5/1994 |
| WO | 1996/27011 A1 | 9/1996 |
| WO | 00/09560 A2 | 2/2000 |
| WO | 00/09560 A3 | 2/2000 |
| WO | 2000/035956 A1 | 6/2000 |
| WO | 00/42072 A2 | 7/2000 |
| WO | 2000/42072 A2 | 7/2000 |
| WO | 00/61739 A1 | 10/2000 |
| WO | 2000/075348 A1 | 12/2000 |
| WO | 2000/075348 A2 | 12/2000 |
| WO | 2000/075348 A3 | 12/2000 |
| WO | 2000/075348 A4 | 12/2000 |
| WO | 2000/075348 A5 | 12/2000 |

(56) References Cited

FOREIGN PATENT DOCUMENTS

| | | |
|---|---|---|
| WO | 2000/075348 A6 | 12/2000 |
| WO | 2000/075348 A7 | 12/2000 |
| WO | 2000/075348 A8 | 12/2000 |
| WO | 2000/075348 A9 | 12/2000 |
| WO | 01/40309 A2 | 6/2001 |
| WO | 01/64754 A1 | 7/2001 |
| WO | 01/58957 A2 | 8/2001 |
| WO | 01/58957 A3 | 8/2001 |
| WO | 01/77181 A2 | 10/2001 |
| WO | 01/077342 A1 | 10/2001 |
| WO | 02/031140 A1 | 4/2002 |
| WO | 02/060919 A2 | 8/2002 |
| WO | 02/083854 A2 | 10/2002 |
| WO | 03/011878 A2 | 2/2003 |
| WO | 2003/020906 A2 | 3/2003 |
| WO | 2003/030833 A2 | 4/2003 |
| WO | 03/035835 A2 | 5/2003 |
| WO | 03/035835 A3 | 5/2003 |
| WO | 2003/055993 A1 | 7/2003 |
| WO | 2003/057134 A2 | 7/2003 |
| WO | 03/073238 A | 9/2003 |
| WO | 03/073238 A2 | 9/2003 |
| WO | 2003/074679 A2 | 9/2003 |
| WO | 2003/106501 A1 | 12/2003 |
| WO | 2004/004662 A2 | 1/2004 |
| WO | 2004/004662 A3 | 1/2004 |
| WO | 2004/004798 A2 | 1/2004 |
| WO | 2004/011611 A2 | 2/2004 |
| WO | 2004/029207 A2 | 4/2004 |
| WO | 2004/029207 A3 | 4/2004 |
| WO | 2004/035752 A2 | 4/2004 |
| WO | 2004/035752 A3 | 4/2004 |
| WO | 2004/063351 A2 | 7/2004 |
| WO | 2004/092219 A2 | 10/2004 |
| WO | 2004/092219 A3 | 10/2004 |
| WO | 2004/099249 A2 | 11/2004 |
| WO | 2005/000900 A1 | 1/2005 |
| WO | 2005/012359 A2 | 2/2005 |
| WO | 2005/018572 A2 | 3/2005 |
| WO | 2005/035727 A2 | 4/2005 |
| WO | 2005/035727 A3 | 4/2005 |
| WO | 2005/037867 A1 | 4/2005 |
| WO | 2005/040217 A2 | 5/2005 |
| WO | 2005/040217 A8 | 5/2005 |
| WO | 2005/044853 A2 | 5/2005 |
| WO | 2005/047327 A2 | 5/2005 |
| WO | 2005/047327 A8 | 5/2005 |
| WO | 2005/054273 A2 | 6/2005 |
| WO | 2005/068503 A2 | 7/2005 |
| WO | 2005/074524 A2 | 8/2005 |
| WO | 2005/074524 A3 | 8/2005 |
| WO | 2005/100402 A1 | 10/2005 |
| WO | 2005/123780 A2 | 12/2005 |
| WO | 2006/002058 A2 | 1/2006 |
| WO | 2006/019447 A1 | 2/2006 |
| WO | 2006/020114 A2 | 2/2006 |
| WO | 2006/020114 A3 | 2/2006 |
| WO | 2006/020258 A2 | 2/2006 |
| WO | 2006/029879 A2 | 3/2006 |
| WO | 2006/029879 A3 | 3/2006 |
| WO | 2006/031370 A2 | 3/2006 |
| WO | 2006/044908 A2 | 4/2006 |
| WO | 2006/045049 A1 | 4/2006 |
| WO | 2006/047350 A2 | 5/2006 |
| WO | 2006/047350 A3 | 5/2006 |
| WO | 2006/053301 A2 | 5/2006 |
| WO | 2006/053301 A3 | 5/2006 |
| WO | 2006/053301 A9 | 5/2006 |
| WO | 2006/068953 A2 | 6/2006 |
| WO | 2006/076594 A2 | 7/2006 |
| WO | 2006/076594 A3 | 7/2006 |
| WO | 2006/093794 A1 | 8/2006 |
| WO | 2006/116260 A2 | 11/2006 |
| WO | 2007/024715 A2 | 3/2007 |
| WO | 2007/024715 A3 | 3/2007 |
| WO | 2007/024715 A4 | 3/2007 |
| WO | 2007/024715 A5 | 3/2007 |
| WO | 2007/024715 A6 | 3/2007 |
| WO | 2007/024715 A7 | 3/2007 |
| WO | 2007/024715 A8 | 3/2007 |
| WO | 2007/024715 A9 | 3/2007 |
| WO | 2007/033216 A2 | 3/2007 |
| WO | 2007/044887 A2 | 4/2007 |
| WO | 2007/068895 A1 | 6/2007 |
| WO | 2007/068895 A2 | 6/2007 |
| WO | 2007/068895 A3 | 6/2007 |
| WO | 2007/068895 A4 | 6/2007 |
| WO | 2007/068895 A5 | 6/2007 |
| WO | 2007/068895 A6 | 6/2007 |
| WO | 2007/068895 A7 | 6/2007 |
| WO | 2007/068895 A8 | 6/2007 |
| WO | 2007/068895 A9 | 6/2007 |
| WO | 2007/089445 A2 | 8/2007 |
| WO | 2007/109254 A2 | 9/2007 |
| WO | 2007/110205 A2 | 10/2007 |
| WO | 2007/147901 A1 | 12/2007 |
| WO | 2008/073300 A2 | 6/2008 |
| WO | 2008/077077 A2 | 6/2008 |
| WO | 2008/132568 A2 | 11/2008 |
| WO | 2008/149147 A2 | 12/2008 |
| WO | 2008/149149 A2 | 12/2008 |
| WO | 2009/006520 A1 | 1/2009 |
| WO | 2009/023955 A1 | 2/2009 |
| WO | 2009/032782 A2 | 3/2009 |
| WO | 2009/058492 A2 | 5/2009 |
| WO | 2009/058812 A1 | 5/2009 |
| WO | 2009/068649 A2 | 5/2009 |
| WO | 2009/073160 A1 | 6/2009 |
| WO | 2009/073569 A2 | 6/2009 |
| WO | 2009/080251 A1 | 7/2009 |
| WO | 2009/080252 A1 | 7/2009 |
| WO | 2009/080253 A1 | 7/2009 |
| WO | 2009/080254 A1 | 7/2009 |
| WO | 2009/086320 A1 | 7/2009 |
| WO | 2009/089004 A1 | 7/2009 |
| WO | 2010/040508 A1 | 4/2010 |
| WO | 1999/37791 A1 | 2/2011 |
| WO | 2011/117329 A1 | 9/2011 |
| WO | 2011/117330 A1 | 9/2011 |
| WO | 2012/097019 A1 | 7/2012 |
| WO | 2012/131078 A1 | 10/2012 |
| WO | 2013/056233 A1 | 4/2013 |
| WO | 2014/009465 A1 | 1/2014 |
| WO | 2014/031429 A2 | 2/2014 |
| WO | 2014/177460 A1 | 11/2014 |
| WO | 2015/083978 A1 | 6/2015 |
| WO | 2015/107015 A1 | 7/2015 |
| WO | 2016/073915 A1 | 5/2016 |
| WO | 2016/073918 A1 | 5/2016 |
| WO | 2016/085750 A1 | 6/2016 |
| WO | 2016/094673 A1 | 6/2016 |
| WO | 2016/109822 A1 | 7/2016 |
| WO | 2016/122996 A1 | 8/2016 |
| WO | 2016/208989 A1 | 12/2016 |
| WO | 2017/085253 A1 | 5/2017 |
| WO | 2017/106770 A1 | 6/2017 |
| WO | 2017/129685 A1 | 8/2017 |
| WO | 2017/197199 A1 | 11/2017 |
| WO | 2017/218977 A2 | 12/2017 |
| WO | 201//122053 A1 | 7/2018 |
| WO | 2018/175752 A1 | 9/2018 |
| WO | 2019/154776 A1 | 8/2019 |
| WO | 2019/217927 A1 | 11/2019 |

OTHER PUBLICATIONS

Daugherty et al., "Chapter 8: Formulation and Delivery Issues for Monoclonal Antibody Therapeutics" Current Trends in Monoclonal Antibody Development and Manufacturing, Springer:103-129 ( 2006).

Manning et al., "Stability of Protein Pharmaceuticals" Pharm. Res. 6(11):903-918 ( 1989).

(56) References Cited

OTHER PUBLICATIONS

Regula, J., et al., "Targeting key angiogenic pathways with a bispecific CrossMAb optimized for neovascular eye diseases" EMBO Mol Med 8(11):1265-1288 (Nov. 1, 2016).
Wang et al., "Antibody Strucutre, Instability, and Formulation" J PHarm Sci 93(1):1-26 (Jan. 2007).
Zheng et al., "Influence of pH, buffer species, and storage tempature on physicochemical stability of a humanized momoclonal antibody LA298" Int. J. Pharm. 308:46-51 ( 2006).
Abes, R., et al., "Activating and inhibitory Fcγ receptors in immunotherapy: being the actor or being the target" Expert Rev Clin Immunol 5(6):735-747 (Nov. 1, 2009).
Adamis, A., et al., "Inhibition of Vascular Endothelial Growth Factor Prevents Retinal Ischemia-Associated Iris Neovascularization in a Nonhuman Primate" Arch Ophthalmol-Chic 114(1):66-71 (Jan. 1, 1996).
Adler, M. et al., "Challenges in the Development of Pre-filled Syringes for Biologics from a Formulation Scientist's Point of View" Amer Pharma Rev:1-8 (Feb. 1, 2012).
Ahmad, S., et al., "Differential Expression of Angiopoietin-1 and Angiopoietin-2 in Colon Carcinoma" Cancer 92(5):1138-1143 (Sep. 1, 2001).
Allan, R. et al., "Studies on the complement-binding site of rabbit immunoglobulin G-II. The reaction of rabbit IgG and its fragments with C1q" Immunochemistry 11(5):243-248 (May 1, 1974).
Allan, R., et al., "Studies on the complement-binding site of rabbit immunoglobulin G-I. Modification of tryptophan residues and their role in anticomplementary activity of rabbit IgG" Immunochemistry 11(4):175-180 (Apr. 1, 1974).
Almagro and Fransson, "Humanization of antibodies" Front Biosci 13:1619-1633 (Jan. 1, 2008).
Anderson, D., et al., "Targeted anti-cancer therapy using rituximab, a chimaeric anti-CD20 antibody (IDEC-C2B8) in the treatment of non-Hodgkin's B-cell lymphoma" Biochem Soc Trans 25(2):705-708 (May 1, 1997).
Angal, S., et al., "A single amino acid substitution abolishes the heterogeneity of chimeric mouse/human (IgG4) antibody" Molec Immunol 30(1):105-108 (Jan. 1, 1993).
Angata, K., et al., "Differential and Cooperative Polysialylation of the Neural Cell Adhesion Molecule by Two Polysialyltransferases, PST and STX" J Biol Chem 273(43):28524-28532 (Oct. 23, 1998).
Armour, K., et al., "Recombinant Human IgG Molecules Lacking Fcγ Receptor I Binding and Monocyte Triggering Activities" Eur J Immunol 29(8):2613-2624 (Aug. 1, 1999).
Artandi, S. et al., "Monoclonal IgM rheumatoid factors bind IgG at a discontinuous epitope comprised of amino acid loops from heavy-chain constant-region domains 2 and 3" PNAS 89(1):94-98 (Jan. 1, 1992).
Asahara, T., et al., "Tie2 Receptor Ligands, Angiopoietin-1 and Angiopoietin-2, Modulate VEGF-Induced Postnatal Neovascularization" Cir Res 83(3):233-240 (Aug. 10, 1998).
Atwell et al., "Stable heterodimers from remodeling the domain interface of a homodimer using a phage display library" J Mol Biol 270(1):26-35 ( 1997).
Baca, M., et al., "Antibody humanization using monovalent phage display" J Biol Chem 272(16):10678-10684 (Apr. 18, 1997).
Bacac, M., et al., "A Novel Carcinoembryonic Antigen T-Cell Bispecific Antibody (CEA TCB) for the Treatment of Solid Tumors" Clin Cancer Res 22(13):3286-3297 (Jul. 1, 2016).
Bacac, M., et al., "CEA TCB: A novel head-to-tail 2:1 T cell bispecific antibody for treatment of CEA-positive solid tumors" Oncoimmunology 5(8 Suppl e1203498):1-3 (Jun. 24, 2016).
Bacac, M., et al., "ITOC2-037. CEA TCB, A novel T-cell bispecific antibody with potent in vitro and in vivo antitumour activity against solid tumours" Eur J Cancer 51( Suppl 1):S13 (Mar. 1, 2015).
Barnes, L., et al., "Advances in animal cell recombinant protein production: GS-NS0 expression system" Cytotechnology 32(2):109-123 (Feb. 1, 2000).
Barnes, L.M. et al., "Characterization of the Stability of Recombinant Protein Production in the GS-NS0 Expression System" Biotechnol Bioeng (Epub: Mar. 14, 2001), 73(4):261-270 (May 20, 2001).
Beckman, R., et al., "Antibody Constructs in Cancer Therapy" Cancer 109(2):170-179 (Jan. 15, 2007).
Berkman, R.. et al., "Expression of the vascular permeability factor/vascular endothelial growth factor gene in central nervous system neoplasms" J Clin Invest 91(1):153-159 (Jan. 1, 1993).
Bhisitkul, R., et al., "Predictive Value in Retinal Vein Occlusions of Early Versus Late or Incomplete Ranibizumab Response Defined by Optical Coherence Tomography" Ophthalmology 120(5):1057-1063 (May 1, 2013).
Bloom, J., et al., "Intrachain disulfide bond in the core hinge region of human IgG4" Protein Sci 6(2):407-415 (Feb. 1, 1997).
Boerner et al., "Production of Antigen-Specific Human Monoclonal Antibodies From In Vitro-Primed Human Splenocytes" J Immunol 147(1):86-95 (Jul. 1991).
Bolland, S., et al., "SHIP modulates immune receptor responses by regulating membrane association of Btk" Immunity 8(4):509-516 (Apr. 1, 1998).
Borgstrom, P., et al., "Complete Inhibition of Angiogenesis and Growth of Microtumors by Anti-Vascular Endothelial Growth Factor Neutralizing Antibody: Novel Concerts of Angiostatic Therapy from Intravital Videomicrocopy" Cancer Res 56(17):4032-4039 (Sep. 1, 1996).
Boyd, F., et al., "The Effect of the Removal of Sialic Acid, Galactose and Total Carbohydrate on the Functional Activity of Campath-1H." Mol Immunol 32(17-18):1311-1318 (Dec. 1, 1995).
Brambell, F.,, "The Transmission of Immunity from Mother to Young and the Catabolism of Immunoglobulins" Lancet 2(7473):1087-1093 (Nov. 19, 1966).
Bredius, R., et al., "Role of neutrophil FcγRIIa (CD32) and FcγRIIIb (CD16) polymorphic forms in phagocytosis of human IgG1- and IgG3-opsonized bacteria and erythrocytes" Immunology 83(4):624-630 (Dec. 1, 1994).
Brekke, O., et al., "Human IgG Isotype-Specific Amino Acid Residues Affecting Complement-Mediated Cell Lysis and Phagocytosis." Eur J Immunol 24(10):2542-2547 (Oct. 1, 1994).
Brekke, O., et al., "Structure-Function Relationships of Human IgG" Immunologist 2:125-130 ( 1994).
Brekke, O., et al., "Therapeutic antibodies for human diseases at the dawn of the twenty-first century" Nat Rev Drug Discov 2(1):52-62 (Jan. 1, 2003).
Brennan, M., et al., "Preparation of Bispecific Antibodies by Chemical Recombination of Monoclonal Immunoglobulin G1 Fragments" Science 229(4708):81-83 (Jul. 5, 1985).
Brodeur, B., et al. Monoclonal Antibody Production Techniques and Applications "Chapter 4: Mouse-Human Myeloma Partners for the Production of Heterohybridomas" Schook, L., ed., New York, N.Y.—USA:Marcel Dekker, Inc.,:51-63 (Jan. 1, 1987).
Brorson, K.,, "Mutational analysis of avidity and fine specificity of anti-levan antibodies" J Immunol 163(12):6694-6701 (Dec. 15, 1999).
Brown, J., et al., "A Human Monoclonal Anti-ANG2 Antibody Leads to Broad Antitumor Activity in Combination with VEGF Inhibitors and Chemotherapy Agents in Preclinical Models" Mole Cancer Ther 9(1):145-156 (Jan. 1, 2010).
Brown, L., et al., "Expression of vascular permeability factor (vascular endothelial growth factor) and its receptors in adenocarcinomas of the gastrointestinal tract" Cancer Res 53:4727-4735 (Oct. 1, 1993).
Brown, L., et al., "Expression of vascular permeability factor (vascular endothelial growth factor) and its receptors in breast cancer" Hum Pathol 26(1):86-91 (Jan. 1, 1995).
Bruggemann, M. et al., "Designer mice: the production of human antibody repertoires in transgenic animals" Year in Immunology 7:33-40 (Jan. 1, 1993).
Bruggemann, M., et al., "Comparison of the effector functions of human immunoglobulins using a matched set of chimeric antibodies" J Exp Med 166(5):1351-1361 (Nov. 1, 1987).

(56) References Cited

OTHER PUBLICATIONS

Brummell, D., et al., "Probing the combining site of an anti-carbohydrate antibody by saturation-mutagenesis: role of the heavy-chain CDR3 residues" ACS Biochemistry 32(4):1180-1187 (Feb. 2, 1993).
Brunker, P., et al., "RG7386, a novel tetravalent FAP-DR5 antibody, effectively triggers FAP-dependent, avidity-driven DR5 hyperclustering and tumor cell apoptosis" Mol Cancer Ther 15(5):946-957 (May 1, 2016).
Burks, E., et al., "In vitro scanning saturation mutagenesis of an antibody binding pocket" PNAS 94(2):412-417 (Jan. 21, 1997).
Burnmeister, W., et al., "Crystal Structure of the Complex of Rat Neonatal Fc Receptor with Fc." Nature 372(6504):379-383 (Nov. 24, 1994).
Burton, D., et al., "Human Antibody Effector Function" Adv Immunol 51:1-84 (Jan. 1, 1992).
Burton, D., et al., "Molecular recognition of antibody (IgG) by cellular Fc receptor (FcRI)" Mol Immunol 25(11):1175-1181 (Nov. 1, 1988).
Burton, D., et al., "The C1q receptor site on immunoglobulin G" Nature 288(5789):338-344 (Nov. 27, 1980).
Burton, D., "Immunoglobulin G: Functional sites" Mol Immunol 22(3):161-206 (Mar. 1, 1985).
Burvenich, I., et al., "Homology modeling based site-directed mutagenesis of anti-Ley antibody hu3S193 Fc:FcRn interactions" Abstract (1240) AACR Annual Meeting, Denver, CO, pp. 1 ( Apr. 18-22, 2009).
Byrn, R., et al., "Biological Properties of a CD4 Immunoadhesin" Nature 344(6267):667-670 (Apr. 12, 1990).
Cameron, D.,, "Specificity of Macrophage-Mediated Cytotoxicity: Role of Target and Effector Cell Fucose." Immunol Lett 11(1):39-44 (Jan. 1, 1985).
Campa, C., et al., "Anti-VEGF Therapy for Retinal Vein Occlusions" Curr Drug Targets 17(3):328-336 (Mar. 1, 2016).
Canfield, S., et al., "The binding affinity of human IgG for its high affinity Fc receptor is determined by multiple amino acids in the CH2 domain and is modulated by the hinge region" J Exp Med 173(6):1483-1491 (Jun. 1, 1991).
Capel, P., et al., "Heterogeneity of human IgG Fc receptors" Immunomethods 4(1):25-34 (Feb. 1, 1994).
Capon, D., et al., "Designing CD4 Immunoadhesins for AIDS Therapy" Nature 337(6207):525-531 (Feb. 9, 1989).
Carroll, R., et al., "Extensive C1q-Complement Initiated Lysis of Human Platelets by IgG Subclass Murine Monoclonal Antibodies to the CD9 Antigen" Thromb Res 59(5):831-839 (Sep. 1, 1990).
Carter, P. et al., "Improved oligonucleotide site-directed mutagenesis Using M13 vectors" Nucleic Acid Res 13(12):4431-4443 (Jun. 25, 1985).
Carter, P., et al., "Bispecific human IgG by design" J Immunol Methods 248(1-2):7-15 (Feb. 1, 2001).
Carter, P., et al., "Humanization of an anti-p185HER2 antibody for human cancer therapy" PNAS USA 89(10):4285-4289 (May 15, 1992).
Casset, F., et al., "A peptide mimetic of an anti-CD4 monoclonal antibody by rational design" Biochem Biophys Res Commun 307(1):198-205 (Jul. 18, 2003).
Cespedes, M., "Mouse Models in Oncogenesis and Cancer Therapy" Clin Transl Oncol 8(5):318-329 (May 1, 2006).
Chakravarthy, U., et al., "Phase I Trial of Anti-Vascular Endothelial Growth Factor/Anti-angiopoietin 2 Bispecific Antibody RG7716 for Neovascular Age-Related Macular Degeneration" Ophthalmol Retina 1(6):474-485 (Nov. 30, 2017).
Chakravarthy, U., et al., "The novel bispecific monoclonal anti-VEGF/anti-Ang2 antibody RG7716 shows promise in wet age-related macular degeneration patients with suboptimal response to prior anti-VEGF monotherapy" ARVO Annual Meeting Abstract 57 (Sep. 2016).
Chan, A.C., et al., "Therapeutic antibodies for autoimmunity and inflammation" Nat Rev Immunol 10(5):301-316 (May 1, 2010).
Chan, L. et al., "Variable Region Domain Exchange in Human IgGs Promotes Antibody Complex Formation with Accompanying Structural Changes and Altered Affector Functions" Mol Immunol 41(5):527-538 (Jul. 1, 2004).
Chappel, M., et al., "Identification of Secondary FcγRI Binding Site within a Genetically Engineered Human IgG Antibody" J Biol Chem 268(33):25124-25131 (Nov. 25, 1993).
Chappel, M., et al., "Identification of the Fcγ Receptor Class I Binding Site in Human IgG Through the use of Recombinant IgG1/IgG2 Hybrid and Point-Mutated Antibodies." PNAS USA 88(20):9036-9040 (Oct. 15, 1991).
Chari, R., et al., "Immunoconjugates containing novel maytansinoids: Promising anticancer drugs" Cancer Res 52(1):127-131 (Jan. 1, 1992).
Charlton, K.A., "Expression and isolation of recombinant antibody fragments in *E. coli*" Methods Mol Biol 248:245-254 ( 2003).
Chen, F., et al., "New Horizons in Tumor Microenvironment Biology: Challenges and Opportunities" BMC Med 13:Article 45 (1-13) (Mar. 5, 2015).
Chen, Y., et al., "Selection and analysis of an optimized anti-VEGF antibody: crystal structure of an affinity-matured Fab in complex with antigen" J Mol Biol 293(4):865-881 (Sep. 13, 1999).
Chennamsetty, N., et al., "Aggregation-Prone Motifs in Human Immunoglobulin G" J Mol Biol 391(2):404-413 (Aug. 14, 2009).
Chennamsetty, N., et al., "Design of therapeutic proteins with enhanced stability" PNAS 106(29):11937-11942 (Jul. 1, 2009).
Cheung, A., et al., "Endothelial Tie2/Tek Ligands Angiopoietin-1 (ANGPT1) and Angiopoietin-2 (ANGPT2): Regional Localization of the Human Genes to 8q22.3-q23 and 8p23" Genomics 48(3):389-391 (Mar. 15, 1998).
Cheung, G., et al., "Dual inhibition of angiopoietin-2 and vascular endothelial growth factor-A with Crossmab RG7716 suppressed laser-induced choroidal neovascularization in a non-human primate model" IOVS—Invest Opthalmol Vis Sci (Abstract :1174), 55(13):1 (Apr. 1, 2014).
Chin, J., et al., "Addition of a photocrosslinking amino acid to the genetic code of *Escherichia coli*" PNAS 99(17):11020-11024 (Aug. 1, 2002).
Chin, J., et al., "Addition of p-Azido-L-phenylalanine to the genetic code of *Escherichia coli*" ACS J Am Chem Soc 124(31):9026-9027 (Jul. 11, 2002).
Chin, J.,, "In vivo photocrosslinking with unnatural amino acid mutagenesis" Chembiochem 3(11):1135-1137 (Oct. 28, 2002).
Chothia, C., et al., "Canonical structures for the hypervariable regions of immunoglobulins" J Mol Biol 196(4):901-917 (Aug. 20, 1987).
Chowdhury, P., "Engineering hot spots for affinity enhancement of antibodies" Methods Mol Biol 207:179-196 ( 2003).
Clackson, T., et al., "Making antibody fragments using phage display libraries" Nature 352(6336):624-628 (Aug. 15, 1991).
Clark, M., et al., "Molecular basis for a polymorphism involving Fc receptor II on human monocytes" J Immunol 143(5):1731-1734 (Sep. 1, 1989).
Clark, M.,, "IgG effector mechanisms" Chem Immunol 65:88-110 (Jan. 1, 1997).
Clynes, R. et al., "Modulation of immune complex-induced inflammation in vivo by the coordinate expression of activation and inhibitory Fc receptors" J Exp Med 189(1):179-185 (Jan. 4, 1999).
Clynes, R., et al., "Cytotoxic antibodies trigger inflammation through Fc receptors" Immunity 3(1):21-26 (Jul. 1, 1995).
Clynes, R., et al., "Fc receptors are required in passive and active immunity to melanoma" PNAS 95(2):652-656 (Jan. 20, 1998).
Clynes, R., et al., "Inhibitory Fc Receptors Modulate In Vivo Cytoxicity Against Tumor Targets" Nat Med 6(4):443-446 (Apr. 1, 2000).
Clynes, R., et al., "Uncoupling of immune complex formation and kidney damage in autoimmune glomerulonephritis" Science 279(5353):1052-1054 (Feb. 13, 1998).
Cohen, S., et al., "Changes in visual acuity in patients with wet age-related macular degeneration treated with intravitreal ranibizumab in daily clinical practice: the Lumiere study" Retina 33(3):474-481 (Mar. 1, 2013).

(56) References Cited

OTHER PUBLICATIONS

Cohen, S., et al., "Nonchromosomal Antibiotic Resistance in Bacteria: Genetic Transformation of *Escherichia coli* by R-Factor DNA" PNAS 69(8):2110-2114 (Aug. 1, 1972).
Cole et al. Monoclonal Antibodies and Cancer Therapy "The EBV-hybridoma technique and its application to human lung cancer" New York:Alan R. Liss, Inc.,:77-96 ( 1985).
Colman, P.M., "Effects of amino acid sequence changes on antibody-antigen interactions" Res Immunol 145(1):33-36 (Jan. 1, 1994).
Coloma, M., et al., "Design and Production of Novel Tetravalent Bispecific Antibodies" Nat Biotechnol 15(2):159-163 (Feb. 1, 1997).
Connolly, D., et al., "Human vascular permeability factor. Isolation from U937 cells" J Biol Chem 264(33):20017-20024 (Nov. 25, 1989).
Cook, J., et al., "Identification of Contact Residues in the IgE Binding Site of Human FcεRIα" ACS Biochemistry 36(50):15579-15588 (Dec. 16, 1997).
Cosimi, A.,, "Clinical Development of Orthoclone OKT3" Transplant P 19(2 Suppl Suppl 1):7-16 (Apr. 1, 1987).
Coxon, A., et al., "Combined Treatment of Angiopoietin and VEGF Pathway Antagonists Enhances Antitumor Activity in Preclinical Models of Colon Carcinoma" Abstract (1113) 99th AACR Annual Meeting, San Diego, California, pp. 1-2 ( Apr. 12-16, 2008).
Cragg, M., et al., "Antibody specificity controls in vivo effector mechanisms of anti-CD20 reagents" Blood 103(7):2738-2743 (Apr. 1, 2004).
Cragg, M., et al., "Complement-mediated lysis by anti-CD20 mAb correlates with segregation into lipid rafts" Blood 101(3):1045-1052 (Feb. 1, 2003).
Cunningham, B., et al., "High-resolution epitope mapping of hGH-receptor interactions by alanine-scanning mutagenesis" Science 244(4908):1081-1085 (Jun. 2, 1989).
Daëron, M. et al., "Fc receptor biology" Annu Rev Immunol 15:203-234 ( 1997).
Dall'Acqua, W., et al., "Antibody humanization by framework shuffling" Methods 36(1):43-60 (Jan. 17, 2005).
Dall'Acqua, W., et al., "Increasing the affinity of a human IgG1 for the neonatal Fc receptor: biological consequences" J Immunol 169(9):5171-5180 (Nov. 1, 2002).
Dall'Acqua, W., et al., "Modulation of the effector functions of a human IgG1 through engineering of its hinge region" J Immunol 177(2):1129-1138 (Jul. 15, 2006).
Dall'Acqua, W., et al., "Properties of human IgG1s engineered for enhanced binding to the neonatal Fc receptor (FcRn)" J Biol Chem 281(33):23514-23524 (Aug. 18, 2006).
Dard, P. et al., "DNA Sequence Variability of IGHG3 Alleles Associated to The Main G3m Haplotypes in Human Populations" Eur J Human Genet 9(10):765-772 (Oct. 1, 2001).
Datta-Mannan, A., et al., "Humanized IgG1 variants with differential binding properties to the neonatal Fc receptor: relationship to pharmacokinetics in mice and primates" Drug Metab Dispos 35(1):86-94 (Jan. 1, 2007).
Datta-Mannan, A., et al., "Monoclonal antibody clearance. Impact of modulating the interaction of IgG with the neonatal Fc receptor" J Biol Chem 282(3):1709-1717 (Jan. 19, 2007).
Daugherty, A., et al. Current Trends in Monoclonal Antibody Development and Manufacturing "Chapter 8: Formulation and Delivery Issues for Monoclonal Antibody Therapeutics" Shire, S, Gombotz, W., eds., First edition, New York, N.Y. USA:Springer New York,:103-129 (Nov. 12, 2009).
Daugherty, A., et al., "Formulation and delivery issues for monoclonal antibody therapeutics" Adv Drug Deliv Rev (Epub: May 22, 2006), 58(5-6):686-706 (Aug. 7, 2006).
Davies, J. et al., "Expression of GnTIII in a Recombinant Anti-CD20 CHO Production Cell Line: Expression of Antibodies with Altered Glycoforms Leads to an Increase in ADCC Through Higher Affinity for FcγRIII" Biotechnol Bioeng 74(4):288-294 (Aug. 20, 2001).

Davis, R., et al., "Fc receptor homologs: newest members of a remarkably diverse Fc receptor gene family" Immunol Rev 190(1):123-136 (Dec. 1, 2002).
Davis, S., et al., "Isolation of angiopoietin-1, a ligand for the TIE2 receptor, by secretion-trap expression cloning" Cell 87(7):1161-1169 (Dec. 27, 1996).
De Haas, M., et al., "Fcγ receptors of phagocytes" J Lab Clin Med 126(4):330-341 (Oct. 1, 1995).
De Pascalis, R., et al., "Grafting of 'Abbreviated' Complementarity-Determining Regions Containing Specificity-Determining Residues Essential for Ligand Contact to Engineer a Less Immunogenic Humanized Monoclonal Antibody" J Immunol 169(6):3076-3084 (Sep. 15, 2002).
De Reys, S., et al., "Human platelet aggregation by murine monoclonal antiplatelet antibodies is subtype-dependent" Blood 81(7):1792-1800 (Apr. 1, 1993).
De Vita, S., et al., "Efficacy of Selective B Cell Blockade in the Treatment of Rheumatoid Arthritis" Arthritis Rheum 46(8):2029-2033 (Aug. 1, 2002).
Deisenhofer, J., "Crystallographic Refinement and Atomic Models of a Human Fc Fragment and Its Complex with Fragment B of Protein A from *Staphylococcus aureus* at 2.9- and 2.8-Å Resolution" ACS Biochemistry 20(9):2361-2370 (Apr. 28, 1981).
Deissler, H., et al., "Actions of Bevacizumab and Ranibizumab on Microvascular Retinal Endothelil Cells: Similarities and Differences" Br J Opthamol 96(7):1023-1028 (Apr. 26, 2012).
Deng, R., et al., "Pharmacokinetics of Humanized Monoclonal Anti-Tumor Necrosis Factor-α Antibody and Its Neonatal Fc Receptor Variants in Mice and Cynomolgus Monkeys" Drug Metab Dispos 38(4):600-605 (Apr. 1, 2010).
Dennis, C.,, "Off by a Whisker" Nature 442:739-741 (Aug. 17, 2006).
Diabetic Retinopathy Clinical Res Network et al., "Randomized trial evaluating ranibiumab plus promt or defered laser or triamcinolone plus prompt laser for diabetic macular edema" Ophthalmology 117(6):1064-1077 (Jun. 1, 2010).
Dingchang, M. et al., "Current Status and Future Perspective of Research on Anti-VEGF/VEGFR Anti-cancer Drugs" Chin J Cancer Biother 22(5):637-645 (Oct. 1, 2015).
Dorai, H., et al., "Aglycosylated Chimeric Mouse/Human IgG1 Antibody Retains Some Effector Function." Hybridoma 10(2):211-217 (Apr. 1, 1991).
Dubowchik, G., et al., "Doxorubicin immunoconjugates containing bivalent, lysosomally-clevable diperptide linkages" Bioorg Med Chem Lett 12(11):1529-1532 (Jun. 3, 2002).
Dufner, P. et al., "Harnessing phage and ribosome display for antibody optimisation" Trends Biotechnol 24(11):523-529 (Nov. 1, 2006).
Duncan, A., et al., "Localization of the Binding Site for the Human High-Affinity Fc Receptor on IgG." Nature 332(6164):563-564 (Apr. 7, 1988).
Duncan, A., et al., "The Binding Site for C1q on IgG" Nature 332(6166):738-740 (Apr. 21, 1988).
Durocher, Y., et al., "High-level and high-throughput recombinant protein production by transient transfection of suspension-growing human 293-EBNA1 cells" Nucleic Acids Res 30(2):E9 (Jan. 15, 2002).
Dvorak, H., et al., "Vascular permeability factor/vascular endothelial growth factor, microvascular hyperpermobility, and angiogenesis" Am J Pathol 146(5):1029-1039 (May 1, 1995).
Eccles, S., et al., "Monoclonal antibodies targeting cancer: 'magic bullets' or just the trigger?" Breast Cancer Res 3(2):86-90 (Dec. 20, 2001).
Edelman, G., et al., "The covalent structure of an entire γG immunoglobulin molecule" PNAS 63(1):78-85 (May 1, 1969).
El-Amine, M., et al., "In vivo induction of tolerance by an Ig peptide is not affected by the deletion of FcR or a mutated IgG Fc fragment" Int Immunol 14(7):761-766 (Jul. 1, 2002).
Elbein, A.,, "Glycosidase Inhibitors: Inhibitors of N-Linked Oligosaccharide Processing" FASEB J 5(15):3055-3063 (Dec. 1, 1991).
Ellman, J. et al. Methods in Enzymology: Molecular Design and Modeling: Concepts and Applications Part A: Proteins, Peptides, and Enzymes "Chapter 15: Biosynthetic method for introducing

(56) References Cited

OTHER PUBLICATIONS unnatural amino acids site-specifically into proteins" Langone, J, ed., First edition, Cambridge, MA—USA:Academic Press, vol. 202:301-336 (Oct. 9, 1991).
Ellison, J., et al., "Linkage and sequence homology of two human immunoglobin gamma heavy chain constant region genes" PNAS USA 79(6):1984-1988 (Mar. 1, 1982).
Elman, M., et al., "Intravitreal Ranibizumab for diabetic macular edema with prompt verss deferred laser treatment: 5-year randomized trial results" Opthalmology 122(2):375-381 (Feb. 1, 2015).
European Patent Office, "European Patent Application No. 11160251. 2" (Certified Copy—Priority Document),:1-128 (Mar. 29, 2011).
Fellouse, F., et al., "Synthetic antibodies from a four-amino-acid code: A dominant role for tyrosine in antigen recognition" PNAS USA 101(34):12467-12472 (Aug. 24, 2004).
Ferrara, C., et al., "Modulation of therapeutic antibody effector functions by glycosylation engineering: influence of Golgi enzyme localization domain and co-expression of heterologous beta1, 4-N-acetylglucosaminyltransferase III and Golgi alpha-mannosidase II" Biotechnol Bioeng 93(5):851-861 (Jan. 24, 2006).
Ferrara, N. et al., "The Biology of Vascular Endothelial Growth Factor" Endocr Rev 18(1):4-25 (Feb. 1, 1997).
Ferrara, N., et al., "Clinical applications of angiogenic growth factors and their inhibitors" Nat Med 5(12):1359-1364 (Dec. 1, 1999).
Finger, R., et al., "Treatment patterns, visual acuity and quality-of-life outcomes of the WAVE study—A noninterventional study of ranibizumab treatment for neovascular age-related macular degeneration in Germany" ACTA Ophthalmol 91(6):540-546 (Sep. 1, 2013).
Fischer, N., et al., "Bispecific antibodies: Molecules that enable novel therapeutic strategies" Pathbilogy 74(1):3-14 (May 21, 2007).
Flatman, S., et al., "Process analytics for purification of monoclonal antibodies" J Chromatogr 848(1):79-87 (Mar. 15, 2007).
Folkman, J.,, "Angiogenesis" J Biol Chem 267(16):10931-10934 (Jun. 5, 1992).
Fridman, W., "Fc receptors and immunoglobulin binding factors" FASEB J 5(12):2684-2690 (Sep. 1, 1991).
Fuhrmann, U., et al., "Inhibitors of Oligosaccharide Processing" Biochim Biophys Acta 825(2):95-110 (Jun. 24, 1985).
Fujimori, K., et al., "A Modeling Analysis of Monoclonal Antibody Percolation Through Tumors: A Binding Site Barrier" J Nuc Med 31(7):1191-1198 (Jul. 1, 1990).
Garner, A., et al. Pathobiology of Ocular Disease: A Dynamic Approach "Chapter 52: Vascular Diseases" Garner, A. & Klintworth, G.K., eds, 2nd edition, New York, N.Y. USA:Marcel Dekker, Inc.,:1625-1710 (Jan. 1, 1994).
Gavin, A., et al. The Immunoglobulin Receptors and their Physiological and Pathological Roles in Immunity "Chapter 2: Molecular basis for the interaction of Fc receptors with immunoglobulins" Winkel, J and Hogarth, P., eds., First edition, Dordrecht, NL:Springer Dordrecht,:11-35 (Aug. 31, 1998).
Gazzano-Santoro, H., et al., "A non-radioactive complement-dependent cytotoxicity assay for anti-CD20 monoclonal antibody" J Immunol Methods 202(2):163-171 (Mar. 28, 1997).
Geisse, S. et al., "Eukaryotic Expression Systems: A Comparison" Protein Expres Purif 8(3):271-282 (Nov. 1, 1996).
Gergly, J., et al., "Fc Receptors on Lymphocytes and K Cells" Biochem Soc Trans 12(5):739-743 (Oct. 1, 1984).
Gerngross, T.,, "Advances in the production of human therapeutic proteins in yeasts and filamentous fungi" Nat Biotechnol 22(11):1409-1414 (Nov. 4, 2004).
Gessner, J., et al., "The IgG Fc Receptor Family" Ann Hematol 76(6):231-248 (Jun. 1, 1998).
Ghebrehiwet, B., et al., "Isolation, cDNA cloning, and overexpression of a 33-kD cell surface glycoprotein that binds to the globular 'heads' of C1q" J Exp Med 179(6):1809-1821 (Jun. 1, 1994).
Ghetie, V. et al., "FcRn: the MHC class I-related receptor that is more than an IgG transporter" Immunol Today 18(12):592-598 (Dec. 1, 1997).

Ghetie, V. et al., "Increasing the serum persistence of an IgG fragment by random mutagenesis" Nat Biotechnol 15(7):637-640 (Jul. 1, 1997).
Ghetie, V., et al., "Abnormally short serum half-lives of IgG in β2-microglobulin-deficient mice" Eur J Immunol 26(3):690-696 (Mar. 1, 1996).
Ghetie, V.,, "Multiple roles for the major histocompatibility complex class I-related receptor FcRn" Ann Rev Immunol 18:739-766 (Apr. 1, 2000).
Gilles, R., et al., "MRI of the tumor microenvironment" J Magn Reson Imaging 16(4):430-450 (Sep. 25, 2002).
Glennie, M., et al., "Clinical Trials of Antibody Therapy" Immunol Today-Cell Press 21(8):403-410 (Aug. 1, 2000).
Goding, J. Monoclonal Antibodies: Principles and Practice "Chapter 2: Production and Application of Monoclonal Antibodies in Cell Biology, Biochemistry and Immunology" Second edition, London, GB:Academic Press,:56-103 (Jan. 1, 1986).
Gohil, R., et al., "Caregiver Burden in Patients Receiving Ranibizumab Therapy for Neovascular Age Related Macular Degeneration" PLOS ONE 10(6):e0129361 (1-13) (Jun. 9, 2015).
Gorman, C., et al., "Transient Production of Proteins Using an Adenovirus Transformed Cell Line" DNA Prot Eng Tech 2(1):3-10 (Jan. 1, 1990).
Graham, F., et al., "A new technique for the assay of infectivity of human adenovirus 5 DNA" Virology 52(2):456-467 (Apr. 1, 1973).
Graham, F., et al., "Characteristics of a Human Cell Line Transformed by DNA from Human Adenovirus Type 5" J Gen Virol 36(1):59-72 (Jul. 1, 1977).
Greenwood, J., et al., "Engineering multiple-domain forms of the therapeutic antibody CAMPATH-1H: effects on complement lysis" Therapeutic Immunology 1(5):247-255 (Oct. 1, 1994).
Greenwood, J., et al., "Structural motifs involved in human IgG antibody effector functions" Eur J Immunol 23(5):1098-1104 (May 1, 1993).
Griffiths, A., et al., "Human anti-self antibodies with high specificity from phage display libraries" EMBO J 12(2):725-734 (Feb. 1, 1993).
Groenink, J., et al., "On the interaction between agalactosyl IgG and Fcγ receptors" Eur J Immunol 26(6):1404-1407 (Jun. 1, 1996).
Gruber, M. et al., "Efficient tumor cell lysis mediated by a bispecific single chain antibody expressed in *Escherichia coli*" J Immunol 152(11):5368-5374 (Jun. 1, 1994).
Guddat, L., et al., "Three-dimensional structure of a human immunoglobulin with a hinge deletion" PNAS USA 90(9):4271-4275 (May 1, 1993).
Gurbaxni, B., et al., "Development of new models for the analysis of Fc-FcRn interactions" Mol Immunol 43(p):1379-1389 (Mar. 1, 2006).
Guyer, R., et al., "Immunoglobulin binding by mouse intestinal epithelial cell receptors" J Immunol 117(2):587-593 (Aug. 1, 1976).
Haagen, I., et al., "Interaction of Human Monocyte Fcγ Receptors with Rat IgG2b: A New Indicator for the FcγRIIa (R-H131) Polymorphism" J Immunol 154(4):1852-1860 (Feb. 15, 1995).
Hadley, A., et al., "The functional activity of FcγRII and FcγRIII on subsets of human lymphocytes" Immunology 76(3):446-451 (Jul. 1, 1992).
Hamilton, L., et al., "The role of the epidermal growth factor receptor in sustaining neutrophil inflammation in severe asthma" Clin Exp Allergy 33(2):233-240 (Feb. 1, 2003).
Hammes, H., et al., "Angiopoietin-2 causes pericyte dropout in the normal retina—Evidence for involvement in diabetic retinopathy" Diabetes 53(4):1104-1110 (Apr. 1, 2004).
Hand, P., et al., "Comparative Biological Properties of a Recombinant Chimeric Anti-Carcinoma mAb and a Recombinant Aglycosylated Variant" Cancer Immunol Immunother 35(3):165-174 (May 1, 1992).
Harlow, E., et al. Antibodies. A Laboratory Manual "Chapter 14: Immunoassay" First edition, New York, USA:Cold Spring Harbor Laboratory,:553-612 (Jan. 1, 1988).
Harris, L., et al., "Crystallographic Structure of an Intact IgG1 Monoclonal Antibody" J Mol Biol 275(5):861-872 (Feb. 6, 1998).
Harris, L., et al., "Refined Structure of an Intact IgG2a Monoclonal Antibody" ACS Biochemistry 36(7):1581-1597 (Feb. 18, 1997).

(56) References Cited

OTHER PUBLICATIONS

Hashim, O., et al., "Role of Processing of N-Linked Oligosaccharides in Control of Immunoglobulin Secretion from Rat Hybridomas" Mol Immunol 24(10):1087-1096 (Oct. 1, 1987).
Hashim, O., et al., "Simultaneous Inhibition of Multiple Steps in the Processing of N-Linked Oligosaccharides Does Not Impair Immunoglobulin Secretion From Rat Hybridoma Cells." Immunology 63(3):383-388 (Mar. 1, 1988).
Hatta, Y., et al., "Association of Fcγ Receptor IIIB, But Not of Fcγ Receptor IIA and IIIA, Polymorphisms with Systemic Lupus Erythematosus in Japanese." Genes Immun 1(1):53-60 (Sep. 29, 1999).
He, F., et al., "High-throughput dynamic light scattering methods for measuring visosity of concentrated protein solutions" Anal Biochem 399(1):141-143 (Apr. 1, 2010).
Heier, J., et al., "Intravitreal Aflibercept (VEGF Trap-Eye) in Wet Age-related Macular Degeneration" Ophthalmology 119(12):2537-2548 (Dec. 1, 2012).
Heiken, H et al., "T lymphocyte development in the absence of Fcε receptor Iγ subunit: analysis of thymic-dependent and independent αβ and γδ pathways" Eur J Immunol 26(8):1935-1943 (Aug. 1, 1996).
Hellstrom, I., et al., "Antitumor effects of L6, an IgG2a antibody that reacts with most human carcinomas" PNAS USA 83(18):7059-7063 (Sep. 1, 1986).
Hellstrom, I., et al., "Strong antitumor activities of IgG3 antibodies to a human melanoma-associated ganglioside" PNAS USA 82(5):1499-1502 (Mar. 1, 1985).
Henry, A., et al., "Participation of the N-terminal region of Cε3 in the binding of human IgE to its high-affinity receptor FεRI" ACS Biochemistry 36(50):15568-15578 (Dec. 16, 1997).
Herter, G., et al., "GA101 P329GLALA, a variant of obinutuzumab with abolished ADCC, ADCP and CDC function but retained cell death induction, is as efficient as rituximab in B-cell depletion and antitumor activity" Haematologica 103(2):e78-e81 (Feb. 1, 2018).
Hessell, A. et al., "Fc receptor but not complement binding is important in antibody protection against HIV" Nature 446:101-105 (2007).
Hezareh, M. et al., "Effector function activities of a panel of mutants of a broadly neutralizing antibody against human immunodeficiency virus type 1" J Virol 75(24):12161-12168 (Dec. 15, 2001).
Hills, A., et al., "Metabolic control of recombinant monoclonal antibody N-glycosylation in GS-NS0 cells" Biotechnol Bioeng 75(2):239-251 (Oct. 20, 2001).
Hinman, L. et al., "Preparation and characterization of monoclonal antibody conjugates of the calicheamicins: A novel and potent family of antitumor antibiotics" Cancer Res 53(14):3336-3342 (Jul. 15, 1993).
Hinton, P. et al., "Engineered human IgG antibodies with longer serum half-lives in primates" J Biol Chem 279(8):6213-6216 (Feb. 20, 2004).
Hinton, P., et al., "An Engineered Human IgG1 Antibody with Longer Serum Half-life" J Immunol 176(1):346-356 (Jan. 1, 2006).
Hobbs, S., et al., "Interaction of Aglycosyl Immunoglobulins with the IgG Fc Transport Receptor From Neonatal Rat Gut: Comparison of Deglycosylation by Tunicamycin Treatment and Genetic Engineering." Mol Immunol 29(7-8):949-956 (Jul. 31, 1992).
Hogarth, P., et al., "Characterization of FcR Ig-binding sites and epitope mapping" Immunomethods 4(1):17-24 (Feb. 1, 1994).
Holliger, P., et al., "'Diabodies': Small bivalent and bispecific antibody fragments" PNAS USA 90(14):6444-6448 (Jul. 15, 1993).
Holliger, P., et al., "Engineered antibody fragments and the rise of single domains" Nat Biotechnol 23(9):1126-1136 (Sep. 7, 2005).
Holz, F., et al., "Multi-country real-life experience of anti-vascular endothelial growth factor therapy for wet age-related macular degeneration" BR J Ophthalmol 99(2):220-226 (Feb. 1, 2015).
Hoogenboom, H., et al., "By-passing immunisation. Human antibodies from synthetic repertoires of germaline VH gene segments rearranged in vitro" J Mol Biol 227(2):381-388 (Sep. 20, 1192).

Hoogenboom, H., et al., "Overview of antibody phage-display technology and its applications" Methods Mol Biol 178:1-37 (Jan. 1, 2002).
Houck, K., et al., "The Vascular Endothelial Growth Factor Family: Identification of a Fourth Molecular Species and Characterization of Alternative Splicing of RNA" Mol Endocrinol 5(12):1806-1814 (Dec. 1, 1991).
Hsu, J., et al., "Poorer Outcomes in Real-World Studies of Anti-Vascular Endothelial Growth Factor Therapy for Neovascular Age-Related Macular Degeneration" Ophthalmology 127(9):1189-1190 (Sep. 1, 2020).
Hudson, P., et al., "Engineered antibodies" Nat Med 9(1):129-134 (Jan. 1, 2003).
Hudziak, R., et al., "p185HER2 monoclonal antibody has antiproliferative effects in vitro and sensitizes human breast tumor cells to tumor necrosis factor" Mol Cell Biol 9(3):1165-1172 (Mar. 1, 1989).
Huizinga, T., et al., "Binding Characteristics of Dimeric IgG Subclass Complexes to Human Neutrophils" J Immunol 142(7):2359-2364 (Apr. 1, 1989).
Hulett, M., et al., "Chimeric Fc Receptors Identify Functional Domains of the Murine High Affinity Receptors for IgG" J Immunol 147(6):1863-1868 (Sep. 15, 1991).
Hutchins, J. et al., "Improved biodistribution, tumor targeting, and reduced immunogenicity in mice with a immunogenicity in mice with a γ4 variant of Campath-1H4 variant of Campath-1H" PNAS USA 92(26):11980-11984 (Dec. 19, 1995).
Idusogie, E.E., et al., "Engineered Antibodies with Increased Activity to Recruit Complement" J Immunol 166(4):2571-2575 (Feb. 15, 2001).
Idusogie, E.E., et al., "Mapping of the C1q Binding Site on Rituxan, A Chimeric Antibody with a Human IgG1 Fc" J Immunol 164(8):4178-4184 (Apr. 15, 2000).
Israel, E., et al., "Increased clearance of IgG in mice that lack β2-microglobulin: possible protective role of FcRn" Immunology 89(4):573-578 (Dec. 1, 1996).
Jaakola, K., et al., "In vivo detection of vascular adhesion protein-1 in experimental inflammation" Am J Pathol 157(2):463-471 (Aug. 1, 2000).
Jackson, T., et al., "Human Retinal Molecular Weight Exclusion Limit and Estimate of Species Variation" Invest Ophthalmol Vis Sci 44(5):2141-2146 (May 1, 2003).
Jacobovits, A., et al., "Analysis of homozygous mutant chimeric mice: Deletion of the immunoglobulin heavy-chain joining region blocks B-cell development and antibody production" PNAS 90(6):2551-2555 (Mar. 15, 1993).
Jacobovits, A., et al., "Germ-line Transmission and Expression of a Human-derived Yeast Artificial Chromosome" Nature 362(6417):255-258 (Mar. 18, 1993).
Janeway, C.A. et al., "Structural Variation in Immunoglobulin Constant Regions: Immunobiology: The Immune System in Health and Disease" Current Biology Ltd./Garland Publishing Inc. (.),:1-4 (1994).
Jang, Y., et al., "The structural basis for DNA binding by an anti-DNA autoantibody" Mol Immunol 35(18):1207-1217 (Dec. 15, 1998).
Jarvis, D., et al., "Biochemical Analysis of the N-Glycosylation Pathway in Baculovirus-Infected Lepidopteran Insect Cells" Virology 212(2):500-511 (Oct. 1, 1995).
Jassal, R.., "Sialylation of Human IgG-Fc Carbohydrate by Transfected Rat α2,6-Sialyltransferase" Biochem Biophys Res Commun 286(2):243-249 (Aug. 17, 2001).
Jaumdally, R., et al., "Systemic and intracardiac vascular endothelial growth factor and angiopoietin-1 and -2 levels in coronary artery disease: Effects of angioplasty" Ann Med 39(4):298-305 (Feb. 9, 2007).
Jefferis, R., et al., "A Comparative Study of the N-Linked Oligosaccharide Structures of Human IgG Subclass Proteins" Biochem J 268(3):529-537 (Jun. 15, 1990).
Jefferis, R., et al., "IgG-Fc-Mediated Effector Functions: Molecular Definition of Interaction Sites for Effector Ligands and the Role of Glycosylation." Immunol Rev 163(1):59-76 (Jun. 1, 1998).

(56) References Cited

OTHER PUBLICATIONS

Jefferis, R., et al., "Molecular Definition of Interaction Sites on Human IgG for Fc Receptors (huFcγR)" Mol Immunol 27(12):1237-1240 (Dec. 1, 1990).

Jefferis, R., et al., "Recognition sites on human IgG for Fcγ receptors: the role of glycosylation" Immunol Lett 44(2-3):111-117 (Jan. 2, 1995).

Jefferis, R.,, "Interaction sites on human IgG-Fc for FcγR: current models" Immunol Lett 82(1-2):57-65 (Jun. 1, 2002).

Jeffrey, C., et al., "Dipeptide-based highly potent doxorubicin antibody conjugates" Bioorganic Med Chem Letters 16(2):358-362 (Jan. 15, 2006).

Jendreyko, N. et al., "Intradiabodies, Bispecific, Tetravalent Antibodies for the Simultaneous Functional Knockout of Two Cell Surface Receptors" J Biol Chem 278(48):47812-47819 (Nov. 28, 2003).

Jendreyko, N. et al., "Phenotypic Knockout of VEGF-R2 and Tie-2 with an Intradiabody Reduces Tumor Growth and Angiogenesis in Vivo" PNAS 102(23):8293-8298 (May 31, 2005).

Jendreyko, N. et al., "Simultaneous, Phenotypic Knockout of VEGF-R2 and Tie-2 with an Intradiabody Enhances Antiangiogenic Effects in Vivo" Klin Padiatr 218(3):143-151 (May 31, 2006).

Jensen, M., et al., "Rapid tumor lysis in a patient with B-cell chronic lymphocytic leukemia and lymphocytosis treated with an anti-CD20 monoclonal antibody (IDEC-C2B8, rituximab)" Ann Hematol 77(1-2):89-91 (Aug. 1, 1998).

Johnson, G., et al., "Kabat Database and its applications: 30 years after the first variability plot" Nucleic Acids Res 28(1):214-218 (Jan. 1, 2000).

Jones, E., et al., "The mechanism of intestinal uptake and transcellular transport of IgG in the neonatal rat" J Clin Invest 51(11):2916-2927 (Nov. 1, 1972).

Jorgensen, L., et al., "Recent trends in stabilising peptides and proteins in pharmaceutical formulation—considerations in the choice of excipients" Expert Opin Drug Deliv 6(11):1219-1230 (Nov. 1, 2009).

Jumper, J.M., et al., "Anti-VEGF treatment of macular edema associated with retinal vein occlusion: patterns of use and effectiveness in clinical practice (ECHO study report 2)" Clin Ophthalmol 12:621-629 (Apr. 3, 2018).

Kabat, E., et al., "Evolutionary and structural influences on light chain constant (CL) region of human and mouse immunoglobulins" PNAS USA 72(7):2785-2788 (Jul. 1, 1975).

Kam, N. et al., "Carbon nanotubes as multifunctional biological transporters and near-infrared agents for selective cancer cell destruction" PNAS USA 102(33):11600-11605 (Aug. 16, 2005).

Kamei, D., et al., "Quantitative methods for developing Fc mutants with extended half-lives" Biotechnol Bioeng 92(6):748-760 (Dec. 20, 2005).

Kaneko, E., et al., "Optimizing therapeutic antibody function progress with Fc domain engineering" Biodrugs 25(1):1-11 (Sep. 15, 2011).

Kaneko, Y., et al., "Anti-inflammatory activity of immunoglobulin G resulting from Fc sialylation" Science 313(5787):670-673 (Aug. 4, 2006).

Kashmiri, S., et al., "SDR grafting—a new approach to antibody humanization" Methods 36:25-34 (Jan. 1, 2005).

Kaufmann R.J., "Overview of Vector Design for Mammalian Gene Expression" Mol Biotechnol 16(2):151-160 (Oct. 1, 2000).

Kaushal, G., Methods in Enzymology—Guide to Techniques in Glycobiology "Chapter 19: Glycosidase inhibitors in study of glycoconjugates" Lennarz, W. & Hart, G., eds., First edition, Cambridge, MA—USA: Academic Press, vol. 230:316-329 (Jan. 17, 1994).

Keck, P., et al., "Vascular Permeability Factor, An Endothelial Cell Mitogen Related to PDGF" Science 246(4935):1309-1312 (Dec. 8, 1989).

Kienast, Y., et al., "Ang-2-VEGF-A CrossMab, a Novel Bispecific Human IgG1 Antibody Blocking VEGF-A and Ang-2 Functions Simultaneously, Mediates Potent Antitumor, Antiangiogenic, and Antimetastatic Efficacy" Clin Cancer Res 19(24):6730-6740 (Dec. 15, 2013).

Kilmartin, J., et al., "Rat Monoclonal Antitubulin Antibodies Derived by Using a New Nonsecreting Rat Cell Line" J Cell Biol 93(3):576-582 (Jun. 1, 1982).

Kim, H. et al., "FcRn receptor-mediated pharmacokinetics of therapeutic IgG in the eye" Mole Vision 15:2803-2812 (Dec. 16, 2009).

Kim, I et al., "Molecular cloning and characterization of a novel angiopoietin family protein, angiopoietin-3" FEBS Lett 443(3):353-356 (Jan. 29, 1999).

Kim, I., et al., "Angiopoietin-2 at high concentration can enhance endothelial cell survival through the phosphatidylinositol 3'-kinase/Akt signal transduction pathway" Oncogene 19(39):4549-4552 (Sep. 14, 2000).

Kim, I., et al., "Molecular cloning, expression and characterization of angiopoietin-related protein" J Biol Chem 274(37):26523-26528 (Sep. 10, 1999).

Kim, J., et al., "Catabolism of the Murine IgG1 Molecule: Evidence That Both CH2-CH3 Domain Interfaces are Required for Persistence of IgG1 in the Circulation of Mice" Scand J Immunol 40(4):457-465 (Oct. 1, 1994).

Kim, J., et al., "Identifying amino acid residues that influence plasma clearance of murine IgG1 fragments by site-directed mutagenesis" Eur J Immunol 24(3):542-548 (Mar. 1, 1994).

Kim, J., et al., "Localization of the site of the murine IgG1 molecule that is involved in binding to the murine intestinal Fc receptor" Eur J Immunol 24(10):2429-2434 (Oct. 1, 1994).

Kim, J., et al., "Mapping the site on human IgG for binding of the MHC class I-related receptor, FcRn" Eur J Immunol 29(9):2819-2825 (Sep. 1, 1999).

Kim, J., et al., "The Vascular Endothelial Growth Factor Proteins: Identification of Biologically Relevant Regions by Neutralizing Monoclonal Antibodies" Growth Factors 7(1):53-64 (Jan. 1, 1992).

Kim, K., et al., "Inhibition of vascular endothelial growth factor-induced angiogenesis suppresses tumour growth in vivo" Nature 362(6423):841-844 (Apr. 29, 1993).

Kindt, T., et al. Kuby Immunology "Part II: Generation of B-Cell and T-Cell Response, Chapter 4: Antigen and Antibodies" Kindt, T., Goldsby, R., eds, Sixth edition, New York, N.Y.—USA:W. H. Freeman and Company,:91 ( 2007).

King, D., et al., "Recombinant Antibodies for the Diagnosis and Therapy of Human Disease." Curr Opin Drug Discovery Develop 2(2):110-117 (Mar. 1, 1999).

King, H., et al., "Monoclonal antibody conjugates of doxorubicin prepared with branched peptide linkers: Inhibition of aggregation by methoxytriethyleneglycol chains" ACS J Med Chem 45(19):4336-4343 (Aug. 14, 2002).

Klagbrun, M., et al., "Regulators of angiogenesis" Ann Rev Physiol 53:217-239 (Jan. 1, 1991).

Klein, C., et al., "Abstract PR8: Novel tumor-targeted, engineered IL-2 variant (IL-2v)-based immunocytokines for immunotherapy of cancer" Cancer Res 73( Suppl 1):1-2 (Jan. 1, 2013).

Klein, C., et al., "Cergutuzumab amunaleukin (CEA-IL2v), a CEA targeted IL-2 variant-based immunocytokine for combination cancer immunotherapy: Overcoming limitations of aldesleukin and conventional IL-2-based immunocytokines" Oncoimmunology 6(3):e1277306 (1-15) (Jan. 11, 2017).

Klein, C., et al., "Novel Tumor-Targeted, Engineered IL-2 Variant (IL2v)-Based Immunocytokines for Immunotherapy of Cancer" Blood 122(21):2278-2278 (Nov. 15, 2013).

Klimka, A. et al., "Human anti-CD30 recombinant antibodies by guided phage antibody selection using cell panning" Brit J Cancer 83(2):252-260 (Jun. 15, 2000).

Kobayashi, H., et al., "Similarities in the biodistribution of iodine-labeled anti-tac single-chain disulfide-stabilized Fv fragment and anti-tac disulfide-stabilized Fv fragment" Nucl Med Biol 25(4):387-393 (May 1, 1998).

Kobayashi, H., et al., "Tryptophan H33 plays an important role in pyrimidin (6-4) pyrimidone photoproduct binding by a high-affinity antibody" Protein Eng 12(10):879-884 (Oct. 1, 1999).

(56) References Cited

OTHER PUBLICATIONS

Koene, H., et al., "FcγRIIIa-158V/F Polymorphism Influences the Binding of the IgG by Natural Killer Cell FcγRIIIa, Independently of the FcγRIIIa-48L/R/H Phenotype" Blood 90(3):1109-1114 (Aug. 1, 1997).

Kohler, C., et al., "Continuous cultures of fused cells secreting antibody of predefined specificity" Nature 256(5517):495-497 (Aug. 7, 1975).

Kojima, N., et al., "Alpha 1,6-linked fucose affects the expression and stability of polysialic acid-carrying glycoproteins in chinese hamster ovary cells" J Biochem 124(4):726-737 (Oct. 1, 1998).

Kojima, N., et al., "Characterization of Mouse ST8Sia II (STX) as a Neural Cell Adhesion Molecule-specific Polysialic Acid Synthase" J Biol Chem 271(32):19457-19463 (Aug. 1, 1996).

Kostelny, S., et al., "Formation of a bispecific antibody by the use of leucine zippers" J Immunol 148(5):1547-1553 (Mar. 1, 1992).

Kozbor, D., et al., "A human hybrid myeloma for production of human monoclonal antibodies" J Immunol 133(6):3001-3005 (Dec. 1, 1984).

Kratz, F., et al., "Prodrugs of anthracyclines in cancer chemotherapy" Curr Med Chem 13(5):477-523 (Mar. 1, 2006).

Krummen et al., "Executive Summary Engineering CHO Cells to Maximize Sialic Acid Content of Recombinant Glycoproteins" Other Cambridge Healthtech Institute's Fourth Annual Protein Expression Meeting, Hilton McLean, Tysons' Corner, McLean Virginia, ( Apr. 5-6, 2001).

Kumpel, B., et al., "Galactosylation of human IgG monoclonl anti-D produced by EBV-transformed B-lymphoblastoid cell lines is dependent on culture method and affects Fc receptor-mediated functional activity" Hum Antibodies Hybridomas 5(3):143-151 (Jan. 1, 1994).

Kunkel, T.,, "Rapid and Efficient Site-Specific Mutagenesis Without Phenotypic Selection" PNAS 82(2):488-492 (Jan. 1, 1985).

Kuo, T., et al., "Neonatal Fc Receptor: From Immunity to Therapeutics" J Clin Immunol 30(6):777-789 (Oct. 1, 2010).

Laurak, V., et al., "Identification and Characterisation of C1q-Binding Phage Displayed Peptides" Biochemistry—US 378(12):1509-1519 (Dec. 1, 1997).

Lazar, G. et al., "Engineered antibody Fc variants with enhanced effector function" PNAS 103(11):4005-4010 (Mar. 14, 2006).

Leatherbarrow, R., et al., "Effector Functions of a Monoclonal Aglycosylated Mouse IgG2a: Binding and Activation of Complement Component C1 and Interaction with Human Monocyte Fc Receptor." Mol Immunol 22(4):407-415 (Apr. 1, 1985).

Lee, C. et al., "High-affinity human antibodies from phage-displayed synthetic Fab libraries with a single framework scaffold" J Mol Biol 340(5):1073-1093 ( 2004).

Lee, C., et al., "Bivalent antibody phage display mimics natural immunoglobulin" J Immunol Methods 284(1-2):119-132 (Jan. 1, 2004).

Lehrnbecher, T., et al., "Variant genotypes of FcγRIIIA influence the development of Kaposi's sarcoma in HIV-infected men" Blood 95(7):2386-2390 (Apr. 1, 2000).

Lehrnbecher, T., et al., "Variant Genotypes of the Low-Affinity Fcγ Receptors in Two Control Populations and a Review of Low-Affinity Fcγ Receptor Polymorphisms in Control and Disease Populations" Blood 94(12):4220-4232 (Dec. 15, 1999).

Leung, D., et al., "Vascular Endothelial Growth Factor is a Secreted Angiogenic Mitogen" Science 246(4935):1306-1309 (Dec. 8, 1989).

Levy, J., et al., "Human Lymphoblastoid Lines From Lymph Node and Spleen" Cancer 22(3):517-524 (Sep. 1, 1968).

Li, H., et al., "Optimization of humanized IgGs in glycoengineered Pichia pastoris" Nat Biotechnol 24(2):210-215 (Feb. 1, 2006).

Li, J., et al., "Human antibodies for immunotherapy development generated via a human B cell hybridoma technology" PNAS USA 103(10):3557-3562 (Mar. 7, 2006).

Li, M., et al., "Reconstitution of human FcγRIII cell type specificity in transgenic mice" J Exp Med 183(3):1259-1263 (Mar. 1, 1996).

Liang, W., et al., "Cross-Species Vascular Endothelial Growth Factor (VEGF)-Blocking Antibodies Completely Inhaibit the Growth of Human Tumor Xenografts and Measure the Contribution of Stromal VEGF" J Biol Chem 28(2):951-961 (Jan. 13, 2006).

Lieu, C., et al., "Safety and Efficacy of MPDL3280A (Anti-PDL1) in Combination with Bevacizumab (BEV) and/or Chemotherapy (Chemo) in Patients (PTS) with Locally Advanced or Metastatic Solid Tumors" Ann Oncol 25( Suppl 4):iv361 (Sep. 1, 2014).

Lifel Y, M. et al., "Glycosylation and Biological Activity of CAMPATH-1H Expressed in Different Cell Lines and Grown Under Different Culture Conditions." Glycobiology 5(8):813-822 (Dec. 1995).

Lin, P., et al., "Inhibition of tumor angiogenesis using a soluble receptor establishes a role for Tie2 in pathologic vascular growth" J Clin Invest 100(8):2072-2078 (Oct. 15, 1997).

Liu, J., et al., "Characterization of Complex Formation by Humanized Anti-IgE Monoclonal Antibody and Monoclonal Human IgE" ACS Biochemistry 34(33):10474-10482 (Aug. 22, 1995).

Liu, J., et al., "Reversible Self-Association Increases the Viscosity of a Concentrated Monoclonal Antibody in Aqueous Solution" J Pharm Sci 94(9):1928-1940 (Sep. 1, 2005).

Liu, L., et al., "The BRAF and MEK Inhibitors Dabrafenib and Trametinib: Effects on Immune Function and in Combination with Immunomodulatory Antibodies Targeting PD-1, PD-L1, and CTLA-4" Clin Cancer Res 21(7):1639-1651 (Apr. 1, 2015).

Lo, M., et al., "Effector-attenuating Substitutions That Maintain Antibody Stability and Reduce Toxicity in Mice" J Biol Chem 292(9):3900-3908 (Mar. 3, 2017).

Lode, H., et al., "Targeted therapy with a novel enediyene antibiotic calicheamicin θ_1 effectively suppresses growth and dissemination of liver metastases in a syngeneic model of murine neuroblastoma" Cancer Res 58(14):2925-2928 (Jul. 15, 1998).

Lonberg, N., et al., "Fully human antibodies from transgenic mouse and phage display platforms" Curr Opin Immunol 20(4):450-459 (Aug. 1, 2008).

Lonberg, N.,, "Human antibodies from transgenic animals" Nat Biotechnol 23(9):1117-1125 (Sep. 7, 2005).

Lorenz, A., et al., "Strong Association Between the Responder Status of the FCγII Receptor and Recurrent Spontaneous Abortion." Eur J Immunogenet 22(5):397-401 (Oct. 1, 1995).

Loyet, K., et al., "Technology comparisons for anti-therapeutic antibody and neutralizing antibody assays in the context of an anti-TNF pharmacokinetic study" J Immunol Methods 345(1-2):17-28 (Jun. 30, 2009).

Lu, D., et al., "A fully human recombinant IgG-like bispecific antibody to both the epidermal growth factor receptor and the insulin-like growth factor receptor for enhanced antitumor activity" J Biol Chem 280(20):19665-19672 (May 20, 2005).

Lu, D., et al., "Simultaneous blockade of both the epidermal growth factor receptor and the insulin-like growth factor receptor signaling pathways in cancer cells with a fully human recombinant bispecific antibody" J Biol Chem 279(4):2856-2865 (Jan. 23, 2004).

Lucas, B. et al., "High-level production of recombinant proteins in CHO cells using a dicistronic DHFR intron expression vector" Nucleic Acids Res 24(9):1774-1779 (May 1, 1996).

Lund, J. et al., "Human FcγRI and Fcγ RII interact with distinct but overlapping sites on human IgG" J Immunol 147(8):2657-2662 (Oct. 15, 1991).

Lund, J. et al., "Multiple binding sites on the CH2 domain of IgG for mouse FcγR11" Mol Immunol 29(1):53-59 (Jan. 1, 1992).

Lund, J., et al., "Multiple Interactions of the IgG with Its Core Oligosaccharide Can Modulate Recognition by Complement and Human Fcγ Receptor I and Influence the Synthesis of Its Oligosaccharide Chains" J Immunol 157:4963-4969 (Dec. 1, 1996).

Lund, J., et al., "Oligosaccharide-protein interactions in IgG can modulate recognition by Fcγ receptors" FASEB J 9(1):115-119 (Jan. 1, 1995).

Mabry, R., et al., "Engineering of stable bispecific antibodies targeting IL-17A and IL-23" Preotein Eng Des Select 23(3):115-127 (Mar. 1, 2010).

Mac Callum, R., et al., "Antibody-antigen Interactions: Contact Analysis and Binding Site Topography" J Mol Biol 262(5):732-745 (Oct. 11, 1996).

Macher, B., et al., "Proteins at membrane surfaces—a review of approaches" Mol Biosyst 3(10):705-713 (Aug. 21, 2007).

(56) References Cited

OTHER PUBLICATIONS

Maguire, M., et al., "Five-Year Outcomes with Anti-Vascular Endothelial Growth Factor Treatment of Neovascular Age-Related Macular Degeneration: The Comparison of Age-Related Macular Degeneration Treatments Trials" Ophthalmology 123(8):1751-1761 (May 1, 2016).
Maisonpierre, P., et al., "Angiopoietin-2, a Natural Antagonist for Tie2 that Disrupts in vivo Angiogenesis" Science 277(5322):55-60 (Jul. 4, 1997).
Makrides, S., et al., "Components of Vectors for Gene Transfer and Expression in mammalian cells" Protein Exp Purif 17(2):183-202 (Nov. 1, 1999).
Makrides, S.,, "Therapeutic Inhibition of the Complement System" Pharmacol Rev 50(1):59-87 (Mar. 1, 1998).
Male, D. Immunology, An Illustrated Outline London: Gower Medical Publishing Ltd.,:21-24 ( 1986).
Malhotra, R., et al., "Glycosylation Changes of IgG Associated with Rheumatoid Arthritis Can Activate Complement via the Mannose-Binding Protein" Nat Med 1(3):237-243 (Mar. 1, 1995).
Marionneau, S., et al., "Susceptibility of Rat Colon Carcinoma Cells to Lymphokine Activated Killer-Mediated Cytotoxicity is Decreased by α1,2-Fucosylation" Int J Cancer 86(5):713-717 (Jun. 1, 2000).
Marks, J. et al., "By-passing immunization: building high affinity human antibodies by chain shuffling" Bio/Technology 10(7):779-783 (Jul. 1, 1992).
Marks, J., et al. Methods Mol Biol "Chapter 8: Selection of Human Antibodies from Phage Display Libraries" Lo B.K.C. (eds), Totowa, New Jersey—US:Humana Press Inc., vol. 248:161-176 (Jan. 1, 2004).
Marks, J., et al., "By-passing immunization, human antibodies from V-gene libraries displayed on phage" J Mol Biol 222(3):581-597 (Dec. 5, 1991).
Martin, W., et al., "Crystal structure at 2.8 A of an FcRn/heterodimeric Fc complex: mechanism of pH-dependent binding" Mol Cell 7(4):867-877 (Apr. 1, 2001).
Masuda, K. et al., "Enhanced binding affinity for FcγRIIIa of fucose-negative antibody is sufficient to induce maximal antibody-dependent cellular cytotoxicity" Molec Immunol 44(12):3122-3131 (May 1, 2007).
Mather, J., "Establishment and characterization of two distinct mouse testicular epithelial cell lines" Biol Reprod 23(1):243-252 (Aug. 1, 1980).
Mather, J., et al., "Culture of Testicular Cells in Hormone-Supplemented Serum-Free Medium" Ann NY Acad Sci 383:44-68 (Jan. 1, 1982).
Mattern, J. et al., "Association of vascular endothelial growth factor expression with intratumoral microvessel density and tumour cell proliferation in human epidermoid lung carcinoma" Br J Cancer 73(7):931-934 (Apr. 1, 1996).
Maxwell, K., et al., "Crystal structure of the human leukocyte Fc receptor, FcγRIIa" Nat Struct Biol 6(5):437-442 (May 1, 1999).
Mc Cafferty, J., et al., "Phage antibodies: filamentous phage displaying antibody variable domains" Nature 348(6301):552-554 (Dec. 6, 1990).
McCarthy, K., et al., "Bidirectional transcytosis of IgG by the rat neonatal Fc receptor expressed in a rat kidney cell line: a system to study protein transport across epithelia" J Cell Sci 113(Pt. 7):1277-1285 (Apr. 1, 2000).
Medesan, C. et al., "Delineation of the amino acid residues involved in transcytosis and catabolism of mouse IgG1" J Immunol 158(5):2211-2217 (Mar. 1, 1997).
Medesan, C., et al., "Comparative studies of rat IgG to further delineate the Fc:FcRN interaction site" Eur J Immunol 28(7):2092-2100 (Jul. 1, 1998).
Medesan, C., et al., "Localization of the site of the IgG molecule that regulates maternofetal transmission in mice" Eur J Immunol 26(10):2533-2536 (Oct. 1, 1996).
Mellis, S., et al., "Structures of the Oligosaccharides Present at the Three Asparagine-Linked Glyosylation Sites of Human IgD" J Biol Chem 258(19):11546-11556 (Oct. 10, 1983).

Melnyk, O., et al., "Vascular endothelial growth factor promotes tumor dissemination by a mechanism distinct from its effect on primary tumor growth" Cancer Res 56(4):921-924 (Feb. 15, 1996).
Meng, Y., et al., "Green fluorescent protein as a second selectable marker for selection of high producing clones from transfected CHO cells" Gene 242(1-2):201-207 (Jan. 25, 2000).
Merchant, A., et al., "An efficient route to human bispecific IgG" Nat Biotechnol 16(7):677-681 (Jul. 1, 1998).
Meyer, T., et al., "Bevacizumab immune complexes activate platelets and induce thrombosis in FCGR2A transgenic mice" J Thromb Haemost (Epub: Oct. 30, 2008), 7(1):171-181 (Jan. 1, 2009).
Michaeli, Y. et al., "Optimised Fc variants with enhanced effector function" Expert Opinion Ther. Patents 16(10):1449-1452 (Oct. 4, 2006).
Mikayama, T., et al., "Molecular cloning and functional expression of a cDNA encoding glycosylation-inhibiting factor" PNAS USA 90(21):10056-10060 (Nov. 1, 1993).
Miller, K., et al., "A Novel Role for the Fc Receptor γ Subunit: Enhancement of the FcγR Ligand Affinity" J Exp Med 183(5):2227-2233 (May 1, 1996).
Miller, K., et al., "Design, Construction, and in Vitro Analyses of Multivalent Antibodies" J Immunol 170(9):4854-4861 (May 1, 2003).
Milstein, C., et al., "Hybrid hybridomas and their use in immunohistochemistry" Nature 305(5934):537-540 (Oct. 6, 1983).
Mimura, Y., et al., "The influence of glycosylation on the thermal stability and effector function expression of human IgG1-Fc: properties of a series of truncated glycoforms" Mol Immunol 37(12-13):697-706 (Aug. 31, 2000).
Mizushima et al., "Structural Basis for Improved Efficacy of Therapeutic Antibodies on Defucosylation of Their Fc Glycans" Genes to Cells 16:1071-1080 ( 2011).
Mojumder, N., et al., "The Mechanism of the Bispecific Antibody Faricimab Targeting VEGF-A and Ang2 has effect greater than targeting either alone" Retinal Physician 16:32-35 (Mar. 1, 2019).
Monkos, K.,, "Concentration and temperature dependence of viscosity in lysozyme aqueous solutions" Biochim Biophys Acta 1339(2):304-310 (May 23, 1997).
Mooney, M.,, "The viscosity of a concentrated suspension of spherical particles" J Colloid Sci 6(2):162-170 (Apr. 1, 1951).
Moore, G., et al., "Engineered Fc cariant antibodies with enhanced ability to recruit complement and mediate effector functions" MABS 2(2):181-189 (Mar. 31, 2010).
Morgan, A, et al., "The N-terminal end of the CH2 domain of chimeric human IgG1 anti-HLA-DR is necessary for C1q, Fc gamma RI and Fc gamma RIII binding" Immunology 86(2):319-324 (Oct. 1, 1995).
Morris, I. Antigen Absorption by the Gut "Chapter 1: The receptor hypothesis of protein ingestion" Hemmings, W., ed., First edition, Baltimore, MD—USA: University Park Press,:3-22 (Jan. 1, 1978).
Morrison, S., et al., "Chimeric human antibody molecules: Mouse antigen-binding domains with human constant region domains" PNAS USA 81(21):6851-6855 (Nov. 1, 1984).
Morrison, S., et al., "Structural Determinants of Human IgG Function" The Immunologist 2/4:119-124 (Jan. 1, 1994).
Morrison, S., et al., "Variable Region Domain Exchange Influences the Functional Properties of IgG" J Immunol 160(6):2802-2808 (Mar. 15, 1998).
Morrison, S.,, "Two Heads are Better Than One—A new Design for Bispecific Antibodies Enables Efficient Production of Stable Molecules with Good Pharmacodynamic Properties." Nat Biotechnol 25(11):1233-1234 (Nov. 1, 2007).
Murray, R., et al. Harper's Biochemistry "Section I: Structures and Functions of Proteins and Enzymes—4-Amino Acids" Murray, R, Granner, D., eds., Twenty-third edition, Norwalk, Conn. USA:Appleton & Lange Publishers, Inc.,:23-28 (Jan. 1, 1993).
Murray, R., Human Biochemistry "Physiological Consequences of Changing of the Primary Structure" (Russian-Eng. Translation only), Moscow, RU:Mir, vol. 1:34 (Jan. 1, 1993).
Nagarajan, S., et al., "Ligand binding and phagocytosis by CD16 (Fc γ receptor III) isoforms. Phagocytic signaling by associated ζ and γ subunits in Chinese hamster ovary cells" J Biol Chem 270(43):25762-25770 (Oct. 27, 1995).

(56) References Cited

OTHER PUBLICATIONS

Nagy, A., et al., "Stability of cytotoxic luteinizing hormone-releasing hormone conjugate (AN-152) containing doxorubicin 14-O-hemiglutarate in mouse and human serum in vitro: implications for the design of preclinical studies" PNAS USA 97(2):829-834 (Jan. 18, 2000).
NCBI Blast, NCBI Database, RID B6YPW2WD114—Protein Sequence, (Seq. ID No. 909; WO2006/076594; Amino Acid), pp. 1-3Release Date Apr. 14, 2019.
NCI Blast, NCBI Database, RID-B1PVHH83114—Protein Sequence, (Seq ID No. 193; Amino Acid), pp. 1-2Release Date Apr. 12, 2019.
Neuberger, M.S., et al., "A hapten-specific chimaeric IgE antibody with human physiological effector function" Nature 314(6008):268-270 (Mar. 21, 1985).
Newkirk, N., et al., "Rheumatoid factor avidity in patients with rheumatoid arthritis: identification of pathogenic RFs which correlate with disease parameters and with the gal(0) glycoform of IgG" J Clin Immunol 15(5):250-257 (Sep. 1, 1995).
Newman, R., et al., "Modification of the Fc region of a primatized IgG antibody to human CD4 retains its ability to modulate CD4 receptors but does not deplete CD4(+) T cells in chimpanzees" Clin Immunol 98(2):164-174 (Feb. 1, 2001).
Ngo, J. et al. The Protein Folding Problem and Tertiary Structure Prediction "Chapter 14: Computational Complexity and the Levinthal Paradox" Merz, K, & Grand, S., eds., First edition, Boston, MA—US:Birkhauser Publishers,:491-506 (Jan. 1, 1994).
Ni, J. et al., "Research progress and future perspectives in antibodomics and antibodomic drugs" Xiandai Mianyixue 26(4):265-268 ( 2006).
Nieto, A., et al., "Involvement of the Fcγ receptor IIIA genotypes in susceptibility to rheumatoid arthritis" Arthritis Rheum 43(4):735-739 (Apr. 1, 2000).
Niu, C.,, "FDA perspective on peptide formulation and stability issues" J Pharm Sci 87(11):1331-1334 (Nov. 1, 1998).
Niu, G., et al., "Human epidermal growth factor receptor 2 regulates angiopoietin-2 expression in breast cancer via AKT and mitogen-activated protein kinase pathways" Cancer Res 67(4):1487-1493 (Feb. 15, 2007).
Norderhaug, L., et al., "Versatile vectors for transient and stable expression of recombinant antibody molecules in mammalian cells" J Immunol Methods 204(1):77-87 (May 12, 1997).
Noren, C., et al., "A general method for site-specific incorporation of unnatural amino acids into proteins" Science 244(4901):182-188 (Apr. 14, 1989).
Nose, M., et al., "Biological Significance of Carbohydrate Chains on Monoclonal Antibodies" PNAS USA 80(21):6632-6636 (Nov. 1, 1983).
Ober, R., et al., "Differences in promiscuity for antibody—FcRn interactions across species: implications for therapeutic antibodies" Int Immunol 13(12):1551-1559 (Dec. 1, 2001).
Ober, R., et al., "Exocytosis of IgG as mediated by the receptor, FcRn: An analysis at the single-molecule level" PNAS USA 101(30):11076-11081 (Jul. 27, 2004).
Ober, R., et al., "Visualizing the site and dynamics of IgG salvage by the MHC class I-related receptor, FcRn" J Immunol 172(4):2021-2029 (Feb. 15, 2004).
Oganesyan, V. et al., "Structural characterization of a human Fc fragment engineered for extended serum half-life" Mol Immunol 46(8-9):1750-1755 (May 1, 2009).
Oganesyan, V., et al., "Structural characterization of a human Fc fragment engineered for lack of effector functions" Acta Crystallogr D Biol Crystallogr 64(Pt 6):700704 (May 14, 2008).
Ohyama, C., et al., "Molecular Cloning and Expression of GDP-d-mannose-4,6-dehydratase, a Key Enzyme for Fucose Metabolism Defective in Lec13 Cells" J Biol Chem 273(23):14582-14587 (Jun. 5, 1998).
Okada, H., et al., "Cutting Edge: Role of the Inositol Phosphatase SHIP in B Cell Receptor-Induced Ca2+ Oscillatory Response" J Immunol 161(10):5129-5132 (Nov. 15, 1998).
Okafo, G., et al., "Simple Differentiation Between Core-Fucosylated and Nonfucosylated Glycans by Capillary Electrophoresis" Anal Biochem 240(1):68-74 (Aug. 15, 1996).
Okazaki, A., et al., "Fucose depletion from human IgG1 oligosaccharide enhances binding enthalpy and association rate between IgG1 and FcgammaRIIIa" J Mol Biol 336(5):1239-1249 (Mar. 5, 2004).
Olafsen, T., et al., "Tunable pharmacokinetics: modifying the in vivo half-life of antibodies by directed mutagenesis of the Fc fragment" Nat Protoc 1(4):2048-2060 (Nov. 30, 2006).
Oliner, J., et al., "Suppression of Angiogenesis and Tumor Growth by Selective Inhibition of Angiopoietin-2" Cancer Cell 6(5):507-516 (Nov. 1, 2004).
Ong, F., et al., "Personalized Medicine in Ophthalmology: From Pharmacogenetic Biomarkers to Therapeutic and Dosage Optimization" J Pers Med 3(1):40-69 (Mar. 5, 2013).
Ono, M., et al., "Deletion of SHIP or SHP-1 reveals two distinct pathways for inhibitory signaling" Cell 90(2):293-301 (Jul. 25, 1997).
Ono, M., et al., "Role of the inositol phosphatase SHIP in negative regulation of the immune system by the receptor FcγRIIB" Nature 383(6597):263-266 (Sep. 19, 1996).
Orlandi, R., et al., "Cloning Immunoglobulin Variable Domains for Expression by the Polymerase Chain Reaction" PNAS USA 86(10):3833-3837 (May 1, 1989).
Osbourn, J. et al., "From rodent reagents to human therapeutics using antibody guided selection" Methods 36(1):61-68 (May 1, 2005).
O'Sullivan, M., et al., "Methods for the preparation of enzyme-antibody conjugates for use in enzyme immunoassay" Method Enzymol 73(Pt. B):147-166 (Jan. 1, 1981).
Padlan, E. et al., "A possible procedure for reducing the immunogenicity of antibody variable domains while preserving their ligand-binding properties" Mol Immunol 28(4-5):489-498 (Apr. 30, 1991).
Padlan, E., "Anatomy of the antibody molecule" Mol Immunol 31(3):169-217 (Feb. 1, 1994).
Pakula, A., et al., "Genetic analysis of protein stability and function" Annu Rev Genet 23:289-310 (Dec. 1, 1989).
Papac, D., et al., "A high-throughput microscale method to release N-linked oligosaccharide from glycoproteins for matrix-assisted laser desorption/ionization time-of-flight mass spectrometric analysis" Glycobiology 8(5):445-454 (May 1, 1998).
Papac, D., et al., "Analysis of Acidic Oligosaccharides and Glycopeptides by Matrix-Assisted Laser Desorption/Ionization Time-of-Flight Mass Spectrometry" ACS Anal Chem 68(18):3215-3223 (Sep. 15, 1996).
Parekh, R., et al., "Association of rheumatoid arthritis and primary osteoarthritis with changes in the glycosylation pattern of total serum IgG" Nature 316(6027):452-457 (Aug. 1, 1985).
Paul, W., Fundamental Immunology "Chapter 9: Structure and Function of Immunoglobins" Paul, W., ed., Third edition, New York, N.Y.—USA:Raven Press,:242, 292-295 (Jan. 1, 1993).
Penichet, M., et al., "Antibody-Cytokine Fusion Proteins for the Therapy of Cancer" J Immunol Methods 248(1-2):91-101 (Feb. 1, 2001).
Petkoova, S., et al., "Enhanced half-life of genetically engineered human IgG1 antibodies in a humanized FcRn mouse model: potential application in humorally mediated autoimmune disease" Int Immunol 18(12):1759-1769 (Dec. 1, 2006).
Petrukhin, K.,, "New Therapeutic Targets in Atrophic Age-Related Macular Degeneration" Expert Opin Ther Targets 11(5):625-639 (May 1, 2007).
Pluckthun, A. et al. The Pharmacology of Monoclonal Antibodies "Antibodies from *Escherichia coli*" Rosenberg & Moore, vol. 113:269-315 ( 1994).
Popkov, M., et al., "Human/mouse cross-reactive anti-VEGF receptor 2 recombinant antibodies selected from an immune b9 allotype rabbit antibody library" J Immunol Methods 288(1-2):149-164 (May 1, 2004).
Popov, S., et al., "The stoichiometry and affinity of the interaction of murine Fc fragments with the MHC class I-related receptor, FcRn" Mol Immunol 33(6):521-530 (Apr. 1, 1996).

(56) References Cited

OTHER PUBLICATIONS

Porges, A., et al., "Novel Fcγ Receptor I Family Gene Products in Human Mononuclear Cells" J Clin Invest 90(5):2102-2109 (Nov. 1, 1992).
Portolano, S., et al., "Lack of promiscuity in autoantigen-specific H and L chain combinations as revealed by human H and L chain 'Roulette'" J Immunol 150(3):880-887 (Feb. 1, 1993).
Prabhat, P., et al., "Elucidation of intracellular recycling pathways leading to exocytosis of the Fc receptor, FcRn, by using multifocal plane microscopy" PNAS USA 104(14):5889-5894 (Mar. 23, 2007).
Praetor, A., et al., "Intracelluarl traffic of the MHC Class I-Like IgG Fc receptor, FcRn, expressed in epithelial MdCK Cells" J Cell Sci 112(Pt. 15):2291-2299 (Jul. 1, 1999).
Presta, L. et al., "Humanization of an antibody directed against IgE" J Immunol 151(5):2623-2632 (Sep. 1, 1993).
Presta, L., et al., "Engineering therapeutic antibodies for improved function" Biochem Soc Trans 30(4):487-490 (Aug. 1, 2002).
Presta, L., et al., "Humanization of an Anti-vascular Endothelial Growth Factor Monoclonal Antibody for the Therapy of Solid Tumors and Other Disorder" Cancer Res 57(20):4593-4599 (Oct. 15, 1997).
Presta, L., et al., "Molecular engineering and design of therapeutic antibodies" Curr Opin Immunol 20(4):460-470 (Aug. 1, 2008).
Presta, L.,, "Antibody engineering for therapeutics" Curr Opin Struc Biol 13(4):519-525 (Aug. 1, 2003).
Presta, L.,, "Engineering of therapeutic antibodies to minimize immunogenicity and optimize function" Adv Drug Deliver Rev 58(5-6):640-656 (Aug. 7, 2006).
Presta, L.,, "Selection, design, and engineering of therapeutic antibodies" J Allergy Clin Immun 116(4):731-736 (Oct. 1, 2005).
Qiao, S., et al., "Dependence of antibody-mediated presentation of antigen on FcRn" PNAS 105(27):9337-9342 (Jul. 1, 2008).
Queen, C., et al., "A humanized antibody that binds to the interleukin 2 receptor" PNAS USA 86(24):10029-10033 (Dec. 1, 1989).
Radaev, S., et al., "The Structure of a Human Type III Fcγ Receptor in Complex with Fc" J Bio Chem 276(19):16469-16477 (May 11, 2001).
Raghavan, M. et al., "Analysis of the pH dependence of the neonatal Fc receptor/immunoglobulin G interaction using antibody and receptor variants" ACS Biochemistry 34(45):14649-14657 (Nov. 14, 1995).
Raghavan, M.,, "Fc receptors and their interactions with immunoglobulins" Annu Rev Cell Dev Biol 12:181-220 (Nov. 1, 1996).
Rajagopal, V.,, "A Form of Anti-Tac(Fv) Which is Both Single-chain and Disulfide Stabilized: Comparison with its Single-chain and Disulfide-stabilized Homologs" Protein Eng 10(12):1453-1459 (Dec. 1, 1997).
Raju, T. et al., "Species-Specific Variation in Glycosylation of IgG: Evidence for the Species-Specific Sialylation and Branch-Specific Galactosylation and Importance for Engineering Recombinant Glycoprotein Therapeutics." Glycobiology 10(5):477-486 (May 1, 2000).
Rao, P., et al., "Real-World Vision in Age-Related Macular Degeneration Patients Treated with Single Anti-VEGF Drug Type for 1 Year in the IRIS Registry" Ophthalmology 125(4):522-528 (Apr. 1, 2018).
Ravetch, J. et al., "IgG Fc receptors" Ann Rev Immunol 19:275-290 (Apr. 1, 2001).
Ravetch, J., et al., "Divergent roles for Fc receptors and complement in vivo" Annu Rev Immunol 16:421-432 (Apr. 1, 1998).
Ravetch, J., et al., "Fc receptors" Annu Rev Immunol 9:457-492 (Apr. 1, 1991).
Ravetch, J., "Fc receptors" Curr Opin Immunol 9(1):121-125 (Feb. 1, 1997).
Ravetch, J., "Fc receptors: rubor redux" Cell 78(4):553-560 (Aug. 26, 1994).
Reff, M.E. et al., "Depletion of B cells in vivo by a chimeric mouse human monoclonal antibody to CD20" Blood 83(2):435-445 (Jan. 15, 1994).

Repp et al., "Combined Fc-Protein- and Fc-Glyco-Engineering of scFv-Fc Fusion Proteins Synergistically Enhances CD16a Binding but Does Not Further Enhance NK-Cell Mediated ADCC" J Immunol Methods 373(1-2):67-78 (Oct. 28, 2011).
Ridgway, J., et al., "Knobs-into-holes' engineering of antibody CH3 domains for heavy chain heterodimerization" Protein Eng 9(7):617-621 (Jul. 1, 1996).
Riechmann, L. et al., "Reshaping human antibodies for therapy" Nature 332(6162):323-327 (Mar. 24, 1988).
Ripka, J., et al., "Lectin-Resistant CHO Cells: Selection of Four New Pea Lectin-Resistant Phenotypes" Somat Cell Molec Gen 12(1):51-62 (Jan. 1, 1986).
Ripka, J., et al., "Two chinese hamster ovary glycosylation mutants affected in the conversion of GDP-mannose to GDP-fucose" Arch Biochem Biophys 249(2):533-545 (Sep. 1, 1986).
Ritter, M., et al., "Myeloid progenitors differentiate into microglia and promote vascular repair in a model of ischemic retinopathy" J Clin Invest (Epub: Nov. 16, 2006), 116(12):3266-3276 (Dec. 1, 2006).
Rodewald, R.,, "pH-dependent binding of immunoglobulins to intestinal cells of the neonatal rat" J Cell Biol 71(2):666-669 (Nov. 1, 1976).
Rogers, M., et al., "The mouse cornea micropocket angiogenesis assay" Nat Protoc 2(10):2545-2550 (Oct. 11, 2007).
Roopenian, D., et al., "The MHC class I-like IgG receptor controls perinatal IgG transport, IgG homeostasis, and fate of IgG-Fc-coupled drugs" J Immunol 170(7):3528-3533 (Apr. 1, 2003).
Roopenian, D.,, "FcRn: the neonatal Fc receptor comes of age" Nat Rev Immunol 7(9):715-725 (Aug. 17, 2007).
Rosok, M., et al., "A combinatorial library strategy for the rapid humanization of anticarcinoma BR96 Fab" J Biol Chem 271(37):22611-22618 (Sep. 13, 1996).
Rossi., E., et al., "Multivalent Anti-CD20/Anti-CD22 Bispecific Antibody Fusion Proteins Made by the DNL Method Show Potent Lymphoma Cytotoxicity" Abstract (2495) ASH Annual Meeting, Baltimore, MD—USA, p. 1 ( Nov. 16-19, 2006).
Rothman, J., et al., "Antibody-Dependent Cytotoxicity Mediated by Natural Killer Cells is Enhanced by Castanospermine-Induced Alterations of IgG Glycosylation" Mol Immunol 26(12):1113-1123 (Dec. 1, 1989).
Routier, F., et al., "The glycosylation pattern of a humanized IgGI antibody (D1.3) expressed in CHO cells" Glycoconjugate J 14(2):201-207 (Feb. 1, 1997).
Rubinstein, E., et al., "Anti-Platelet Antibody Interactions with Fcγ Receptor" Semi Thromb Hemost 21(1):10-22 ( 1995).
Rudd, P., et al., "Glycosylation and the Immune System" Science 291(5512):2370-2376 (Mar. 23, 2001).
Rudikoff et al., "Single amino acid substitution altering antigen-binding specificity" Proc. Natl. Acad. Sci. USA, 79(6):1979-1983 (Mar. 1982).
Rudnick, S., et al., "Affinity and Avidity in Antibody-Based Tumor Targeting" Cancer Biother Radiopharm 24(2):155-162 (Apr. 1, 2009).
Russelakis-Carneiro, M., et al., "Inflammatory response and retinal ganglion cell degeneration following intraocular injection of ME7" Neuropathol Appl Neurobio 25(3):196-206 (Jun. 1, 1999).
Sahni, J., et al., "Safety and Efficacy of Different Doses and Regimens of Faricimab vs Ranibizumab in Neovascular Age-Related Macular Degeneration: The Avenue Phase 2 Randomized Clinical Trial" JAMA Ophthalmol 138(9):955-963 (Sep. 1, 2020).
Sahni, J., et al., "Simultaneous Inhibition of Angiopoietin-2 and Vascular Endothelial Growth Factor-A with Faricimab in Diabetic Macular Edema—Boulevard Phase 2 Randomized Trial" Ophthalmology 126(8):1155-1170 (Aug. 1, 2019).
Sampson, J., et al., "Unarmed, Tumor-Specific Monoclonal Antibody Effectively Treats Brain Tumors" PNAS USA 97(13):7503-7508 (Jun. 20, 2000).
Sarmay, G., et al., "Ligand Inhibition Studies on the Role of Fc Receptors in Antibody-Dependent Cell-Mediated Cytotoxicity." Mol Immunol 21(1):43-51 (Jan. 1, 1984).
Sarmay, G., et al., "Mapping and comparison of the interaction sites on the Fc region of IgG responsible for triggering antibody depen-

(56) References Cited

OTHER PUBLICATIONS dent cellular cytotoxicity (ADCC) through different types of human Fcγ receptor" Mol Immunol 29(5):633-639 (May 1, 1992).
Sato, Y.,, "Molecular diagnosis of tumor angiogenesis and anti-angiogenic cancer therapy" Int J Clin Oncol 8(4):200-206 (Aug. 1, 2003).
Sautes, C., Cell-Mediated Effects of Immunoglobulins "Chapter 2: Structure and Expression of Fc Receptors (FcR)" Fridman, W., & Sautes, C., eds., First edition, Austin, Texas—US:R.G. Landes Company,:29-66 ( 1997).
Schaefer, W., et al., "Immunoglobulin domain crossover as a generic approach for the production of bispecific IgG antibodies" PNAS USA 108(27):11187-11192 (Jul. 5, 2011).
Schlaeger, E., et al., "The protein hydrolysate, Primatone RL, is a cost-effective multiple growth promoter of mammalian cell culture in serum-containing and serum-free media and displays anti-apoptosis properties" J Immunol Methods 194(2):191-199 (Aug. 14, 1996).
Schlaeger, E., et al., "Transient gene expression in mammalian cells grown in serum-free suspension culture" Cytotechnology 30(1-3):71-83 (Jul. 1, 1999).
Schlaeth, M., et al., "Fc-engineered EGF-R antibodies mediate improved antibody-dependent cellular cytotoxicity (ADCC) against KRAS-mutated tumor cells" Cancer Sci 101(5):1080-1088 (Jan. 20, 2010).
Schlothauer, T., et al., "Novel human IgG1 and IgG4 Fc-engineered antibodies with completely abolished immune effector functions" Protein Eng Des Sel (w/Supplementary Figures), 29(10):457-466 (Oct. 1, 2016).
Schmidt, M. et al., "Suppression of Metastasis Formation by a Recombinant Single Chain Antibody-Toxin Targeted to Full-length and Oncogenic Variant EGF Receptors" Oncogene 18(9):1711-1721 (Mar. 15, 1999).
Schmidt-Erfurth, U., et al., "Intravitreal aflibercept injection for neovascular age-related macular degeneration: ninety-six-week results of the View studies" Ophthalmology 121(1):193-201 (Jan. 1, 2014).
Schoojans, R. et al., "Fab Chains as an Efficient Heterodimerization Scaffold for the Production of Recombinant Bispecific and Trispecific Antibody Derivatives" J Immunol 165(12):7050-7057 (Dec. 15, 2000).
Scott, I.U., et al., "Month 24 Outcomes After Treatment Initiation With Anti-Vascular Endothelial Growth Factor Therapy for Macular Edema Due to Central Retinal or Hemiretinal Vein Occlusion: Score2 Report 10: A Secondary Analysis of the Score2 Randomized Clinical Trial" JAMA Ophthalmol 137(12):1389-1398 (Dec. 1, 2019).
Scott, I.U., et al., "Patient-Reported Visual Function Outcomes After Anti-Vascular Endothelial Growth Factor Therapy for Macular Edema Due to Central Retinal or Hemiretinal Vein Occlusion: Preplanned Secondary Analysis of a Randomized Clinical Trial" JAMA Ophthalmol 137(8):932-938 (Aug. 1, 2019).
Scrama, D., et al., "Antibody Targeted Drugs as Cancer Therapeutics" Nat Rev Drug Discov 5:147-159 (Jan. 20, 2006).
Segal, D., "Introduction: Bispecific Antibodies" J Immunol Methods 248(1-2):1-6 (Feb. 1, 2001).
Sensel, M., et al., "Amino acid differences in the N-terminus of C(H)2 influence the relative abilities of IgG2 and IgG3 to activate complement" Mol Immunol 34(14):1019-1029 (Oct. 1, 1997).
Shen, J., et al., "Single Variable Domain Antibody as a Versatile Building Block for the Construction of IgG-like Bispecific Antibodies" J Immunol Methods 318(1-2):65-74 (Oct. 26, 2006).
Shields, R., et al., "High resolution mapping of the binding site on human IgG1 for Fc gamma RI, Fc gamma RII, Fc gamma RIII, and FcRn and design of IgG1 variants with improved binding to the Fc gamma R" J Biol Chem 276(9):6591-6604 (Mar. 2, 2001).
Shields, R.L., et al., "Lack of Fucose on Human IgG1 N-Linked Oligosaccharide Improves Binding to Human FcγRIII and Antibody-dependent Cellular Toxicity" J Biol Chem 277(30):26733-26740 (Jul. 26, 2002).
Shim, H.,, "One Target, different effects: a comparison of distinct therapeutic antibodies against the same targets" Exp Mol Med 43(10):539-549 (Oct. 31, 2011).
Shindo, Y., et al., "Combination Immunotherapy with 4-1BB Activation and PD-1 Blockade Enhances Antitumor Efficacy in a Mouse Model of Subcutaneous Tumor" Anticancer Res 35(1):129-136 (Jan. 1, 2015).
Shinkawa, T., et al., "The Absence of Fucose but Not the Presence of Galactose or Bisecting N-Acetyclucosamine of Human IgG1 Complex-type Oligosaccharides Shows the Critical Role of Enhancing Antibody-dependent Cellular Cytotoxicity" J Biol Chem 278(5):3466-3473 (Jan. 31, 2003).
Shitara, K., et al., "A New Vector for the High Level Expression of Chimeric Antibodies in Myeloma Cells" J Immunol Methods 167(1-2):271-278 (Jan. 3, 1994).
Shores, E., et al., "T cell development in mice lacking all T cell receptor ζ family members (ζ, η, and FcεRIγ)" J Exp Med 187(7):1093-1101 (Apr. 6, 1998).
Sidhu, S., et al., "Phage-displayed antibody libraries of synthetic heavy chain complementarity determining regions" J Mol Biol 338(2):299-310 (Apr. 23, 2004).
Simon, T., et al., "Antibody Domain Mutants Demonstrate Autonomy of the Antigen Binding Site" EMBO Journal 9(4):1051-1056 (Apr. 1, 1990).
Simon, T., et al., "Consolidation Treatment With Chimeric Anti-GD2-Antibody ch14.18 in Children Older Than 1 Year With Metastatic Neuroblastoma" J Clin Oncol 22(17):3549-3557 (Sep. 1, 2004).
Sims, M., et al., "A Humanized CD18 Antibody Can Block Function Without Cell Destruction" J Immunol 151(4):2296-2308 (Aug. 15, 1993).
Sinapis, C., et al., "Pharmacokinetics of intravitreal bevacizumab (Avastin®) in rabbits" Clin Ophthamol 5:697-704 (May 24, 2011).
Sinapis, C., et al., "Pharmacokinetics of Intravitreal Bevacizumab (Avastin) in Rabbits" IOVS—Invest Opthalmol Vis Sci (Abstract), 51(13):2440 (Apr. 1, 2010).
Sondermann, P., et al., "Crystal structure of the soluble form of the human Fcγ-receptor IIb: a new member of the immunoglobulin superfamily at 1.7 A resolution" EMBO J 18(5):1095-1103 (Mar. 1, 1999).
Sondermann, P., et al., "The 3.2-A crystal structure of the human IgG1 Fc fragment-Fc gammaRIII complex" Nature 406(6793):267-273 (Jul. 20, 2000).
Song, C., Cancer Drug Resistance "Chapter 2: Influence of Tumor pH on Therapeutic Response" Teicher, B., ed., First edition, Humana Totowa, N.J.—USA:Humana Press,:21-42 (Mar. 9, 2006).
Stankova, J., et al., "Fucose-Activated Killer (FAK) Cells: Anomalous Killers with Augmented Cytotoxic Activity" J Immunol 135(6):3719-3728 (Dec. 1, 1985).
Steeg, P., et al., "Brain Metastases as Preventive and Theraputic Targets" Nat Rev Cancer 11(5):352-363 (Apr. 7, 2011).
Steplewski, Z., et al., "Biological activity of human-mouse IgG1, IgG2, IgG3, and IgG4 chimeric monoclonal antibodies with antitumor specificity" PNAS USA 85(13):4852-4856 (Jul. 1, 1988).
Streit, M., et al., "Angiogenesis, lymphangiogenesis, and melanoma metastasis" Oncogene 22(20):3172-3179 (May 19, 2003).
Strohmeier, G., et al., "Neutrophil functional responses depend on immune complex valency" J Leukocyte Biol 58(4):403-414 (Oct. 1, 1995).
Strohmeier, G., et al., "Role of the FcγR subclasses FcγRII and FcγRIII in the activation of human neutrophils by low and high valency immune complexes" J Leukocyte Biol 58(4):415-422 (Oct. 1, 1995).
Stubenrauch, K., et al., "Impact of molecular processing in the hinge region of therapeutic IgG4 antibodies on disposition profiles in cynomolgus monkeys" Drug Metab Dispos 38(1):84-91 (Jan. 1, 2010).
Suzuki, Y., et al., "Distinct contribution of Fc receptors and angiotensin II-dependent pathways in anti-GBM glomerulonephritis" Kidney Int 54(4):1166-1174 (Oct. 1, 1998).
Sylvestre, D et al., "Fc receptors initiate the Arthus reaction: redefining the inflammatory cascade" Science 265(5175):1095-1098 (Aug. 19, 1994).

(56) References Cited

OTHER PUBLICATIONS

Sylvestre, D, "A dominant role for mast cell Fc receptors in the Arthus reaction" Immunity 5(4):387-390 (Oct. 1, 1996).
Sylvestre, D., et al., "Immunoglobulin G-mediated inflammatory responses develop normally in complement-deficient mice" J Exp Med 184(6):2385-2392 (Dec. 1, 1996).
Takahashi, N., et al., "Comparative Structural Study of the N-Linked Oligosaccharides of Human Normal and Pathological Immunoglobulin G" ACS Biochemistry 26(4):1137-1144 (Feb. 24, 1987).
Takai, T., et al., "Augmented humoral and anaphylactic responses in FcγRII-deficient mice" Nature 379(6563):346-349 (Jan. 25, 1996).
Takai, T., et al., "FcR γ chain deletion results in pleiotrophic effector cell defects" Cell 76(3):519-529 (Feb. 11, 1994).
Talmadge, J., et al., "Murine Models to Evaluate Novel and Conventional Therapeutic Strategies for Cancer" Am J Pathol 170(3):793-804 (Mar. 1, 2007).
Tam, S., et al., "Functional, Biophysical, and Structural Characterization of Human IgG1 and IgG4 Fc Variants with Ablated Immune Functionality" Antibodies 6(3):1-34 (Sep. 1, 2017).
Tamm, A., et al., "The IgG binding site of human FcγRIIIB receptor involves CC' and FG loops of the membrane-proximal domain" J Biol Chem 271(7):3659-3666 (Feb. 16, 1996).
Tamura, K.,, "Human Immunoadhesin A New Ligand Antagonist (English Translation)" Pharma Soc Japan 33(1):46-50 (Jan. 1, 1997).
Tao, H., et al., "Structural Features of Human Immunoglobulin G That Determine Isotype-Specific Differences in Complement Activation." J Exp Med 178(2):661-667 (Aug. 1, 1993).
Tao, M., et al., "Studies of Aglycosylated Chimeric Mouse-Human IgG: Role of Carbohydrate in the Structure and Effector Functions Mediated by the Human IgG Constant Region." J Immunol 143(8):2595-2601 (Oct. 15, 1989).
Tao, M., et al., "The differential ability of human IgG1 and IgG4 to activate complement is determined by the COOH-terminal sequence of the CH2 domain" J Exp Med 173(4):1025-1028 (Apr. 1, 1991).
Tax, W., et al., "Fc receptors for mouse IgG1 on human monocytes: polymorphism and role in antibody-induced T cell proliferation" J Immunol 133(3):1185-1189 (Sep. 1, 1984).
Taylor, L. et al., "In vitro and in vivo activities of OX40 (CD134)-IgG fusion protein isoforms with different levels of immune-effector functions" J Leukoc Biol 72(3):522-529 (Sep. 1, 2002).
Taylor, S., et al., "Thrombosis and shock induced by activating antiplatelet antibodies in human FcγRIIA transgenic mice: the interplay among antibody, spleen, and Fc receptor" Blood 96(13):4254-4260 (Dec. 15, 2000).
Teillaud, J.,, "Antibody-dependent Cellular Cytotoxicity (ADCC)" ELS—Encyclopedia of Life Sciences—Wiley:1-8 (Jul. 16, 2012).
Tejada, T., et al., "Tumor-driven paracrine platelet-derived growth factor receptor alpha signaling is a key determinant of stromal cell recruitment in a model of human lung carcinoma" Clin Cancer Res 12(9):2676-2688 (May 1, 2006).
Tesar, D., et al., "Ligand valency affects transcytosis, recycling and intracellular trafficking mediated by the neonatal Fc receptor" Traffic-Copehagen 7(9):1127-1142 (Jun. 29, 2006).
Thomas, M. et al., "A novel angiopoietin-2 selective fully human antibody with potent anti-tumoral and anti-angiogenic efficacy and superior side effect profile compared to pan-angiopoietin-1-2 inhibitors" PLOS ONE 8(2):e54923 (1-11) (Feb. 6, 2013).
Thomas, M., et al., "LC06, a novel angiopoietin-2 selective human antibody with potent anti-tumoral and anti-angiogenic efficacy in different xenograft models" Eur J Cancer 8(7 Suppl 1):156-157 (Nov. 1, 2010).
Thommesen, J., et al., "Lysine 322 in the human IgG3 C(H)2 domain is crucial for antibody dependent complement activation" Mol Immunol 37(16):995-1004 (Nov. 1, 2000).
Thurber, G., et al., "Antibody tumor penetration: transport opposed by systemic and antigen-mediated clearance" Adv Drug Deliv Rev 60(12):1421-1434 (Sep. 1, 2008).

Ting, A., et al., "Fcγ receptor activation induces the tyrosine phosphorylation of both phospholipase C (PLC)-γ1 and PLC-γ2 in natural killer cells" J Exp Med 176(6):1751-1755 (Dec. 1, 1992).
Tomiyama, Y., et al., "Response of human platelets to activating monoclonal antibodies: Importance of FcγRII (CD32) phenotype and level of expression" Blood 80(9):2261-2268 (Nov. 1, 1992).
Tonini, T. et al., "Molecular basis of angiogenesis and cancer" Oncogene 22(42):6549-6556 (Sep. 29, 2003).
Torgov, M., et al., "Generation of an intensely potent anthracycline by a monoclonal antibody—β-galactosidase conjugate" Bioconjugate Chem 16(3):717-21 (May 1, 2005).
Traunecker, A., et al., "Bispecific single chain molecules (Janusins) target cytotoxic lymphocytes on HIV infected cells" EMBO J 10(12):3655-3659 (Dec. 10, 1991).
Tsuchiya, N., et al., "Effects of Galactose Depletion from Oligosaccharide Chains on Immunological Activities of Human IgG" J Rheumatol 16(3):285-290 (Mar. 1, 1989).
Tutt, A., et al., "Monoclonal antibody therapy of B cell lymphoma: signaling activity on tumor cells appears more important than recruitment of effectors" J Immunol 161(6):3176-3185 (Sep. 15, 1998).
Tutt, A., et al., "Trispecific F(ab')3 derivatives that use cooperative signaling via the TCR/CD3 complex and CD2 to activate and redirect resting cytotoxic T cells" J Immunol 147(1):60-69 (Jul. 1, 1991).
Umaña, P., et al., "Engineered Glycoforms of an Antineuroblastoma IgG1 with Optimized Antibody-Dependent Cellular Cytotoxic Activity" Nat Biotechnol 17(2):176-180 (Feb. 1, 1999).
Urfer, R., et al., "High resolution mapping of the binding site of TrkA for nerve growth factor and TrkC for neurotrophin-3 on the second immunoglobulin-like domain of the Trk receptors" J Biol Chem 273(10):5829-5840 (Mar. 6, 1998).
Urlaub, G., et al., "Isolation of chinese hamster cell mutants deficient in dihydrofolate reductase activity" PNAS US 77(7):4216-4220 (Jul. 1, 1980).
US Clinical TRIALS.gov et al., "A Proof-of-Concept Study of Faricimab (RO6867461) in Participants With Choroidal Neovascularization (CNV) Secondary to Age-Related Macular Degeneration (AMD) (Avenue)" (ClinicalTrials.gov ID: NCT02484690; History of Changes, Version 15, Submitted Date: Feb. 2, 2018; First Posted: Jun. 30, 2015; Last Update Posted: Feb. 5, 2018; Retrieved: Aug. 4, 2022),:1-8 (Aug. 4, 2022).
US Clinical TRIALS.gov et al., "A Proof-of-Concept Study of Faricimab (RO6867461) in Participants With Choroidal Neovascularization (CNV) Secondary to Age-Related Macular Degeneration (AMD) (Avenue)" (ClinicalTrials.gov ID: NCT02484690; History of Changes; Version 15; First Posted: Jun. 30, 2015; Last Update Submitted: Feb. 2, 2018; Retrieved: Feb. 12, 2018),:1-6 (Feb. 2, 2018).
US Clinical TRIALS.gov et al., "A Study of Faricimab (RO6867461) in Participants With Center-Involving Diabetic Macular Edema (Boulevard)" (ClinicalTrials.gov Identifier: NCT02699450; History of Changes; Submitted Date: Dec. 21, 2017 (v9); Retrieved: Aug. 2, 2021),: 1-13 (Dec. 21, 2017).
US Clinical TRIALS.gov et al., "Study to Evaluate Faricimab (RO6867461; RG7716) for Extended Durability in the Treatment of Neovascular Age Related Macular Degeneration (Stairway)" (ClinicalTrials.gov ID: NCT03038880; History of Changes, Version 1, Submitted: Jan. 31, 2017; First Posted: Feb. 1, 2017; Last Update Posted: Jan. 31, 2017; Retrieved: Aug. 4, 2022),:1-7 (Aug. 4, 2022).
US Clinical TRIALS.gov, "A Study of Faricimab (RO6867461) in Participants With Center-Involving Diabetic Macular Edema (Boulevard)" (ClinicalTrials.gov ID: NCT02699450; History of Changes, Version 9; First Posted: Mar. 4, 2016; Last Updated Posted: Dec. 26, 2017; Retrieved: Aug. 28, 2023),:1-8 (Dec. 21, 2007).
Vajdos, F., et al., "Comprehensive functional maps of the antigen-binding site of an anti-ErbB2 antibody obtained with shotgun scanning mutagenesis" J Mol Biol 320(2):415-428 (Jul. 5, 2002).
Vallette, F., et al., "Construction of mutant and chimeric genes using the polymerase chain reaction" Nucl Acids Res 17(2):723-733 (Jan. 25, 1989).
Van De Winkel, J.G., et al., "Biology of human immunoglobulin G Fc receptors" J Leukocyte Biol 49(5):511-524 (May 1, 1991).

(56) References Cited

OTHER PUBLICATIONS

Van Dijk and Van De Winkel et al., "Human antibodies as next generation therapeutics" Curr Opin Chem Biol 5(4):368-374 (Aug. 2001).
Vance, B., et al., "Binding of monomeric human IgG defines an expression polymorphism of FcγRIII on large granular lymphocyte/natural killer cells" J Immunol 151(11):6429-6439 (Dec. 1, 1993).
Varano, M., et al., "Current barriers to treatment for wet age-related macular degeneration (wAMD): findings from the wAMD patient and caregiver survey" Clin Ophthalmol 9:2243-2250 (Dec. 1, 2015).
Vaswani, S.,, "Humanized Antibodies as Potential Therapeutic Drugs" Ann Allergy Asthma Immunol 81(2):105-119 (Aug. 1, 1998).
Vaz-Pereira, S., et al., "Real-World Outcomes of Anti-VEGF Treatment for Retinal Vein Occlusion in Portugal" Eur J Ophthalmol 27(6):756-761 (Nov. 8, 2017).
Vijayalkakshmi, M., "Antibody Purification Methods" Appl Biochem Biotech 75(1):93-102 (Oct. 1, 1998).
Vitetta, E., et al., "Considering Therapeutic Antibodies" Science 313(5785):308-309 (Jul. 21, 2006).
Vitetta, E., et al., "Redesigning nature's poisons to create anti-tumor reagents" Science 238(4830):1098-1104 (Nov. 20, 1987).
Vollmers, H., et al., "The 'early birds': Natural IgM antibodies and immune surveillance" Histol Histopathol 20(3):927-937 (Jul. 1, 2005).
Vollmers, H.,, "Death by stress: natural IgM-induced apoptosis" Methods Find Exp Clin Pharmacol 27(3):185-191 (Apr. 1, 2005).
Voskoglou-Nomikos, T. et al., "Clinical Predictive Value of the in Vitro Cell Line, Human Xenograft, and Mouse Allograft Preclinical Cancer Models" Clin Can Res 9(11):4227-4239 (Sep. 15, 2003).
Vukicevic, M., et al., "Caregiver perceptions about the impact of caring for patients with wet age-related macular degeneration" Eye (London) 30(3):413-421 (Mar. 1, 2016).
Walker, M., et al., "Aglycosylation of Human IgG1 and IgG3 Monoclonal Antibodies Can Eliminate Recognition by Human Cells Expressing FcγRI and/or FcγRII Receptors." Biochem J 259(2):347-353 (Apr. 15, 1989).
Wang, L.,, "Expanding the genetic code" Chem Commun—Cambridge 1:1-10 (Jan. 7, 2002).
Wang, W., et al., "Antibody structure, instability, and formulation" J. of Pharmaceutical Sciences 96(1):1-26 (Jan. 1, 2007).
Ward, S., et al., "The Effector Functions of Immunoglobulins: Implications for Therapy." Ther Immunology 2(2):77-94 (Apr. 1, 1995).
Warmderdam, P., et al., "A Single Amino Acid in the Second Ig-Like Domain of the Human Fcγ Receptor II is Critical for Human IgG2 Binding" J Immunol 147(4):1338-1343 (Aug. 15, 1991).
Warren, R., et al., "Regulation by Vascular Endothelial Growth Factor of Human Colon Cancer Tumorigenesis in a Mouse Model of Experimental Liver Metastasis" J Clin Invest 95(4):1789-1797 (Apr. 1, 1995).
Wartha, K. et al., "A novel bispecific Fap-Dr5 antibody inducing potent and tumor-specific death receptor 5 (Dr5) activation by fibroblast activation protein (Fap)-dependent crosslinking" Cancer Res 74( Suppl 19):1 (Oct. 1, 2014).
Waterhouse, P., et al., "Combinatorial infection and in vivo recombination: a strategy for making large phage antibody repertoires" Nucleic Acids Res 21(9):2265-2266 (May 11, 1993).
Watt, G., et al., "Site-specific glycosylation of an aglycosylated human IgG1-Fc antibody protein generated neoglycoproteins with enhanced function" Chem Biol 10(9):807-814 (Sep. 1, 2003).
Wawrzynczak, E., et al., "Blood Clearance in the Mouse of an Aglycosyl Recombinant Monoclonal Antibody" Biochem Soc Trans 17(6):1061-1062 (Dec. 1, 1989).
Wawrzynczak, E., et al., "Blood clearance in the rat of a recombinant mouse monoclonal antibody lacking the N-linked oligosaccharide side chains of the CH2 domains" Mol Immunol 29(2):213-220 (Feb. 1, 1992).

Wawrzynczak, E., et al., "Recombinant Mouse Monoclonal Antibodies with single Amino Acid Substitutions Affecting C1q and High Affinity Fc Receptor Binding Have Identical Serum Half-lives in the BALB/c Mouse" Mol Immunol 29(2):221-227 (Feb. 1, 1992).
Wecker, T., et al., "Five-year visual acuity outcomes and injection patterns in patients with pro-re-nata treatments for AMD, DME, RVO and myopic CNV" Br J Ophthal 101(3):353-359 (Mar. 1, 2017).
Weidner, K., et al., "Anti-Angiogenic Activity of a Tetravalent Bispecific Antibody (TAvi6) Targeting VEGF and Angiopoietin-2." Blood 116(21):4304 (Nov. 19, 2010).
Weis, W., et al., "The C-Type Lectin Superfamily in the Immune System" Immunol Rev 163(1):19-34 (Apr. 26, 1998).
Wells, J., et al., "Cassette mutagenesis: An efficient method for generation of multiple mutations at defined sites" Gene 34(2-3):315-323 (Jan. 1, 1985).
Weng, Z., et al., "Computational determination of the structure of rat Fc bound to the neonatal Fc receptor" J Mol Biol 282(2):217-225 (Sep. 18, 1998).
Werner, R., et al., "Appropriate mammalian expression systems for biopharmaceuticals" Arznei-Forschung/Drug Res 48(8):870-880 (Aug. 1, 1998).
Werther, W., et al., "Humanization of an Anti-Lymphocyte Function-Associated Antigen (LFA)-1 Monoclonal Antibody and Reengineering of the Humanized Antibody for Binding to Rhesus LFA-1" J Immunol 157(11):4986-4995 (Dec. 1, 1996).
White, C., et al., "Antibody-targeted immunotherapy for treatment of malignancy" Ann Rev Med 52:125-145 (Feb. 1, 2001).
Williams, R., et al., "Heteroclitic polyclonal and monoclonal anti-Gm(a) and anti-Gm(g) human rheumatoid factors react with epitopes induced in Gm(a-), Gm(g-) IgG by interaction with antigen or by nonspecific aggregation" J Immunol 149(5):1817-1824 (Sep. 1, 1992).
Wines, B., et al., "The IgG Fc contains distinct Fc receptor (FcR) binding sites: the leukocyte receptors FcγRI and FcγRIIa bind to a region in the Fc distinct from that recognized by neonatal FcR and protein A" J Immunol 164(10):5313-5318 (May 15, 2000).
Winter, G., et al., "Making antibodies by phage display technology" Annu Rev Immunol 12(1):433-455 (Apr. 1, 1994).
The Merck Index, An encyclopedia of Chemicals, Drugs, and Biologicals), Maryadale J. O'Neil, 14th Edition edition, Whitehouse Station, NJ USA:Merck Research Laboratories, Division of Merck & Co, Inc.,: 26-27 ( 2006).
European Patent Office, "European Patent Application No. 11160251. 2" (Certified Copy—Priority Document),:1-128 (Issued by European Patent Office on Mar. 29, 2011).
European Patent Office, "European Patent Application No. 11164237. 7" (Certified Copy—Priority Document),:1-170 (Issued by European Patent Office on Apr. 29, 2011).
International Preliminary Report on Patentability for PCT/EP2019/079137 issued by the International Searching Authority on Apr. 27, 2021.
"International Preliminary Report on Patentability—PCT/EP2019/052704" (Issued by the International Searching Authority on Aug. 11, 2020; Chapter I), :pp. 1-8 (Aug. 20, 2020).
"International Preliminary Report on Patentability—PCT/EP2020/072088" (Issued by International Searching Authority on : Feb. 8, 2022; Chapter I),:pp. 1-11 (Feb. 17, 2022).
International Search Report for PCT/EP2019/079137Issued by the International Searching Authority on Jan. 16, 2020.
International Search Report—PCT/EP2019/052704, (w/Written Opinion),:pp. 1-14 (Issued by International Searching Authority on May 7, 2019).
"International Search Report—PCT/EP2012/055393" (w/Written Opinion),:pp. 1-15 (Issued by the International Searching Authority on May 15, 2012).
"International Search Report—PCT/EP2020/072088" (w/Written Opinion),:1-21 (Issued by the International Searching Authority on Nov. 10, 2020).
"International Search Report—PCT/US2002/033739":pp. 1-2 (Issued by International Searching Authority on Jun. 16, 2003).
Kabat, EA et al. Sequences of Proteins of Immunological Interest Fifth edition, NIH Publication,:91-3242 ( 1991).

(56) References Cited

OTHER PUBLICATIONS

Kabat, EA et al. Sequences of Proteins of Immunological Interest (Table of Contents, Introduction and Constant Region Sequences sections), 5th edition, Bethesda, MD:NIH, vol. 1:647-723 ( 1991).

Li et al., "Safety and Efficacy of Conbercept in Neovascular Age-Related Macular Degeneration" Ophthalmology 121:1740-1747 ( 2014).

Martin, "Ranibizumab and Bevacizumab for Treatment of Neovascular Age-Related Macular Degeneration: 2-Year Results:" Ophthalmology 119(7):1388-1398 ( 2012).

Mayo Clinic Staff, "Goiter" http://www.mayoclinic.com/health/goiter/DS00217/method (Sep. 9, 2011).

Natsume, A., et al., "Improving Effector Functions of Antibodies for Cancer Treatement: Enhancing ADCC and CDC" Drug Des Devel Ther 3:7-16 (Sep. 21, 2009).

Notice of Opposition for Ecuadorian Application No. SP-2013-DIV-11-11139-D1 with English translation. (Mar. 6, 2015).

Ridgway et al., "'Knobs-into-holes' engineering of antibody C\\\subscript:H\\\3 domains for heavy chain heterodimerization" Protein Eng 9(7):617-621 ( 1996).

Thomas et al., EJC Supplements, 8(7):156-157 (Nov. 2010).

Zhang et al., "English translation of the Abstract" Chemistry of Life 27(2):166-169 ( 2007).

\* cited by examiner

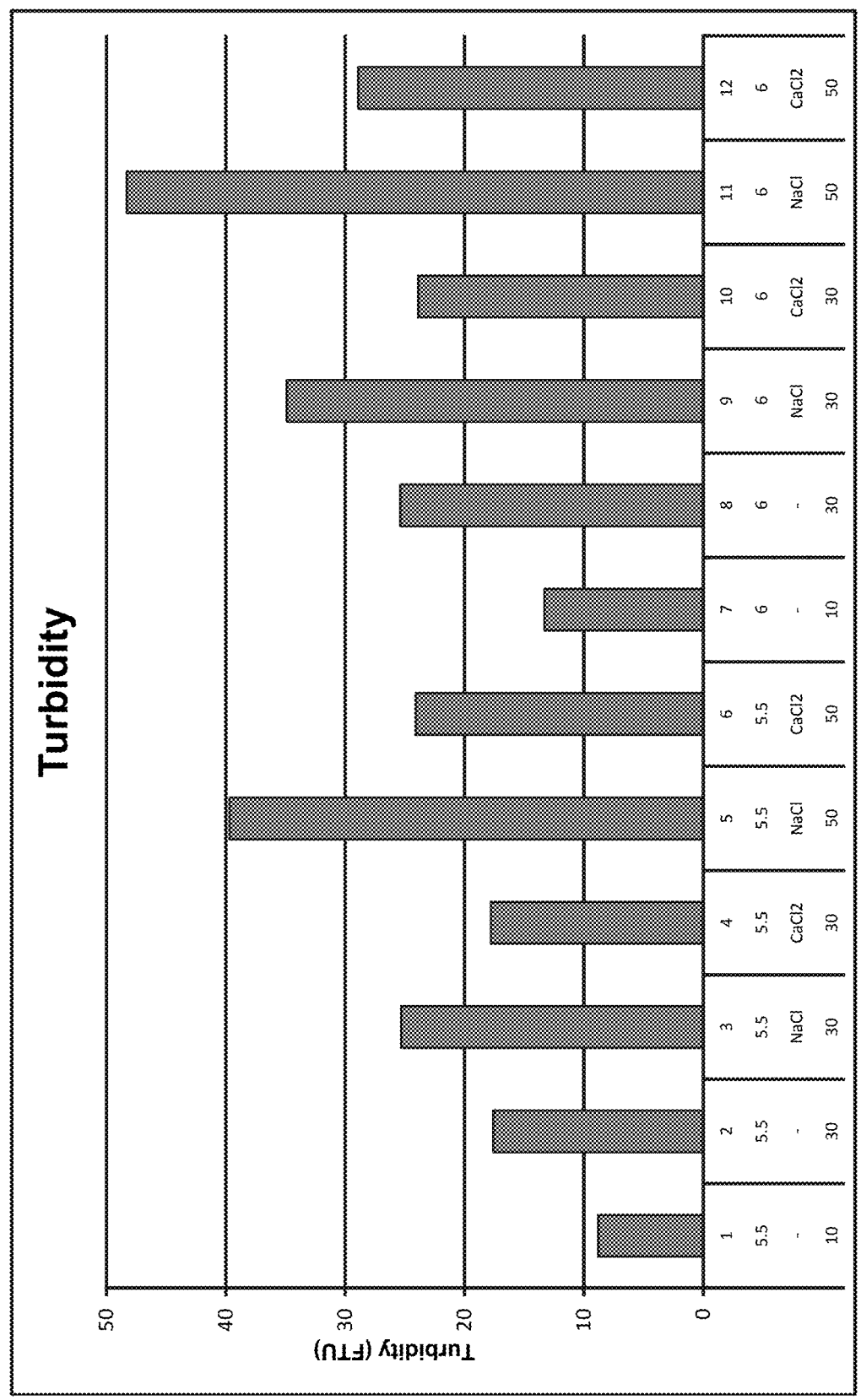

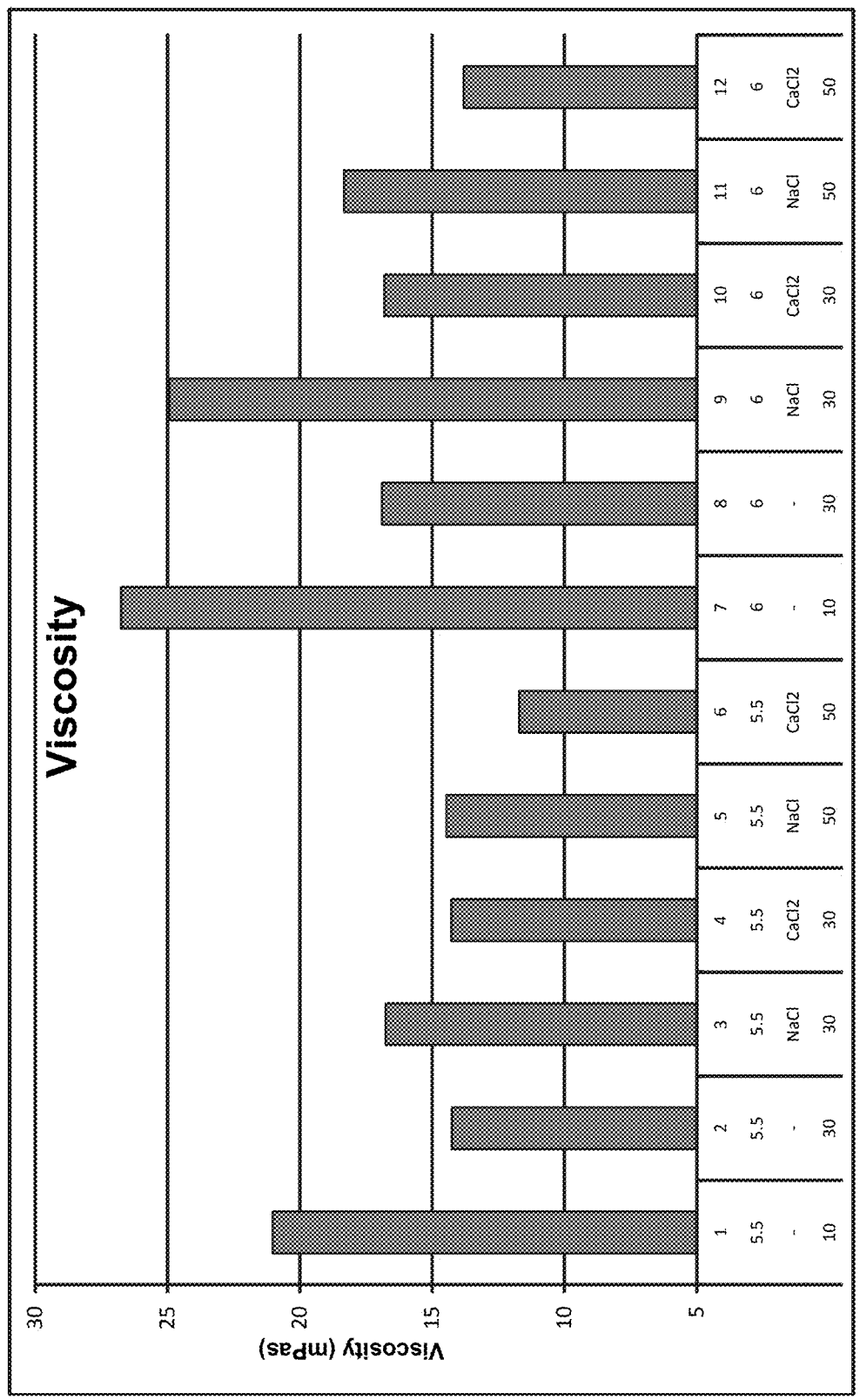

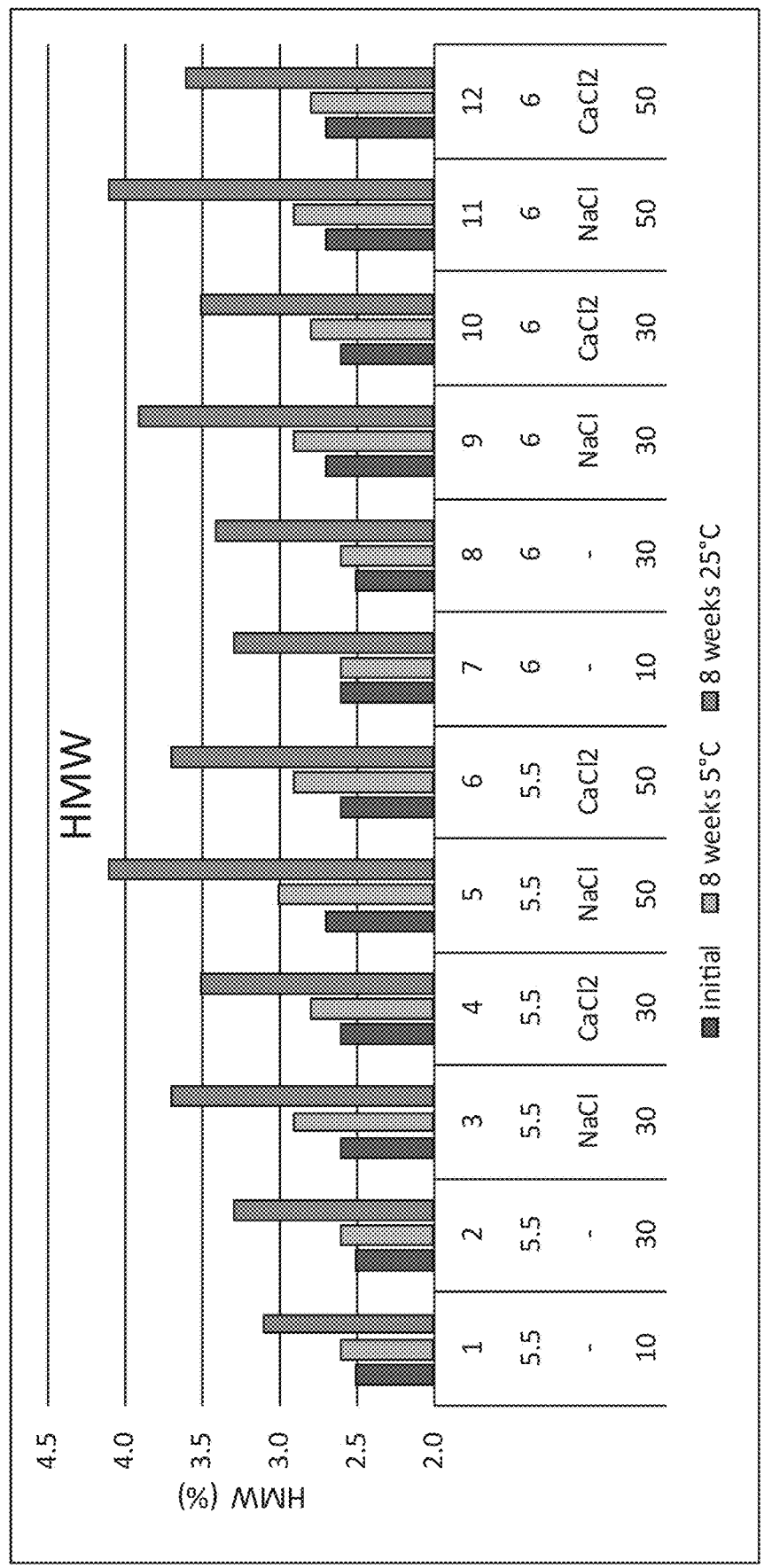

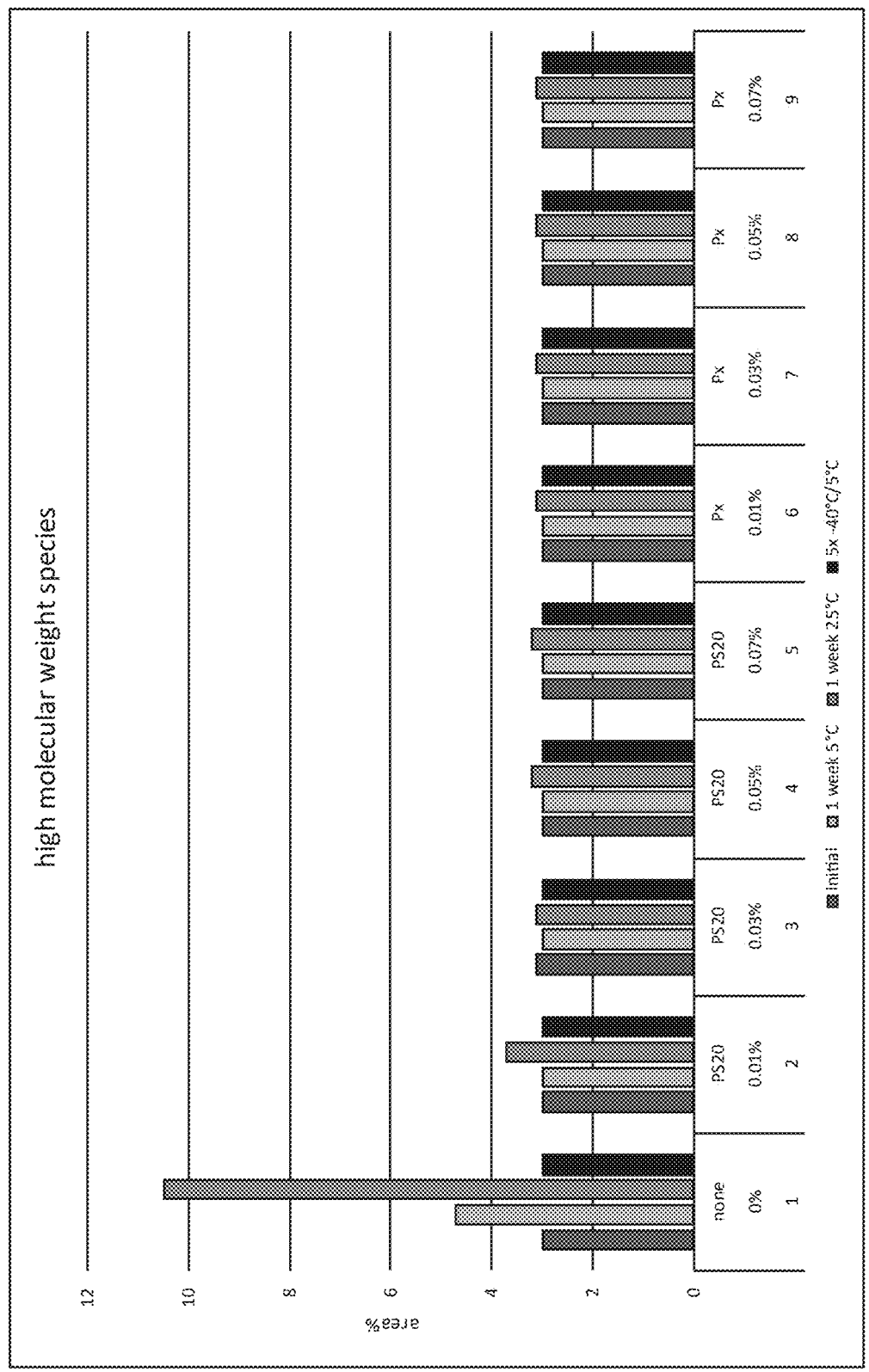

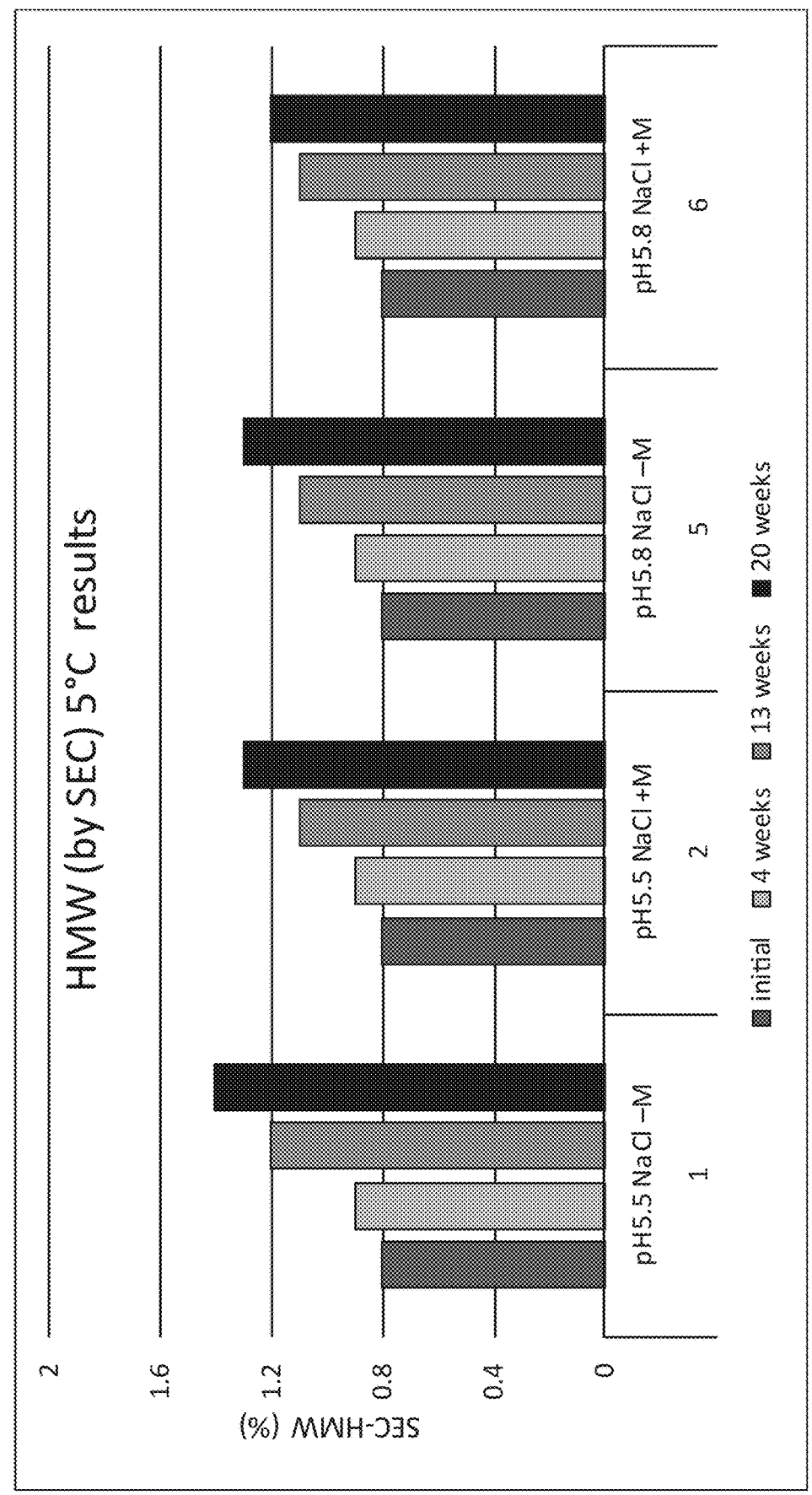

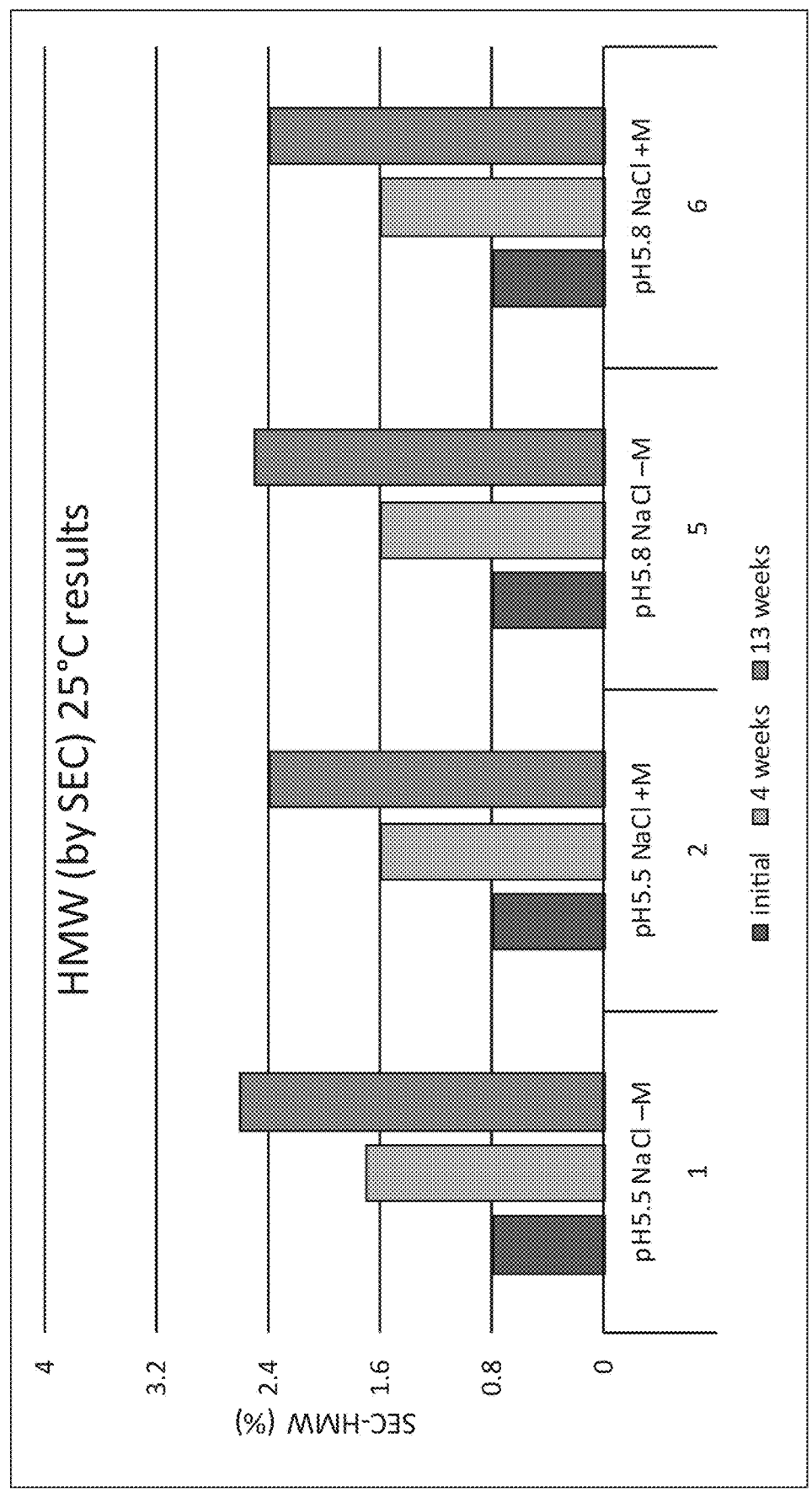

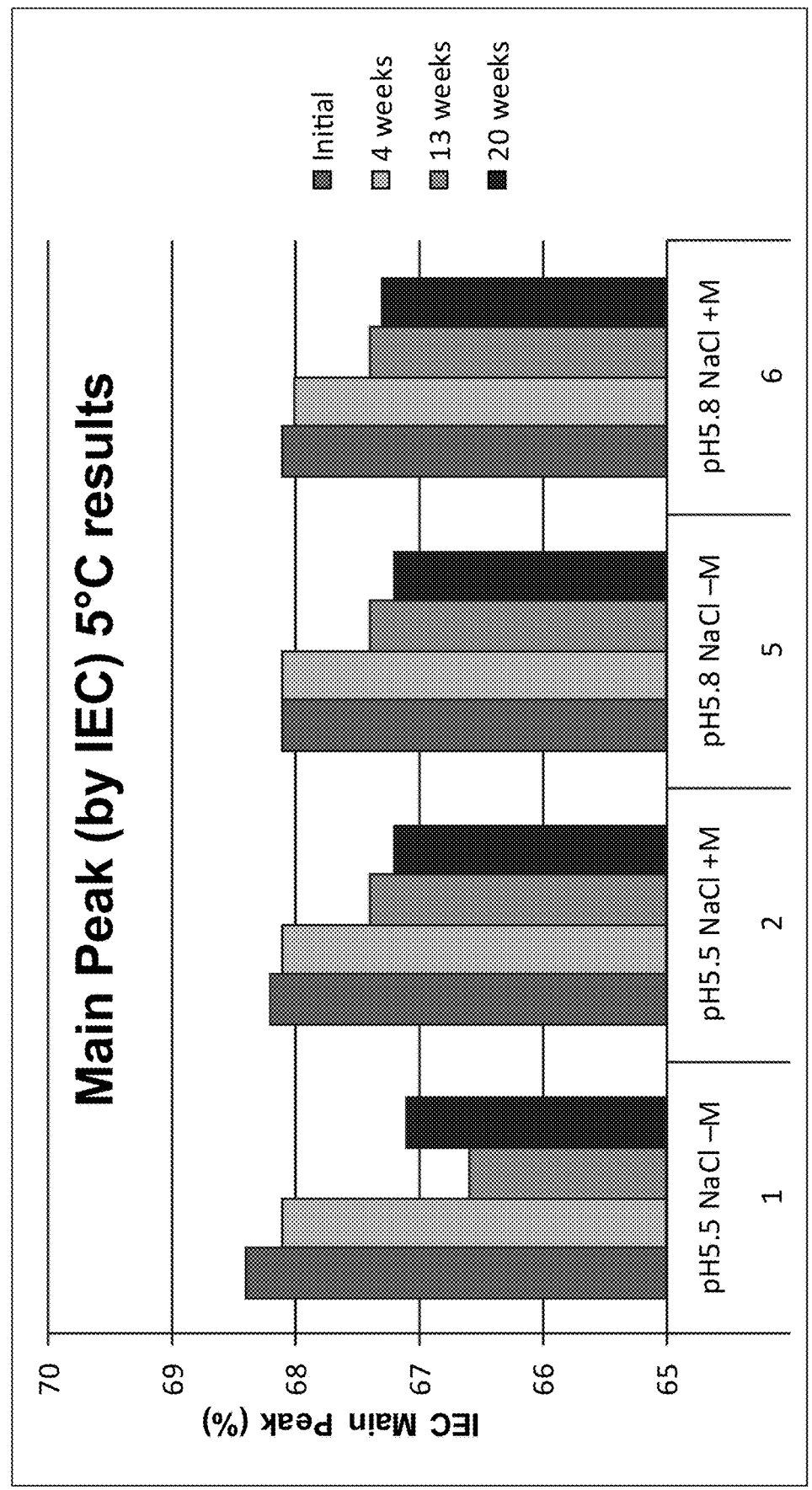

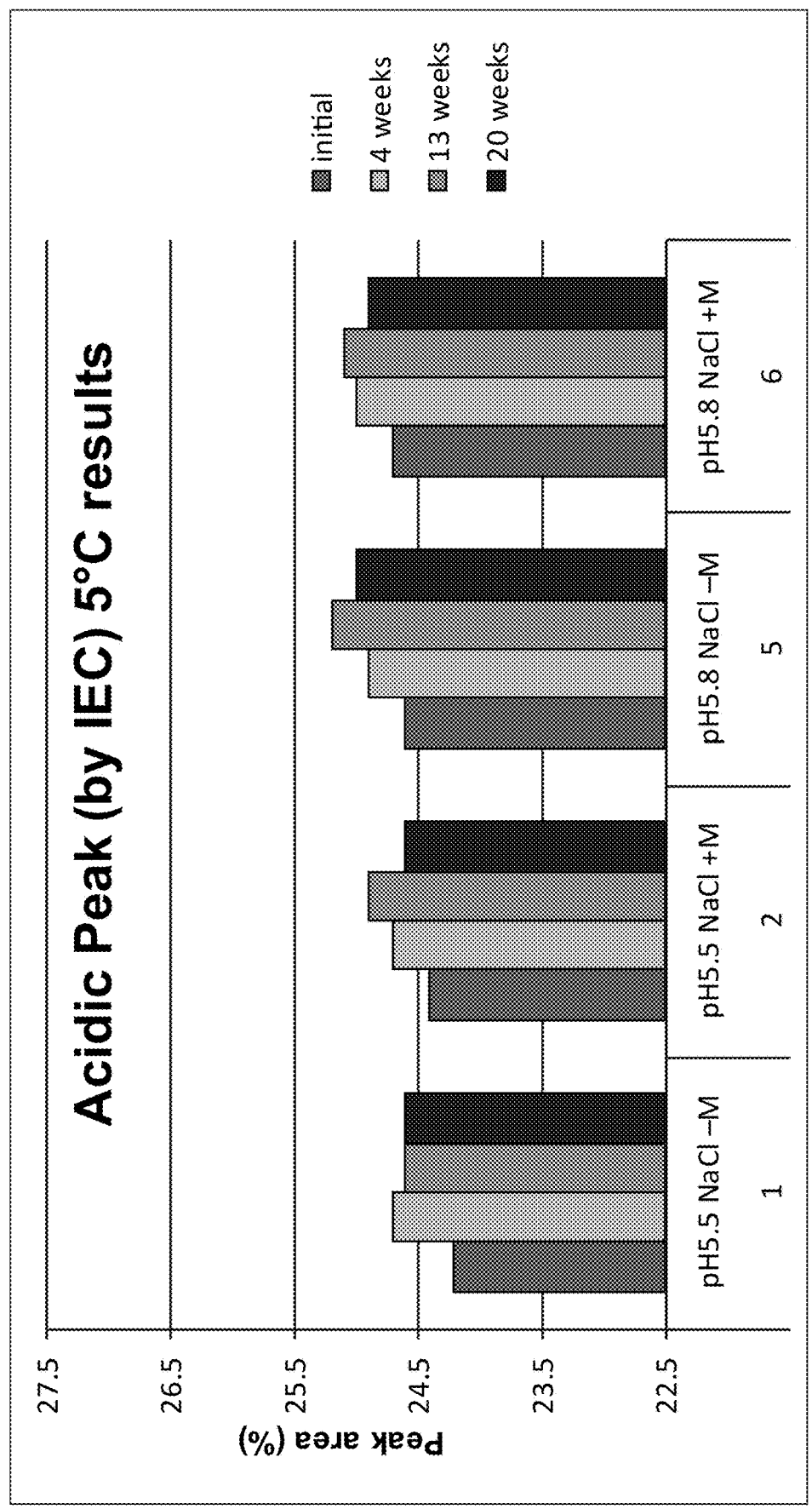

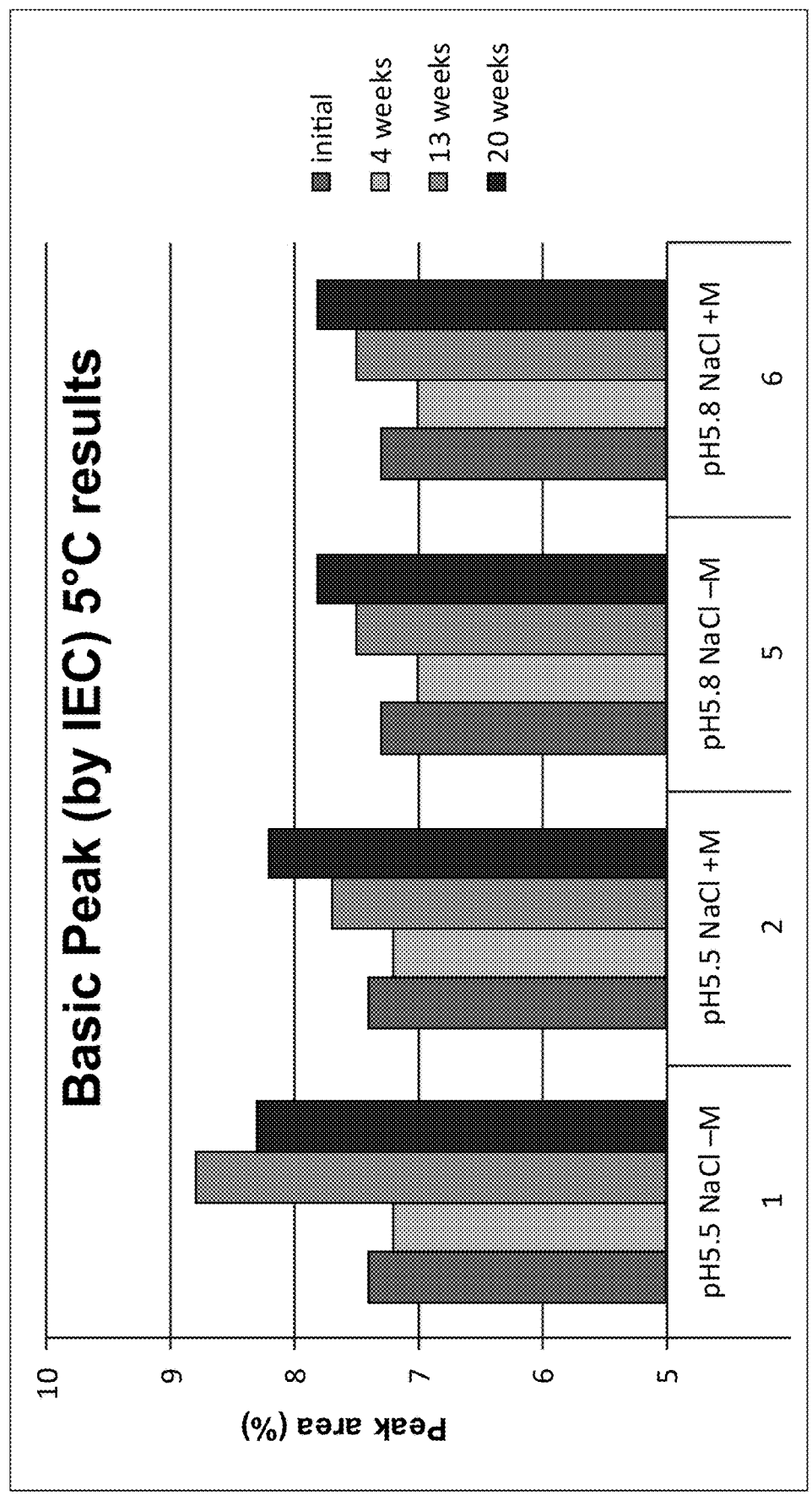

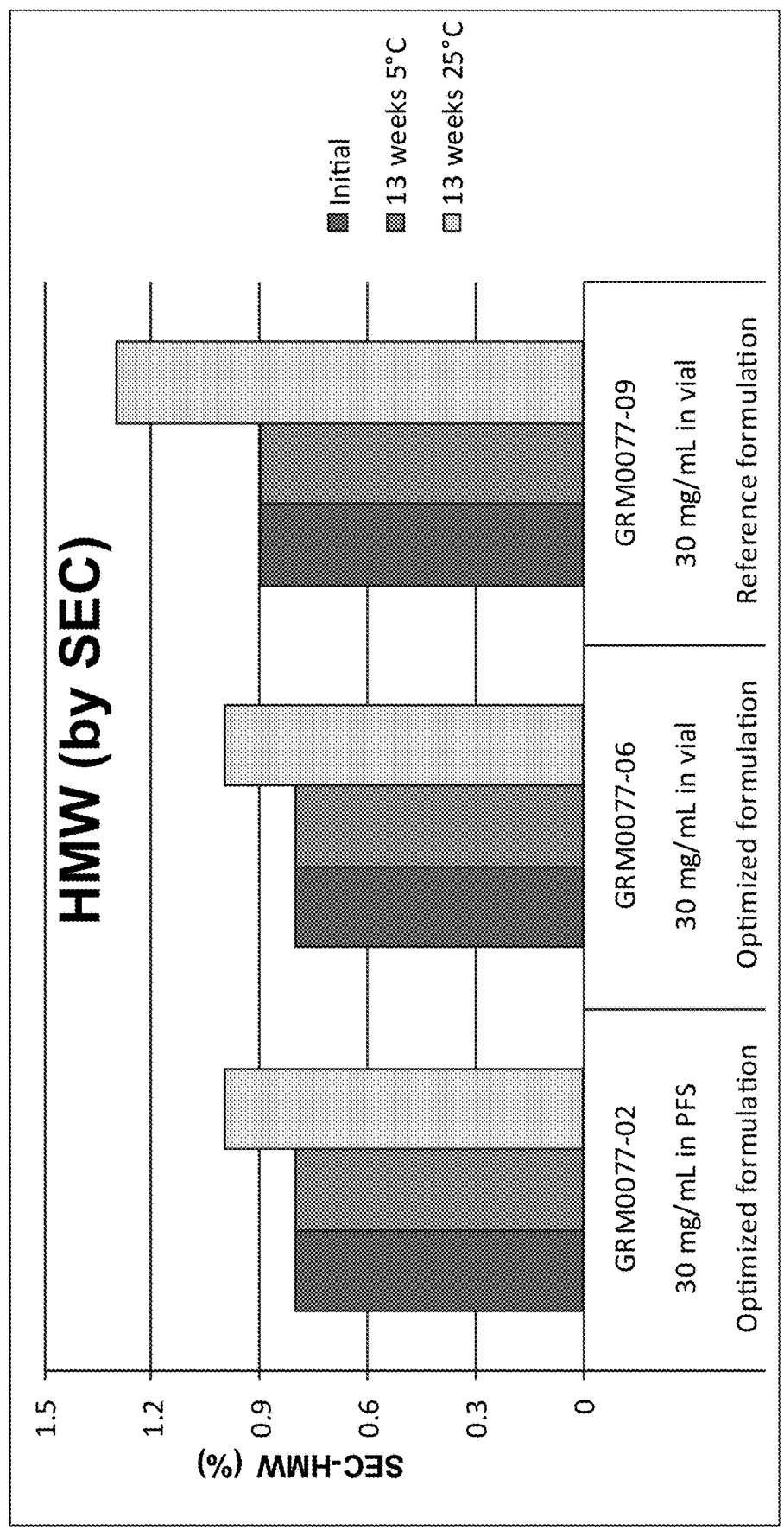

BISPECIFIC ANTI-VEGF/ANG2 ANTIBODY FORMULATION

CROSS REFERENCE TO RELATED APPLICATIONS

This application is a continuation of International Application No. PCT/EP2019/079137, filed Oct. 25, 2019, claiming priority to EP Application No. 18203104.7 filed Oct. 29, 2018, which are incorporated herein by reference in their entirety for all purposes.

SEQUENCE LISTING

This application contains a Sequence Listing which has been submitted electronically in ASCII format and is hereby incorporated by reference in its entirety. Said ASCII copy, created on Feb. 9, 2021, is named Sequence_Listing.txt and is 30,324 bytes in size.

FIELD OF THE INVENTION

This invention relates to a liquid pharmaceutical formulation of bispecific antibodies against Angiopoietin-2 (ANG-2) and human vascular endothelial growth factor (VEGF, VEGF-A) (bispecific anti-VEGF/ANG2 antibodies) and a process for the preparation and uses of the formulation.

BACKGROUND

Bispecific antibodies against Angiopoietin-2 (ANG-2) and human vascular endothelial growth factor (VEGF, VEGF-A) (bispecific anti-VEGF/ANG2 antibodies), are of therapeutic interest, in particular as medicaments for the treatment and prophylaxis of treatment of vascular diseases, including ocular vascular disease. Bispecific anti-VEGF/ANG2 antibodies are for example described in WO2010/040508, WO2011/117329 or WO2014/009465. These antibodies inhibit Vegf binding to the VEGF receptor and at the same time ANG-2 binding to Tie2.

Antibody molecules, as part of the group of protein pharmaceuticals, are very susceptible to physical and chemical degradation. Chemical degradation includes any process that involves modification of the protein via bond formation or cleavage, yielding a new chemical entity. A variety of chemical reactions is known to affect proteins. These reactions can involve hydrolysis including cleavage of peptide bonds as well as deamidation, isomerization, oxidation and decomposition. Physical degradation refers to changes in the higher order structure and includes denaturation, adsorption to surfaces, aggregation and precipitation. Protein stability is influenced by the characteristics of the protein itself, e.g. the amino acid sequence, the glycosylation pattern, and by external influences, such as temperature, solvent pH, excipients, interfaces, or shear rates. So, it is important to define the optimal formulation conditions to protect the protein against degradation reactions during manufacturing, storage and administration. (Manning, M. C., et al. (1989), "Stability of protein pharmaceuticals", Pharm Res 6(11), 903-918; Zheng, J. Y., Janis, L. J. (2005), "Influence of pH, buffer species, and storage temperature on physicochemical stability of a humanized monoclonal antibody LA298", Int. J. Pharmaceutics 308, 46-51). Stable liquid formulations of therapeutic antibodies are particularly difficult to obtain when the formulation should include antibodies in a high concentration.

It is therefore an object of the present invention to provide a liquid, in particular high concentration, formulation of a bispecific VEGF/ANG2 antibody with as few as necessary excipients, which enables the desired dosing and allows convenient intravitreal administration of the bispecific antibody through thin needles to a patient.

SUMMARY

The present invention relates to a liquid pharmaceutical formulation of a bispecific anti-VEGF/ANG2 antibody, a method for the preparation and uses of the formulation. In particular, the pharmaceutical formulations of the present invention are for use in intravitreal administration for the treatment of ophthalmologic diseases like AMD and DME.

In one aspect, the invention refers to a liquid pharmaceutical formulation, comprising:
20 to 150 mg/ml of a bispecific anti-VEGF/ANG2 antibody comprising a constant heavy chain region of human IgG1 subclass
15 to 35 mM of sodium chloride
15 to 25 mM of a histidine acetate buffer
at a pH of 5.5±0.5; wherein
the bispecific anti-VEGF/ANG2 antibody is bivalent and comprises a first antigen-binding site that specifically binds to human VEGF and a second antigen-binding site that specifically binds to human ANG-2, wherein
  i) said first antigen-binding site specifically binding to VEGF comprises in the heavy chain variable domain a CDR3H region of SEQ ID NO: 1, a CDR2H region of SEQ ID NO: 2, and a CDR1H region of SEQ ID NO:3, and in the light chain variable domain a CDR3L region of SEQ ID NO: 4, a CDR2L region of SEQ ID NO:5, and a CDR1L region of SEQ ID NO:6; and
  ii) said second antigen-binding site specifically binding to ANG-2 comprises in the heavy chain variable domain a CDR3H region of SEQ ID NO: 9, a CDR2H region of, SEQ ID NO: 10, and a CDR1H region of SEQ ID NO: 11, and in the light chain variable domain a CDR3L region of SEQ ID NO: 12, a CDR2L region of SEQ ID NO: 13, and a CDR1L region of SEQ ID NO: 14, and wherein
  iii) the bispecific antibody comprises a constant heavy chain region of human IgG1 subclass comprising the mutations I253A, H310A, and H435A and the mutations L234A, L235A and P329G (numberings according to EU Index of Kabat.

In one embodiment the bispecific anti-VEGF/ANG2 antibody is bivalent and comprises the amino acid sequences of SEQ ID NO: 17, of SEQ ID NO: 18, of SEQ ID NO: 19, and of SEQ ID NO: 20.

In one embodiment the bispecific anti-VEGF/ANG2 antibody is faricimab.

In one embodiment the formulation further comprises 1 to 20 mM of at least one stabilizer.

In one embodiment the formulation further comprises 7.0 mM±2.0 mM methionine.

In one embodiment the formulation further comprises 0.01-0.07% (w/v) of a surfactant.

In one embodiment the formulation further comprises 0.04% (w/v)±0.02% (w/v) polysorbate 20.

In one embodiment the formulation further comprises 50-250 mM of a tonicity agent.

In one embodiment the formulation further comprises 160 mM±24 mM sucrose.

In one embodiment the formulation is essentially free of visible particles.

In one embodiment the formulation is a stable formulation.

In one embodiment the osmolality of the formulation is 300±100 mOsm/kg.

In one embodiment the formulation is for intravitreal administration.

In one aspect the formulation is for use in the treatment of an ocular vascular disease.

In one embodiment the ocular vascular disease is selected from the group consisting of diabetic retinopathy (DR), diabetic macular edema (DME), retinal vein occlusion (RVO), central retinal vein occlusion (CRVO), macular degeneration, wet age-related macular degeneration (wet AMD), retinopathy of prematurity (ROP), neovascular glaucoma, retinitis pigmentosa (RP), retinal angiomatous proliferation, macular telangiectasia, ischemic retinopathy, iris neovascularization, intraocular neovascularization, corneal neovascularization, retinal neovascularization, choroidal neovascularization, and retinal degeneration, in particular from the group consisting of diabetic retinopathy (DR), diabetic macular edema (DME), retinal vein occlusion (RVO), central retinal vein occlusion (CRVO), wet age-related macular degeneration (wet AMD).

One aspect of the invention is a method for the preparation of the pharmaceutical formulation according to the invention.

One aspect of the invention is a vial comprising the pharmaceutical formulation according to the invention.

One aspect of the invention is a prefilled syringe comprising the pharmaceutical formulation according to the invention.

One aspect of the invention is a lyophilized form of the liquid pharmaceutical formulation according to the invention.

The present invention provides a liquid pharmaceutical formulation of a bispecific anti-VEGF/ANG2 antibody (with IgG1 constant region) which has valuable properties useful for ophthalmologic use and intravitreal application: the formulation has low viscosity and low turbidity (even at high concentrations of e.g. about 120 mg/l), the formulation is stable and isotonic. This is achieved especially by the combination of 20 to 150 mg/ml (in particular of 100 to 140 mg/ml) of the bispecific anti-VEGF/ANG2 antibody comprising a constant heavy chain region of human IgG1 subclass as described herein, 15 to 35 mM of sodium chloride and 15 to 25 mM of a histidine buffer at a pH of 5.5±0.5.

DESCRIPTION OF THE FIGURES

FIG. 1A compares the turbidity results of the formulations from the pH/buffer screen I (below the bars: first row: no. of formulation sample; second row: pH value; third row: buffer system; fourth row: ionic strength).

FIG. 1B compares the viscosity results of the formulations from the pH/buffer screen I (below the bars: first row: no. of formulation sample; second row: pH value; third row: buffer system; fourth row: ionic strength).

FIG. 2A Turbidity results of formulations from the pH/buffer screen part II (below the bars: first row: no. of formulation sample; second row pH value; third row; viscosity reducer absent –, NaCl or $CaCl_2$); fourth row: ionic strength).

FIG. 2B Viscosity results of formulations from the pH/buffer screen part II (below the bars: first row: no. of formulation sample; second row pH value; third row; viscosity reducer absent –, NaCl or $CaCl_2$); fourth row: ionic strength).

FIG. 3 Higher molecular weight species (HMW) of formulations from the pH/buffer screen part II at start and after 8 weeks storage at 5° C. and 25° C. (below the bars: first row: no. of formulation sample; second row pH value; third row: viscosity reducer absent –, NaCl or $CaCl_2$; fourth row: ionic strength).

FIG. 4 Levels of high molecular weight species (HMW) at initial and after physical stress (below the bars: first row: type of physical stress; second row: % surfactant; third row: no. of formulation sample).

FIG. 6 Levels of high molecular weight species (HMW) at initial and during storage at 5° C. (below the bars: first row: pH value with NaCl as viscosity reducer absence (–) or presence (+) of methionine as stabilizer; second row: no. of formulation sample).

FIG. 7 Levels of high molecular weight species (HMW) at initial and during storage at 25° C. (below the bars: first row: pH value with NaCl as viscosity reducer absence (–) or presence (+) of methionine as stabilizer; second row: no. of formulation sample).

FIG. 8A Levels of charged species (Main peak) at initial and during storage at 5° C. (below the bars: first row: pH value with NaCl as viscosity reducer absence (–) or presence (+) of methionine as stabilizer; second row: no. of formulation sample).

FIG. 8B Levels of charged species (Acidic peak) at initial and during storage at 5° C. (below the bars: first row: pH value with NaCl as viscosity reducer absence (–) or presence (+) of methionine as stabilizer; second row: no. of formulation sample).

FIG. 8C Levels of charged species (Basic peak) at initial and during storage at 5° C. (below the bars: first row: pH value with NaCl as viscosity reducer absence (–) or presence (+) of methionine as stabilizer; second row: no. of formulation sample).

FIG. 13 Levels of high molecular weight species (HMW) at initial (left bar) and after 13 weeks storage at 5° C. (middle bar) and 25° C. (right bar) of optimized and reference formulation with a protein concentration of 30 mg/mL.

DETAILED DESCRIPTION OF THE INVENTION

Figure 1A:
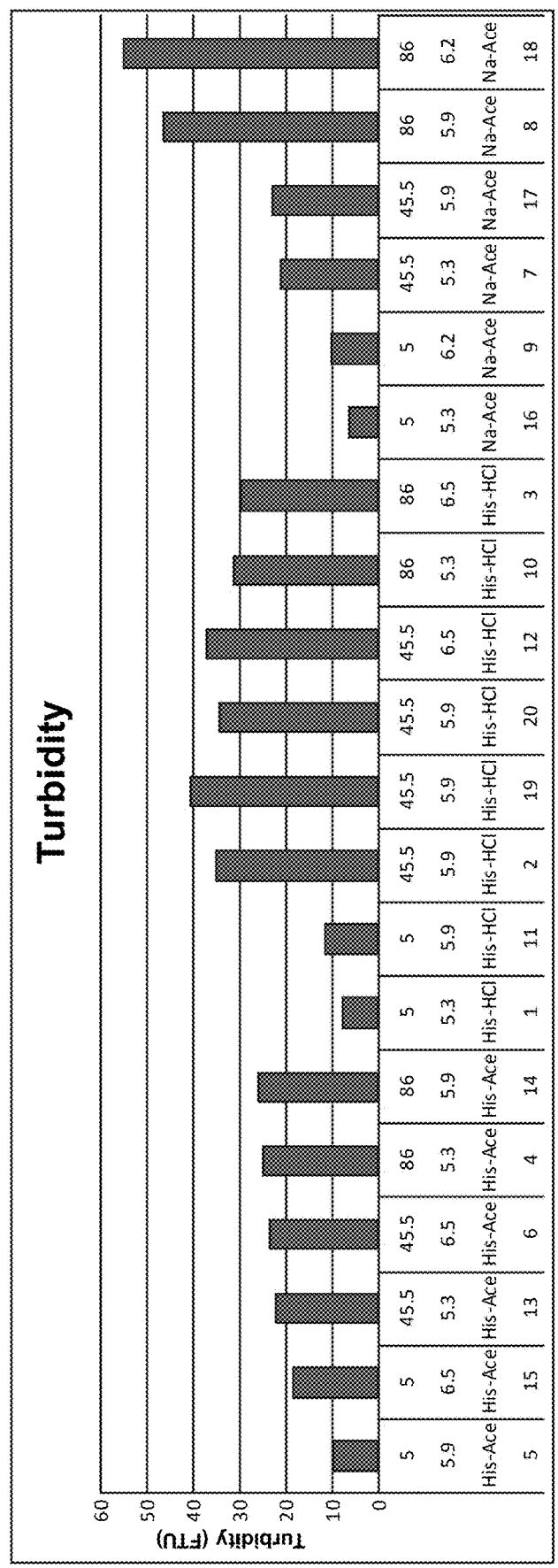
FIG. 1A Turbidity results of formulations from the pH/buffer screen part I.

The present invention relates to a liquid pharmaceutical formulation comprising a bispecific anti-VEGF/ANG2 comprising a constant heavy chain region of human IgG1 subclass.

The term "pharmaceutical formulation" refers to preparations which are in such form as to permit the biological activity of the active ingredients to be unequivocally effective, and which contain no additional components which are toxic to the subjects to which the formulation is administered.

The term "liquid" as used herein in connection with the formulation according to the invention denotes a formulation which is liquid at least at a temperature between about 2° C. to about 35° C. (in one embodiment between about 2° C. to about 25° C.) under atmospheric pressure.

The concentration of the bispecific anti-VEGF/ANG2 antibody comprised in the pharmaceutical formulation is in the range of about 20 mg/ml to about 150 mg/ml, in particular the concentration 120 mg/ml±18 mg/ml, more particularly the concentration is 120 mg/ml±12 mg/ml. In another embodiment the concentration can be 30 mg/ml±4.5 mg/ml.

As used herein, "antibody" refers to a binding protein that comprises antigen-binding sites. The terms "binding site" or "antigen-binding site" as used herein denotes the region(s) of an antibody molecule to which a ligand actually binds. The term "antigen-binding site" comprises an antibody's heavy chain variable domains (VH) and an antibody's light chain variable domains (VL) (pair of VH/VL).

Antibody specificity refers to selective recognition of the antibody for a particular epitope of an antigen. Natural antibodies, for example, are monospecific.

"Bispecific antibodies" according to the invention are antibodies which have two different antigen-binding specificities. Antibodies of the present invention are specific for two different antigens, VEGF as first antigen and ANG-2 as second antigen.

The term "monospecific" antibody as used herein denotes an antibody that has one or more binding sites each of which binds to the same epitope of the same antigen.

The term "valent" as used within the current application denotes the presence of a specified number of binding sites in an antibody molecule. As such, the terms "bivalent", "tetravalent", and "hexavalent" denote the presence of two binding site, four binding sites, and six binding sites, respectively, in an antibody molecule. The bispecific antibodies according to the invention are preferably "bivalent".

The terms "bispecific antibody which binds to human vascular endothelial growth factor (VEGF) and to human angiopoietin-2 (ANG-2)", "bispecific anti-VEGF/ANG2 antibody" and bispecific <VEGF/ANG2> antibody" as used herein are interchangeable and refer to an antibody which has at least two different antigen-binding sites, a first one which binds to VEGF and a second one which binds to ANG2.

Bispecific anti-VEGF/ANG2 antibodies are e.g. described in WO2010/040508, WO2011/117329, WO2012/131078, WO2015/083978, WO2017/197199, and WO2014/009465. WO2014/009465 describes bispecific anti-VEGF/ANG2 antibodies especially designed for treatment of ocular vascular diseases. The bispecific anti-VEGF/ANG2 antibodies of WO2014/009465 (which is incorporated herein in its entirety) are especially useful in the treatment and treatment schedules of ocular vascular diseases as described herein. In particular, anti-VEGF/ANG2 antibody CrossMAb VEGFang2-0016 as described in WO2014/009465 which is also described as faricimab (in World Health Organization (2017). "International Nonproprietary Names for Pharmaceutical Substances (INN). Proposed INN: List 118" WHO Drug Information. 31 (4)) is a preferred bispecific anti-VEGF/ANG2 antibody of the present invention.

In one embodiment the bispecific antibody which binds to human vascular endothelial growth factor (VEGF) and to human angiopoietin-2 (ANG-2) is a bispecific anti-VEGF/ANG2 antibody comprising a first antigen-binding site that specifically binds to human VEGF and a second antigen-binding site that specifically binds to human ANG-2, wherein i) said first antigen-binding site specifically binding to VEGF comprises in the heavy chain variable domain a CDR3H region of SEQ ID NO: 1, a CDR2H region of SEQ ID NO: 2, and a CDR1H region of SEQ ID NO: 3, and in the light chain variable domain a CDR3L region of SEQ ID NO: 4, a CDR2L region of SEQ ID NO:5, and a CDR1L region of SEQ ID NO:6; and ii) said second antigen-binding site specifically binding to ANG-2 comprises in the heavy chain variable domain a CDR3H region of SEQ ID NO: 9, a CDR2H region of, SEQ ID NO: 10, and a CDR1H region of SEQ ID NO: 11, and in the light chain variable domain a CDR3L region of SEQ ID NO: 12, a CDR2L region of SEQ ID NO: 13, and a CDR1L region of SEQ ID NO: 14, and wherein iii) the bispecific antibody comprises a constant heavy chain region of human IgG1 subclass comprising the mutations I253A, H310A, and H435A and the mutations L234A, L235A and P329G (numberings according to EU Index of Kabat).

In one embodiment such bispecific anti-VEGF/ANG2 antibody is bivalent.

In one embodiment such bispecific, bivalent anti-VEGF/ANG2 antibody is characterized in that
i) said first antigen-binding site specifically binding to VEGF comprises as heavy chain variable domain VH an amino acid sequence of SEQ ID NO: 7, and as light chain variable domain VL an amino acid sequence of SEQ ID NO: 8, and
ii) said second antigen-binding site specifically binding to ANG-2 comprises as heavy chain variable domain VH an amino acid sequence of SEQ ID NO: 15, and as light chain variable domain VL an amino acid sequence of SEQ ID NO: 16.

In one aspect of the invention such bispecific, bivalent antibody according to the invention is characterized in comprising
a) the heavy chain and the light chain of a first full length antibody that specifically binds to VEGF;
b) the modified heavy chain and modified light chain of a second full length antibody that specifically binds to ANG-2, wherein the constant domains CL and CH1 are replaced by each other.

This bispecific, bivalent antibody format for the bispecific antibody specifically binding to human vascular endothelial growth factor (VEGF) and human angiopoietin-2 (ANG-2) is described in WO 2009/080253 (including Knobs-into-Holes modified CH3 domains). The antibodies based on this bispecific, bivalent antibody format are named CrossMAbs.

In one embodiment such bispecific, bivalent anti-VEGF/ANG2 antibody is characterized in comprising
a) as heavy chain of the first full length antibody the amino acid sequence of SEQ ID NO: 17, and as light chain of the first full length antibody the amino acid sequence of SEQ ID NO: 18, and
b) as modified heavy chain of the second full length antibody the amino acid sequence of SEQ ID NO: 19, and as modified light chain of the second full length antibody the amino acid sequence of SEQ ID NO: 20.

In one embodiment such bispecific, bivalent anti-VEGF/ANG2 antibody is characterized in comprising the amino acid sequences of SEQ ID NO: 17, of SEQ ID NO: 18, of SEQ ID NO: 19, and of SEQ ID NO: 20

Accordingly, one embodiment of the invention is a bispecific, bivalent antibody comprising a first antigen-binding site that specifically binds to human VEGF and a second antigen-binding site that specifically binds to human ANG-2, characterized in comprising the amino acid sequences of SEQ ID NO: 17, of SEQ ID NO: 18, of SEQ ID NO: 19, and of SEQ ID NO: 20.

In one embodiment the CH3 domains of the bispecific, bivalent antibody according to the invention is altered by the "knob-into-holes" technology which is described in detail with several examples in e.g. WO 96/027011, Ridgway J. B., et al., Protein Eng 9 (1996) 617-621; and Merchant, A. M., et al., Nat Biotechnol 16 (1998) 677-681. In this method the interaction surfaces of the two CH3 domains are altered to increase the heterodimerization of both heavy chains containing these two CH3 domains. Each of the two CH3 domains (of the two heavy chains) can be the "knob", while the other is the "hole". The introduction of a disulfide bridge stabilizes the heterodimers (Merchant, A. M, et al., Nature Biotech 16 (1998) 677-681; Atwell, S., et al. J. Mol. Biol. 270 (1997) 26-35) and increases the yield.

In a preferred aspect of the invention the bispecific anti-VEGF/ANG2 antibodies according to the invention are characterized in that
the CH3 domain of one heavy chain and the CH3 domain of the other heavy chain each meet at an interface which comprises an original interface between the antibody CH3 domains;
wherein said interface is altered to promote the formation of the bispecific antibody, wherein the alteration is characterized in that:
a) the CH3 domain of one heavy chain is altered,
so that within the original interface the CH3 domain of one heavy chain that meets the original interface of the CH3 domain of the other heavy chain within the bispecific antibody,
an amino acid residue is replaced with an amino acid residue having a larger side chain volume, thereby generating a protuberance within the interface of the CH3 domain of one heavy chain which is positionable in a cavity within the interface of the CH3 domain of the other heavy chain
and
b) the CH3 domain of the other heavy chain is altered,
so that within the original interface of the second CH3 domain that meets the original interface of the first CH3 domain within the bispecific antibody
an amino acid residue is replaced with an amino acid residue having a smaller side chain volume, thereby generating a cavity within the interface of the second CH3 domain within which a protuberance within the interface of the first CH3 domain is positionable.

Thus the bispecific anti-VEGF/ANG2 antibodies for use described herein are preferably characterized in that
the CH3 domain of the heavy chain of the full length antibody of a) and the CH3 domain of the heavy chain of the full length antibody of b) each meet at an interface which comprises an alteration in the original interface between the antibody CH3 domains;
wherein i) in the CH3 domain of one heavy chain
an amino acid residue is replaced with an amino acid residue having a larger side chain volume, thereby generating a protuberance within the interface of the CH3 domain of one heavy chain which is positionable in a cavity within the interface of the CH3 domain of the other heavy chain
and wherein
ii) in the CH3 domain of the other heavy chain
an amino acid residue is replaced with an amino acid residue having a smaller side chain volume, thereby generating a cavity within the interface of the second CH3 domain within which a protuberance within the interface of the first CH3 domain is positionable.

Preferably said amino acid residue having a larger side chain volume is selected from the group consisting of arginine (R), phenylalanine (F), tyrosine (Y), tryptophan (W).

Preferably said amino acid residue having a smaller side chain volume is selected from the group consisting of alanine (A), serine (S), threonine (T), valine (V).

In one aspect of the invention both CH3 domains are further altered by the introduction of cysteine (C) as amino acid in the corresponding positions of each CH3 domain such that a disulfide bridge between both CH3 domains can be formed.

In one embodiment, the bispecific antibody comprises a T366W mutation in the CH3 domain of the "knobs chain" and T366S, L368A, Y407V mutations in the CH3 domain of the "hole chain". An additional interchain disulfide bridge between the CH3 domains can also be used (Merchant, A. M, et al., Nature Biotech 16 (1998) 677-681) e.g. by introducing a S354C mutation into one CH3 domain and a Y349C mutation into the other CH3 domain.

In a another preferred embodiment the bispecific antibody comprises S354C and T366W mutations in one of the two CH3 domains and Y349C, T366S, L368A, Y407V mutations in the other of the two CH3 domains In a another preferred embodiment the bispecific antibody comprises Y349C, T366W mutations in one of the two CH3 domains and S354C, T366S, L368A, Y407V mutations in the other of the two CH3 domains (the additional Y349C or S354C mutation in one CH3 domain and the additional S354C or Y349C mutation in the other CH3 domain forming a interchain disulfide bridge) (numbering always according to EU index of Kabat (Kabat, E. A., et al., Sequences of Proteins of Immunological Interest, 5th ed., Public Health Service, National Institutes of Health, Bethesda, MD (1991)).

Other techniques for CH3-modifications to enforce the heterodimerization are contemplated as alternatives of the invention and described e.g. in WO 96/27011, WO 98/050431, EP 1870459, WO 2007/110205, WO 2007/147901, WO 2009/089004, WO 2010/129304, WO 2011/90754, WO 2011/143545, WO 2012/058768, WO 2013/157954 and WO 2013/096291.

In one embodiment the heterodimerization approach described in EP 1 870 459A1 is used alternatively. This approach is based on the introduction of substitutions/mutations of charged amino acids with the opposite charge at specific amino acid positions of the in the CH3/CH3 domain interface between both heavy chains. One preferred embodiment for said multispecific antibodies are amino acid R409D and K370E mutations in the CH3 domain of one heavy chain and amino acid D399K and E357K mutations in the CH3 domain of the other heavy chain of the multispecific antibody (numberings according to Kabat EU index).

In another embodiment said multispecific antibody comprises an amino acid T366W mutation in the CH3 domain of the "knobs chain" and amino acid T366S, L368A and Y407V mutations in the CH3 domain of the "hole chain"; and additionally comprises amino acid R409D and K370E mutations in the CH3 domain of the "knobs chain" and amino acid D399K and E357K mutations in the CH3 domain of the "hole chain".

In one embodiment the heterodimerization approach described in WO2013/157953 is used alternatively. In one embodiment the CH3 domain of one heavy chain comprises an amino acid T366K mutation and the CH3 domain of the other heavy chain comprises an amino acid L351D mutation. In a further embodiment the CH3 domain of the one heavy chain further comprises an amino acid L351K mutation. In a further embodiment the CH3 domain of the other heavy chain further comprises an amino acid mutation selected from Y349E, Y349D and L368E (in one embodiment L368E).

In one embodiment the heterodimerization approach described in WO2012/058768 is used alternatively. In one embodiment the CH3 domain of one heavy chain comprises amino acid L351Y and Y407A mutations and the CH3 domain of the other heavy chain comprises amino acid T366A and K409F mutations. In a further embodiment the CH3 domain of the other heavy chain further comprises an amino acid mutation at position T411, D399, S400, F405, N390 or K392. In one embodiment said amino acid mutation is selected from the group consisting of a) T411N, T411R, T411Q, T411K, T411D, T411E and T411W,
b) D399R, D399W, D399Y and D399K,
c) S400E, S400D, S400R and S400K,
d) F405I, F405M, F405T, F405S, F405V and F405W,
e) N390R, N390K and N390D,
f) K392V, K392M, K392R, K392L, K392F and K392E.

In a further embodiment the CH3 domain of one heavy chain comprises amino acid L351Y and Y407A mutations and the CH3 domain of the other heavy chain comprises amino acid T366V and K409F mutations. In a further embodiment the CH3 domain of one heavy chain comprises an amino acid Y407A mutation and the CH3 domain of the other heavy chain comprises amino acid T366A and K409F mutations. In a further embodiment the CH3 domain of the other heavy chain further comprises amino acid K392E, T411E, D399R and S400R mutations.

In one embodiment the heterodimerization approach described in WO2011/143545 is used alternatively. In one embodiment the amino acid modification according to WO2011/143545 is introduced in the CH3 domain of the heavy chain at a position selected from the group consisting of 368 and 409.

In one embodiment the heterodimerization approach described in WO2011/090762 which also uses the knob-into-hole technology described above is used alternatively. In one embodiment the CH3 domain of one heavy chain comprises an amino acid T366W mutation and the CH3 domain of the other heavy chain comprises an amino acid Y407A mutation. In one embodiment the CH3 domain of one heavy chain comprises an amino acid T366Y mutation and the CH3 domain of the other heavy chain comprises an amino acid Y407T mutation.

In one embodiment the multispecific antibody is of IgG2 isotype and the heterodimerization approach described in WO2010/129304 is used alternatively.

In one embodiment the heterodimerization approach described in WO2009/089004 is used alternatively. In one embodiment the CH3 domain of one heavy chain comprises an amino acid substitution of K392 or N392 with a negatively-charged amino acid (in one embodiment glutamic acid (E) or aspartic acid (D); in a further embodiment a K392D or N392D mutation) and the CH3 domain of the other heavy chain comprises an amino acid substitution of D399, E356, D356, or E357 with a positively-charged amino acid (in one embodiment Lysine (K) or arginine (R), in a further embodiment a D399K, E356K, D356K or E357K substitution; and in an even further embodiment a D399K or E356K mutation). In a further embodiment the CH3 domain of the one heavy chain further comprises an amino acid substitution of K409 or R409 with a negatively-charged amino acid (in one embodiment glutamic acid (E) or aspartic acid (D); in a further embodiment a K409D or R409D mutation). In a further embodiment the CH3 domain of the one heavy chain further or alternatively comprises an amino acid substitution of K439 and/or K370 with a negatively-charged amino acid (in one embodiment glutamic acid (E) or aspartic acid (D)).

In one embodiment the heterodimerization approach described in WO2007/147901 is used alternatively. In one embodiment the CH3 domain of one heavy chain comprises amino acid K253E, D282K and K322D mutations and the CH3 domain of the other heavy chain comprises amino acid D239K, E240K and K292D mutations.

In one embodiment the heterodimerization approach described in WO2007/110205 is used alternatively.

In one preferred embodiment such bispecific anti-VEGF/ANG2 antibody is bivalent.

In one embodiment the bispecific, bivalent antibody which binds to human vascular endothelial growth factor (VEGF) and to human angiopoietin-2 (ANG-2) is a bispecific anti-VEGF/ANG2 antibody comprising a first antigen-binding site that specifically binds to human VEGF and a second antigen-binding site that specifically binds to human ANG-2, wherein
  i) said first antigen-binding site specifically binding to VEGF comprises in the heavy chain variable domain a CDR3H region of SEQ ID NO: 1, a CDR2H region of SEQ ID NO: 2, and a CDR1H region of SEQ ID NO:3, and in the light chain variable domain a CDR3L region of SEQ ID NO: 4, a CDR2L region of SEQ ID NO:5, and a CDR1L region of SEQ ID NO:6; and
  ii) said second antigen-binding site specifically binding to ANG-2 comprises in the heavy chain variable domain a CDR3H region of SEQ ID NO: 9, a CDR2H region of, SEQ ID NO: 10, and a CDR1H region of SEQ ID NO: 11, and in the light chain variable domain a CDR3L region of SEQ ID NO: 12, a CDR2L region of SEQ ID NO: 13, and a CDR1L region of SEQ ID NO: 14, and wherein
  iii) the bispecific antibody comprises a constant heavy chain region of human IgG1 subclass comprising the mutations I253A, H310A, and H435A and the mutations L234A, L235A and P329G (numberings according to EU Index of Kabat; and wherein
  iv) in the constant heavy chain region a T366W mutation is comprised in one CH3 domain and T366S, L368A, Y407V mutations are comprised the other CH3 domain (numberings according to EU Index of Kabat).

In one embodiment the bispecific, bivalent antibody which binds to human vascular endothelial growth factor (VEGF) and to human angiopoietin-2 (ANG-2) is a bispecific anti-VEGF/ANG2 antibody comprising a first antigen-binding site that specifically binds to human VEGF and a second antigen-binding site that specifically binds to human ANG-2, wherein
  i) said first antigen-binding site specifically binding to VEGF comprises in the heavy chain variable domain a CDR3H region of SEQ ID NO: 1, a CDR2H region of SEQ ID NO: 2, and a CDR1H region of SEQ ID NO:3, and in the light chain variable domain a CDR3L region of SEQ ID NO: 4, a CDR2L region of SEQ ID NO:5, and a CDR1L region of SEQ ID NO:6; and
  ii) said second antigen-binding site specifically binding to ANG-2 comprises in the heavy chain variable domain a CDR3H region of SEQ ID NO: 9, a CDR2H region of, SEQ ID NO: 10, and a CDR1H region of SEQ ID NO: 11, and in the light chain variable domain a CDR3L region of SEQ ID NO: 12, a CDR2L region of SEQ ID NO: 13, and a CDR1L region of SEQ ID NO: 14, and wherein
  iii) the bispecific antibody comprises a constant heavy chain region of human IgG1 subclass comprising the mutations I253A, H310A, and H435A and the mutations L234A, L235A and P329G (numberings according to EU Index of Kabat; and wherein
  iv) in the constant heavy chain region a S354C and T366W mutations are comprised in one CH3 domain and Y349C, T366S, L368A and Y407V mutations are comprised the other CH3 domain (numberings according to EU Index of Kabat).

In one embodiment such bispecific, bivalent anti-VEGF/ANG2 is characterized in comprising the amino acid sequences of SEQ ID NO: 17, of SEQ ID NO: 18, of SEQ ID NO: 19, and of SEQ ID NO: 20.

Accordingly, one embodiment of the invention the antibody is a bispecific, bivalent antibody comprising a first antigen-binding site that specifically binds to human VEGF and a second antigen-binding site that specifically binds to human ANG-2, characterized in comprising the amino acid sequences of SEQ ID NO: 17, of SEQ ID NO: 18, of SEQ ID NO: 19, and of SEQ ID NO: 20.

In one preferred embodiment such bispecific anti-VEGF/ANG2 antibody is faricimab.

The term "VEGF" as used herein refers to human vascular endothelial growth factor (VEGF/VEGF-A) the 165-amino acid human vascular endothelial cell growth factor (amino acid 27-191 of precursor sequence of human VEGF165: SEQ ID NO: 25; amino acids 1-26 represent the signal peptide), and related 121, 189, and 206 vascular endothelial cell growth factor isoforms, as described by Leung, D. W., et al., Science 246 (1989) 1306-9; Houck et al., Mol. Endocrin. 5 (1991) 1806-1814; Keck, P. J., et al., Science 246 (1989) 1309-12 and Connolly, D. T., et al., J. Biol. Chem. 264 (1989) 20017-24; together with the naturally occurring allelic and processed forms of those growth factors. VEGF is involved in the regulation of normal and abnormal angiogenesis and neovascularization associated with tumors and intraocular disorders (Ferrara, N., et al., Endocr. Rev. 18 (1997) 4-25; Berkman, R. A., et al., J. Clin. Invest. 91 (1993) 153-159; Brown, L. F., et al., Human Pathol. 26 (1995) 86-91; Brown, L. F., et al., Cancer Res. 53 (1993) 4727-4735; Mattern, J., et al., Brit. J. Cancer. 73 (1996) 931-934; and Dvorak, H. F., et al., Am. J. Pathol. 146 (1995) 1029-1039). VEGF is a homodimeric glycoprotein that has been isolated from several sources and includes several isoforms. VEGF shows highly specific mitogenic activity for endothelial cells. A VEGF antagonist/inhibitor inhibits binding of VEGF to its receptor VEGFR. Known VEGF antagonist/inhibitors include bispecific anti-VEGF/ANG2 antibodies as described in WO2014/009465.

The term "ANG-2" as used herein refers to human angiopoietin-2 (ANG-2) (alternatively abbreviated with ANGPT2 or ANG2) (SEQ ID NO: 24) which is described e.g. in Maisonpierre, P. C., et al, Science 277 (1997) 55-60 and Cheung, A. H., et al., Genomics 48 (1998) 389-91. The angiopoietins-1 and -2 were discovered as ligands for the Ties, a family of tyrosine kinases that is selectively expressed within the vascular endothelium (Yancopoulos, G. D., et al., Nature 407 (2000) 242-48). There are now four definitive members of the angiopoietin family. Angiopoietin-3 and -4 (Ang-3 and Ang-4) may represent widely diverged counterparts of the same gene locus in mouse and man (Kim, I., et al., FEBS Let, 443 (1999) 353-56; Kim, I., et al., J Biol Chem 274 (1999) 26523-28). ANG-1 and ANG-2 were originally identified in tissue culture experiments as agonist and antagonist, respectively (see for ANG-1: Davis, S., et al., Cell 87 (1996) 1161-69; and for ANG-2: Maisonpierre, P. C., et al., Science 277 (1997) 55-60). All of the known angiopoietins bind primarily to its receptor TIE2, and both Ang-1 and -2 bind to TIE2 with an affinity of 3 nM (Kd) (Maisonpierre, P. C., et al., Science 277 (1997) 55-60). An ANG2 antagonist/inhibitor inhibits binding of ANG2 to its receptor TIE2. Known ANG2 antagonist/inhibitors include bispecific anti-VEGF/ANG2 antibodies as described in WO2014/009465.

The antigen-binding sites of the bispecific antibody of the invention contain six complementarity determining regions (CDRs) which contribute in varying degrees to the affinity of the binding site for antigen. There are three heavy chain variable domain CDRs (CDRH1, CDRH2 and CDRH3) and three light chain variable domain CDRs (CDRL1, CDRL2 and CDRL3). The extent of CDR and framework regions (FRs) is determined by comparison to a compiled database of amino acid sequences in which those regions have been defined according to variability among the sequences.

The antibodies of the invention comprise immunoglobulin constant regions derived from human origin of immunoglobulin class IgG1.

The terms "monoclonal antibody" or "monoclonal antibody composition" as used herein refer to a preparation of antibody molecules of a single amino acid composition.

The term "chimeric antibody" refers to an antibody comprising a variable region, i.e., binding region, from one source or species and at least a portion of a constant region derived from a different source or species, usually prepared by recombinant DNA techniques. Chimeric antibodies comprising a murine variable region and a human constant region are of particular interest. Other forms of "chimeric antibodies" encompassed by the present invention are those in which the constant region has been modified or changed from that of the original antibody to generate the desired properties according to the invention, especially in regard to C1q binding and/or Fc receptor (FcR) binding. Such chimeric antibodies are also referred to as "class-switched antibodies". Chimeric antibodies are the product of expressed immunoglobulin genes comprising DNA segments encoding immunoglobulin variable regions and DNA segments encoding immunoglobulin constant regions. Methods for producing chimeric antibodies involve conventional recombinant DNA and gene transfection techniques are well known in the art. See e.g. Morrison, S. L., et al., Proc. Natl. Acad. Sci. USA 81 (1984) 6851-6855; U.S. Pat. Nos. 5,202,238 and 5,204,244.

The term "humanized antibody" refers to antibodies in which the framework or "complementarity determining regions" (CDR) have been modified to comprise the CDR of an immunoglobulin of different specificity as compared to that of the parent immunoglobulin. In a preferred embodiment, a murine CDR is grafted into the framework region of a human antibody to prepare the "humanized antibody." See e.g. Riechmann, L., et al., Nature 332 (1988) 323-327; and Neuberger, M. S., et al., Nature 314 (1985) 268-270. Particularly preferred CDRs correspond to those representing sequences recognizing the antigens noted above for chimeric antibodies. Other forms of "humanized antibodies" encompassed by the present invention are those in which the constant region has been additionally modified or changed from that of the original antibody to generate the properties according to the invention, especially in regard to C1q binding and/or Fc receptor (FcR) binding.

The term "human antibody", as used herein, is intended to include antibodies having variable and constant regions derived from human germ line immunoglobulin sequences. Human antibodies are well-known in the state of the art (van Dijk, M. A., and van de Winkel, J. G., Curr. Opin. Chem. Biol. 5 (2001) 368-374). Human antibodies can also be produced in transgenic animals (e.g., mice) that are capable, upon immunization, of producing a full repertoire or a selection of human antibodies in the absence of endogenous immunoglobulin production. Transfer of the human germline immunoglobulin gene array in such germ-line mutant mice will result in the production of human antibodies upon antigen challenge (see, e.g., Jakobovits, A., et al., Proc. Natl. Acad. Sci. USA 90 (1993) 2551-2555; Jakobovits, A., et al., Nature 362 (1993) 255-258; Bruggemann, M., et al., Year Immunol. 7 (1993) 33-40). Human antibodies can also be produced in phage display libraries (Hoogenboom, H. R., and Winter, G., J. Mol. Biol. 227 (1992) 381-388; Marks, J. D., et al., J. Mol. Biol. 222 (1991) 581-597). The techniques of Cole et al. and Boerner et al. are also available for the preparation of human monoclonal antibodies (Cole et al., Monoclonal Antibodies and Cancer Therapy, Alan R. Liss, p. 77 (1985); and Boerner, P., et al., J. Immunol. 147 (1991) 86-95). As already mentioned for chimeric and humanized antibodies according to the invention the term "human antibody" as used herein also comprises such antibodies which are modified in the constant region to generate the properties according to the invention, especially in regard to C1q binding and/or FcR binding, e.g. by "class switching" i.e. change or mutation of Fc parts (e.g. from IgG1 to IgG4 and/or IgG1/IgG4 mutation).

The term "recombinant human antibody", as used herein, is intended to include all human antibodies that are prepared, expressed, created or isolated by recombinant means, such as antibodies isolated from a host cell such as a NS0 or CHO cell or from an animal (e.g. a mouse) that is transgenic for human immunoglobulin genes or antibodies expressed using a recombinant expression vector transfected into a host cell. Such recombinant human antibodies have variable and constant regions in a rearranged form. The recombinant human antibodies according to the invention have been subjected to in vivo somatic hypermutation. Thus, the amino acid sequences of the VH and VL regions of the recombinant antibodies are sequences that, while derived from and related to human germ line VH and VL sequences, may not naturally exist within the human antibody germ line repertoire in vivo.

The "variable region" (variable region of a light chain ($V_L$), variable region of a heavy chain ($V_H$)) or "variable domain" as used herein denotes each of the pair of light and heavy chain domains which are involved directly in binding the antibody to the antigen. The variable light and heavy chain domains have the same general structure and each domain comprises four framework (FR) regions whose sequences are widely conserved, connected by three "hypervariable regions" (or complementary determining regions, CDRs). The framework regions adopt a β-sheet conformation and the CDRs may form loops connecting the β-sheet structure. The CDRs in each chain are held in their three-dimensional structure by the framework regions and form together with the CDRs from the other chain the antigen binding site. The antibody's heavy and light chain CDR3 regions play a particularly important role in the binding specificity/affinity of the antibodies according to the invention. The term "antigen-binding portion of an antibody" when used herein refer to the amino acid residues of an antibody which are responsible for antigen-binding. The antigen-binding portion of an antibody comprises amino acid residues from the "complementary determining regions" or "CDRs". "Framework" or "FR" regions are those variable domain regions other than the hypervariable region residues as herein defined. Therefore, the light and heavy chain variable domains of an antibody comprise from N- to C-terminus the domains FR1, CDR1, FR2, CDR2, FR3, CDR3, and FR4. Especially, CDR3 of the heavy chain is the region which contributes most to antigen binding and defines the antibody's properties. CDR and FR regions are determined according to the standard definition of Kabat et al., Sequences of Proteins of Immunological Interest, 5th ed., Public Health Service, National Institutes of Health, Bethesda, MD (1991) and/or those residues from a "hypervariable loop".

The term "epitope" includes any polypeptide determinant capable of specific binding to an antibody. In certain embodiments, epitope determinant includes chemically active surface groupings of molecules such as amino acids, sugar side chains, phosphoryl, or sulfonyl, and, in certain embodiments, may have specific three dimensional structural characteristics, and or specific charge characteristics. An epitope is a region of an antigen that is bound by an antibody.

The term "full length antibody" denotes an antibody consisting of two "full length antibody heavy chains" and two "full length antibody light chains". A "full length antibody heavy chain" is a polypeptide consisting in N-terminal to C-terminal direction of an antibody heavy chain variable domain (VH), an antibody constant heavy chain domain 1 (CH1), an antibody hinge region (HR), an antibody heavy chain constant domain 2 (CH2), and an antibody heavy chain constant domain 3 (CH3), abbreviated as VH-CH1-HR-CH2-CH3; and optionally an antibody heavy chain constant domain 4 (CH4) in case of an antibody of the subclass IgE. Preferably the "full length antibody heavy chain" is a polypeptide consisting in N-terminal to C-terminal direction of VH, CHI, HR, CH2 and CH3. A "full length antibody light chain" is a polypeptide consisting in N-terminal to C-terminal direction of an antibody light chain variable domain (VL), and an antibody light chain constant domain (CL), abbreviated as VL-CL. The antibody light chain constant domain (CL) can be kappa or lambda. The two full length antibody chains are linked together via inter-polypeptide disulfide bonds between the CL domain and the CHI domain and between the hinge regions of the full length antibody heavy chains. Examples of typical full length antibodies are natural antibodies like IgG (e.g. IgG1 and IgG2), IgM, IgA, IgD, and IgE. The full length antibodies according to the invention can be from a single species e.g. human, or they can be chimerized or humanized antibodies. The full length antibodies according to the invention comprise two antigen binding sites each formed by a pair of VH and VL, which both specifically bind to the same antigen. The C-terminus of the heavy or light chain of said full length antibody denotes the last amino acid at the C-terminus of said heavy or light chain. The N-terminus of the heavy or light chain of said full length antibody denotes the last amino acid at the N-terminus of said heavy or light chain.

The term "constant region" or "constant domains" as used within the current applications denotes the sum of the domains of an antibody other than the variable region. The constant region is not involved directly in binding of an antigen, but exhibits various effector functions. Depending on the amino acid sequence of the constant region of their heavy chains, antibodies are divided in the classes: IgA, IgD, IgE, IgG and IgM, and several of these may be further divided into subclasses, such as IgG1, IgG2, IgG3, and IgG4, IgA1 and IgA2. The heavy chain constant regions that correspond to the different classes of antibodies are called alpha, delta, epsilon, gamma, and micro, respectively. The light chain constant regions which can be found in all five antibody classes are called kappa and lambda.

The term "constant region derived from human origin" as used in the current application denotes a constant heavy chain region of a human antibody of the subclass IgG1, IgG2, IgG3, or IgG4 and/or a constant light chain kappa or lambda region. Such constant regions are well known in the state of the art and e.g. described by Kabat, E. A., (see e.g. Johnson, G., and Wu, T. T., Nucleic Acids Res. 28 (2000) 214-218; Kabat, E. A., et al, Proc. Natl. Acad. Sci. USA 72 (1975) 2785-2788).

The term constant heavy chain domain (or region) as used herein defines a C-terminal region of an immunoglobulin heavy chain that contains at least a portion of the constant heavy chain region.

The term includes native sequences of the constant heavy chain domains and variant constant heavy chain domains. Variant constant heavy chain domains include e.g. mutations in the constant domain which are used to foster the heterodimerization as describe above for the knobs into hole technology. Also other mutations like e.g. L234A (Leu235Ala), L235A (Leu234Ala) and P329G (Pro329Gly) can be included as constant domains with such mutations have a reduced FcR binding (especially they show no more binding to FcRgammaI, FcRgammaII and FcRgammaIII). This especially useful to reduce potential side effects like e.g. thrombosis (Meyer, T., et al., J. Thromb. Haemost. 7 (2009) 171-81). In addition e.g. also the mutations I253A, H310A, and H435A (numbering according to EU Index of Kabat) can be included in the constant domain as constant domains with such mutations have a reduced FcRn one or two mutations) or eliminated FcRn binding (all 3 mutations).

In one aspect, a human IgG heavy chain constant region extends from alanine118 (A118) (numbering according to EU index of Kabat) to the carboxyl-terminus of the heavy chain. However, antibodies produced by host cells may undergo post-translational cleavage of one or more, particularly one or two, amino acids from the C-terminus of the heavy chain. Therefore, an antibody produced by a host cell by expression of a specific nucleic acid molecule encoding a full-length heavy chain may include the full-length heavy chain, or it may include a cleaved variant of the full-length heavy chain. This may be the case where the final two C-terminal amino acids of the heavy chain are glycine (G446) and lysine (K447, numbering according to EU index). Therefore, the C-terminal lysine (Lys447), or the C-terminal glycine (Gly446) and lysine (Lys447), of the constant heavy chain domain may or may not be present. Amino acid sequences of heavy chains including the constant heavy chain domain are denoted herein with C-terminal glycine-lysine dipeptide if not indicated otherwise.

A "stable" formulation is one in which the protein therein, e.g. the antibody, essentially retains its physical and chemical stability and thus its biological activity upon storage; e.g. wherein the high molecular weight content (HMW) of the bispecific antibody in the pharmaceutical formulation is below 10% after 8 weeks at 25° C. (in one embodiment below 5%, in one embodiment below 2.5%). In one embodiment the high molecular weight content (HMW) of the bispecific antibody in the pharmaceutical formulation is below 10% after 52 weeks at 25° C. (in one embodiment below 5%).

In one embodiment a "stable liquid pharmaceutical formulation" is a liquid formulation with no significant changes observed at a refrigerated temperature (2-8° C.) for at least 12 months, particularly 2 years, and more particularly 3 years. The criteria for stability are the following: no more than 10%, particularly 5%, of antibody monomer is degraded as measured by size exclusion chromatography (SEC-HPLC). Furthermore, the solution is colorless or clear to slightly opalescent by visual analysis. The protein concentration of the formulation has no more than +/−10% change. No more than 10%, particularly 5% of aggregation is formed. The stability is measured by methods known in the art such UV spectroscopy, size exclusion chromatography (SEC-HPLC), Ion-Exchange Chromatography (IE-HPLC), turbidimetry and visual inspection.

Turbidity (in FTU (=Formazine Turbidity Unit))

The turbidity of a pharmaceutical formulation can be determined on a turbidimeter (e.g. on a Hach 2100 AN turbidimeter according to Ph. Eur. 2.2.1 (Clarity and degree of opalescence of Liquids). A sample volume of approximately 2 mL sample solution is transferred into a 11 mm inner diameter glass cuvette and m. The glass cuvette is placed into the turbidimeter and the turbidity is measured against a calibration curve of the reference suspensions 1 FTU, 3 FTU, 10 FTU, 20 FTU and 100 FTU.

Viscosity (in mPa)

The viscosity of the formulation samples of a pharmaceutical formulation can be determined on a rheometer (e.g. an Anton Paar Physica MCR 301 rotational rheometer with a 25 mm-0.5° cone at a shear rate of 1000 $s^{-1}$ and a temperature of 20° C.).

Visible Particles

The vial samples are visually inspected on respective inspection machine (e.g. a Seidenader inspection machine V90-T with help of a 2× magnifier lens. The illuminating light sources L1, L2 and L3 were adjusted to setting 5. The vial samples were inspected during a rotational movement for the presence of particles. The formation of visible particles is not acceptable for an intravitreal injection according to the requirements of USP-NF <790>, which is essentially free of visible particles. USP-NF <790> provides that the "essentially free" standard is achieved when parenteral drugs are inspected and no more than a specified number of units are observed to contain visible particulates. More specifically, for parenteral drugs subject to 100% inspection, the "essentially free" standard is met when a batch meets an acceptable quality level (AQL) of 0.65% or lower. And if it becomes necessary to evaluate product that has been shipped to customers (e.g., because of a complaint or regulatory concern), a firm can sample and inspect 20 units. If no particles are observed in the sample, the batch is considered "essentially free" of visible particulates.

Protein Concentration (in mg/ml).

The protein concentration of the formulation samples was measured by ultraviolet (UV) light absorption on an UV/Vis Photometer Lambda™ 35 from Perkin Elmer. The formulation samples were diluted with a 20 mM L-histidine-acetate buffer solution pH 5.5 to a protein concentration of approximately 0.5 mg/mL and filled into a measurement cuvette with a thickness of 1 cm. The UV absorption of the measurement cuvette was measured at wavelengths at 280 and 320 nm.

The protein concentration was calculated from the measured UV light absorptions at 280 (A280) and 320 nm (A320), the extinction coefficient (E) of 1.70 mL/(mg×cm), the thickness (d) of 1 cm and dilution factor (DF) corresponding to the actual dilution according to the following equation:

$$\text{Protein concentration in mg/mL} = \frac{(A280 - A320)}{(E \times d)} \times DF$$

pH

The pH of the formulations samples was determined by potentiometry with a glass electrode.

Ionic Strength

The dimensionless ionic strength I of formulations is calculated according to Equation 1:

$$I = \Sigma z_i^2 (b_i/b^\ominus) \qquad \text{Equation 1}$$

In this expression z is the charge number of an ion I (positive for cations and negative for anions) $b_i$ is its molality. $b^\ominus$ corresponds to 1 mol/kg and is required to make I dimensionless (Physical Chemistry, P. Atkins, J. de Paula, Oxford Press Nineth edition, p. 194).

The molality of charged buffer species was calculated using Henderson-Hasselbalch equation (Methods in Enzymology—Guide to Protein Purification, Volume 182, M. P. Deutscher, Academic Press, Inc., 1990, p. 24ff).

Osmolality

The osmolality of the formulation samples was measured on an Osmomat® 030 3P osmometer from Gonotec® according to the principle of freezing point depression.

Surfactants

The pharmaceutical formulation of the present invention comprises a surfactant to reduce aggregation of the antibodies and particle formation. The term "surfactant" as used herein denotes a pharmaceutically acceptable excipient which is used to protect protein formulations against mechanical stresses like agitation and shearing. Examples of pharmaceutically acceptable surfactants include polyoxyethylensorbitan fatty acid esters (Tween®), polyoxyethylene alkyl ethers (for example those sold under the trademark Brij™) and polyoxyethylene-polyoxypropylene copolymer (Poloxamer, Pluronic®).

Preferably, the surfactant is a polyoxyethylenesorbitan-fatty acid ester or a polyxamer. Examples of polyoxyethylenesorbitan-fatty acid esters are polysorbate 20 (sold under the trademark Tween® 20) and polysorbate 80 (sold under the trademark Tween® 80). The preferred polyoxyethylene-sorbitan-fatty acid is polysorbate 20.

The above mentioned surfactants are generally used in a concentration of 0.01% (w/v) or higher, e.g. 0.01 to about 0.09% (w/v). The surfactant in a pharmaceutical composition of the present invention are in particular used in the range of about 0.02% to about 0.06% (w/v), more particular in the range of about 0.03% to about 0.05% (w/v), even more particularly in a concentration of about 0.04% (w/v).

The term "poloxamer" as used herein includes a polyoxyethylene-polyoxypropylene triblock copolymer composed of a central hydrophobic chain of polyoxypropylene flanked by two hydrophilic chains of polyoxyethylene known as poloxamer 188, sold under the trade name PLURONIC® F68 by BASF (Parsippany, N.J.). Other poloxamers which may be utilized in the formulations of the present invention include poloxamer 403 (sold as PLURONIC® P123), poloxamer 407 (sold as PLURONIC® P127), poloxamer 402 (sold as PLURONIC® P122), poloxamer 181 (sold as PLURONIC® L61), poloxamer 401 (sold as PLURONIC® L121), poloxamer 185 (sold as PLURONIC® P65), and poloxamer 338 (sold as PLURONIC® F108).

Buffers

The term "buffer" as used herein denotes a pharmaceutically acceptable excipient, which stabilizes the pH of a pharmaceutical preparation. Suitable buffers are well known in the art and can be found in the literature. Typical pharmaceutically acceptable buffers for intravitreal administrations comprise but are not limited to histidine-buffers, citrate-buffers, succinate-buffers, acetate-buffers, phosphate-buffers or mixtures thereof. In this context buffers of particular interest comprise L-histidine ("histidine buffer") or mixtures of L-histidine and L-histidine hydrochloride with pH adjustment with an acid or a base known in the art. Buffers of particular interest comprise L-histidine ("histidine buffer") in particular L-histidine with pH adjustment with acetic acid (e.g. 30%) or hydrochloride. The above-mentioned buffers are generally used in a concentration of about 2 mM to about 200 mM or about 5 mM to about 100 mM, particularly in a concentration of about 10 mM to about 30 mM or about 15 mM to about 20 mM and more particularly of about 20 mM. Independently from the buffer used, the pH can be adjusted to a value in the range from 4.5 to 7.0 and particularly to a value in the range from 5.0 to 6.0 and most particularly to pH 5.5±0.2 with an acid or a base known in the art, e.g. acetic acid, hydrochloric acid, phosphoric acid, sulfuric acid and citric acid, sodium hydroxide and potassium hydroxide, in particular with acetic acid. A buffer of particular interest is a histidine (L-histidine) acetate buffer in concentration of 15-25 mM (in one embodiment 20 mM±3 mM, in particular 20 mM±2 mM) at a pH of 5.5±0.5 (in one embodiment at a pH of 5.5±0.3; in particular, at a pH of 5.5±0.2)

Stabilizers

The term "stabilizer" denotes a pharmaceutical acceptable excipient, which protects the active pharmaceutical ingredient and/or the formulation from chemical and/or physical degradation during manufacturing, storage and application. Chemical and physical degradation pathways of protein pharmaceuticals are reviewed by Cleland et al. (1993), Crit Rev Ther Drug Carrier Syst 10(4):307-77, Wang (1999) Int J Pharm 185(2):129-88, Wang (2000) Int J Pharm 203(1-2): 1-60 and Chi et al. (2003) Pharm Res 20(9):1325-36. Stabilizers include but are not limited to sugars, amino acids, polyols, cyclodextrines, e.g. hydroxypropyl-β-cyclodextrine, sulfobutylethyl-β-cyclodextrin, β-cyclodextrin, polyethylenglycols, e.g. PEG 3000, PEG 3350, PEG 4000, PEG 6000, albumin, human serum albumin (HSA), bovine serum albumin (BSA), salts, e.g. sodium chloride, magnesium chloride, calcium chloride, chelators, e.g. EDTA as hereafter defined. Stabilizers that are particularly used in the present invention, are selected from the group consisting of sugars, polyols and amino acids. More particularly, the stabilizers are selected from the group consisting of sucrose, trehalose, sorbitol and methionine.

More preferably, the stabilizer is methionine. Methionine was used in the formulations described herein for the first time for use in ocular applications. Preclinical safety testings showed that methionine shows a good safety profile for use in ocular diseases when administered e.g. intravitreally.

Stabilizers can be present in the formulation in a concentration of about 2 mM to about 600 mM, particularly, if the stabilizer is methionine, in a concentration of about 2 mM to about 15 mM or 5 to 12 mM; more particularly in a concentration of about of 5 to 9 mM or about 7 mM.

In one preferred embodiment the stabilizer is methionine in a concentration of 7.0 mM±2.0 mM methionine (in one embodiment 7.0 mM±1.0 mM methionine; in one embodiment 7.0 mM±0.7 mM methionine). Methionine as stabilizer is especially useful as it can function in addition as scavenger agent for hydrogen peroxide which is used for sterilization of injection solutions or packaged prefilled syringes.

In some embodiments, the liquid pharmaceutical formulation of the present invention comprises an antioxidant as a second stabilizer. An "antioxidant" is a pharmaceutically acceptable excipient, which prevents oxidation of the active pharmaceutical ingredient. Antioxidants include but are not limited to chelating agents such as EDTA, citric acid, ascorbic acid, butylated hydroxytoluene (BHT), butylated hydroxy anisole (BHA), sodium sulfite, p-amino benzoic acid, glutathione, propyl gallate, cysteine, methionine, ethanol, benzyl alcohol and n-acetyl cysteine. Antioxidants can be used in a concentration of about 0.01 to about 100 mM, particularly in a concentration of about 5 to about 50 mM and more particularly in a concentration of about 5 to about 25 mM. In particular, methionine is chosen as a second stabilizer, particularly in a concentration of about 5 to about 25 mM, more particularly in a concentration of about 10 mM.

The term "sugar" as used herein denotes a monosaccharide or an oligosaccharide. A monosaccharide is a monomeric carbohydrate which is not hydrolysable by acids, including simple sugars and their derivatives, e.g. aminosugars. Examples of monosaccharides include glucose, fructose, galactose, mannose, sorbose, ribose, deoxyribose, neuraminic acid. An oligosaccharide is a carbohydrate consisting of more than one monomeric saccharide unit connected via glycosidic bond(s) either branched or in a chain. The monomeric saccharide units within an oligosaccharide can be identical or different. Depending on the number of monomeric saccharide units the oligosaccharide is a di-, tri-, tetra- penta- and so forth saccharide. In contrast to polysaccharides, the monosaccharides and oligosaccharides are water soluble. Examples of oligosaccharides include sucrose, trehalose, lactose, maltose and raffinose. In particular, sugars are selected from sucrose and trehalose, in particular sucrose.

The term "amino acid" as used herein denotes in general a pharmaceutically acceptable organic molecule possessing an amino moiety located at α-position to a carboxylic group. Examples of amino acids include arginine glycine, ornithine, lysine, histidine, glutamic acid, asparagic acid, isoleucine, leucine, alanine, phenylalanine, tyrosine, tryptophane, methionine, serine, proline, in particular methionine.

The term "polyols" as used herein denotes pharmaceutically acceptable alcohols with more than one hydroxy group. Suitable polyols comprise to but are not limited to mannitol, sorbitol, glycerine, dextran, glycerol, arabitol, propylene glycol, polyethylene glycol, and combinations thereof. Polyols can be used in a concentration of about 10 mM to about 500 mM, particularly in a concentration of about 10 to about 250 mM and more particularly in a concentration of about 200 to about 250 mM.

The term "stabilizers" also includes lyoprotectants. The term "lyoprotectant" denotes a pharmaceutical acceptable excipient, which protects the labile active ingredient (e.g. a protein) against destabilizing conditions during the lyophilisation process, subsequent storage and reconstitution. Lyoprotectants comprise but are not limited to the group consisting of sugars, polyols (such as e.g. sugar alcohols) and amino acids. In particular, lyoprotectants can be selected from the group consisting of sugars such as sucrose, trehalose, lactose, glucose, mannose, maltose, galactose, fructose, sorbose, raffinose, neuraminic acid, amino sugars such as glucosamine, galactosamine, N-methylglucosamine ("Meglumine"), polyols such as mannitol and sorbitol, and amino acids such as methionine or glycine. Lyoprotectants are generally used in a concentration of about 10 to about 600 mM, particularly in a concentration of about 10 to about 250 mM and more particularly in a concentration of about 100 to about 250 mM.

Tonicity Agents

The pharmaceutical formulation may also contain tonicity agents. The term "tonicity agents" as used herein denotes pharmaceutically acceptable tonicity agents which are used to modulate the tonicity of the formulation. The formulation can be hypotonic, isotonic or hypertonic. Isotonicity in general relates to the osmotic pressure relative of a solution usually relative to that of human blood serum. The formulation according to the invention can be hypotonic, isotonic or hypertonic, preferably the pharmaceutical formulation is isotonic. An isotonic formulation is liquid or liquid reconstituted from a solid form, e.g. from a lyophilised form and denotes a solution having a similar tonicity as some other solution with which it is compared, such as physiologic salt solution and the blood serum. Suitable tonicity agents comprise but are not limited to sodium chloride, potassium chloride, glycerin and any component from the group of amino acids, sugars, in particular sucrose. In one embodiment of the present invention, the preferred tonicity agent is sucrose. Tonicity agents are generally used in a concentration of about 5 mM to about 1000 mM, in particular about 30 mM to about 500 mM, more particular about 120 mM to about 200 mM. Tonicity agents for isotonic formulations of the present invention are generally used in a concentration of about 50 mM to about 250 mM, in particular about 120 mM to about 200 mM. More particularly, tonicity agents for isotonic formulations are used in a concentration of 130 mM to 190 mM, and even more particularly in a concentration of about 160 mM±24 mM in case sucrose is used as tonicity agent. The tonicity agent and its concentration is chosen to enable an isotonic formulation with a target osmolality of 300±100 mOsm/kg (in particular with a target osmolality of 300±50 mOsm/kg.)

Within the stabilizers and tonicity agents there is a group of compounds which can function in both ways, i.e. they can at the same time be a stabilizer and a tonicity agent. Examples thereof can be found in the group of sugars, amino acids, polyols, cyclodextrines, polyethyleneglycols and salts. An example for a sugar which can at the same time be a stabilizer and a tonicity agent is sucrose and trehalose, in particular sucrose.

Viscosity Reducer

The pharmaceutical formulation may also contain viscosity reducers. The term "viscosity reducers" as used herein denotes pharmaceutically acceptable ionic strength modifier which are used to reduce the viscosity of the formulation, which is important for high concentrations formulations and formulations which are foreseen to be administered intravitreally in the eye through thin needles (enabling relative fast application without the need of high pressure for the injection) in the treatment of ocular diseases. Examples of typical viscosity reducers are e.g. calcium chloride or sodium chloride.

Adjuvants

The pharmaceutical formulation may also contain adjuvants such as preservatives, wetting agents, emulsifying agents and dispersing agents. Prevention of presence of microorganisms may be ensured both by sterilization procedures, and by the inclusion of various antibacterial and antifungal agents, for example, paraben, chlorobutanol, phenol, sorbic acid, and the like. Preservatives are generally used in a concentration of about 0.001 to about 2% (w/v). Preservatives comprise but are not limited to ethanol, benzyl alcohol, phenol, m-cresol, p-chlor-m-cresol, methyl or propyl parabens, benzalkonium chloride.

The pharmaceutical formulation may also contain amounts of the different above mentioned agents such as buffers, surfactants, stabilizer, ion strength modifier, in smaller amounts that do not essentially change the technical features of pharmaceutical formulation of the present invention as e.g. a viscosity of 20 mPas or less (preferably 15 mPas or less), a turbidity of 30 FTU or less (preferably 25 FTU or less), an osmolality of 300±50 mOsm/kg, essentially free of visible particles.

Use

The pharmaceutical formulation of bispecific anti-VEGF/ANG2 antibody according to the invention can be used in the prevention or treatment of ocular vascular diseases. For this purpose the pharmaceutical formulation of bispecific anti-VEGF/ANG2 antibody is provided for intravitreal administration as liquid isotonic formulation with a viscosity of 20 mPas or less (preferably 15 mPas or less), a turbidity of 30 FTU or less (preferably 25 FTU or less), an osmolality of 300±50 mOsm/kg, essentially free of visible particles. The liquid isotonic pharmaceutical formulation of bispecific anti-VEGF/ANG2 antibody for this purpose can be provided in glass vials or in form of a prefilled syringe, in particular in form of a prefilled glass syringe.

For such formulations which are administered intravitreally to the eye excipients like e.g. arginine should be avoided as the toxicity of arginine as carrier for tissue plasminogen activator (t-PA), to the retina and retinal pigment epithelium has been described (see e.g. Benner J D, Morse L S, Toth C A et al Arch Ophthalmol 19911091731-1736.1736; Johnson M W, Olsen K R. Hernandez E. et al, Arch Ophthalmool 1990108259-263.263, Irvine W D, Johnson M W, Heinandez E. et al, Arch Ophthalmol 1991109718-722.722, Johnson M W, Olsen K R. Heinandez E., Retina 199111250-258.258). Therefore, the liquid pharmaceutical formulation of the present invention is essentially free of arginine (which means the formulation comprises no arginine or amounts of arginine below a concentration/level where they can be toxic (via their function as carrier for tissue plasminogen activator (t-PA)) or does not comprise arginine. A low viscosity is also essential in order to enable a commercial-scale production process (up-concentration by ultrafiltration) and to ensure an easy and convenient intravitreal injection (injection (gliding) forces of less than 20 N, in particular less than 15N with an injection speed of 50 mm/min). It was demonstrated that the liquid pharmaceutical formulation of the present invention with a viscosity of less than 15 mPas were able to be injected through a 30G injection needle with 5 s injection time with an injection force of less than 5 N. For this purpose, the pharmaceutical formulation of bispecific anti-VEGF/ANG2 antibody is as liquid isotonic formulation with a viscosity of 15 mPas or less, a turbidity of 25 FTU or less, an osmolality of 300±50 mOsm/kg, essentially free of visible particles. To avoid any visible particles, the liquid pharmaceutical formulation of the present invention is essentially free of calcium chloride (which means the formulation comprises no calcium chloride or comprises amounts of calcium chloride below a concentration/level where they can contribute to the formation of visible particles, so that the formulation remains/is essentially free of visible particles) or does not comprise calcium chloride.

The terms "ocular vascular disease" and "vascular eye disease" are used interchangeable herein and include, but are not limited to intraocular neovascular syndromes such as diabetic retinopathy, diabetic macular edema, retinopathy of prematurity, neovascular glaucoma, retinal vein occlusions, central retinal vein occlusions, macular degeneration, age-related macular degeneration, retinitis pigmentosa, retinal angiomatous proliferation, macular telangectasia, ischemic retinopathy, iris neovascularization, intraocular neovascularization, corneal neovascularization, retinal neovascularization, choroidal neovascularization, and retinal degeneration. (Garner, A., Vascular diseases, In: Pathobiology of ocular disease, A dynamic approach, Garner, A., and Klintworth, G. K., (eds.), 2nd edition, Marcel Dekker, New York (1994), pp. 1625-1710). As used herein, ocular vascular disorder refers to any pathological conditions characterized by altered or unregulated proliferation and invasion of new blood vessels into the structures of ocular tissues such as the retina or cornea. In one embodiment the ocular vascular disease is selected from the group consisting of: wet age-related macular degeneration (wet AMD) (also called neovascular age-related macular degeneration (nAMD)), diabetic macular edema (DME), diabetic rethinopathy (DR), non-proliferative diabetic retinopathy (NPDR), proliferative diabetic retinopathy (PDR), cystoid macular edema (CME), vasculitis (e.g. central retinal vein occlusion), retinal vein occlusion (RVO), central retinal vein occlusion (CRVO), papilloedema, retinitis, conjunctivitis, uveitis, choroiditis, multifocal choroiditis, ocular histoplasmosis, blepharitis, dry eye (Sjögren's disease) and other ophthalmic diseases wherein the eye disease or disorder is associated with ocular neovascularization, vascular leakage, and/or retinal edema, in particular wet age-related macular degeneration (wet AMD) (also called neovascular age-related macular degeneration (nAMD)), diabetic macular edema (DME), diabetic rethinopathy (DR), non-proliferative diabetic retinopathy (NPDR), proliferative diabetic retinopathy (PDR), cystoid macular edema (CME), vasculitis (e.g. central retinal vein occlusion), retinal vein occlusion (RVO), central retinal vein occlusion (CRVO). So the anti-VEGF/ANG2 bispecific antibodies for use and the methods described herein are useful in the prevention and treatment of wet AMD (also called neovascular age-related macular degeneration (nAMD)), DME, DR, NPDR, PDR, also preferably wet AMD, DME, and RVO, also preferably wet AMD wet AMD. In some embodiments, the ocular vascular disease is selected from the group consisting wet age-related macular degeneration (wet AMD)), diabetic macular edema (DME), retinal vein occlusions (RVO), diabetic retinopathy (DR). and retinopathy of prematurity (ROP), Other diseases associated with corneal neovascularization include, but are not limited to, epidemic keratoconjunctivitis, Vitamin A deficiency, contact lens overwear, atopic keratitis, superior limbic keratitis, pterygium keratitis sicca, sjogrens, acne rosacea, phylectenulosis, syphilis, Mycobacteria infections, lipid degeneration, chemical burns, bacterial ulcers, fungal ulcers, Herpes simplex infections, Herpes zoster infections, protozoan infections, Kaposi sarcoma, Mooren ulcer, Terrien's marginal degeneration, mariginal keratolysis, rheumatoid arthritis, systemic lupus, polyarteritis, trauma, Wegeners sarcoidosis, Scleritis, Steven's Johnson disease, periphigoid radial keratotomy, and corneal graph rejection.

Diseases associated with retinal/choroidal neovascularization include, but are not limited to, diabetic retinopathy, macular degeneration, sickle cell anemia, sarcoid, syphilis, pseudoxanthoma elasticum, Pagets disease, vein occlusion, artery occlusion, carotid obstructive disease, chronic uveitis/vitritis, mycobacterial infections, Lyme's disease, systemic lupus erythematosis, retinopathy of prematurity, retinitis pigmentosa, retina edema (including macular edema), Eales disease, Bechets disease, infections causing a retinitis or choroiditis, presumed ocular histoplasmosis, Bests disease, myopia, optic pits, Stargarts disease, pars planitis, chronic retinal detachment, hyperviscosity syndromes, toxoplasmosis, trauma and post-laser complications. Other diseases include, but are not limited to, diseases associated with rubeosis (neovascularization of the angle) and diseases caused by the abnormal proliferation of fibrovascular or fibrous tissue including all forms of proliferative vitreoretinopathy.

Retinopathy of prematurity (ROP) is a disease of the eye that affects prematurely born babies. It is thought to be caused by disorganized growth of retinal blood vessels which may result in scarring and retinal detachment. ROP can be mild and may resolve spontaneously, but may lead to blindness in serious cases. As such, all preterm babies are at risk for ROP, and very low birth weight is an additional risk factor. Both oxygen toxicity and relative hypoxia can contribute to the development of ROP.

Macular degeneration is a medical condition predominantly found in elderly adults in which the center of the inner lining of the eye, known as the macula area of the retina, suffers thinning, atrophy, and in some cases, bleeding. This can result in loss of central vision, which entails inability to see fine details, to read, or to recognize faces. According to the American Academy of Ophthalmology, it is the leading cause of central vision loss (blindness) in the United States today for those over the age of fifty years. Although some macular dystrophies that affect younger individuals are sometimes referred to as macular degeneration, the term generally refers to age-related macular degeneration (AMD or ARMD).

"Age-related macular degeneration (AMD)", as used herein, refers to a serious eye condition when the small central portion of the retina, known as the macula, deteriorates. The wet form of AMD (wet AMD (wAMD), also called neovascular AMD (nAMD)), a form of advanced AMD is characterized by the growth of abnormal blood vessels from the choroid underneath the macula. This is called choroidal neovascularization. These blood vessels leak blood and fluid into the retina, causing distortion of vision that makes straight lines look wavy, as well as blind spots and loss of central vision. These abnormal blood vessels eventually scar, leading to permanent loss of central vision. The symptoms of AMD include dark, blurry areas in the center of vision; and diminished or changed color perception. AMD can be detected in a routine eye exam. One of the most common early signs of macular degeneration is the presence of drusen tiny yellow deposits under the retina or pigment clumping.

Retinitis pigmentosa (RP) is a group of genetic eye conditions. In the progression of symptoms for RP, night blindness generally precedes tunnel vision by years or even decades. Many people with RP do not become legally blind until their 40 s or 50 s and retain some sight all their life. Others go completely blind from RP, in some cases as early as childhood. Progression of RP is different in each case. RP is a type of hereditary retinal dystrophy, a group of inherited disorders in which abnormalities of the photoreceptors (rods and cones) or the retinal pigment epithelium (RPE) of the retina lead to progressive visual loss. Affected individuals first experience defective dark adaptation or nyctalopia (night blindness), followed by reduction of the peripheral visual field (known as tunnel vision) and, sometimes, loss of central vision late in the course of the disease.

Macular edema occurs when fluid and protein deposits collect on or under the macula of the eye, a yellow central area of the retina, causing it to thicken and swell. The swelling may distort a person's central vision, as the macula is near the center of the retina at the back of the eyeball. This area holds tightly packed cones that provide sharp, clear central vision to enable a person to see form, color, and detail that is directly in the line of sight. Cystoid macular edema is a type of macular edema that includes cyst formation.

"Diabetic Macular Edema" (DME), as used herein, refers to a serious eye condition that affects people with diabetes (type 1 or 2). Macular edema occurs when blood vessels in the retina leak into the macula and fluid and protein deposits collect on or under the macula of the eye (a yellow central area of the retina) and causes it to thicken and swell (edema). The swelling may distort a person's central vision, as the macula is near the center of the retina at the back of the eyeball. The primary symptoms of DME include, but are not limited to, blurry vision, floaters, loss of contrast, double vision, and eventual loss of vision. The pathology of DME is characterized by breakdown of the blood-retinal barrier, normally preventing water movement in the retina, thus allowing fluid to accumulate in the retinal tissue, and presence of retinal thickening. DME is presently diagnosed during an eye examination consisting of a visual acuity test, which determines the smallest letters a person can read on a standardized chart, a dilated eye exam to check for signs of the disease, imaging tests such as optical coherence tomography (OCT) or fluorescein angiography (FA) and tonometry, an instrument that measures pressure inside the eye. The following studies are also performed to determine treatment: optical coherence tomography (OCT), fluorescein angiography, and color stereo fundus photography. DME can be broadly characterized into two main categories—Focal and Diffuse. Focal DME is characterized by specific areas of separate and distinct leakage in the macula with sufficient macular blood flow. Diffuse DME results from leakage of the entire capillary bed surrounding the macula, resulting from a breakdown of the inner blood-retina barrier of the eye. In addition to Focal and Diffuse, DME is also categorized based on clinical exam findings into clinically significant macular edema (CSME), non-CSME and CSME with central involvement (CSME-CI), which involves the fovea. The present invention includes methods to treat the above-mentioned categories of DME.

In one embodiment of the invention the ocular vascular disease is selected from the group consisting of: wet age-related macular degeneration (wet AMD), diabetic macular edema (DME), diabetic retinopathy (DR), non-proliferative diabetic retinopathy (NPDR), proliferative diabetic retinopathy (PDR), vasculitis (e.g. retinal vein occlusion (RVO) and central retinal vein occlusion (CRVO.

In one embodiment the ocular vascular disease is selected from the group consisting of diabetic retinopathy (DR), diabetic macular edema (DME), retinal vein occlusion (RVO), central retinal vein occlusion (CRVO), macular degeneration, wet age-related macular degeneration (wet AMD), retinopathy of prematurity (ROP), neovascular glaucoma, retinitis pigmentosa (RP), retinal angiomatous proliferation, macular telangiectasia, ischemic retinopathy, iris neovascularization, intraocular neovascularization, corneal neovascularization, retinal neovascularization, choroidal neovascularization, and retinal degeneration, in particular from the group consisting of diabetic retinopathy (DR), diabetic macular edema (DME), retinal vein occlusion (RVO), central retinal vein occlusion (CRVO), wet age-related macular degeneration (wet AMD).

In one embodiment of the invention the ocular vascular disease is diabetic retinopathy (DR).

In one embodiment of the invention the ocular vascular disease is diabetic macular edema (DME).

In one embodiment of the invention the ocular vascular disease is retinal vein occlusion (RVO).

In one embodiment of the invention the ocular vascular disease is central retinal vein occlusion (CRVO).

In one embodiment of the invention the ocular vascular disease is retinopathy of prematurity (ROP).

In one embodiment of the invention the ocular vascular disease is macular degeneration.

In one embodiment of the invention the ocular vascular disease is age-related macular degeneration (AMD).

In one embodiment of the invention the ocular vascular disease is wet age-related macular degeneration (wAMD).

In one embodiment of the invention the ocular vascular disease is choroidal neovascularization.

Administration

The liquid pharmaceutical formulation according to the invention can be administered by intravitreal (IVT) means such as those known in the pharmaceutical art (e.g an appropriate syringe). For the intravitreal injection typically injection volumes are 50 to 100 µL. The intravitreal injection is performed by use of a disposable syringe and an injection needle of 30G (25G to 30G) or a pre-filled syringe with an appropriate injection needle. The liquid formulation can be withdrawn from the vial containing the formulation by use of a filter needle with pore size of 5 µm. Intravitreal injection technique is described e.g. in D. Yorston, Community Eye Health. 2014; 27(87): 47.

For this purpose, the pharmaceutical formulation of bispecific anti-VEGF/ANG2 antibody is as liquid isotonic formulation with a viscosity of 15 mPas or less, a turbidity of 25 FTU or less, an osmolality of 300±50 mOsm/kg, essentially free of visible particles.

The formulations to be used for in vivo administration must be sterile. This is readily accomplished by filtration through sterile filtration membranes and aseptic manufacturing practice.

Method for the Preparation of the Formulation

The pharmaceutical formulation according to the invention can be prepared by methods or processes known in the art, e.g. ultrafiltration-diafiltration, dialysis, addition and mixing, lyophilisation, reconstitution, and combinations thereof. Examples of preparations of formulations according to the invention can be found herein after.

In one embodiment of the invention the pharmaceutical formulation can be prepared by the following manufacturing method or process comprising the steps of:

1. Buffer exchange against a diafiltration buffer containing the histidine-acetate buffer or the histidine-acetate buffer and sodium chloride, or histidine-acetate buffer, sodium chloride and methionine, or histidine-acetate buffer, sodium chloride, methionine and sucrose by ultra-filtration and diafiltration using a semipermeable membrane with a MWCO (molecular weight cut-off) between 5 and 80 kD (30 to 50 kD) (30 kD). Typically, the ratio between diafiltration buffer and bulk solution is 5 to 20 (5-10).
2. Alternatively to 1, buffer-exchange can be achieved by dialysis using a dialysis buffer containing the histidine-acetate buffer or the histidine-acetate buffer and sodium chloride, or histidine-acetate buffer, sodium chloride and methionine, or histidine-acetate buffer, sodium chloride, methionine and sucrose and dialysis membrane with a MWCO between 5 and 80 kD (30 to 50 kD) (30 kD). Typically, the ratio between dialysis buffer and bulk solution is 5 to 20 (5-10).
3. The buffer exchanged bulk solution is concentrated by ultrafiltration using a diafiltration membrane with a MWCO (molecular weight cut-off) between 5 and 80 kD (30 to 50 kD) (30 kD) to a protein concentration of more than 120 mg/mL (120 to 160 mg/mL) (120 to 200 mg/mL).

4. The final composition of the pharmaceutical formulation is adjusted by addition of stock solutions of the respective excipients or by an appropriate conditioning buffer. The solution is homogenized by mixing.

Furthermore, the manufacturing method or process can include the following steps 5. The final formulated solution can be stored frozen at a temperature below −20° C. (below −40° C.).
6. Before filling in the final primary container the solution is thawed
7. Several container or batches of the pharmaceutical formulation are mixed and homogenized by stirring
8. The homogenized pharmaceutical formulation is filtered through several (at least two) sterilizing grade filters with a pore size of at least 0.2 or 0.22 μm.
9. The sterile-filtered solution is filled under aseptic conditions into sterile vials or pre-fillable syringes and closed with elastomeric stopper, respectively plunger stopper and tip caps.
10. The filled primary containers are inspected for defects and visible particles
11. Pre-filled syringes are assembled with respective device components, packaged into sterile barrier system and sterilized at the outer surface.
12. Vials and sterilized syringes are packaged in the final secondary packaging The pharmaceutical formulations according to the invention can also be in a lyophilized form or in a liquid form reconstituted from the lyophilized form. The "lyophilized form" is manufactured by freeze-drying methods known in the art. The lyophilizate usually has a residual moisture content of about 0.1 to 5% (w/w) and is present as a powder or a physically stable cake. The "reconstituted form" can be obtained from the lyophilizate by a fast dissolution after addition of reconstitution medium. Suitable reconstitution media comprise but are not limited to water for injection (WFI), bacteriostatic water for injection (BWFI), sodium chloride solutions (e.g. 0.9% (w/v) NaCl), and glucose solutions (e.g. 5% (w/v) glucose).

Production of the Antibodies

Anti-VEGF/ANG2 antibodies that are particularly useful for the invention are produced by recombinant means. Methods for recombinant production are widely known in the state of the art and comprise protein expression in prokaryotic and eukaryotic cells with subsequent isolation of the antibody and usually purification to a pharmaceutically acceptable purity. For the expression of the antibodies as aforementioned in a host cell, nucleic acids encoding the respective modified light and heavy chains are inserted into expression vectors by standard methods. Expression is performed in appropriate prokaryotic or eukaryotic host cells like CHO cells, NSO cells, SP2/0 cells, HEK293 cells, COS cells, PER.C6 cells, yeast, or E. coli cells, and the antibody is recovered from the cells (supernatant or cells after lysis). General methods for recombinant production of antibodies are well-known in the state of the art and described, for example, in the review articles of Makrides, S. C., Protein Expr. Purif. 17 (1999) 183-202; Geisse, S., et al, Protein Expr. Purif 8 (1996) 271-282; Kaufman, R. J., Mol. Biotechnol 16 (2000) 151-160; Werner, R. G., Drug Res. 48 (1998) 870-880. A method for the preparation of an antibody useful in the invention, comprises the steps of a) transforming a host cell with vectors comprising nucleic acid molecules encoding said antibody; b) culturing the host cell under conditions that allow synthesis of said antibody molecule; and c) recovering said antibody molecule from said culture.

The antibodies are suitably separated from the culture medium by conventional immunoglobulin purification procedures such as, for example, protein A-Sepharose, hydroxylapatite chromatography, gel electrophoresis, dialysis, or affinity chromatography. DNA and RNA encoding the monoclonal antibodies is readily isolated and sequenced using conventional procedures. The hybridoma cells can serve as a source of such DNA and RNA. Once isolated, the DNA may be inserted into expression vectors, which are then transfected into host cells such as HEK 293 cells, CHO cells, or myeloma cells that do not otherwise produce immunoglobulin protein, to obtain the synthesis of recombinant monoclonal antibodies in the host cells.

Amino acid sequence variants (or mutants) of the bispecific antibody are prepared by introducing appropriate nucleotide changes into the antibody DNA, or by nucleotide synthesis. Such modifications can be performed, however, only in a very limited range. For example, the modifications do not alter the above mentioned antibody characteristics such as the IgG isotype and antigen binding, but may improve the yield of the recombinant production, protein stability or facilitate the purification.

The term "host cell" as used in the current application denotes any kind of cellular system which can be engineered to generate the antibodies comprised in the formulation of the current invention. In one embodiment HEK293 cells and CHO cells are used as host cells.

As used herein, the expressions "cell," "cell line," and "cell culture" are used interchangeably and all such designations include progeny. Thus, the words "transformants" and "transformed cells" include the primary subject cell and cultures derived therefrom without regard for the number of transfers. It is also understood that all progeny may not be precisely identical in DNA content, due to deliberate or inadvertent mutations. Variant progeny that have the same function or biological activity as screened for in the originally transformed cell are included.

Expression in NS0 cells is described by, e.g., Barnes, L. M., et al, Cytotechnology 32 (2000) 109-123; Barnes, L. M., et al, Biotech. Bioeng. 73 (2001) 261-270. Transient expression is described by, e.g., Durocher, Y., et al, Nucl. Acids. Res. 30 (2002) E9. Cloning of variable domains is described by Orlandi, R., et al, Proc. Natl. Acad. Sci. USA 86 (1989) 3833-3837; Carter, P., et al, Proc. Natl. Acad. Sci. USA 89 (1992) 4285-4289; and Norderhaug, L., et al, J. Immunol. Methods 204 (1997) 77-87. A preferred transient expression system (HEK 293) is described by Schlaeger, E.-J., and Christensen, K., in Cytotechnology 30 (1999) 71-83 and by Schlaeger, E.-J., in J. Immunol. Methods 194 (1996) 191-199.

The control sequences that are suitable for prokaryotes, for example, include a promoter, optionally an operator sequence, and a ribosome binding site. Eukaryotic cells are known to utilize promoters, enhancers and polyadenylation signals.

A nucleic acid is "operably linked" when it is placed in a functional relationship with another nucleic acid sequence. For example, DNA for a pre-sequence or secretory leader is operably linked to DNA for a polypeptide if it is expressed as a pre-protein that participates in the secretion of the polypeptide; a promoter or enhancer is operably linked to a coding sequence if it affects the transcription of the sequence; or a ribosome binding site is operably linked to a coding sequence if it is positioned so as to facilitate translation. Generally, "operably linked" means that the DNA sequences being linked are contiguous, and, in the case of a secretory leader, contiguous and in reading frame. However, enhancers do not have to be contiguous. Linking is accomplished by ligation at convenient restriction sites. If such sites do not exist, the synthetic oligonucleotide adaptors or linkers are used in accordance with conventional practice.

Purification of antibodies is performed in order to eliminate cellular components or other contaminants, e.g. other cellular nucleic acids or proteins, by standard techniques, including alkaline/SDS treatment, CsCl banding, column chromatography, agarose gel electrophoresis, and others well known in the art. See Ausubel, F., et al, ed. Current Protocols in Molecular Biology, Greene Publishing and Wiley Interscience, New York (1987). Different methods are well established and widespread used for protein purification, such as affinity chromatography with microbial proteins (e.g. protein A or protein G affinity chromatography), ion exchange chromatography (e.g. cation exchange (carboxymethyl resins), anion exchange (amino ethyl resins) and mixed-mode exchange), thiophilic adsorption (e.g. with beta-mercaptoethanol and other SH ligands), hydrophobic interaction or aromatic adsorption chromatography (e.g. with phenyl-sepharose, aza-arenophilic resins, or m-aminophenylboronic acid), metal chelate affinity chromatography (e.g. with Ni(II)- and Cu(II)-affinity material), size exclusion chromatography, and electrophoretical methods (such as gel electrophoresis, capillary electrophoresis) (Vijayalakshmi, M. A., Appl. Biochem. Biotech. 75 (1998) 93-102).

Amino Acid Sequences Disclosed in the Application:

| SEQ ID NO: | Description |
|---|---|
| 1 | heavy chain variable domain CDR3 of <VEGF> |
| 2 | heavy chain variable domain CDR2 of <VEGF> |
| 3 | heavy chain variable domain CDR1 of <VEGF> |
| 4 | light chain variable domain CDR3 of <VEGF> |
| 5 | light chain variable domain CDR2 of <VEGF> |
| 6 | light chain variable domain CDR1 of <VEGF> |
| 7 | heavy chain variable domain CDR3 of <ANG-2> |
| 8 | heavy chain variable domain CDR2 of <ANG-2> |
| 9 | heavy chain variable domain CDR1 of <ANG-2> |
| 10 | light chain variable domain CDR3 of <ANG-2> |
| 11 | light chain variable domain CDR2 of <ANG-2> |
| 12 | light chain variable domain CDR1 of <ANG-2> |
| 13 | heavy chain variable domain (VH) of <VEGF> |
| 14 | light chain variable domain (VL) of <VEGF> |
| 15 | heavy chain variable domain (VH) of <ANG-2> |
| 16 | light chain variable domain (VL) of <ANG-2> |
| 17 | Bispecific anti-VEGF/ANG2 antibody: CrossMAb VEGFang2-0016-<VEGF> light chain |
| 18 | Bispecific anti-VEGF/ANG2 antibody: CrossMAb VEGFang2-0016-<ANG2> light chain |
| 19 | Bispecific anti-VEGF/ANG2 antibody: CrossMAb VEGFang2-0016-<VEGF> heavy chain |
| 20 | Bispecific anti-VEGF/ANG2 antibody: CrossMAb VEGFang2-0016-<ANG2> heavy chain |
| 21 | Exemplary kappa constant light chain region |
| 22 | Exemplary lambda constant light chain region |
| 23 | Exemplary constant heavy chain region of human IgG1 subclass |
| 24 | Human angiopoietin-2 (ANG-2) with leader and His-tag |
| 25 | human vascular endothelial growth factor (VEGF) |

In the following embodiments of the invention are listed:
1. A liquid pharmaceutical formulation comprising:
   20 to 150 mg/ml of a bispecific anti-VEGF/ANG2 antibody comprising a constant heavy chain region of human IgG1 subclass (in one embodiment 30 mg/ml±4.5 mg/ml or 120 mg/ml±18 mg/ml),
   15 to 35 mM of sodium chloride (in one embodiment 25 mM±5 mM; in one embodiment 25 mM±3.75 mM of sodium chloride; in particular, 25 mM±2.5 mM of sodium chloride),
   15 to 25 mM of a histidine acetate buffer (in one embodiment 20 mM±3 mM of a histidine acetate buffer; in one embodiment 20 mM±2 mM of a histidine acetate buffer),
   at a pH of 5.5±0.5 (in one embodiment at a pH of 5.5±0.3; in particular, at a pH of 5.5±0.2);
   wherein the bispecific anti-VEGF/ANG2 antibody is bivalent and comprises a first antigen-binding site that specifically binds to human VEGF and a second antigen-binding site that specifically binds to human ANG-2, wherein
   i) said first antigen-binding site specifically binding to VEGF comprises in the heavy chain variable domain a CDR3H region of SEQ ID NO: 1, a CDR2H region of SEQ ID NO: 2, and a CDR1H region of SEQ ID NO:3, and in the light chain variable domain a CDR3L region of SEQ ID NO: 4, a CDR2L region of SEQ ID NO:5, and a CDR1L region of SEQ ID NO:6; and
   ii) said second antigen-binding site specifically binding to ANG-2 comprises in the heavy chain variable domain a CDR3H region of SEQ ID NO: 9, a CDR2H region of, SEQ ID NO: 10, and a CDR1H region of SEQ ID NO: 11, and in the light chain variable domain a CDR3L region of SEQ ID NO: 12, a CDR2L region of SEQ ID NO: 13, and a CDR1L region of SEQ ID NO: 14, and wherein
   iii) the bispecific antibody comprises a constant heavy chain region of human IgG1 subclass comprising the mutations I253A, H310A, and H435A and the mutations L234A, L235A and P329G (numberings according to EU Index of Kabat.

2. The pharmaceutical formulation according to embodiment 1, wherein the bispecific anti-VEGF/ANG2 antibody is bivalent and comprises a first antigen-binding site that specifically binds to human VEGF and a second antigen-binding site that specifically binds to human ANG-2, wherein
   i) said first antigen-binding site specifically binding to VEGF comprises as heavy chain variable domain VH an amino acid sequence of SEQ ID NO: 7, and as light chain variable domain VL an amino acid sequence of SEQ ID NO: 8, and
   ii) said second antigen-binding site specifically binding to ANG-2 comprises as heavy chain variable domain VH an amino acid sequence of SEQ ID NO: 15, and as light chain variable domain VL an amino acid sequence of SEQ ID NO: 16.

3. The pharmaceutical formulation according to embodiment 2, wherein the bispecific anti-VEGF/ANG2 antibody is bivalent and comprises a first antigen-binding site that specifically binds to human VEGF and a second antigen-binding site that specifically binds to human ANG-2, wherein
   wherein
   iv) in the constant heavy chain region a S354C and T366W mutations are comprised in one CH3 domain and Y349C, T366S, L368A and Y407V mutations are comprised the other CH3 domain (numberings according to EU Index of Kabat).

4. The pharmaceutical formulation according to any one of embodiments 1 to 3, wherein the bispecific anti-VEGF/ANG2 antibody is bivalent and comprises the amino acid sequences of SEQ ID NO: 17, of SEQ ID NO: 18, of SEQ ID NO: 19, and of SEQ ID NO: 20.

5. The pharmaceutical formulation according to any one of embodiments 1 to 3, wherein the bispecific anti-VEGF/ANG2 antibody is faricimab.

6. The pharmaceutical formulation according to embodiment 1, wherein the formulation comprises
120 mg/ml±18 mg/ml of the bispecific anti-VEGF/ANG2 antibody (in particular 120 mg/ml±12 mg/ml of the bispecific anti-VEGF/ANG2 antibody).

7. The pharmaceutical formulation according to any one of claims 1 to 7 for intravitreal administration.

8. The pharmaceutical formulation according to any one of embodiments 1 to 6, wherein the formulation is essentially free of visible particles.

9. The pharmaceutical formulation according to any one of embodiments 1 to 8, wherein the formulation further comprises
1 to 20 mM of at least one stabilizer (in one embodiment selected from sugars, polyols and amino acids).

10. The pharmaceutical formulation according to any one of embodiments 1 to 8, wherein the formulation further comprises
7.0 mM±2.0 mM methionine (in one embodiment 7.0 mM±1.0 mM methionine; in one embodiment 7.0 mM±0.7 mM methionine).

11. The pharmaceutical formulation according to any one of embodiments 1 to 10, wherein the formulation further comprises
0.01-0.07% of a surfactant (in one embodiment selected from polysorbate 20, polysorbate 80, or poloxamer).

12. The pharmaceutical formulation according to any one of embodiments 1 to 10, wherein the formulation further comprises
0.04% (w/v)±0.02 (w/v) polysorbate 20 (in one embodiment 0.03% (w/v) to 0.07% (w/v)); in one embodiment 0.04% (w/v)±0.01 (w/v); in one embodiment about 0.04% (w/v))

13. The pharmaceutical formulation according to any one of embodiments 1 to 12, wherein the formulation further comprises
50-250 mM of a tonicity agent (in one embodiment selected from the tonicity agent is selected from sucrose, trehalose, and sorbitol).

14. The pharmaceutical formulation according to any one of embodiments 1 to 12, wherein the formulation further comprises
160 mM±24 mM sucrose (in one embodiment 160 mM±16 mM; in one embodiment about 160 mM).

15. The pharmaceutical formulation according to any one of embodiments 1 to 14, wherein the formulation has a viscosity of 20 mPas or less (in one embodiment 17 mPas or less; in one embodiment 16 mPas or less, in one embodiment about 15 mPas or less; in one embodiment 15 mPas or less).

16. The pharmaceutical formulation according to any one of embodiments 1 to 15, wherein the formulation has a turbidity of 30 FTU or less (in one embodiment 27 FTU or less; in one embodiment 26 FTU or less; in one embodiment about 25 FTU or less; in one embodiment 25 FTU or less).

17. The pharmaceutical formulation according to any one of embodiments 1 to 16, wherein the formulation has an ionic strength between 20 and 50 (in one embodiment an ionic strength between 30 and 50 (in one embodiment an ionic strength between 30 and 45; in one embodiment an ionic strength of 30±10).

18. The pharmaceutical formulation according to any one of embodiments 1 to 17 for intravitreal administration wherein the formulation is essentially free of calcium chloride (or does not comprise calcium chloride).

19. The pharmaceutical formulation according to any one of embodiments 1 to 17 for intravitreal administration wherein the formulation is essentially free of arginine (or does not comprise arginine).

20. The pharmaceutical formulation according to any one of embodiments 1 to 17 for intravitreal administration wherein the formulation is essentially free of arginine and calcium chloride (or does not comprise arginine and calcium chloride).

21. The pharmaceutical formulation according to any one of embodiments 1 to 5 and 7 to 20, wherein the formulation comprises or consists (at least) of the following components
20 to 150 mg/ml of the bispecific anti-VEGF/ANG2 antibody (in one embodiment 30 mg/ml±4.5 mg/ml or 120 mg/ml±18 mg/ml, in particular 120 mg/ml±12 mg/ml);
15 to 35 mM of sodium chloride (in one embodiment 25 mM±5 mM; in one embodiment 25 mM±3.75 mM of sodium chloride; in particular, 25 mM±2.5 mM of sodium chloride);
15 to 25 mM of histidine acetate buffer (in one embodiment 20 mM±3 mM of a histidine acetate buffer; in one embodiment 20 mM±2 mM of a histidine acetate buffer);
7.0 mM±2.0 mM methionine (in one embodiment 7.0 mM±1.0 mM methionine; in one embodiment 7.0 mM±0.7 mM methionine)
0.03% (w/v) to 0.07% (w/v) polysorbate 20 (in one embodiment 0.04% (w/v)±0.02 (w/v); in one embodiment 0.04% (w/v)±0.01 (w/v); in one embodiment about 0.04% (w/v));
160 mM±24 mM sucrose (in one embodiment 160 mM±16 mM; in one embodiment about 160 mM);
water (for (ophthalmologic) injections);
at a pH of 5.5±0.5 (in one embodiment at a pH of 5.5±0.3; in particular, at a pH of 5.5±0.2);

22. The pharmaceutical formulation according to any one of embodiments 1 to 21, wherein formulation is a stable formulation.

23. The pharmaceutical formulation according to any one of embodiments 1 to 21, wherein the high molecular weight species (HMW) content of the bispecific antibody in the pharmaceutical formulation is below 10% after 8 weeks at 25° C. or after 52 weeks at 25° C. (in one embodiment below 5%).

24. The pharmaceutical formulation according to any one of embodiments 1 to 21, wherein the main peak of the bispecific antibody in the pharmaceutical formulation is more than 50% and the high molecular weight species (HMW) content of the bispecific antibody in the pharmaceutical formulation is below 10% after 2 years at 2-8° C. (or after 3 years at 2-8° C.) (the main peak of the bispecific antibody in the pharmaceutical formulation is more than 55% and the high molecular weight species (HMW) content of the bispecific antibody in the pharmaceutical formulation is below 7% after 2 years at 2-8° C. (or after 3 years at 2-8° C.)).

25. The pharmaceutical formulation according to any one of embodiments 1 to 24, wherein the osmolality of the formulation is 300±100 mOsm/kg (in one embodiment 300±50 mOsm/kg).
26. The pharmaceutical formulation according to any one of embodiments 1 to 25 for use in the treatment of an ocular vascular disease.
27. The pharmaceutical formulation for use according to embodiment 26, wherein the ocular vascular diseases is selected from the group consisting of diabetic retinopathy (DR), diabetic macular edema (DME), retinal vein occlusion (RVO), central retinal vein occlusion (CRVO), macular degeneration, wet age-related macular degeneration (wet AMD), retinopathy of prematurity (ROP), neovascular glaucoma, retinitis pigmentosa (RP), retinal angiomatous proliferation, macular telangiectasia, ischemic retinopathy, iris neovascularization, intraocular neovascularization, corneal neovascularization, retinal neovascularization, choroidal neovascularization, and retinal degeneration, in particular from the group consisting of diabetic retinopathy (DR), diabetic macular edema (DME), retinal vein occlusion (RVO), central retinal vein occlusion (CRVO), wet age-related macular degeneration (wet AMD).
28. The pharmaceutical formulation for use according to embodiment 26, wherein the ocular vascular disease is diabetic retinopathy.
29. The pharmaceutical formulation for use according to embodiment 26, wherein the ocular vascular disease is diabetic macular edema (DME).
30. The pharmaceutical formulation for use according to embodiment 26, wherein the ocular vascular disease is retinal vein occlusion (RVO).
31. The pharmaceutical formulation for use according to embodiment 26, wherein the retinal vein occlusion is central retinal vein occlusion (CRVO).
32. The pharmaceutical formulation for use according to embodiment 26, wherein the ocular vascular disease is macular degeneration.
33. The pharmaceutical formulation for use according to embodiment 26, wherein the macular degeneration is age-related macular degeneration (AMD).
34. The pharmaceutical formulation for use according to embodiment 26, wherein the macular degeneration is wet age-related macular degeneration (wAMD) (also called neovascular age-related macular degeneration (nAMD).
35. The pharmaceutical formulation for use according to embodiment 26, wherein the ocular vascular disease is choroidal neovascularization.
36. A method for the preparation of the pharmaceutical formulation of any one of embodiments 1 to 25 the method comprising the steps of
buffer exchange of the bispecific antibody bulk solution a) against a diafiltration buffer by ultra-filtration and diafiltration or b) by dialysis using a dialysis buffer, the buffers containing a histidine-acetate buffer or a histidine-acetate buffer and sodium chloride, or a histidine-acetate buffer, sodium chloride and methionine, or a histidine-acetate buffer, sodium chloride, methionine and sucrose
concentration of the buffer exchanged bulk solution by ultrafiltration
adjustment of the final composition of the pharmaceutical formulation by addition of stock solutions of the respective excipients or by an appropriate conditioning buffer and homogenization of the liquid pharmaceutical formulation is homogenized by mixing.
37. A vial comprising the pharmaceutical formulation of any one of embodiments 1 to 25.
38. A prefilled syringe comprising the pharmaceutical formulation of any one of embodiments 1 to 25.
39. A lyophilised form of the liquid pharmaceutical formulation of any one of embodiments 1 to 25.

EXAMPLES

Liquid drug product pharmaceutical formulations for intravitreal (IVT) administration according to the invention were developed as follows.

Example 1: Materials and Methods

The bispecific anti-VEGF/ANG2 antibody CrossMAb VEGFang2-0016 (faricimab) prepared and purified as described in WO2014/009465 was provided for further experimentation initially at a concentration of approximately 130 to 140 mg/mL in a 20 mM histidine-HCl buffer at pH 5.5.

A summary of materials (including supplier) used during the preparation of the formulations and their primary packaging is given in table 1 and table 2

TABLE 1

Chemicals used for formulations

| Chemical | Supplier |
| --- | --- |
| L-Histidine free Base | Ajinomoto |
| L-Histidine-HCl Monohydrate | Ajinomoto |
| Sodium-Acetate-Trihydrate | Merck |
| Glacial Acetic Acid | Wacker Chemie |
| Sodium Chloride | Merck |
| Calcium chloride Dihydrate ($CaCl_2$) | Applichem |
| Sucrose | FPS |
| Methionine | Ajinomoto |
| Polysorbate 20 | Croda |
| Poloxamer | BASF |

TABLE 2

Primary Packaging

| Designation | Supplier |
| --- | --- |
| 6 ml vials, colorless, 20 mm | Schott |
| teflonized serum-stoppers D777-1, 20 mm | Daikyo |
| Aluminum caps with PP-cap, 20 mm | Helvoet (Datwyler) |
| 2 ml vials, colorless, 13 mm | Schott |
| teflonized serum-stoppers D777-1, 13 mm | Daikyo |
| Aluminum caps with PP-cap, 13 mm | Helvoet (Datwyler) |
| 1.0 mL prefillable syringe (PFS) | Gerresheimer Buende |
| 1.0 mL PFS plunger stopper | West |
| 0.5 mL prefillable syringe (PFS) | Nuova Ompi |
| 0.5 mL PFS plunger stopper | West |

Container Closure System

Colorless 2-mL or 6-mL glass vial (type 1 glass) closed by means of a rubber stopper (D 777-1, 13 mm) and an aluminium overseal with flip-off cap.

Colorless 1.0-mL pre-fillable syringe (type 1 glass) with luer cone closed by means of Gerresheimer Buende TELC tip cap and West 4023/50 plunger stopper.

Colorless 0.5-mL pre-fillable syringe (type 1 glass) with luer cone closed by means of Vetter OVS tip cap and West 4023/50 plunger stopper. The Vetter OVS Tip cap consists of the West 4023/50 elastomer.

Size Exclusion Chromatography (SE-HPLC)

Size Exclusion Chromatography (SEC) was used to detect soluble high molecular weight species (aggregates) and low molecular weight hydrolysis products (LMW) in the formulations. The method was performed with a TSK-Gel® G3000SWXL, 7.8×300 mm, 5 μm (Tosoh Bioscience, Cat. no. 08541) or BioSuite 250, 7.8×300 mm, or 5 μm (Waters, Cat. no. 186002165). Intact monomer, aggregates and fragments were separated by an isocratic elution profile, using 0.2 M Potassium phosphate, 0.25 M KCl, pH 7.0 as mobile phase, and were detected at a wavelength of 280 nm.

Ion Exchange Chromatography (IE-HPLC))

Ion Exchange Chromatography (IEC) was performed to detect chemical degradation products altering the net charge of the test antibody in the formulations. The method was performed with a YMC BioPro SP-F, 100×4.6 mm, 5 μm column (YMC, catalogue number SF00S05-1046WP). 20 mM BES (N,N-bis[2-hydroxyethyl]-2-aminoethanesulfonic acid), pH 6.8 was used as eluent A and 20 mM BES, 488 mM NaCl, pH 6.8 as eluent B, respectively, at a flow rate of 0.8 ml/min. The samples were dilute with eluent A to 3 mg/mL before injecting onto the column.

Gradient Program:

| Time (mm) | % Mobile Phase A | % Mobile Phase B |
|---|---|---|
| 0 | 98 | 2 |
| 5 | 98 | 2 |
| 35 | 85 | 15 |
| 35.1 | 0 | 100 |
| 40 | 0 | 100 |
| 40.1 | 98 | 2 |
| 50 | 98 | 2 |

Turbidity (in FTU (=Formazine Turbidity Unit))

The turbidity of the formulation samples was measured on a Hach 2100 AN turbidimeter according to Ph. Eur. 2.2.1 (Clarity and degree of opalescence of Liquids). A sample volume of approximately 2 mL sample solution is transferred into a 11 mm inner diameter glass cuvette and m. The glass cuvette is placed into the turbidimeter and the turbidity is measured against a calibration curve of the reference suspensions 1 FTU, 3 FTU, 10 FTU, 20 FTU and 100 FTU.

Viscosity (in mPa)

The viscosity of the formulation samples was measured on an Anton Paar Physica MCR 301 rotational rheometer with a 25 mm-0.5° cone at a shear rate of 1000 s$^{-1}$ and a temperature of 20° C.

Visible Particles

The vial samples were visually inspected on a Seidenader inspection machine V90-T with help of a 2× magnifier lens. The illuminating light sources L1, L2 and L3 were adjusted to setting 5. The vial samples were inspected during a rotational movement for the presence of particles.

Protein Concentration (in mg/ml).

The protein concentration of the formulation samples was measured by ultraviolet (UV) light absorption on an UV/Vis Photometer Lambda™ 35 from Perkin Elmer. The formulation samples were diluted with a 20 mM L-histidine-acetate buffer solution pH 5.5 to a protein concentration of approximately 0.5 mg/mL and filled into a measurement cuvette with a thickness of 1 cm. The UV absorption of the measurement cuvette was measured at wavelengths at 280 and 320 nm.

The protein concentration was calculated from the measured UV light absorptions at 280 (A280) and 320 nm (A320), the extinction coefficient (E) of 1.70 mL/(mg×cm), the thickness (d) of 1 cm and dilution factor (DF) corresponding to the actual dilution according to the following equation:

$$\text{Protein concentration in mg/mL} = \frac{(A280 - A320)}{(E \times d)} \times DF$$

Osmolality

The osmolality of the formulation samples was measured on an Osmomat® 030 3P osmometer from Gonotec® according to the principle of freezing point depression.

pH

The pH of the formulations samples was determined by potentiometry with a glass electrode.

Example 2: pH/Buffer Screen I

Setup

The scope of the pH/buffer screen was to select the optimal pH and buffer for the commercial formulation of anti-VEGF/ANG2 antibody and to select a formulation with a low viscosity, a reduced turbidity and a good stability behavior resulting in a low formation of soluble aggregates and charged variants.

The first part of the pH/buffer screen included the three buffer systems L-histidine/L-histidine-HCl(His/His-HCl), L-histidine-acetate (His/Acetate) and sodium acetate (Na/acetate), a pH range between 5.3 and 6.5, buffer strength ranges between 7 and 300 mM and an ionic strength range between 5 and 86. The setup of the active formulations is shown in table 3.

TABLE 3

Formulation codes: ph/buffer screen part I

| Form. Code | Buffer system | pH | Buffer Concentration (mM) | Ionic strength | Protein (mg/ml) | Fill volume (ml) | Dosage form |
|---|---|---|---|---|---|---|---|
| F1 | His/His-HCl | 5.3 | 7 | 5 | 120 | 2.7 | 6 mL vial |
| F2 | | 5.9 | 75 | 45.5 | 120 | 2.7 | 6 mL vial |
| F3 | | 6.5 | 300 | 86 | 120 | 2.7 | 6 mL vial |
| F4 | His/Acetate | 5.3 | 102 | 86 | 120 | 2.7 | 6 mL vial |
| F5 | | 5.9 | 10 | 5 | 120 | 2.7 | 6 mL vial |
| F6 | | 6.5 | 180 | 45.5 | 120 | 2.7 | 6 mL vial |
| F7 | Na/Acetate | 5.3 | 58 | 45.5 | 120 | 2.7 | 6 mL vial |
| F8 | | 5.9 | 91 | 86 | 120 | 2.7 | 6 mL vial |
| F9 | | 6.2 | 6 | 5 | 120 | 2.7 | 6 mL vial |
| F10 | His/His-HCl | 5.3 | 100 | 86 | 120 | 2.7 | 6 mL vial |
| F11 | | 5.9 | 10 | 5 | 120 | 2.7 | 6 mL vial |
| F12 | | 6.5 | 165 | 45.5 | 120 | 2.7 | 6 mL vial |
| F13 | His/Acetate | 5.3 | 53 | 45.5 | 120 | 2.7 | 6 mL vial |
| F14 | | 5.9 | 150 | 86 | 120 | 2.7 | 6 mL vial |
| F15 | | 6.5 | 20 | 5 | 120 | 2.7 | 6 mL vial |

TABLE 3-continued

Formulation codes: ph/buffer screen part I

| Form. Code | Buffer system | pH | Buffer Concentration (mM) | Ionic strength | Protein (mg/ml) | Fill volume (ml) | Dosage form |
|---|---|---|---|---|---|---|---|
| F16 | Na/Acetate | 5.3 | 7 | 5 | 120 | 2.7 | 6 mL vial |
| F17 | | 5.9 | 49 | 45.5 | 120 | 2.7 | 6 mL vial |
| F18 | | 6.2 | 89 | 86 | 120 | 2.7 | 6 mL vial |
| F19 | His/His-HCl | 5.9 | 75 | 45.5 | 120 | 2.7 | 6 mL vial |
| F20 | | 5.9 | 75 | 45.5 | 120 | 2.7 | 6 mL vial |

Material and Methods

A summary of materials used during the preparation of the formulations and their primary packaging is given Table 1 and Table 2.

The drug substance was buffer exchanged by dialysis using a Slide-A-Lyzer™ G2 (Thermo Scientific) with a 10 kD molecular weight cut-off against the buffer systems as listed in Table 3. Thereby, 42 mL of drug substance was filled into the dialysis device and buffer exchanged against three times 5 L of dialysis buffer.

Optionally, if the protein concentration was below 120 mg/mL after dialysis, the drug substance was concentrated by centrifugation using an Amicon® Ultra 15, Ultracel 10K (Millipore) device (20° C., 4000 rpm).

Afterwards, the dialyzed and optionally concentrated drug substance was diluted with the respective dialysis buffer to a target protein concentration of 120 mg/mL, resulting the final drug product solution.

Each drug product solution was filtered through a 0.22 µm Sterivex GV (Millipore) filter and is filled into clean and sterile 6 mL vials with a fill volume of 2.7 mL. The vials were stoppered and crimped.

Analytical Methods

The analytical test methods turbidity and viscosity are described in example 1.

Results

Figure 1B:
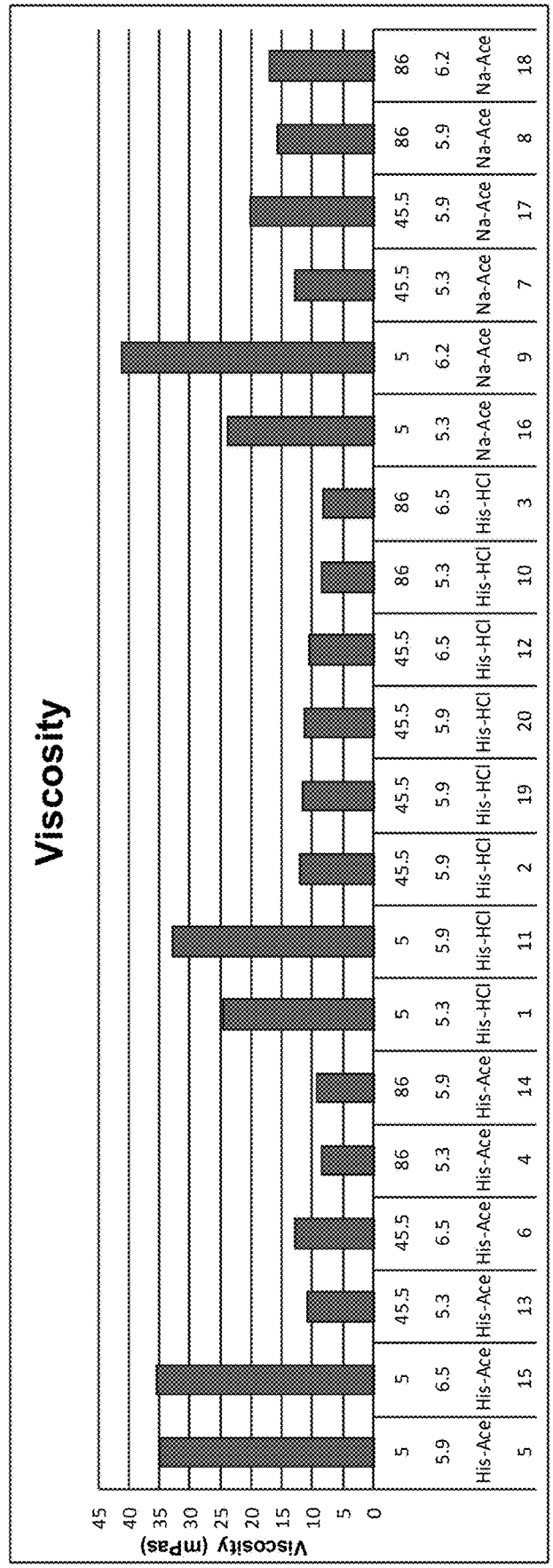
FIG. 1B Viscosity results of formulations from the pH/buffer screen part I.

FIG. 1 compares the turbidity and the viscosity results of the formulations from the pH/buffer screen I.

In general, formulations with high ionic strength (e.g. 4, 14, 10, 3, 8 and 18) show a high turbidity (above 30 FTU) and a low viscosity (approximately 10 mPas). Instead, formulations with a low ionic strength have a high viscosity (approximately 25 to 40 mPas) and a low turbidity (below 10 FTU). Surprisingly, formulations with the buffer system histidine-acetate (13, 6, 4, 14) could be identified with low viscosities of approximately 10 mPas and a turbidity of less than 25 FTU.

Conclusion

Formulations from the pH/buffer screen I were measured for viscosity and turbidity. Surprisingly, formulations of the histidine-acetate buffer system and with an ionic strength of 45.5 or higher showed low viscosity and reduced turbidity values.

Example 3: pH/Buffer Screen II

Set-up

The scope of the pH/buffer screen was to select the optimal pH and buffer for the formulation of anti-VEGF/ANG2 antibody CrossMAb VEGFang2-0016 (faricimab) anti-VEGF/ANG2 antibody and to select a formulation with a low viscosity, a reduced turbidity and a good stability behavior resulting in a low formation of soluble aggregates and charged variants.

The second part of the pH/buffer screen was designed based on the outcome of the pH/buffer screen I and included the buffer system L-histidine-acetate (His/Acetate), a pH range between 5.5 and 6.0 with a buffer strength range between 14 and 59 mM. The ionic strength of the formulations was modified either by increasing the buffer strength or by addition of sodium chloride (NaCl) or Calcium chloride (CaCl$_2$) resulting in ionic strength range between 10 and 50. The setup of the active formulations is shown in table 4.

TABLE 4

Formulation codes: ph/buffer screen part II

| Form. Code (= sample no) | Buffer system | Buffer Concentration (mM) | pH | Salt | Salt concentration (mM) | Ionic strength | Protein (mg/ml) | Fill volume (ml) | Dosage form |
|---|---|---|---|---|---|---|---|---|---|
| GRM0069-01 = 01 | His-Acetate | 14 | 5.5 | — | — | 10 | 120 | 2.7 | 6-mL vial |
| GRM0069-02 = 02 | His-Acetate | 39 | 5.5 | — | — | 30 | 120 | 2.7 | 6-mL vial |
| GRM0069-03 = 03 | His-Acetate | 14 | 5.5 | NaCl | 20 | 30 | 120 | 2.7 | 6-mL vial |
| GRM0069-04 = 04 | His-Acetate | 14 | 5.5 | CaCl$_2$ | 6.7 | 30 | 120 | 2.7 | 6-mL vial |
| GRM069-05 = 05 | His-Acetate | 14 | 5.5 | NaCl | 40 | 50 | 120 | 2.7 | 6-mL vial |
| GRM0069-06 = 06 | His-Acetate | 14 | 5.5 | CaCl$_2$ | 13.3 | 50 | 120 | 2.7 | 6-mL vial |
| GRM0069-07 = 07 | His-Acetate | 20 | 6.0 | — | — | 10 | 120 | 2.7 | 6-mL vial |
| GRM0069-08 = 08 | His-Acetate | 59 | 6.0 | — | — | 30 | 120 | 2.7 | 6-mL vial |
| GRM0069-09 = 09 | His-Acetate | 20 | 6.0 | NaCl | 20 | 30 | 120 | 2.7 | 6-mL vial |
| GRM0069-10 = 10 | His-Acetate | 20 | 6.0 | CaCl$_2$ | 6.7 | 30 | 120 | 2.7 | 6-mL vial |

TABLE 4-continued

Formulation codes: ph/buffer screen part II

| Form. Code (= -sample no) | Buffer system | Buffer Concentration (mM) | pH | Salt | Salt concentration (mM) | Ionic strength | Protein (mg/ml) | Fill volume (ml) | Dosage form |
|---|---|---|---|---|---|---|---|---|---|
| GRM0069-11 = 11 | His-Acetate | 20 | 6.0 | NaCl | 40 | 50 | 120 | 2.7 | 6-mL vial |
| GRM0069-12 = 12 | His-Acetate | 20 | 6.0 | $CaCl_2$ | 13.3 | 50 | 120 | 2.7 | 6-mL vial |

Material and Methods

A summary of materials used during the preparation of the formulations and their primary packaging is given Table 1 and Table 2.

The drug substance was buffer exchanged by ultrafiltration-diafiltration using a Labscale TTF (Millipore) with a 30 kD molecular weight cut-off semi-permeable membrane against the buffer systems as listed in Table 4. Thereby, 120 mL of drug substance was filled into the Labscale system and buffer exchanged against 1050 mL of diafiltration buffer.

After buffer-exchange the drug substance was concentrated in the Labscale system to a protein concentration of approximately 150 mg/mL.

Afterwards, the concentrated drug substance was diluted with stock solutions of respective buffer and salt solutions to a target protein concentration of 120 mg/mL, resulting the final drug product solution according to table 4.

Each drug product solution was filtered through a 0.22 μm Sterivex GV (Millipore) filter and is filled into clean and sterile 6 mL vials with a fill volume of 2.7 mL. The vials were stoppered and crimped.

Analytical Methods

The analytical test methods turbidity, viscosity and SE-HPLC are described in example I.

Stability Program

The formulations were kept on stability at 2-8° C. and 25 for 8 weeks. Samples were drawn and analyzed at start of the stability study and after 8 weeks' storage.

Results

FIG. 2 compares the turbidity and viscosity results of the second part of the pH/buffer screen. In general, turbidity is increasing with increasing ionic strength and with a pH of 6.0 in comparison to a pH of 5.5. In addition, the presence of sodium chloride leads also to a higher turbidity. A pH of 5.5 also reduces the viscosity in comparison to a pH of 6. Furthermore, an ionic strength of at least 30 helps to reduce the viscosity to a level of approximately 15 mPas. When comparing the effect of the different salts on viscosity, calcium chloride or a higher buffer strength are more efficient to reduce viscosity than sodium chloride.

Considering both goals, reducing turbidity and viscosity, a formulation with an ionic strength of at least 30 and a pH of 5.5 shows a reduced turbidity level of approximately 20 FTU and a viscosity around 15 mPas.

FIG. 3 compares the aggregate levels (HMWS) of the pH/buffer screen II formulations at start (=0) with the levels after 8 weeks at 5° C. and 25° C. In general, the HMW levels increase with increasing ionic strength. Comparing the effect of the different salts, a high buffer strength or the presence of sodium chloride leads to a lower increase of aggregates than the presence of sodium chloride. A lower pH of 5.5 has a small impact on reducing the aggregate formation.

Conclusion

A formulation with a pH of 5.5 and an ionic strength of 30 provides an optimum with reduced turbidity, low viscosity and reduced aggregate formation. The ionic strength can be adjusted with a higher buffer strength, or the addition of the salts sodium chloride and calcium chloride. In general, a higher buffer strength or the presence of calcium chloride show a preferred turbidity and viscosity behavior.

Example 4: Surfactant Screen

Set-up

The scope of the surfactant screen is to select the optimal surfactant type and the surfactant concentration for the formulation of anti-VEGF/ANG2 antibody CrossMAb VEGFang2-0016 (faricimab).

A formulation matrix of 120 mg/mL VEGF/Ang-2 antibody, 20 mM L-histidine-acetate buffer at pH 5.5, 25 mM sodium chloride and 180 mM sucrose based on the outcome of the pH/buffer screens I and II and to enable an isotonic formulation with a target osmolality of 300±50 mOsm/kg.

The surfactant screen tested the stabilizing effect of the surfactants polysorbate 20 and poloxamer 188 at different surfactant concentrations between 0.01 and 0.07% on the Vegf-Ang2 antibody. In addition, a surfactant-free formulation was tested.

Table 5 summarizes the test formulations of the surfactant screen.

TABLE 5

Formulation codes for the surfactant screen

| Form. Code (= -sample no) | Formulation matrix | Ionic strength | Target Osmolality (mOsm/kg) | Surfactant | Surfactant concentration (%) | Fill volume (ml) | Dosage form |
|---|---|---|---|---|---|---|---|
| GRM0071-01 | 120 mg/mL Vegf-Ang2 antibody 20 mM | 40 | 311 | — | 0 | 2.7 | 6-mL vial |
| GRM0071-02 | | | | Polysorbate 20 | 0.01 | 2.7 | 6-mL vial |

TABLE 5-continued

Formulation codes for the surfactant screen

| Form. Code (=-sample no) | Formulation matrix | Ionic strength | Target Osmolality (mOsm/kg) | Surfactant | Surfactant concentration (%) | Fill volume (ml) | Dosage form |
|---|---|---|---|---|---|---|---|
| GRM0071-03 | His-Acetate pH 5.5, | | | Polysorbate 20 | 0.03 | 2.7 | 6-mL vial |
| GRM0071-04 | 25 mM NaCl | | | Polysorbate 20 | 0.05 | 2.7 | 6-mL vial |
| GRM0071-05 | 180 mM sucrose | | | Polysorbate 20 | 0.07 | 2.7 | 6-mL vial |
| GRM0071-06 | | | | Poloxamer | 0.01 | 2.7 | 6-mL vial |
| GRM0071-07 | | | | Poloxamer | 0.03 | 2.7 | 6-mL vial |
| GRM0071-08 | | | | Poloxamer | 0.05 | 2.7 | 6-mL vial |
| GRM0071-09 | | | | Poloxamer | 0.07 | 2.7 | 6-mL vial |

Material and Methods

A summary of materials used during the preparation of the formulations and their primary packaging is given Table 1 and Table 2.

The drug substance was buffer exchanged by ultrafiltration-diafiltration using a Labscale TTF (Millipore) with a 30 kD molecular weight cut-off semi-permeable membrane against the 20 mM histidine-acetate pH 5.3 diafiltration buffer. Thereby, 250 mL of drug substance was filled into the Labscale system and buffer exchanged against 1700 mL of diafiltration buffer.

After buffer-exchange the drug substance was concentrated in the Labscale system to a protein concentration of approximately 170 mg/mL and a pH of approximately 5.5.

Afterwards, the concentrated drug substance was diluted with stock solutions of respective buffer and salt solutions to a target protein concentration of 120 mg/mL, resulting the final drug product solution according to table 5.

Each drug product solution was filtered through a 0.22 µm Sterivex GV (Millipore) filter and is filled into clean and sterile 6 mL vials with a fill volume of 2.7 mL. The vials were stoppered and crimped.

Analytical Methods

The analytical test methods protein concentration, pH, osmolality, turbidity, viscosity, visible particles and SE-HPLC are described in example I.

Stability Program

During the surfactant screen mechanical stress test conditions of 1-week horizontal shaking at 2-8° C. (200 rpm), 1 week horizontal shaking at 25° C. (200 rpm) and 5 cycles Freeze/Thaw (−40° C./5° C.) were applied.

Results

Table 6 summarizes the initial results of the surfactant screen samples. All formulations had a protein concentration of approximately 120 mg/mL and a pH of 5.5±0.1. The measured osmolality was between 335 and 350 mOsm/kg and thereby slightly higher than the target of 311 mOsm/kg. The selected formulation matrix of 120 mg/mL Vegf-Ang2 with a 20 mM histidine-acetate buffer at pH 5.5 plus 25 mM sodium chloride and 180 mM sucrose resulted in low viscosities of approximately 15 mPas and reduced turbidity of 20 FTU.

The surfactant screen formulations were exposed to shaking stress at 5° C. and 25° C. and freeze-thaw stress (five freeze-thaw cycles) and were analyzed for visible particles and soluble aggregates (HMWS).

Table 7 summarizes the visible particles results at initial and after physical stresses. All formulation samples were free of particles at initial. After exposing to the different physical stresses, the formulation GRM0071-01 without surfactant showed always many particles. The addition of at least 0.01% polysorbate 20 prevented the formation of visible particles during exposure to the three physical stress methods.

Surprisingly, the addition of poloxamer could not prevent the formation of visible particles after exposure to 1 week shaking at 5° C., whereas it was able to protect the protein against shaking at 25° C. and freeze-thaw stress.

FIG. 4 shows the soluble aggregate levels (HMWS) of the initial samples and the stressed samples. The formulation GRM0071-01 (1) without surfactant was sensitive to shaking stress and showed increased aggregate levels up to 10% after 1 week shaking at 5° C. and 25° C. The presence of 0.01% polysorbate 20 was not sufficient to fully prevent the increase of soluble aggregates after 1 week shaking at 25° C. as the aggregate level increased from 3 to 3.8%. Surprisingly, a polysorbate 20 level of equal or higher than 0.03% was required to prevent an increase of soluble aggregates after 1 week shaking at 25° C.

TABLE 6

Summary on protein concentration, pH, osmolality, turbidity and viscosity results of the surfactant screen samples after manufacturing

| Form. Code (=-sample no) | Protein concentration (mg/mL) | pH | Osmolality (mOsm/kg) | Turbidity (FTU) | Viscosity (mPas) |
|---|---|---|---|---|---|
| GRM0071-01 | 121 | 5.6 | 341 | 22.9 | 15 |
| GRM0071-02 | 118 | 5.6 | 344 | 20.4 | 14 |
| GRM0071-03 | 121 | 5.6 | 337 | 20 | 14 |
| GRM0071-04 | 124 | 5.5 | 341 | 20.1 | 14 |
| GRM0071-05 | 121 | 5.5 | 341 | 20.3 | 14 |
| GRM0071-06 | 121 | 5.5 | 347 | 20.5 | 14 |
| GRM0071-07 | 120 | 5.6 | 340 | 20.1 | 15 |
| GRM0071-08 | 121 | 5.5 | 350 | 21 | 15 |
| GRM0071-09 | 122 | 5.5 | 346 | 20.8 | 15 |

TABLE 7

Summary on visible particle results of initial and physically stressed surfactant screen samples

| Form. Code (=-sample no) | Surfactant | Initial | after 1 week shaking at 5° C. | after 1 week shaking at 25° C. | after 5 freeze/thaw cycles |
|---|---|---|---|---|---|
| GRM0071-01 | none | free of particles | with many particles | with many particles | with many particles |
| GRM0071-02 | 0.01% Polysorbate 20 | free of particles | free of particles | free of particles | free of particles |
| GRM0071-03 | 0.03% Polysorbate 20 | free of particles | free of particles | free of particles | free of particles |
| GRM0071-04 | 0.05% Polysorbate 20 | free of particles | free of particles | free of particles | free of particles |
| GRM0071-05 | 0.07% Polysorbate 20 | free of particles | free of particles | free of particles | free of particles |
| GRM0071-06 | 0.01% Poloxamer | free of particles | with many particles | free of particles | free of particles |
| GRM0071-07 | 0.03% Poloxamer | free of particles | with many particles | free of particles | free of particles |
| GRM0071-08 | 0.05% Poloxamer | free of particles | with many particles | free of particles | free of particles |
| GRM0071-09 | 0.07% Poloxamer | free of particles | with many particles | free of particles | free of particles |

Conclusion

The addition of at least 0.03% polysorbate 20 is required to fully stabilize anti-VEGF/ANG2 antibody at a concentration of 120 mg/mL against shaking and freeze-thaw stress.

The surfactant poloxamer is not able to protect the bispecific anti-VEGF/ANG2 antibody at a concentration of 120 mg/mL against shaking stress at 5° C.

The formulation matrix with 20 mM histidine-acetate buffer at pH 5.5, 25 mM sodium chloride and 180 mM sucrose provides acceptable turbidity (approximately 20 FTU) and viscosity results (approximately 15 mPas) for a 120 mg/mL anti-VEGF/ANG2 antibody formulation.

Example 5: Excipient Screen I

Set-up

The scope of the excipient screen is to select the final composition for the commercial formulation of the anti-VEGF/ANG2 antibody CrossMAb VEGFang2-0016 (faricimab).

Based on the outcome of the previous pH/buffer screens I and II and the surfactant screen, a formulation matrix was selected which consisted of 120 mg/mL Vegf-Ang2 antibody, a 20 mM histidine acetate buffer system, 160 mM sucrose and 0.04% polysorbate 20. In the formulation matrix the effect of pH (5.5 versus 5.8), salt (25 mM sodium chloride versus 8 mM calcium chloride) and methionine (0 versus 7 mM) was tested. The ionic strength was adjusted to 40 based on the contribution from the buffer and salt concentration.

Table 8 summarizes the formulations of the excipient screen I.

TABLE 8

Formulation codes for the excipient screen part I

| Form. Code (= -sample no) | Protein concentration | pH/ buffer | Salt | Methionine (mM) | Sucrose | Polysorbate 20 | Fill volume | Dosage Form |
|---|---|---|---|---|---|---|---|---|
| GRM0073-01 | 120 mg/mL | 20 mM Histidine-acetate pH 5.5 | 25 mM NaCl | 0 | 160 mM | 0.04% | 2.7 mL | 6-mL vial |
| GRM0073-02 | | | | 7 | | | | |
| GRM0073-03 | | | 8 mM CaCl$_2$ | 0 | | | | |
| GRM0073-04 | | | | 7 | | | | |
| GRM0073-05 | | 20 mM Histidine-acetate pH 5.8 | 25 mM NaCl | 0 | | | | |
| GRM0073-06Tab | | | | 7 | | | | |
| GRM0073-07 | | | 8 mM CaCl$_2$ | 0 | | | | |
| GRM0073-08 | | | | 7 | | | | |

Material and Methods

A summary of materials used during the preparation of the formulations and their primary packaging is given Table 1 and Table 2.

The drug substance was buffer exchanged by ultrafiltration-diafiltration using a Labscale TTF (Millipore) with a 30 kD molecular weight cut-off semi-permeable membrane against either 20 mM histidine-acetate pH 5.3 diafiltration buffer or 20 mM histidine-acetate pH 5.6. Thereby, 410 mL of drug substance was filled into the Labscale system and buffer exchanged against 3000 mL of diafiltration buffer.

After buffer-exchange the drug substance was concentrated in the Labscale system to a protein concentration of approximately 165 mg/mL and a pH of either approximately 5.5 or pH 5.8.

Afterwards, the concentrated drug substance was diluted with stock solutions of respective buffer and salt solutions to a target protein concentration of 120 mg/mL, resulting the final drug product solution according to table 8.

Each drug product solution was filtered through a 0.22 µm Sterivex GV (Millipore) filter and was filled into clean and sterile 6 mL vials with a fill volume of 2.7 mL. The vials were stoppered and crimped.

Analytical Methods

The analytical test methods protein concentration, pH, osmolality, turbidity, viscosity, visible particles, SE-HPLC and IE-HPLC are described in example I.

Stability Program

The formulations were kept on stability at 2-8° C. for up to 20 weeks and at 25° C. for up to 13-weeks. In addition, samples were exposed to 1-week horizontal shaking at 2-8° C. (200 rpm), 1-week horizontal shaking at 25° C. (200 rpm) and 5 cycles Freeze/Thaw (−40° C./5° C.).

Results

Table 9 summarizes the initial results of the excipient screen I. All formulations had a protein concentration between 125 and 130 mg/mL. The formulations GRM0073-01 to -04 with a target pH of 5.5 had measured pH values of approximately 5.6, whereas the formulations GRM0073-05 to -08 with a target pH of 5.8 had measured pH values of approximately 5.9. The osmolality of the formulations containing 25 mM sodium chloride (GRM0073-01, -02, -05 and -06) had higher osmolality results (between 313 and 322 mOsm/kg) in comparison to the formulations with 8 mM calcium chloride (GRM0073-03, -04, -07 and -08), which were between 273 and 288 mOsm/kg).

Table 10 summarizes the visible particle results at initial, after physical stress and after 13-weeks storage at 5° C. and 25° C. After manufacturing and after exposure to physical stress (1 week shaking at 5° C. or 25° C., or five freeze-thaw cycles), all formulations were free of particles. Surprisingly, all formulations which contained 8 mM calcium chloride showed visible particles after 13 weeks' storage at 5° C. and 25° C., whereas all formulations which container 25 mM sodium chloride were free of particles.

Figure 5A:
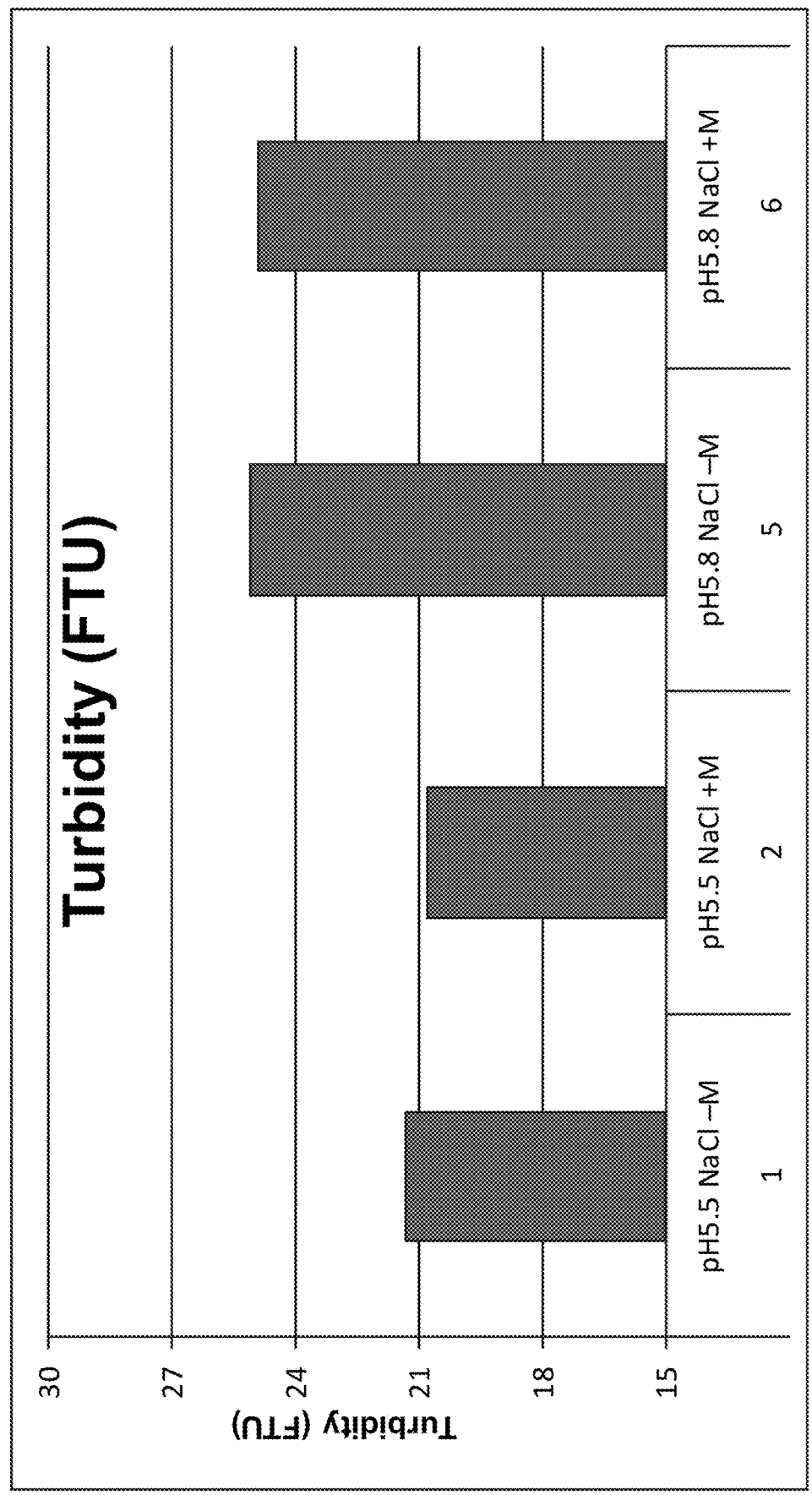
FIG. 5A Turbidity of formulations from the excipient screen I (below the bars: first row: pH value with NaCl as viscosity reducer absence (–) or presence (+) of methionine as stabilizer; second row: no. of formulation sample).
Figure 5B:
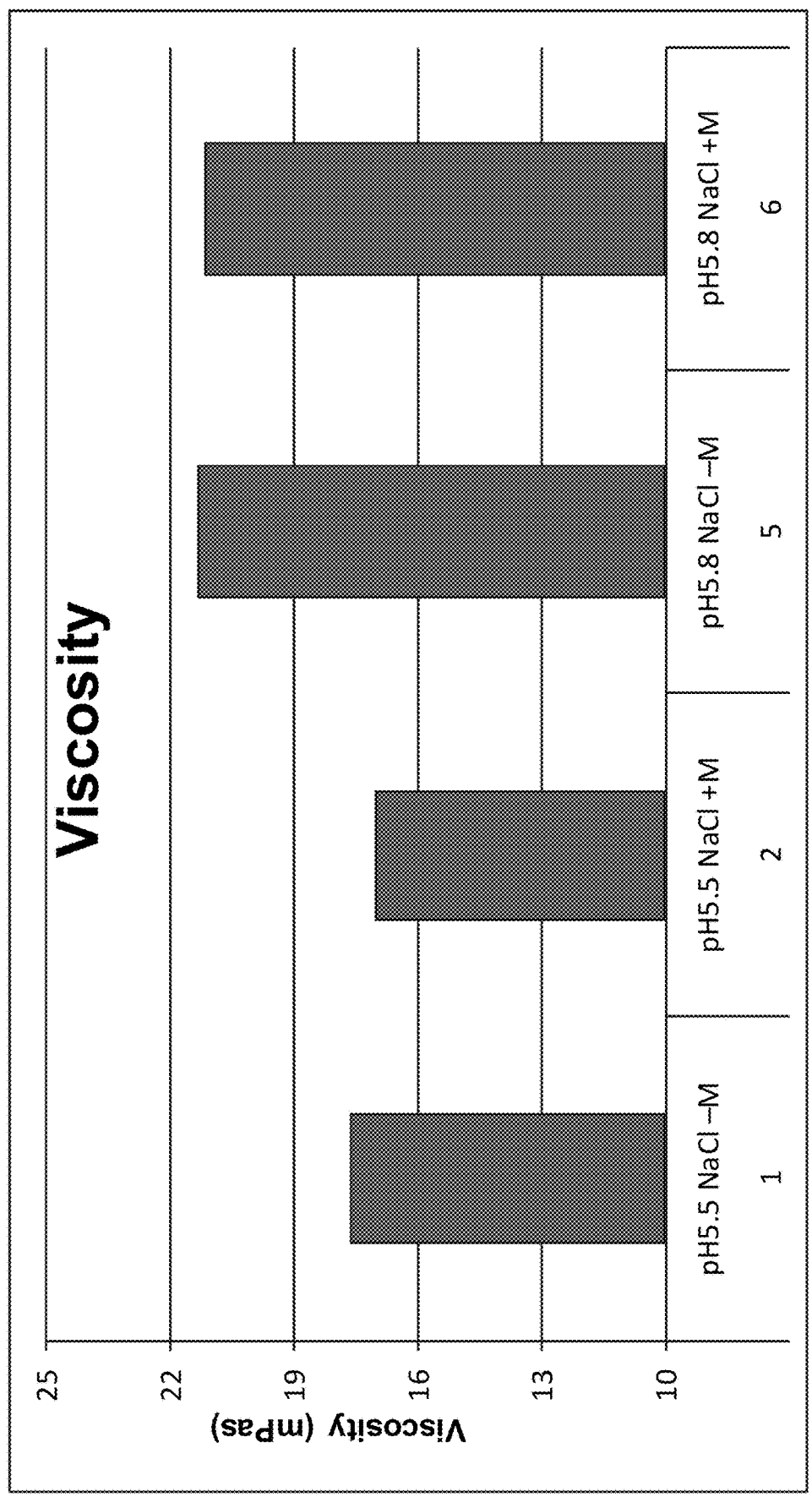
FIG. 5B Viscosity of formulations from the excipient screen I (below the bars: first row: pH value with NaCl as viscosity reducer absence (–) or presence (+) of methionine as stabilizer; second row: no. of formulation sample).

FIG. 5 compares turbidity and viscosity results of the formulations containing 25 mM sodium chloride. Thereby, the formulations with a pH of 5.5 showed lower turbidity (21 FTU versus 25 FTU) and lower viscosity (17 mPas versus 21 mPas).

FIGS. 6 and 7 show the increase of soluble aggregates (HMWS) during 20 weeks' storage at 5° C., respectively 13 weeks storage at 25° C. The formulations with a pH of 5.8 showed a slightly lower increase in soluble aggregates in comparison to the formulations at pH 5.5. Surprisingly, the addition of methionine could reduce the formation of soluble aggregates and could compensate the influence of a lower pH on aggregation.

Figure 9A:
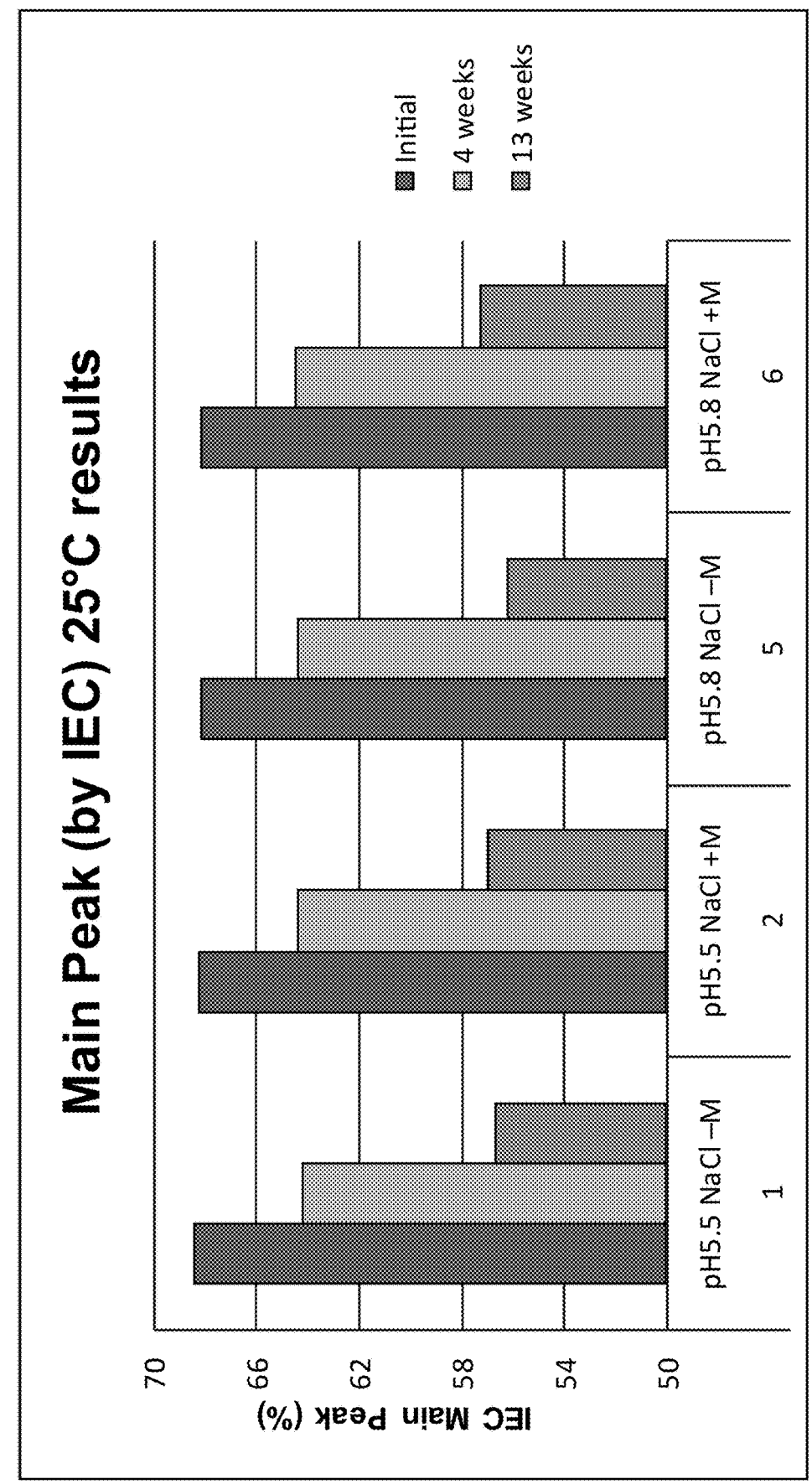
FIG. 9A Levels of charged species (Main peak) at initial and during storage at 25° C. (below the bars: first row: pH value with NaCl as viscosity reducer; absence (–) or presence (+) of methionine as stabilizer; second row: no. of formulation sample.
Figure 9B:
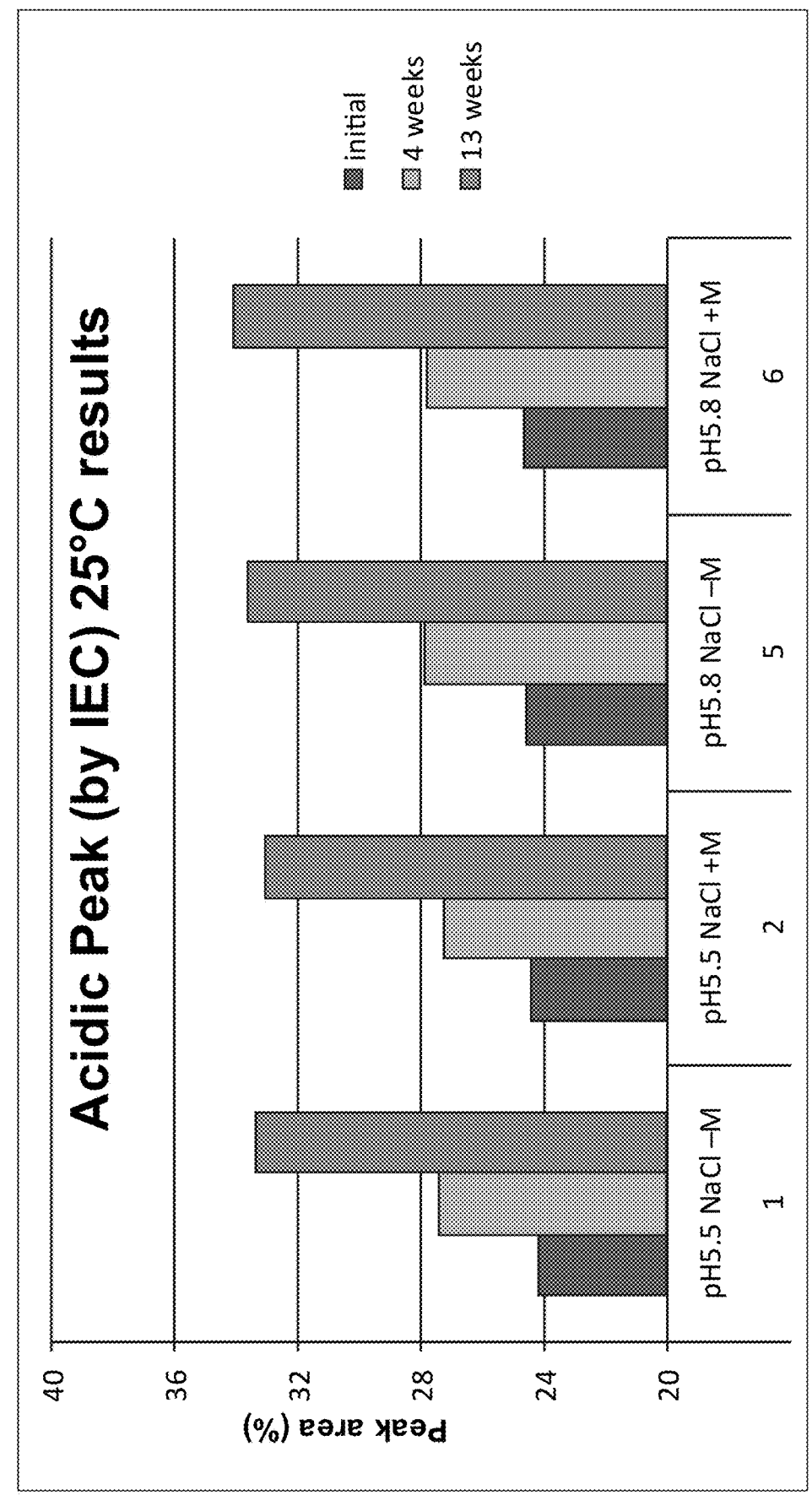
FIG. 9B Levels of charged species (Acidic peak) at initial and during storage at 25° C. (below the bars: first row: pH value with NaCl as viscosity reducer; absence (–) or presence (+) of methionine as stabilizer; second row: no. of formulation sample.
Figure 9C:
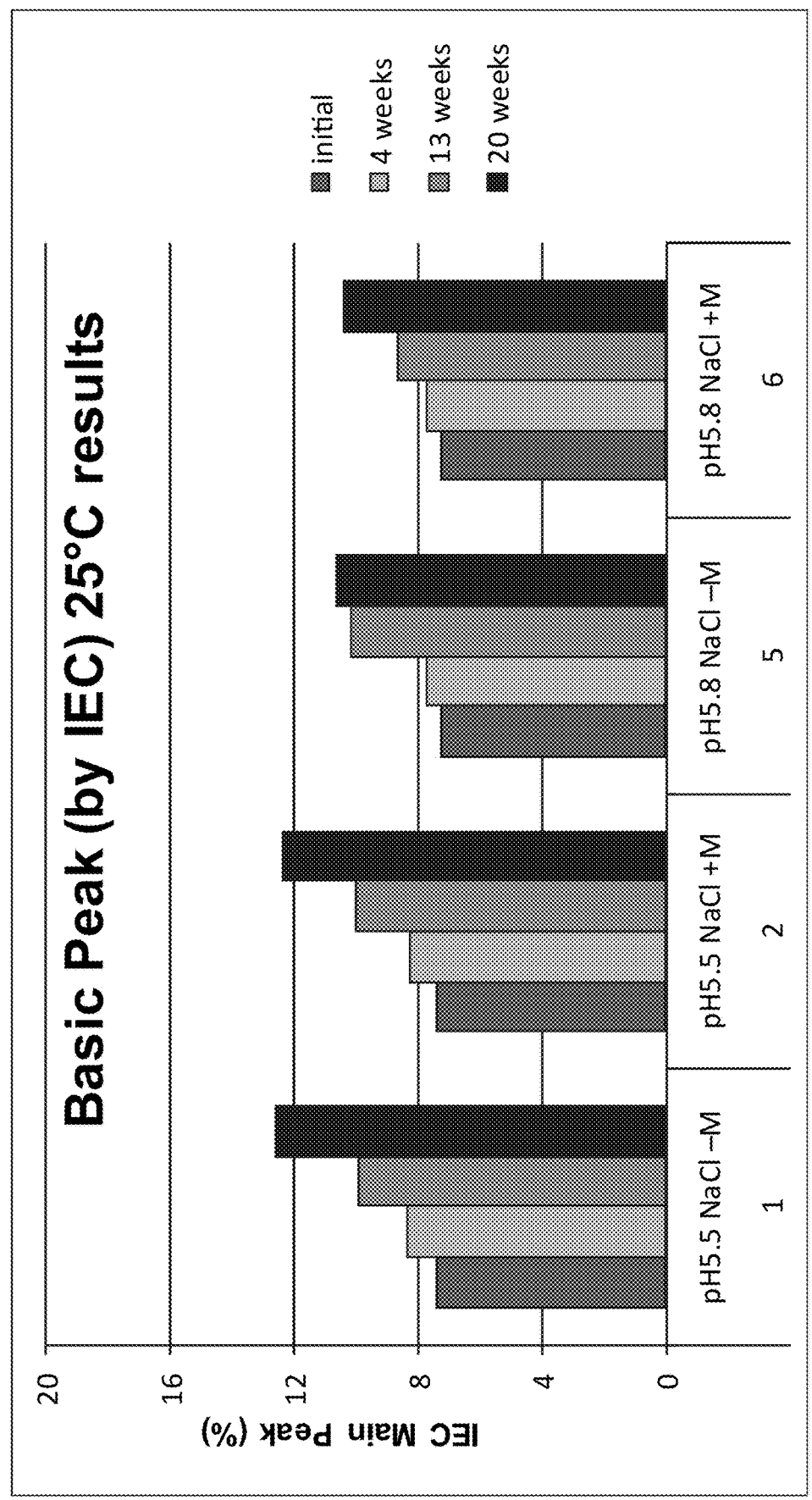
FIG. 9C Levels of charged species (Basic peak) at initial and during storage at 25° C. (below the bars: first row: pH value with NaCl as viscosity reducer; absence (–) or presence (+) of methionine as stabilizer; second row: no. of formulation sample.
Figure 10A:
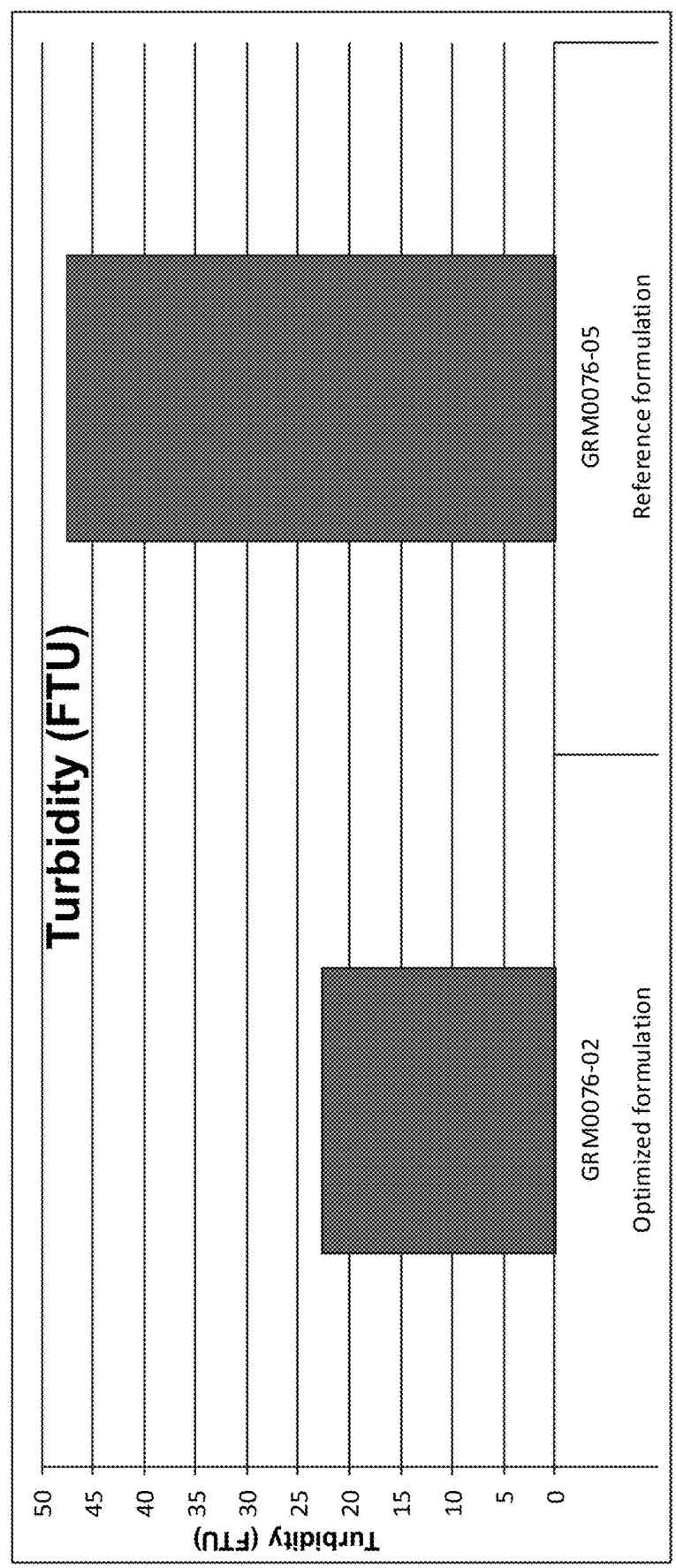
FIG. 10A Turbidity of optimized and reference formulation with a protein concentration of 120 mg/mL from the excipient screen II.
Figure 10B:
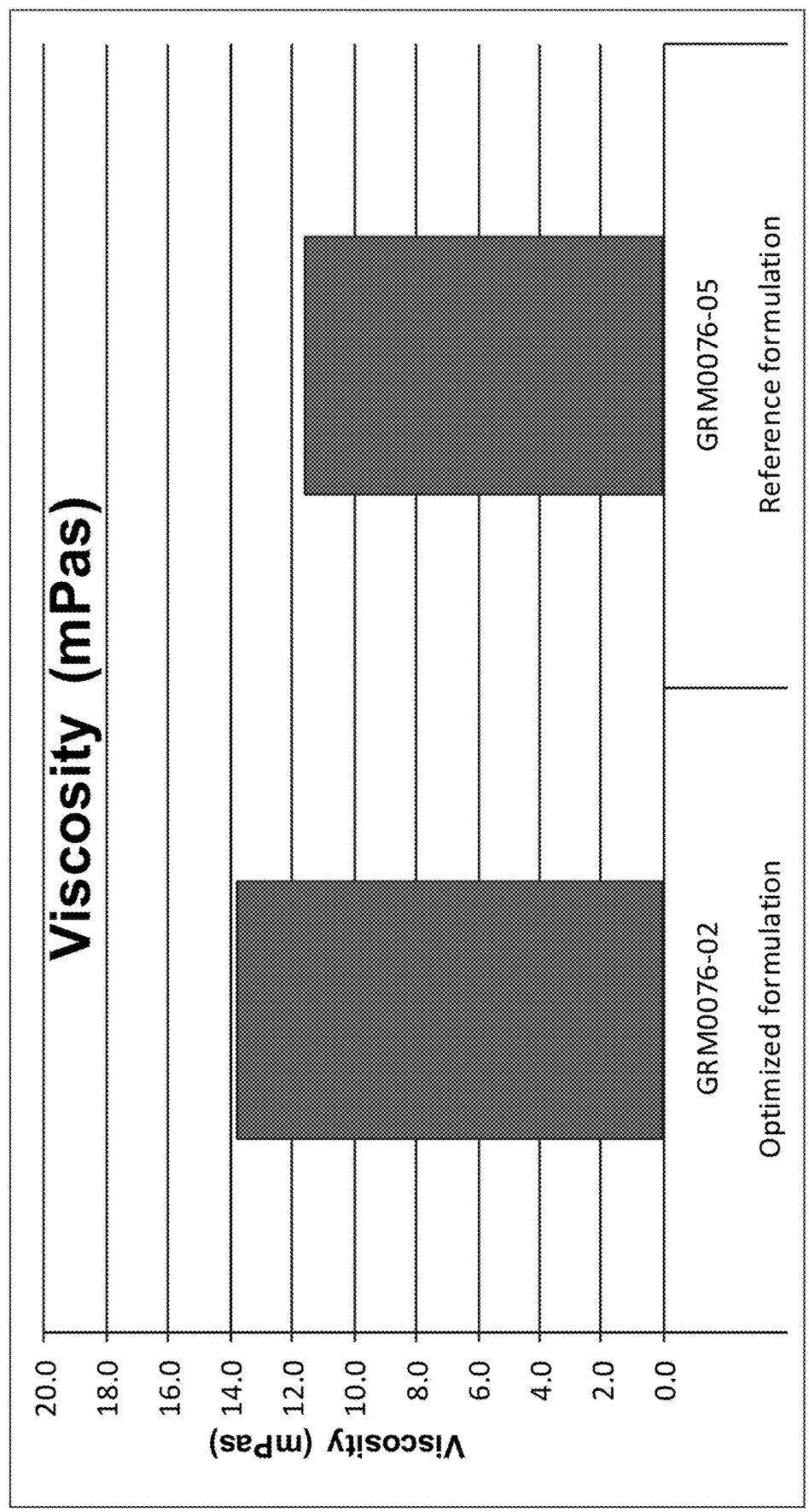
FIG. 10B Viscosity of optimized and reference formulation with a protein concentration of 120 mg/mL from the excipient screen II.
Figure 11A:
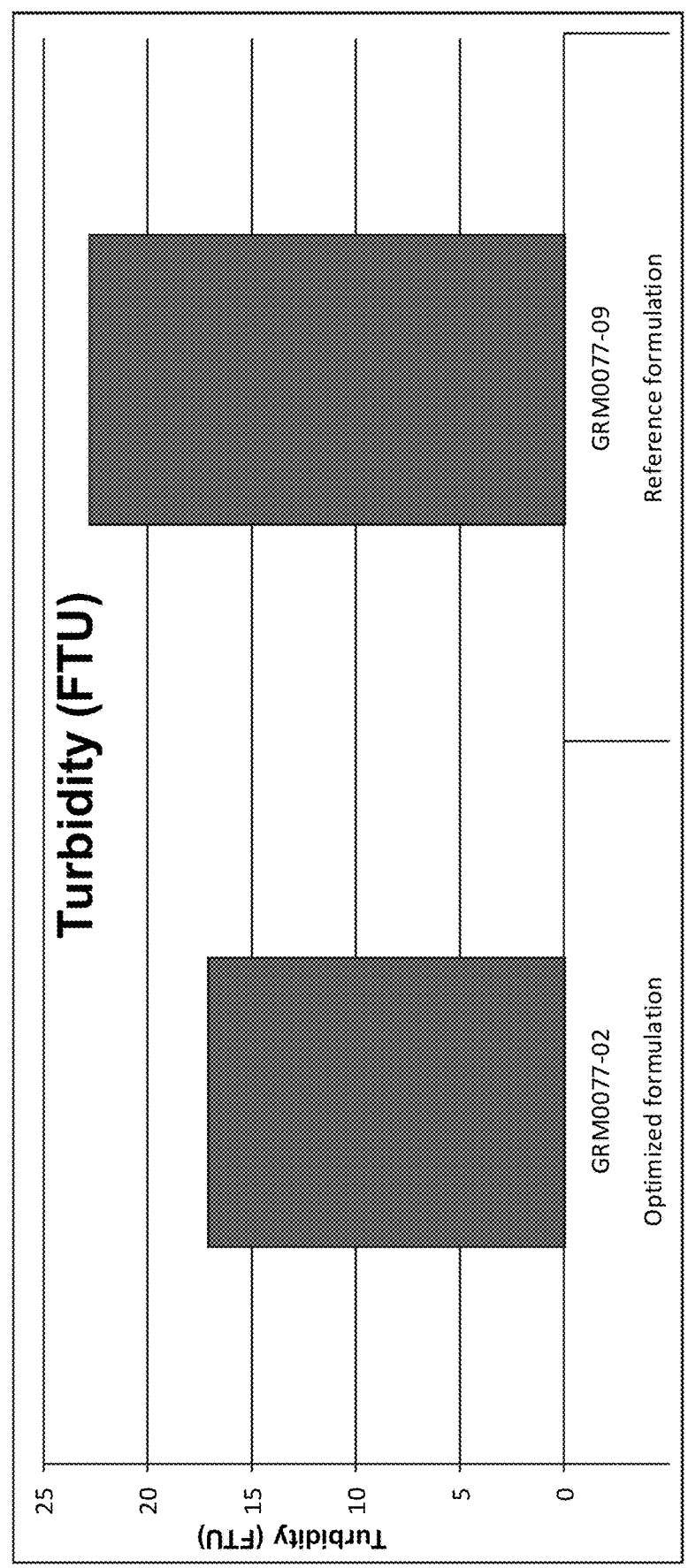
FIG. 11A Turbidity of optimized and reference formulation with a protein concentration of 30 mg/mL from the excipient screen II.
Figure 11B:
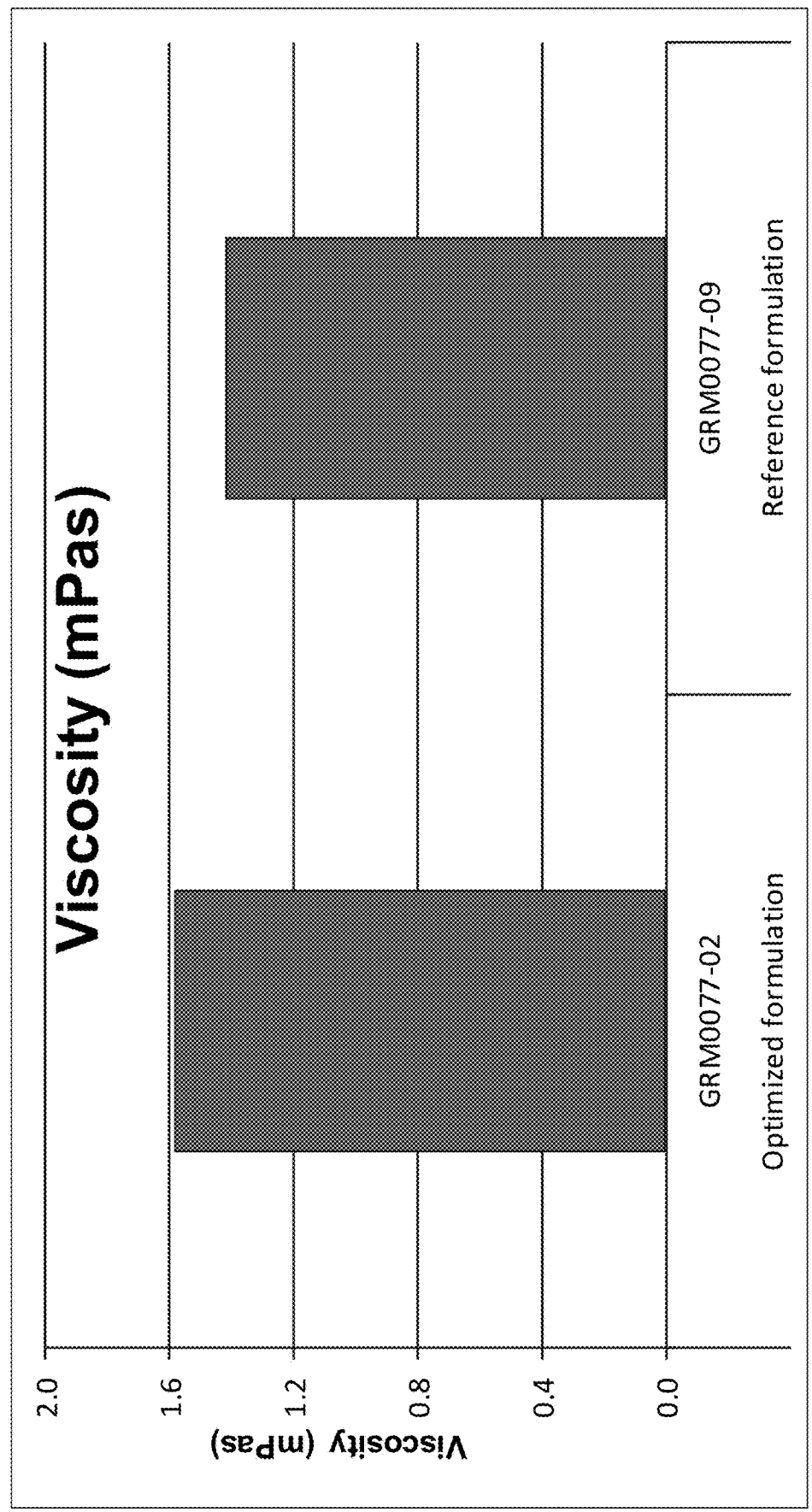
FIG. 11B Viscosity of optimized and reference formulation with a protein concentration of 30 mg/mL from the excipient screen II.
Figure 12:
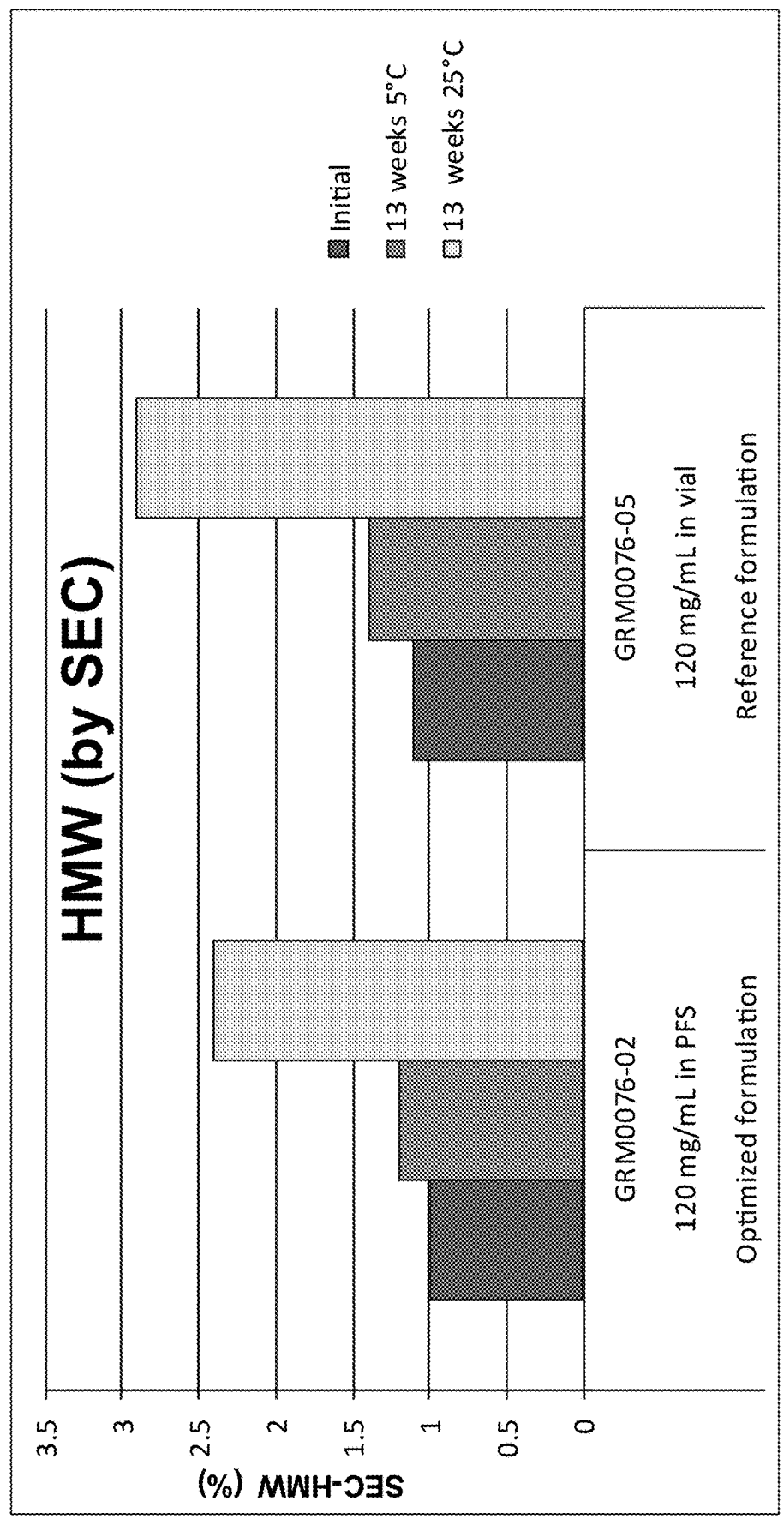
FIG. 12 Levels of high molecular weight species (HMW) at initial (left bar) and after 13 weeks storage at 5° C. (middle bar) and 25° C. (right bar) of optimized and reference formulation with a protein concentration of 120 mg/mL.
Figure 14A:
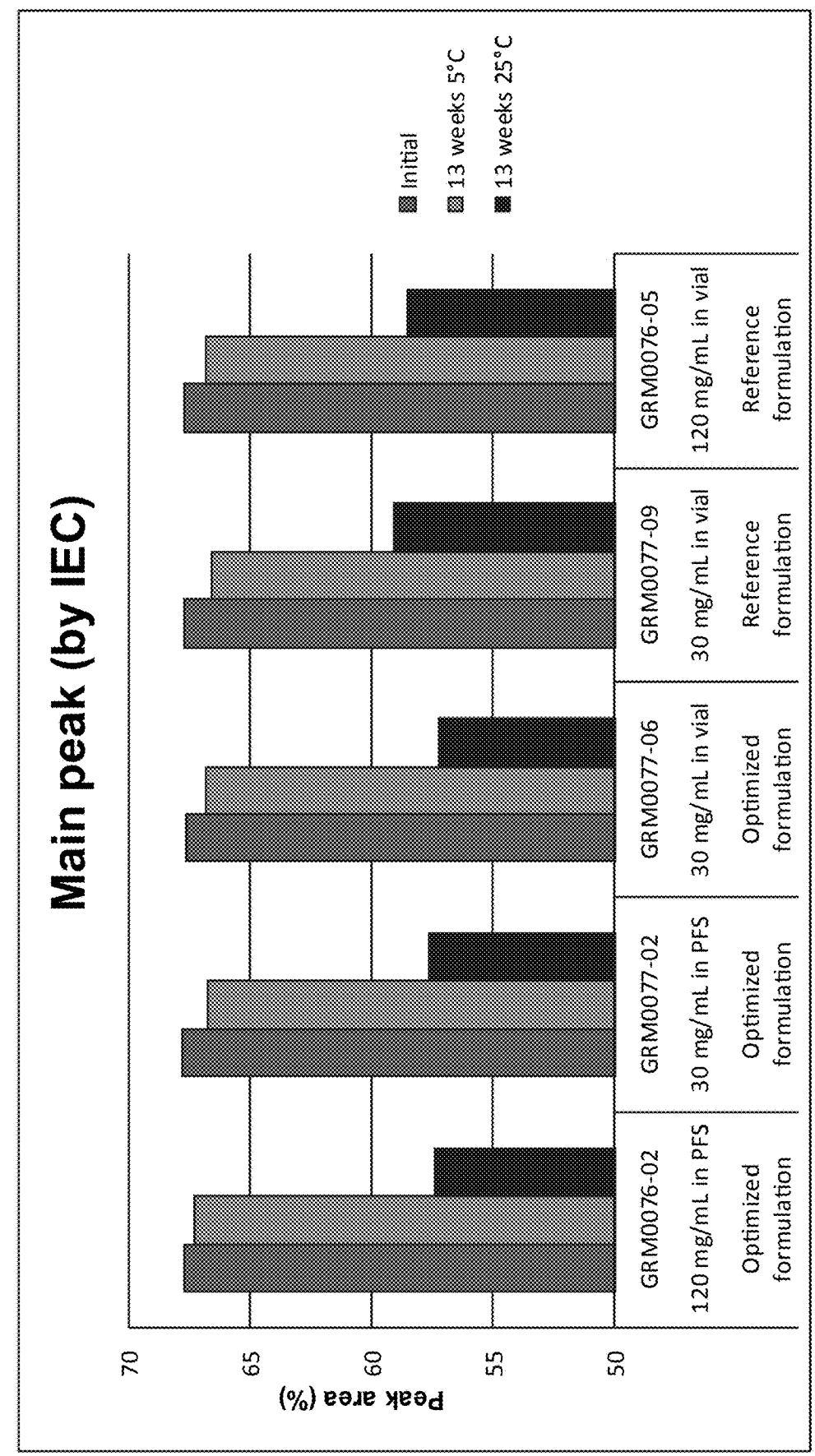
FIG. 14A Levels of charged species (Main peak) at initial (left bar) and after 13 weeks storage at 5° C. (middle bar) and 25° C. (right bar) of optimized and reference formulation.
Figure 14B:
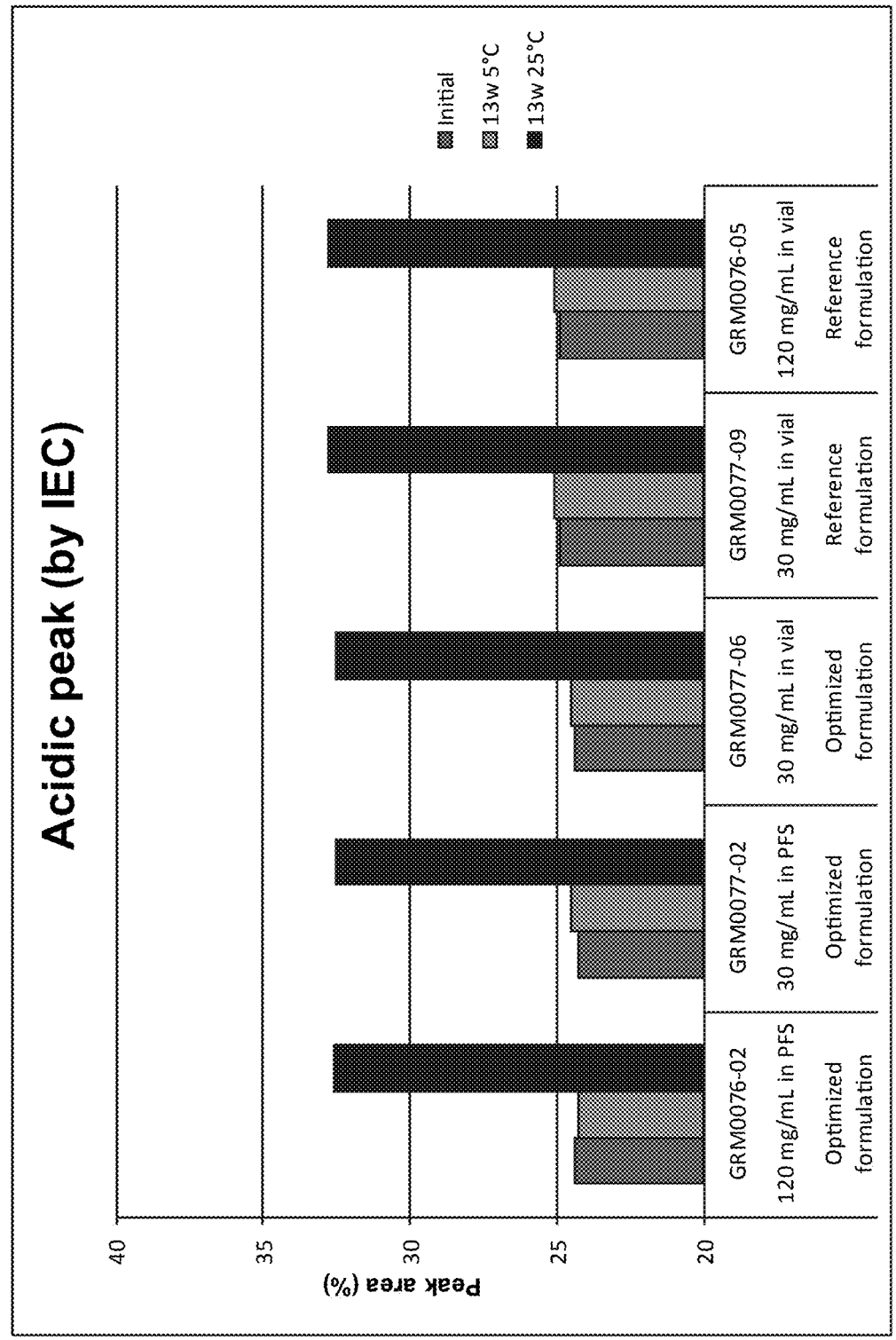
FIG. 14B Levels of charged species (Acidic peak) at initial (left bar) and after 13 weeks storage at 5° C. (middle bar) and 25° C. (right bar) of optimized and reference formulation.
Figure 14C:
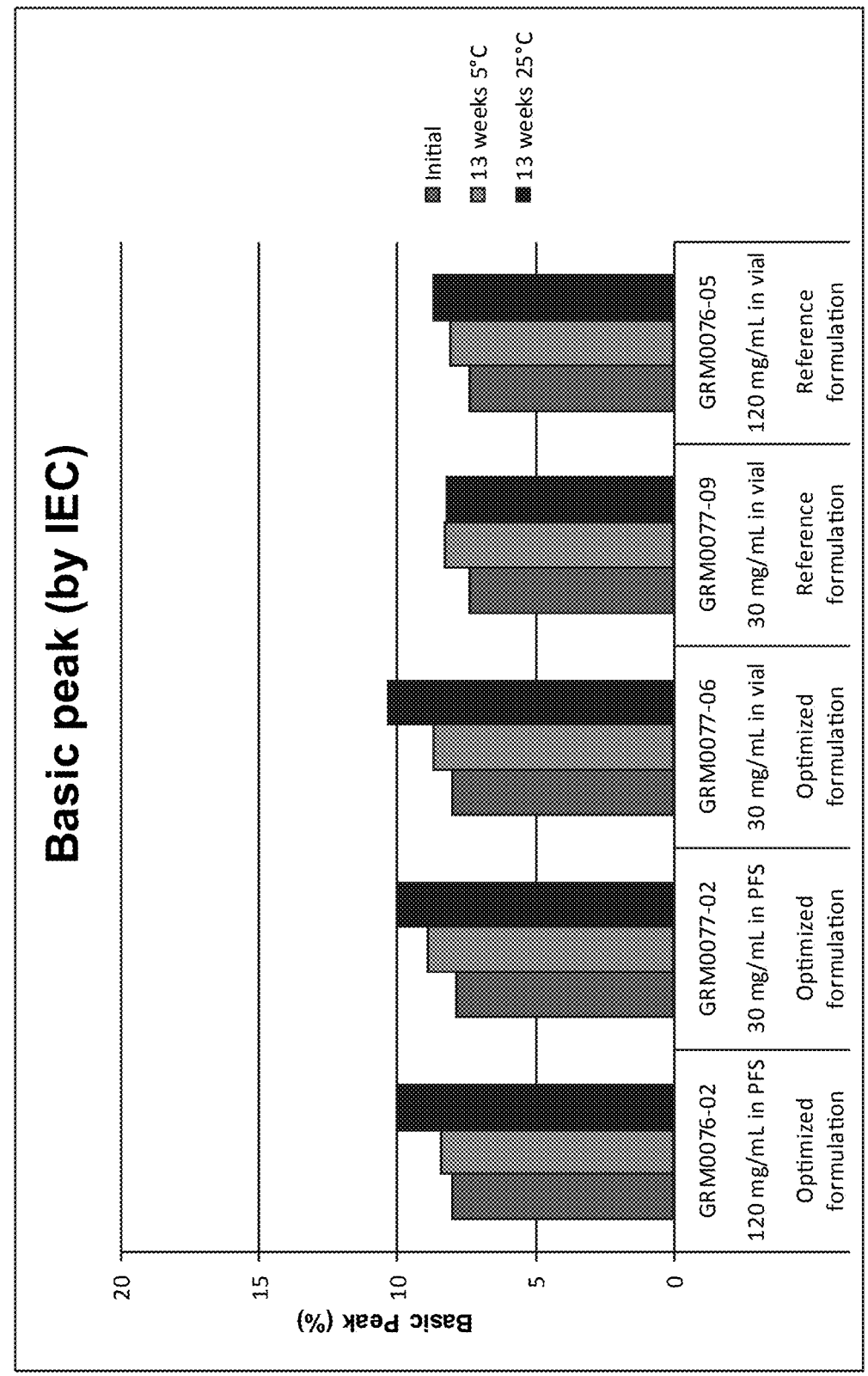
FIG. 14C Levels of charged species (Basic peak) at initial (left bar) and after 13 weeks storage at 5° C. (middle bar) and 25° C. (right bar) of optimized and reference formulation.

FIGS. 8 and 9 compare the change of charged variants measured by IEC after 20 weeks' storage at 5° C. and 13 weeks storage at 25° C., respectively. All formulations showed a slight drop of approximately 1% of the main peak area after 13 weeks storage at 5° C. This is accompanied by an approximate 0.2% increase in acidic variants and an approximate 1% increase in basic peak area. There is no clear differentiation caused by the different pH or the presence of methionine. Although the drop in main peak is much stronger (approximately 18%), after 13 weeks storage at 25° C., there is no clear differentiation based on pH and methionine. The decrease in main peak during storage at 25° C. is mainly caused by an increase in acidic variants.

TABLE 9

Summary on protein concentration, pH and osmolality results of the excipient screen I samples after manufacturing

| Form. Code (=-sample no) | Protein concentration (mg/mL) | pH | Osmolality (mOsm/kg) |
| --- | --- | --- | --- |
| GRM0073-01 | 126 | 5.6 | 315 |
| GRM0073-02 | 125 | 5.6 | 322 |
| GRM0073-03 | 126 | 5.6 | 275 |
| GRM0073-04 | 127 | 5.6 | 288 |
| GRM0073-05 | 126 | 5.9 | 313 |
| GRM0073-06 | 128 | 5.9 | 314 |
| GRM0073-07 | 129 | 5.9 | 273 |
| GRM0073-08 | 128 | 5.9 | 281 |

TABLE 10

Summary on visible particle results of initial and stressed excipient screen I samples

| Form. Code (= -sample no) | Salt | Initial | after 1 week shaking at 5° C. | after 1 week shaking at 25° C. | after 5 freeze/ thaw cycles | after 13 weeks at 5° C. | after 13 weeks at 25° C. |
| --- | --- | --- | --- | --- | --- | --- | --- |
| GRM0073-01 | 25 mM NaCl | free of particles | free of particles | free of particles | free of particles | free of particles | free of particles |
| GRM0073-02 | | free of particles | free of particles | free of particles | free of particles | free of particles | free of particles |
| GRM0073-03 | 8 mM CaCl$_2$ | free of particles | free of particles | free of particles | free of particles | with many particles | with many particles |
| GRM0073-04 | | free of particles | free of particles | free of particles | free of particles | with many particles | with many particles |
| GRM0073-05 | 25 mM NaCl | free of particles | free of particles | free of particles | free of particles | free of particles | free of particles |

TABLE 10-continued

Summary on visible particle results of initial and stressed excipient screen I samples

| Form. Code (= -sample no) | Salt | Initial | after 1 week shaking at 5° C. | after 1 week shaking at 25° C. | after 5 freeze/ thaw cycles | after 13 weeks at 5° C. | after 13 weeks at 25° C. |
|---|---|---|---|---|---|---|---|
| GRM0073-06 | | free of particles | free of particles | free of particles | free of particles | free of particles | free of particles |
| GRM0073-07 | 8 mM CaCl$_2$ | free of particles | free of particles | free of particles | free of particles | with many particles | with many particles |
| GRM0073-08 | | free of particles | free of particles | free of particles | free of particles | with many particles | with many particles |

Conclusion

Although the presence of calcium chloride leads to lower viscosity and turbidity levels in comparison to formulations with sodium chloride (refer to examples 2 and 3), it surprisingly also caused the formation of visible particles. The formation of visible particles is not acceptable for an intravitreal injection according to the requirements of USP-NF <790>, which is essentially free of visible particles. Therefore, the addition of sodium chloride as an ionic strength modifier for reduction of viscosity is preferred over the use of calcium chloride.

Furthermore, formulations at a pH of 5.5 show lower turbidity and lower viscosity in comparison to formulations at pH 5.8. However, formulations at a pH of 5.8 showed slightly less formation of soluble aggregates than formulations at pH 5.5, but this effect can be compensated by the addition of 7 mM methionine. Therefore, the addition of methionine allows to reduce soluble aggregate formation at pH 5.5 while still realizing lower viscosity and turbidity levels.

The difference in pH (pH 5.5 versus 5.8) or the presence or absence of methionine have no impact on the formation of charged variants.

In summary, a formulation with 25 mM sodium chloride instead of 8 mM calcium chloride and a 20 mM histidine-acetate buffer at pH 5.5 with 7 mM methionine and 160 mM sucrose and 0.04% polysorbate 20 allows a particle-free formulation with low turbidity and viscosity and an improved stability behavior.

Example 6: Excipient Screen II

Set-up

In the second part of the excipient screen, the stability behavior is further characterized in a pre-filled syringe and at a protein concentration of 30 mg/mL.

The excipient screen I resulted in an optimized formulation consisting of 120 mg/mL anti-VEGF/ANG2 antibody CrossMAb VEGFang2-0016 (faricimab), 20 mM histidine-acetate at pH 5.5, 25 mM sodium chloride, 160 mM sucrose, 7 mM methionine and 0.04% polysorbate 20, which was filled in glass vial (corresponds to formulation GRM0073-02).

This formulation was also filled in pre-filled syringe (GRM0076-02). In addition, the stability behavior of this formulation matrix was tested at a protein concentration of 30 mg/mL, filled either in a pre-filled syringe (GRM0077-02) or in a glass vial (GRM0077-06).

For comparison, the stability of the reference formulation filled in a glass vial was tested at 30 mg/mL (GRM0077-09) and 120 mg/ml (GRM0076-05).

Table 11 summarizes the formulations of the excipient screen II.

TABLE 11

Formulation codes for the excipient screen part II

| Form. Code (= sample no) | Protein concentration | pH/ buffer | Salt | Methionine | Sucrose | Polysorbate 20 | Fill volume | Dosage Form |
|---|---|---|---|---|---|---|---|---|
| GRM0076-02 | 120 mg/mL | 20 mM Histidine-acetate pH 5.5 | 25 mM NaCl | 7 mM | 160 mM | 0.04% | 1 mL | 1 mL PFS |
| GRM0077-02 | 30 mg/mL | | | | | | | |
| GRM0077-06 | | | | | | | 2.7 | 6 mL Vial |
| GRM0077-09 | 30 mg/mL | 20 mM Histidine-HCl pH 6.0 | 100 mM NaCl | 0 mM | 60 mM | | | |
| GRM0076-05 | 120 mg/mL | | | | | | | |

Material and Methods

A summary of materials used during the preparation of the formulations and their primary packaging is given Table 1 and Table 2.

The drug substance was buffer exchanged by ultrafiltration-diafiltration using a Labscale TTF (Millipore) with a 30 kD molecular weight cut-off semi-permeable membrane.

For the preparation of anti-VEGF/ANG2 antibody CrossMAb VEGFang2-0016 (faricimab) in 20 mM histidine-acetate buffer pH 5.5, approximately 340 mL of drug substance was filled into the Labscale system and buffer exchanged against 2400 mL of 20 mM histidine-acetate pH 5.2 diafiltration buffer.

Anti-VEGF/ANG2 antibody CrossMAb VEGFang2-0016 (faricimab) in 20 mM histidine-HCl buffer pH 6.0 was prepared using approximately 200 mL of drug substance. This was filled into the Labscale system and buffer exchanged against 1400 mL of 20 mM histidine-HCl pH 5.85 diafiltration buffer.

After buffer-exchange the respective drug substance was concentrated in the Labscale system to a protein concentration of approximately 165 mg/mL and a pH of either approximately 5.5 or pH 6.0.

Afterwards, the concentrated drug substance was diluted with stock solutions of respective buffer and salt solutions to a target protein concentration of 30 or 120 mg/mL, resulting the final drug product solution according to table 8.

Each drug product solution was filtered through a 0.22 μm Sterivex GV (Millipore) filter and was filled either into clean and sterile 6 mL vials with a fill volume of 2.7 mL or in clean sterilized 1 mL pre-filled syringes with a fill volume of 1 mL. The vials were stoppered and crimped, whereas the syringes were closed with a plunger stopper.

Analytical Methods

The analytical test methods protein concentration, pH, osmolality, turbidity, viscosity, visible particles and SE-HPLC are described in example I.

Stability Program

The formulations were kept on stability at 2-8° C. and 24° C. for up to 13 weeks. In addition, samples were exposed to 1-week horizontal shaking at 2-8° C. (200 rpm), 1-week horizontal shaking at 25° C. (200 rpm) and 5 cycles Freeze/Thaw (−40° C./5° C.).

Results

Table 12 summarizes the initial results of the excipient screen II. GRM0076-02 (optimized formulation in PFS) and GRM0076-05 (reference formulation) matched both the targeted protein concentration of 120 mg/mL with measured values of 119 or 123 mg/mL, respectively. GRM0077-02 (optimized formulation in PFS), GRM0077-06 (optimized formulation in vial) and GRM0076-05 (reference formulation) were prepared at a target protein concentration of 30 mg/mL. The actual rptoein concentration were in the range between 30 and 31 mg/mL.

The pH pf all formulations was close to the targeted pH and with maximum deviation of just 0.1 pH units.

The osmolality of the formulations at 120 mg/mL were slightly higher and between 310 and 320 mOsm/kg, whereas the 30 mg/mL formulations were between 278 and 394 mOsm/kg.

Table 13 summarizes the visible particle results at initial, after physical stress and after 13-weeks storage at 5° C. and 25° C. After manufacturing and after exposure to physical stress (1 week shaking at 5° C. or 25° C., or five freeze-thaw cycles), all formulations were free of particles. Surprisingly, the reference formulations showed many particles after 13 weeks of storage at 5 and 25° C. All other formulations were free of particles.

FIG. compares turbidity and viscosity results of the of the optimized and the reference formulation at a protein concentration of 120 mg/mL. The optimized formulation showed a clearly lower turbidity of approximately 23 FTU, whereas the clinical service formulation had a turbidity of more than 45 FTU. Interestingly, the viscosity of both formulations were both below 14 mPas.

FIG. shows the turbidity and viscosity of the 30 mg/ml formulations. Here, the difference in turbidity is smaller between the formulations GRM0072-02 and GRM0077-09, but still the optimized formulations showed a lower turbidity. The viscosities for both 30 mg/mL formulations is very low compared to the 120 mg/mL formulations and is below 2 mPas.

FIG. and FIG. show the increase of HMW species after 13 weeks storage at 5 and 25° C. The optimized formulation showed both at 120 mg/mL and 30 mg/mL less increase of HMW species than the reference formulation. The stabilizing effect is most pronounced after 13 weeks' storage at 25° C., where HMW increased only to 2.4% in the optimized formulation GRM0076-02, whereas the formulation GRM0076-05 showed an increase up to 2.9%. The same trend is also observed for the 30 mg/mL formulations, with a lower increase to 1.0% seen with the optimized formulation and an increase to 1.3% for the reference form.

FIG. compares the change of charged variants measured by IEC after 13 weeks storage at 5° C. and 25° C. All formulations showed a slight drop of approximately 1% of the main peak area after 13 weeks' storage at 5° C. This is accompanied by a corresponding increase in basic peak area, whereas the acidic peak area remains constant. Although the drop in main peak is much stronger (approximately 10%), after 13 weeks' storage at 25° C., there is no clear differentiation between the formulations. The decrease in main peak during storage at 25° C. is mainly caused by an increase in acidic variants (around 8%) and a slight increase in basic variants (1-2%). The increase of basic variants after 13 weeks at 25° C. is slightly lower (ca. 1%) with the reference formulations (formulated at pH 6.0) in comparison to the optimized formulations (ca. 2% increase). The lower protein concentration and the primary container have no impact on the charged variants.

TABLE 12

Summary on protein concentration, pH and osmolality results of the excipient screen II samples after manufacturing

| Form. Code | Formulation and dosage form | Protein. concentration (mg/mL) | pH | Osmolality (mOsm/kg) |
|---|---|---|---|---|
| GRM0076-02 | 120 mg/mL in PFS | 119 | 5.6 | 318 |
| GRM0077-02 | 30 mg/mL in PFS | 30 | 5.5 | 278 |
| GRM0077-06 | 30 mg/mL in vial | 30 | 5.5 | 278 |
| GRM0077-09 | 30 mg/mL in vial, reference formulation | 31 | 6.0 | 294 |
| GRM0076-05 | 120 mg/mL in vial, reference formulation | 123 | 6.1 | 312 |

TABLE 13

Summary on visible particle results of initial and stressed excipient screen II samples

| Form. Code | Formulation and dosage form | Initial | after 1 week shaking at 5° C. | after 1 week shaking at 25° C. | after 5 freeze/thaw cycles | after 13 weeks at 5° C. | after 13 weeks at 25° C. |
|---|---|---|---|---|---|---|---|
| GRM0076-02 | 120 mg/mL in PFS | free of particles | free of particles | free of particles | free of particles | Free of particles | Free of particles |
| GRM0077-02 | 30 mg/mL in PFS | free of particles | free of particles | free of particles | free of particles | Free of particles | Free of particles |
| GRM0077-06 | 30 mg/mL in vial | free of particles | free of particles | free of particles | free of particles | Free of particles | Free of particles |
| GRM0077-09 | 30 mg/mL in vial, reference formulation | free of particles | free of particles | free of particles | free of particles | With many particles | With many particles |
| GRM0076-05 | 120 mg/mL in vial, reference formulation | free of particles | free of particles | free of particles | free of particles | Free of particles | Free of particles |

Conclusion

The outcome of the excipient screen II confirmed that the optimized formulations is superior to the reference formulation. The turbidity of the optimized formulations at 120 mg/mL was reduced from greater than 45 FTU to less than 25 FTU, while maintaining the viscosity to less than 15 mPas. A low viscosity is essential in order to enable a commercial-scale production process (up-concentration by ultrafiltration) and to ensure an easy and convenient intravitreal injection (injection forces of less than 20N, in particular less than 15 N). It was demonstrated that the optimized formulation with a viscosity of less than 15 mPas was able to be injected through a 30G injection needle with 5 s injection time with an injection force of less than 5 N.

Furthermore, the optimized formulations at 30 mg/mL remained free of particles, whereas the reference formulations showed visible particles after 13 weeks' storage at 5 and 25° C. In addition, the increase of HMW species was lower in the optimized formulations.

The improved stability behavior of the optimized formulations was observed at protein concentrations of 30 and 120 mg/mL and in a vial, as well as a pre-filled syringe.

In summary, the optimized formulation with protein concentration between 30 and 120 mg/mL containing a histidine-acetate buffer pH 5.5, 25 mM sodium chloride, 7 mM methionine, 160 mM sucrose and 0.04% polysorbate 20 allows a particle-free formulation with low turbidity and viscosity and an improved stability behavior in a vial and a pre-filled syringe.

Example 7: Safety of Methionine for Use in Ocular Indication (in a Formulation for Intravitreal Application)

Overview of Nonclinical Toxicity Studies with L-Methionine

A toxicity study in cynomolgus monkeys was conducted in which methionine (10 mM) was a component of the vehicle and of the formulated test article CrossMAb VEGFang2-0016 (faricimab). In this study, a total of 12 animals (6 males/6 females) were treated intravitreal with 50 μL/eye two times, 14 days apart. The left eyes were treated with the vehicle (containing 10 mM methionine) and the right eyes were treated with the formulated test article CrossMAb VEGFang2-0016 (faricimab), also containing 10 mM methionine. In this study, no ocular effects of methionine were seen in cynomolgus monkeys.

Three studies (in cynomolgus monkeys and in New Zealand White rabbits) were conducted in which methionine (5-25 mM) was a component of the vehicle, administered intravitreally (also 50 μL/eye) up to six times, 14 days apart. In these studies, no ocular effects of methionine were observed in any of the animals treated with the methionine-containing vehicle.

An overview of the nonclinical toxicity studies is provided in Table 14.

TABLE 14

Summary of Nonclinical Toxicity Studies Containing Methionine (Dosed intravitreally)

| Species | — | Cynomolgus monkey | NZW rabbit | Cynomolgus monkey | NZW rabbit |
|---|---|---|---|---|---|
| N (m/f) | — | 6M/6F | 3M | 5M/5F | 5M/5F |
| Administration | — | Vehicle in left eye, formulated faricimab in right eye | Vehicle in both eyes (control group) | Vehicle in both eyes (control group) | Vehicle in both eyes (control group) |

TABLE 14-continued

Summary of Nonclinical Toxicity Studies Containing Methionine (Dosed intravitreally)

| | | | | | |
|---|---|---|---|---|---|
| N of doses (14 days apart) | — | 2 | 1 | 6 | 4 |
| | formulation for CrossMAb VEGFang2-0016 (faricimab) | — | — | — | — |
| Test article | CrossMAb VEGFang2-0016 (faricimab) | faricimab | — | — | — |
| Vehicle/ control article composition | 7 mM methionine<br>—<br>20 mM histidine-acetate buffer pH 5.5<br>160 mM sucrose<br>0.04% polysorbate 20<br>25 mM sodium chloride | 10 mM methionine<br>—<br>20 mM histidine/ histidine-HCl<br>50 mM sucrose<br>0.04% (w/v) polysorbate 20<br>100 mM sodium chloride | 25 mM methionine<br>5 mM NAT<br>20 mM histidine HCl<br>240 mM sucrose<br>0.02% polysorbate 20<br>— | 5 mM methionine<br>1 mM NAT<br>20 mM histidine HCl<br>240 mM sucrose<br>0.02% polysorbate 20<br>— | 5 mM methionine<br>1 mM NAT<br>20 mM histidine HCl<br>240 mM sucrose<br>0.02% polysorbate 20<br>— |

Abbreviations: NAT = N-acetyl tryptophan;
NZW = New Zealand white.

Example 8: Stability

A drug Product batch (120 mg/mL Vegf/Ang2 antibody (Faricimab) in 20 mM L-histidine-acetate pH 5.5, 160 mMv sucrose, 25 mMv sodium chloride, 7 mM L-methionine, 0.04% polysorbate 20) was filtered through a 0.22 μm sterile filter and filled into clean and sterile 2 mL glass vials with a fill volume of 0.24 mL.

After manufacturing the pH was 5.6, the osmolality 320 mOsm/kg and the protein concentration 120 mg/mL.

Table 15 presents the stability data of Drug Product batch GLI0219-01 during storage at 5° C. Table 16 shows the stability during storage at 25° C.

TABLE 15

Stability data of Vegf-Ang2 antibody (Faricimab) Drug Product batch during storage at 5° C.

| Time (wks) | Visible particles | Turbidity (NTU) | HMW by SEC (Area %) | Main peak (Area %) | Acidic peak (Area %) | Basic peak (Area %) |
|---|---|---|---|---|---|---|
| 0 | Practically free from particles | 24 | 0.8 | 72.8 | 18.9 | 8.3 |
| 4 | 0 particles per 10 vials | 22 | 1.2 | 72.2 | 18.9 | 8.9 |
| 13 | 0 particles per 10 vials | 23 | 1.7 | 71.6 | 19.5 | 8.9 |
| 26 | 0 particles per 10 vials | 22 | 2.2 | 71.0 | 19.5 | 9.5 |
| 39 | 0 particles per 10 vials | 24 | 2.4 | 70.6 | 19.8 | 9.6 |
| 52 | 0 particles per 10 vials | 23 | 2.8 | 69.5 | 20.2 | 10.3 |
| 65 | 0 particles per 10 vials | 24 | 3.1 | 68.8 | 20.7 | 10.5 |
| 78 | 0 particles per 10 vials | 24 | 3.3 | 68.3 | 20.8 | 11.0 |

TABLE 16

Stability data of Vegf-Ang2 antibody (Faricimab) Drug Product batch during storage at 25° C.

| Time (wks) | Visible particles | Turbidity (NTU) | HMW by SEC (Area %) | Main peak (Area %) | Acidic peak (Area %) | Basic peak (Area %) |
|---|---|---|---|---|---|---|
| 0 | Practically free from particles | 24 | 1.0 | 72.8 | 18.9 | 8.3 |
| 4 | 0 particles per 10 vials | 23 | 2.0 | 68.1 | 21.4 | 10.5 |
| 13 | 0 particles per 10 vials | 23 | 2.6 | 59.7 | 28.6 | 11.7 |

TABLE 16-continued

Stability data of Vegf-Ang2 antibody (Faricimab) Drug Product batch during storage at 25° C.

| Time (wks) | Visible particles | Turbidity (NTU) | HMW by SEC (Area %) | Main peak (Area %) | Acidic peak (Area %) | Basic peak (Area %) |
|---|---|---|---|---|---|---|
| 26 | 0 particles per 10 vials | 23 | 3.0 | 50.0 | 37.2 | 12.8 |
| 52 | 0 particles per 10 vials | 24 | 3.5 | 37.7 | 49.9 | 12.4 |

Abbreviations

| Abbreviation | Description |
|---|---|
| His/Ace | Histidine-Acetate buffer |
| His-HCl | Histidine-hydrochloride buffer |
| SE-HPLC | Size exclusion high performance liquid chromatography |
| IE-HPLC | Ion exchange high performance liquid chromatography |
| FTU | Formazin turbidity unit |
| HMW | High Molecular Weight Species |
| mPas | milli Pascal second |
| LMW | Low Molecular Weight Species |
| mg/mL | milligram per milliliter |

The invention claimed is:

1. A liquid pharmaceutical formulation comprising:
   120 mg/mL of faricimab,
   25 mM of sodium chloride,
   20 mM of a histidine acetate buffer,
   7.0 mM methionine,
   160 mM sucrose,
   0.04% (w/v) polysorbate 20
   at a pH of 5.5.

2. The pharmaceutical formulation according to claim 1 which is formulated for intravitreal administration.

3. The pharmaceutical formulation according to claim 1, wherein the formulation is essentially free of visible particles.

4. The pharmaceutical formulation according to claim 1, wherein the high molecular weight species (HMW) content representing aggregates of the bispecific antibody in the pharmaceutical formulation is below 10% after 8 weeks at 25° C. or after 52 weeks at 25° C., as measured by size exclusion chromatography.

5. A method of treating an ocular vascular disease comprising administering the pharmaceutical formulation according to claim 1.

6. The method according to claim 5, wherein the ocular vascular disease is selected from the group consisting of diabetic retinopathy (DR), diabetic macular edema (DME), retinal vein occlusion (RVO), central retinal vein occlusion (CRVO), macular degeneration, wet age-related macular degeneration (wet AMD), retinopathy of prematurity (ROP), neovascular glaucoma, retinitis pigmentosa (RP), retinal angiomatous proliferation, macular telangiectasia, ischemic retinopathy, iris neovascularization, intraocular neovascularization, corneal neovascularization, retinal neovascularization, choroidal neovascularization, and retinal degeneration.

7. The method according to claim 5, wherein the ocular vascular disease is selected from the group consisting of diabetic retinopathy, diabetic macular edema, retinal vein occlusion, central retinal vein occlusion, wet age-related macular degeneration.

8. A vial comprising the pharmaceutical formulation of claim 1.

9. A prefilled syringe comprising the pharmaceutical formulation of claim 1.

10. The pharmaceutical formulation according to claim 1, wherein the formulation is essentially free of arginine and calcium chloride.

11. A liquid pharmaceutical formulation comprising:
    120 mg/mL of the bispecific anti-VEGF/ANG2 antibody,
    25 mM of sodium chloride,
    20 mM of a histidine acetate buffer,
    7.0 mM methionine,
    160 mM sucrose,
    0.04% (w/v) polysorbate 20
    at a pH of 5.5,
    wherein the bispecific anti-VEGF/ANG2 antibody is bivalent and comprises a first antigen-binding site that specifically binds to human vascular endothelial growth factor (VEGF) and a second antigen-binding site that specifically binds to human Angiopoietin-2 (ANG-2), and wherein the bispecific anti-VEGF/ANG2 antibody comprises the amino acid sequences of SEQ ID NO: 17, SEQ ID NO: 18, SEQ ID NO: 19, and SEQ ID NO: 20.

12. A vial comprising the pharmaceutical formulation of claim 11.

13. A prefilled syringe comprising the pharmaceutical formulation of claim 11.

* * * * *

SEQUENCE LISTING

```
<160> NUMBER OF SEQ ID NOS: 25

<210> SEQ ID NO 1
<211> LENGTH: 14
<212> TYPE: PRT
<213> ORGANISM: Artificial
<220> FEATURE:
<223> OTHER INFORMATION: heavy chain CDR3H, <VEGF>

<400> SEQUENCE: 1

Tyr Pro Tyr Tyr Tyr Gly Thr Ser His Trp Tyr Phe Asp Val
1               5                   10

<210> SEQ ID NO 2
<211> LENGTH: 17
<212> TYPE: PRT
<213> ORGANISM: Artificial
<220> FEATURE:
<223> OTHER INFORMATION: heavy chain CDR2H, <VEGF>

<400> SEQUENCE: 2

Trp Ile Asn Thr Tyr Thr Gly Glu Pro Thr Tyr Ala Ala Asp Phe Lys
1               5                   10                  15

Arg

<210> SEQ ID NO 3
<211> LENGTH: 5
<212> TYPE: PRT
<213> ORGANISM: Artificial
<220> FEATURE:
<223> OTHER INFORMATION: heavy chain CDR1H, <VEGF>

<400> SEQUENCE: 3

His Tyr Gly Met Asn
1               5

<210> SEQ ID NO 4
<211> LENGTH: 9
<212> TYPE: PRT
<213> ORGANISM: Artificial
<220> FEATURE:
<223> OTHER INFORMATION: light chain CDR3L, <VEGF>

<400> SEQUENCE: 4

Gln Gln Tyr Ser Thr Val Pro Trp Thr
1               5

<210> SEQ ID NO 5
```

-continued

```
<211> LENGTH: 7
<212> TYPE: PRT
<213> ORGANISM: Artificial
<220> FEATURE:
<223> OTHER INFORMATION: light chain CDR2L, <VEGF>

<400> SEQUENCE: 5

Phe Thr Ser Ser Leu His Ser
1               5

<210> SEQ ID NO 6
<211> LENGTH: 11
<212> TYPE: PRT
<213> ORGANISM: Artificial
<220> FEATURE:
<223> OTHER INFORMATION: light chain CDR1L, <VEGF>

<400> SEQUENCE: 6

Ser Ala Ser Gln Asp Ile Ser Asn Tyr Leu Asn
1               5                   10

<210> SEQ ID NO 7
<211> LENGTH: 123
<212> TYPE: PRT
<213> ORGANISM: Artificial
<220> FEATURE:
<223> OTHER INFORMATION: heavy chain variable domain VH, <VEGF>

<400> SEQUENCE: 7

Glu Val Gln Leu Val Glu Ser Gly Gly Gly Leu Val Gln Pro Gly Gly
1               5                   10                  15

Ser Leu Arg Leu Ser Cys Ala Ala Ser Gly Tyr Asp Phe Thr His Tyr
            20                  25                  30

Gly Met Asn Trp Val Arg Gln Ala Pro Gly Lys Gly Leu Glu Trp Val
        35                  40                  45

Gly Trp Ile Asn Thr Tyr Thr Gly Glu Pro Thr Tyr Ala Ala Asp Phe
    50                  55                  60

Lys Arg Arg Phe Thr Phe Ser Leu Asp Thr Ser Lys Ser Thr Ala Tyr
65                  70                  75                  80

Leu Gln Met Asn Ser Leu Arg Ala Glu Asp Thr Ala Val Tyr Tyr Cys
                85                  90                  95

Ala Lys Tyr Pro Tyr Tyr Tyr Gly Thr Ser His Trp Tyr Phe Asp Val
            100                 105                 110

Trp Gly Gln Gly Thr Leu Val Thr Val Ser Ser
        115                 120

<210> SEQ ID NO 8
<211> LENGTH: 107
<212> TYPE: PRT
<213> ORGANISM: Artificial
<220> FEATURE:
<223> OTHER INFORMATION: light chain variable domain VL, <VEGF>

<400> SEQUENCE: 8

Asp Ile Gln Leu Thr Gln Ser Pro Ser Ser Leu Ser Ala Ser Val Gly
1               5                   10                  15

Asp Arg Val Thr Ile Thr Cys Ser Ala Ser Gln Asp Ile Ser Asn Tyr
            20                  25                  30

Leu Asn Trp Tyr Gln Gln Lys Pro Gly Lys Ala Pro Lys Val Leu Ile
        35                  40                  45

Tyr Phe Thr Ser Ser Leu His Ser Gly Val Pro Ser Arg Phe Ser Gly
    50                  55                  60
```

```
Ser Gly Ser Gly Thr Asp Phe Thr Leu Thr Ile Ser Ser Leu Gln Pro
 65                  70                  75                  80

Glu Asp Phe Ala Thr Tyr Tyr Cys Gln Gln Tyr Ser Thr Val Pro Trp
                 85                  90                  95

Thr Phe Gly Gln Gly Thr Lys Val Glu Ile Lys
            100                 105

<210> SEQ ID NO 9
<211> LENGTH: 20
<212> TYPE: PRT
<213> ORGANISM: Artificial
<220> FEATURE:
<223> OTHER INFORMATION: heavy chain CDR3H, <ANG-2>

<400> SEQUENCE: 9

Ser Pro Asn Pro Tyr Tyr Tyr Asp Ser Ser Gly Tyr Tyr Tyr Pro Gly
 1               5                  10                  15

Ala Phe Asp Ile
            20

<210> SEQ ID NO 10
<211> LENGTH: 17
<212> TYPE: PRT
<213> ORGANISM: Artificial
<220> FEATURE:
<223> OTHER INFORMATION: heavy chain CDR2H, <ANG-2>

<400> SEQUENCE: 10

Trp Ile Asn Pro Asn Ser Gly Gly Thr Asn Tyr Ala Gln Lys Phe Gln
 1               5                  10                  15

Gly

<210> SEQ ID NO 11
<211> LENGTH: 5
<212> TYPE: PRT
<213> ORGANISM: Artificial
<220> FEATURE:
<223> OTHER INFORMATION: heavy chain CDR1H, <ANG-2>

<400> SEQUENCE: 11

Gly Tyr Tyr Met His
 1               5

<210> SEQ ID NO 12
<211> LENGTH: 11
<212> TYPE: PRT
<213> ORGANISM: Artificial
<220> FEATURE:
<223> OTHER INFORMATION: light chain CDR3L, <ANG-2>

<400> SEQUENCE: 12

Gln Val Trp Asp Ser Ser Ser Asp His Trp Val
 1               5                  10

<210> SEQ ID NO 13
<211> LENGTH: 7
<212> TYPE: PRT
<213> ORGANISM: Artificial
<220> FEATURE:
<223> OTHER INFORMATION: light chain CDR2L, <ANG-2>

<400> SEQUENCE: 13

Asp Asp Ser Asp Arg Pro Ser
 1               5
```

```
<210> SEQ ID NO 14
<211> LENGTH: 11
<212> TYPE: PRT
<213> ORGANISM: Artificial
<220> FEATURE:
<223> OTHER INFORMATION: light chain CDR1L, <ANG-2>

<400> SEQUENCE: 14

Gly Gly Asn Asn Ile Gly Ser Lys Ser Val His
1               5                   10

<210> SEQ ID NO 15
<211> LENGTH: 129
<212> TYPE: PRT
<213> ORGANISM: Artificial
<220> FEATURE:
<223> OTHER INFORMATION: heavy chain variable domain VH, <ANG-2>

<400> SEQUENCE: 15

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Gly Tyr
            20                  25                  30

Tyr Met His Trp Val Arg Gln Ala Pro Gly Gln Gly Leu Glu Trp Met
        35                  40                  45

Gly Trp Ile Asn Pro Asn Ser Gly Gly Thr Asn Tyr Ala Gln Lys Phe
    50                  55                  60

Gln Gly Arg Val Thr Met Thr Arg Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Ala Arg Ser Pro Asn Pro Tyr Tyr Tyr Asp Ser Ser Gly Tyr Tyr Tyr
            100                 105                 110

Pro Gly Ala Phe Asp Ile Trp Gly Gln Gly Thr Met Val Thr Val Ser
        115                 120                 125

Ser

<210> SEQ ID NO 16
<211> LENGTH: 110
<212> TYPE: PRT
<213> ORGANISM: Artificial
<220> FEATURE:
<223> OTHER INFORMATION: light chain variable domain VL, <ANG-2>

<400> SEQUENCE: 16

Ser Tyr Val Leu Thr Gln Pro Pro Ser Val Ser Val Ala Pro Gly Gln
1               5                   10                  15

Thr Ala Arg Ile Thr Cys Gly Gly Asn Asn Ile Gly Ser Lys Ser Val
            20                  25                  30

His Trp Tyr Gln Gln Lys Pro Gly Gln Ala Pro Val Leu Val Val Tyr
        35                  40                  45

Asp Asp Ser Asp Arg Pro Ser Gly Ile Pro Glu Arg Phe Ser Gly Ser
    50                  55                  60

Asn Ser Gly Asn Thr Ala Thr Leu Thr Ile Ser Arg Val Glu Ala Gly
65                  70                  75                  80

Asp Glu Ala Asp Tyr Tyr Cys Gln Val Trp Asp Ser Ser Ser Asp His
                85                  90                  95

Trp Val Phe Gly Gly Gly Thr Lys Leu Thr Val Leu Ser Ser
```

<210> SEQ ID NO 17
<211> LENGTH: 453
<212> TYPE: PRT
<213> ORGANISM: Artificial
<220> FEATURE:
<223> OTHER INFORMATION: Heavy chain 1 of <VEGF-ANG-2> CrossMAb IgG1
with AAA mutations and P329G LALA mutations (VEGFang2-0016)

<400> SEQUENCE: 17

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Tyr Asp Phe Thr His Tyr
            20                  25                  30

Gly Met Asn Trp Val Arg Gln Ala Pro Gly Lys Gly Leu Glu Trp Val
        35                  40                  45

Gly Trp Ile Asn Thr Tyr Thr Gly Glu Pro Thr Tyr Ala Ala Asp Phe
    50                  55                  60

Lys Arg Arg Phe Thr Phe Ser Leu Asp Thr Ser Lys Ser Thr Ala Tyr
65                  70                  75                  80

Leu Gln Met Asn Ser Leu Arg Ala Glu Asp Thr Ala Val Tyr Tyr Cys
                85                  90                  95

Ala Lys Tyr Pro Tyr Tyr Tyr Gly Thr Ser His Trp Tyr Phe Asp Val
            100                 105                 110

Trp Gly Gln Gly Thr Leu Val Thr Val Ser Ser Ala Ser Thr Lys Gly
        115                 120                 125

Pro Ser Val Phe Pro Leu Ala Pro Ser Ser Lys Ser Thr Ser Gly Gly
    130                 135                 140

Thr Ala Ala Leu Gly Cys Leu Val Lys Asp Tyr Phe Pro Glu Pro Val
145                 150                 155                 160

Thr Val Ser Trp Asn Ser Gly Ala Leu Thr Ser Gly Val His Thr Phe
                165                 170                 175

Pro Ala Val Leu Gln Ser Ser Gly Leu Tyr Ser Leu Ser Ser Val Val
            180                 185                 190

Thr Val Pro Ser Ser Ser Leu Gly Thr Gln Thr Tyr Ile Cys Asn Val
        195                 200                 205

Asn His Lys Pro Ser Asn Thr Lys Val Asp Lys Lys Val Glu Pro Lys
    210                 215                 220

Ser Cys Asp Lys Thr His Thr Cys Pro Pro Cys Pro Ala Pro Glu Ala
225                 230                 235                 240

Ala Gly Gly Pro Ser Val Phe Leu Phe Pro Pro Lys Pro Lys Asp Thr
                245                 250                 255

Leu Met Ala Ser Arg Thr Pro Glu Val Thr Cys Val Val Val Asp Val
            260                 265                 270

Ser His Glu Asp Pro Glu Val Lys Phe Asn Trp Tyr Val Asp Gly Val
        275                 280                 285

Glu Val His Asn Ala Lys Thr Lys Pro Arg Glu Glu Gln Tyr Asn Ser
    290                 295                 300

Thr Tyr Arg Val Val Ser Val Leu Thr Val Leu Ala Gln Asp Trp Leu
305                 310                 315                 320

Asn Gly Lys Glu Tyr Lys Cys Lys Val Ser Asn Lys Ala Leu Gly Ala
                325                 330                 335

Pro Ile Glu Lys Thr Ile Ser Lys Ala Lys Gly Gln Pro Arg Glu Pro
            340                 345                 350
```

Gln Val Tyr Thr Leu Pro Pro Cys Arg Asp Glu Leu Thr Lys Asn Gln
            355                 360                 365

Val Ser Leu Trp Cys Leu Val Lys Gly Phe Tyr Pro Ser Asp Ile Ala
370                 375                 380

Val Glu Trp Glu Ser Asn Gly Gln Pro Glu Asn Asn Tyr Lys Thr Thr
385                 390                 395                 400

Pro Pro Val Leu Asp Ser Asp Gly Ser Phe Phe Leu Tyr Ser Lys Leu
            405                 410                 415

Thr Val Asp Lys Ser Arg Trp Gln Gln Gly Asn Val Phe Ser Cys Ser
420                 425                 430

Val Met His Glu Ala Leu His Asn Ala Tyr Thr Gln Lys Ser Leu Ser
435                 440                 445

Leu Ser Pro Gly Lys
    450

<210> SEQ ID NO 18
<211> LENGTH: 463
<212> TYPE: PRT
<213> ORGANISM: Artificial
<220> FEATURE:
<223> OTHER INFORMATION: Heavy chain 2 of <VEGF-ANG-2> CrossMAb IgG1
      with AAA mutations and P329G LALA mutations (VEGFang2-0016)

<400> SEQUENCE: 18

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Gly Tyr
            20                  25                  30

Tyr Met His Trp Val Arg Gln Ala Pro Gly Gln Gly Leu Glu Trp Met
        35                  40                  45

Gly Trp Ile Asn Pro Asn Ser Gly Gly Thr Asn Tyr Ala Gln Lys Phe
    50                  55                  60

Gln Gly Arg Val Thr Met Thr Arg Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Ala Arg Ser Pro Asn Pro Tyr Tyr Tyr Asp Ser Ser Gly Tyr Tyr Tyr
            100                 105                 110

Pro Gly Ala Phe Asp Ile Trp Gly Gln Gly Thr Met Val Thr Val Ser
        115                 120                 125

Ser Ala Ser Val Ala Ala Pro Ser Val Phe Ile Phe Pro Pro Ser Asp
    130                 135                 140

Glu Gln Leu Lys Ser Gly Thr Ala Ser Val Val Cys Leu Leu Asn Asn
145                 150                 155                 160

Phe Tyr Pro Arg Glu Ala Lys Val Gln Trp Lys Val Asp Asn Ala Leu
                165                 170                 175

Gln Ser Gly Asn Ser Gln Glu Ser Val Thr Glu Gln Asp Ser Lys Asp
            180                 185                 190

Ser Thr Tyr Ser Leu Ser Ser Thr Leu Thr Leu Ser Lys Ala Asp Tyr
        195                 200                 205

Glu Lys His Lys Val Tyr Ala Cys Glu Val Thr His Gln Gly Leu Ser
    210                 215                 220

Ser Pro Val Thr Lys Ser Phe Asn Arg Gly Glu Cys Asp Lys Thr His
225                 230                 235                 240

Thr Cys Pro Pro Cys Pro Ala Pro Glu Ala Ala Gly Gly Pro Ser Val
                245                 250                 255

```
Phe Leu Phe Pro Pro Lys Pro Lys Asp Thr Leu Met Ala Ser Arg Thr
            260                 265                 270

Pro Glu Val Thr Cys Val Val Val Asp Val Ser His Glu Asp Pro Glu
        275                 280                 285

Val Lys Phe Asn Trp Tyr Val Asp Gly Val Glu Val His Asn Ala Lys
    290                 295                 300

Thr Lys Pro Arg Glu Glu Gln Tyr Asn Ser Thr Tyr Arg Val Val Ser
305                 310                 315                 320

Val Leu Thr Val Leu Ala Gln Asp Trp Leu Asn Gly Lys Glu Tyr Lys
                325                 330                 335

Cys Lys Val Ser Asn Lys Ala Leu Gly Ala Pro Ile Glu Lys Thr Ile
                340                 345                 350

Ser Lys Ala Lys Gly Gln Pro Arg Glu Pro Gln Val Cys Thr Leu Pro
                355                 360                 365

Pro Ser Arg Asp Glu Leu Thr Lys Asn Gln Val Ser Leu Ser Cys Ala
    370                 375                 380

Val Lys Gly Phe Tyr Pro Ser Asp Ile Ala Val Glu Trp Glu Ser Asn
385                 390                 395                 400

Gly Gln Pro Glu Asn Asn Tyr Lys Thr Thr Pro Pro Val Leu Asp Ser
                405                 410                 415

Asp Gly Ser Phe Phe Leu Val Ser Lys Leu Thr Val Asp Lys Ser Arg
            420                 425                 430

Trp Gln Gln Gly Asn Val Phe Ser Cys Ser Val Met His Glu Ala Leu
        435                 440                 445

His Asn Ala Tyr Thr Gln Lys Ser Leu Ser Leu Ser Pro Gly Lys
    450                 455                 460

<210> SEQ ID NO 19
<211> LENGTH: 214
<212> TYPE: PRT
<213> ORGANISM: Artificial
<220> FEATURE:
<223> OTHER INFORMATION: Light chain 1 of <VEGF-ANG-2> CrossMAb IgG1
      with AAA mutations and P329G LALA mutations (VEGFang2-0016)

<400> SEQUENCE: 19

Asp Ile Gln Leu Thr Gln Ser Pro Ser Ser Leu Ser Ala Ser Val Gly
1               5                   10                  15

Asp Arg Val Thr Ile Thr Cys Ser Ala Ser Gln Asp Ile Ser Asn Tyr
            20                  25                  30

Leu Asn Trp Tyr Gln Gln Lys Pro Gly Lys Ala Pro Lys Val Leu Ile
        35                  40                  45

Tyr Phe Thr Ser Ser Leu His Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Ser Thr Val Pro Trp
                85                  90                  95

Thr Phe Gly Gln Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
```

```
                    145                 150                 155                 160
Glu Ser Val Thr Glu Gln Asp Ser Lys Asp Ser Thr Tyr Ser Leu Ser
                    165                 170                 175

Ser Thr Leu Thr Leu Ser Lys Ala Asp Tyr Glu Lys His Lys Val Tyr
                    180                 185                 190

Ala Cys Glu Val Thr His Gln Gly Leu Ser Ser Pro Val Thr Lys Ser
                    195                 200                 205

Phe Asn Arg Gly Glu Cys
                    210

<210> SEQ ID NO 20
<211> LENGTH: 213
<212> TYPE: PRT
<213> ORGANISM: Artificial
<220> FEATURE:
<223> OTHER INFORMATION: Light chain 2 of <VEGF-ANG-2> CrossMAb IgG1
      with AAA mutations and P329G LALA mutations (VEGFang2-0016)

<400> SEQUENCE: 20

Ser Tyr Val Leu Thr Gln Pro Pro Ser Val Ser Val Ala Pro Gly Gln
1               5                   10                  15

Thr Ala Arg Ile Thr Cys Gly Gly Asn Asn Ile Gly Ser Lys Ser Val
                20                  25                  30

His Trp Tyr Gln Gln Lys Pro Gly Gln Ala Pro Val Leu Val Val Tyr
            35                  40                  45

Asp Asp Ser Asp Arg Pro Ser Gly Ile Pro Glu Arg Phe Ser Gly Ser
        50                  55                  60

Asn Ser Gly Asn Thr Ala Thr Leu Thr Ile Ser Arg Val Glu Ala Gly
65                  70                  75                  80

Asp Glu Ala Asp Tyr Tyr Cys Gln Val Trp Asp Ser Ser Ser Asp His
                    85                  90                  95

Trp Val Phe Gly Gly Gly Thr Lys Leu Thr Val Leu Ser Ser Ala Ser
                    100                 105                 110

Thr Lys Gly Pro Ser Val Phe Pro Leu Ala Pro Ser Ser Lys Ser Thr
                    115                 120                 125

Ser Gly Gly Thr Ala Ala Leu Gly Cys Leu Val Lys Asp Tyr Phe Pro
            130                 135                 140

Glu Pro Val Thr Val Ser Trp Asn Ser Gly Ala Leu Thr Ser Gly Val
145                 150                 155                 160

His Thr Phe Pro Ala Val Leu Gln Ser Ser Gly Leu Tyr Ser Leu Ser
                    165                 170                 175

Ser Val Val Thr Val Pro Ser Ser Ser Leu Gly Thr Gln Thr Tyr Ile
                    180                 185                 190

Cys Asn Val Asn His Lys Pro Ser Asn Thr Lys Val Asp Lys Lys Val
                    195                 200                 205

Glu Pro Lys Ser Cys
                    210

<210> SEQ ID NO 21
<211> LENGTH: 107
<212> TYPE: PRT
<213> ORGANISM: Homo sapiens

<400> SEQUENCE: 21

Arg Thr Val Ala Ala Pro Ser Val Phe Ile Phe Pro Pro Ser Asp Glu
1               5                   10                  15

Gln Leu Lys Ser Gly Thr Ala Ser Val Val Cys Leu Leu Asn Asn Phe
```

```
            20                  25                  30
Tyr Pro Arg Glu Ala Lys Val Gln Trp Lys Val Asp Asn Ala Leu Gln
        35                  40                  45

Ser Gly Asn Ser Gln Glu Ser Val Thr Glu Gln Asp Ser Lys Asp Ser
    50                  55                  60

Thr Tyr Ser Leu Ser Ser Thr Leu Thr Leu Ser Lys Ala Asp Tyr Glu
65                  70                  75                  80

Lys His Lys Val Tyr Ala Cys Glu Val Thr His Gln Gly Leu Ser Ser
                85                  90                  95

Pro Val Thr Lys Ser Phe Asn Arg Gly Glu Cys
            100                 105

<210> SEQ ID NO 22
<211> LENGTH: 105
<212> TYPE: PRT
<213> ORGANISM: homo sapiens

<400> SEQUENCE: 22

Gln Pro Lys Ala Ala Pro Ser Val Thr Leu Phe Pro Pro Ser Ser Glu
1               5                  10                  15

Glu Leu Gln Ala Asn Lys Ala Thr Leu Val Cys Leu Ile Ser Asp Phe
            20                  25                  30

Tyr Pro Gly Ala Val Thr Val Ala Trp Lys Ala Asp Ser Ser Pro Val
        35                  40                  45

Lys Ala Gly Val Glu Thr Thr Thr Pro Ser Lys Gln Ser Asn Asn Lys
    50                  55                  60

Tyr Ala Ala Ser Ser Tyr Leu Ser Leu Thr Pro Glu Gln Trp Lys Ser
65                  70                  75                  80

His Arg Ser Tyr Ser Cys Gln Val Thr His Glu Gly Ser Thr Val Glu
                85                  90                  95

Lys Thr Val Ala Pro Thr Glu Cys Ser
            100                 105

<210> SEQ ID NO 23
<211> LENGTH: 330
<212> TYPE: PRT
<213> ORGANISM: Homo sapiens

<400> SEQUENCE: 23

Ala Ser Thr Lys Gly Pro Ser Val Phe Pro Leu Ala Pro Ser Ser Lys
1               5                  10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
```

```
            130                 135                 140
Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
                195                 200                 205

Lys Ala Leu Pro Ala Pro Ile Glu Lys Thr Ile Ser Lys Ala Lys Gly
            210                 215                 220

Gln Pro Arg Glu Pro Gln Val Tyr Thr Leu Pro Pro Ser Arg Asp Glu
225                 230                 235                 240

Leu Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
                260                 265                 270

Asn Tyr Lys Thr Thr Pro Pro Val Leu Asp Ser Asp Gly Ser Phe Phe
            275                 280                 285

Leu Tyr Ser Lys Leu Thr Val Asp Lys Ser Arg Trp Gln Gln Gly Asn
            290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 24
<211> LENGTH: 191
<212> TYPE: PRT
<213> ORGANISM: Homo sapiens

<400> SEQUENCE: 24

Met Asn Phe Leu Leu Ser Trp Val His Trp Ser Leu Ala Leu Leu Leu
1               5                   10                  15

Tyr Leu His His Ala Lys Trp Ser Gln Ala Ala Pro Met Ala Glu Gly
                20                  25                  30

Gly Gly Gln Asn His His Glu Val Val Lys Phe Met Asp Val Tyr Gln
            35                  40                  45

Arg Ser Tyr Cys His Pro Ile Glu Thr Leu Val Asp Ile Phe Gln Glu
    50                  55                  60

Tyr Pro Asp Glu Ile Glu Tyr Ile Phe Lys Pro Ser Cys Val Pro Leu
65                  70                  75                  80

Met Arg Cys Gly Gly Cys Cys Asn Asp Glu Gly Leu Glu Cys Val Pro
                85                  90                  95

Thr Glu Glu Ser Asn Ile Thr Met Gln Ile Met Arg Ile Lys Pro His
                100                 105                 110

Gln Gly Gln His Ile Gly Glu Met Ser Phe Leu Gln His Asn Lys Cys
            115                 120                 125

Glu Cys Arg Pro Lys Lys Asp Arg Ala Arg Gln Glu Asn Pro Cys Gly
130                 135                 140

Pro Cys Ser Glu Arg Arg Lys His Leu Phe Val Gln Asp Pro Gln Thr
145                 150                 155                 160

Cys Lys Cys Ser Cys Lys Asn Thr Asp Ser Arg Cys Lys Ala Arg Gln
                165                 170                 175
```

```
Leu Glu Leu Asn Glu Arg Thr Cys Arg Cys Asp Lys Pro Arg Arg
            180                 185                 190

<210> SEQ ID NO 25
<211> LENGTH: 496
<212> TYPE: PRT
<213> ORGANISM: Homo sapiens

<400> SEQUENCE: 25

Met Trp Gln Ile Val Phe Phe Thr Leu Ser Cys Asp Leu Val Leu Ala
1               5                   10                  15

Ala Ala Tyr Asn Asn Phe Arg Lys Ser Met Asp Ser Ile Gly Lys Lys
            20                  25                  30

Gln Tyr Gln Val Gln His Gly Ser Cys Ser Tyr Thr Phe Leu Leu Pro
        35                  40                  45

Glu Met Asp Asn Cys Arg Ser Ser Ser Ser Pro Tyr Val Ser Asn Ala
    50                  55                  60

Val Gln Arg Asp Ala Pro Leu Glu Tyr Asp Asp Ser Val Gln Arg Leu
65                  70                  75                  80

Gln Val Leu Glu Asn Ile Met Glu Asn Asn Thr Gln Trp Leu Met Lys
                85                  90                  95

Leu Glu Asn Tyr Ile Gln Asp Asn Met Lys Lys Glu Met Val Glu Ile
            100                 105                 110

Gln Gln Asn Ala Val Gln Asn Gln Thr Ala Val Met Ile Glu Ile Gly
        115                 120                 125

Thr Asn Leu Leu Asn Gln Thr Ala Glu Gln Thr Arg Lys Leu Thr Asp
    130                 135                 140

Val Glu Ala Gln Val Leu Asn Gln Thr Thr Arg Leu Glu Leu Gln Leu
145                 150                 155                 160

Leu Glu His Ser Leu Ser Thr Asn Lys Leu Glu Lys Gln Ile Leu Asp
                165                 170                 175

Gln Thr Ser Glu Ile Asn Lys Leu Gln Asp Lys Asn Ser Phe Leu Glu
            180                 185                 190

Lys Lys Val Leu Ala Met Glu Asp Lys His Ile Ile Gln Leu Gln Ser
        195                 200                 205

Ile Lys Glu Glu Lys Asp Gln Leu Gln Val Leu Val Ser Lys Gln Asn
    210                 215                 220

Ser Ile Ile Glu Glu Leu Glu Lys Lys Ile Val Thr Ala Thr Val Asn
225                 230                 235                 240

Asn Ser Val Leu Gln Lys Gln Gln His Asp Leu Met Glu Thr Val Asn
                245                 250                 255

Asn Leu Leu Thr Met Met Ser Thr Ser Asn Ser Ala Lys Asp Pro Thr
            260                 265                 270

Val Ala Lys Glu Glu Gln Ile Ser Phe Arg Asp Cys Ala Glu Val Phe
        275                 280                 285

Lys Ser Gly His Thr Thr Asn Gly Ile Tyr Thr Leu Thr Phe Pro Asn
    290                 295                 300

Ser Thr Glu Glu Ile Lys Ala Tyr Cys Asp Met Glu Ala Gly Gly Gly
305                 310                 315                 320

Gly Trp Thr Ile Ile Gln Arg Arg Glu Asp Gly Ser Val Asp Phe Gln
                325                 330                 335

Arg Thr Trp Lys Glu Tyr Lys Val Gly Phe Gly Asn Pro Ser Gly Glu
            340                 345                 350

Tyr Trp Leu Gly Asn Glu Phe Val Ser Gln Leu Thr Asn Gln Gln Arg
        355                 360                 365
```

```
Tyr Val Leu Lys Ile His Leu Lys Asp Trp Glu Gly Asn Glu Ala Tyr
    370             375             380

Ser Leu Tyr Glu His Phe Tyr Leu Ser Ser Glu Glu Leu Asn Tyr Arg
385             390             395                         400

Ile His Leu Lys Gly Leu Thr Gly Thr Ala Gly Lys Ile Ser Ser Ile
            405             410                 415

Ser Gln Pro Gly Asn Asp Phe Ser Thr Lys Asp Gly Asp Asn Asp Lys
            420             425             430

Cys Ile Cys Lys Cys Ser Gln Met Leu Thr Gly Gly Trp Trp Phe Asp
        435             440             445

Ala Cys Gly Pro Ser Asn Leu Asn Gly Met Tyr Tyr Pro Gln Arg Gln
    450             455             460

Asn Thr Asn Lys Phe Asn Gly Ile Lys Trp Tyr Tyr Trp Lys Gly Ser
465             470             475                         480

Gly Tyr Ser Leu Lys Ala Thr Thr Met Met Ile Arg Pro Ala Asp Phe
            485             490             495
```